United States Patent
Li et al.

(10) Patent No.: US 12,467,048 B2
(45) Date of Patent: Nov. 11, 2025

(54) METHODS FOR MAPPING PERSONALIZED TRANSLATOME

(71) Applicant: Northwestern University, Evanston, IL (US)

(72) Inventors: Qianru Li, Evanston, IL (US); Haiwang Yang, Evanston, IL (US); Zhe Ji, Evanston, IL (US)

(73) Assignee: Northwestern University, Evanston, IL (US)

( * ) Notice: Subject to any disclaimer, the term of this patent is extended or adjusted under 35 U.S.C. 154(b) by 1010 days.

(21) Appl. No.: 17/543,476

(22) Filed: Dec. 6, 2021

(65) Prior Publication Data
US 2022/0213468 A1    Jul. 7, 2022

Related U.S. Application Data

(60) Provisional application No. 63/121,680, filed on Dec. 4, 2020.

(51) Int. Cl.
| | |
|---|---|
| *C12Q 1/68* | (2018.01) |
| *C12N 9/22* | (2006.01) |
| *C12N 15/10* | (2006.01) |
| *C12N 15/11* | (2006.01) |
| *C12N 15/63* | (2006.01) |

(52) U.S. Cl.
CPC ........... *C12N 15/1065* (2013.01); *C12N 9/22* (2013.01); *C12N 15/1096* (2013.01); *C12Y 301/27008* (2013.01); *C12N 2800/80* (2013.01)

(58) Field of Classification Search
None
See application file for complete search history.

(56) References Cited

U.S. PATENT DOCUMENTS

2009/0075256 A1\*  3/2009  Lyamichev .......... C12Q 1/6832
                                                       435/6.1

FOREIGN PATENT DOCUMENTS

WO        WO-0190337 A2 \*  11/2001  ........... C12N 9/1252

OTHER PUBLICATIONS

Ingolia (Ribosome Footprint Profiling of Translation throughout the Genome, Primer, published Mar. 24, 2016) (Year: 2016).\*

\* cited by examiner

*Primary Examiner* — Gary Benzion
*Assistant Examiner* — Elizabeth Rose Lafave
(74) *Attorney, Agent, or Firm* — Foley & Lardner LLP

(57) ABSTRACT

A low-input RNase footprinting approach is described for the rapid quantification of ribosome-protected fragments with 1,000-100,000 cells. The assay uses a simplified procedure for capturing ribosome-RNA complexes based on optimized RNase digestion. It simultaneously maps cytosolic and mitochondrial translation with single-nucleotide resolution.

Figure 1:
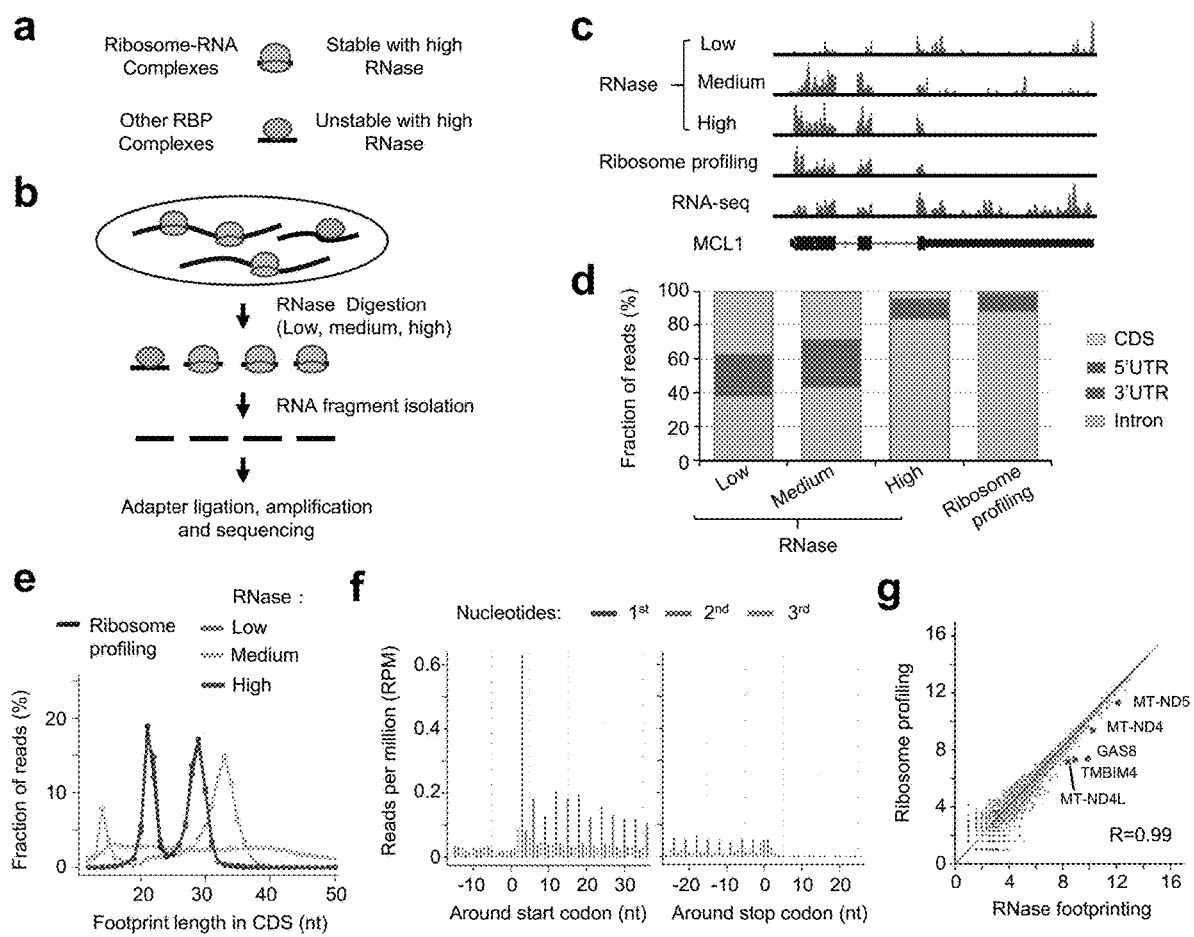

22 Claims, 34 Drawing Sheets
Specification includes a Sequence Listing.

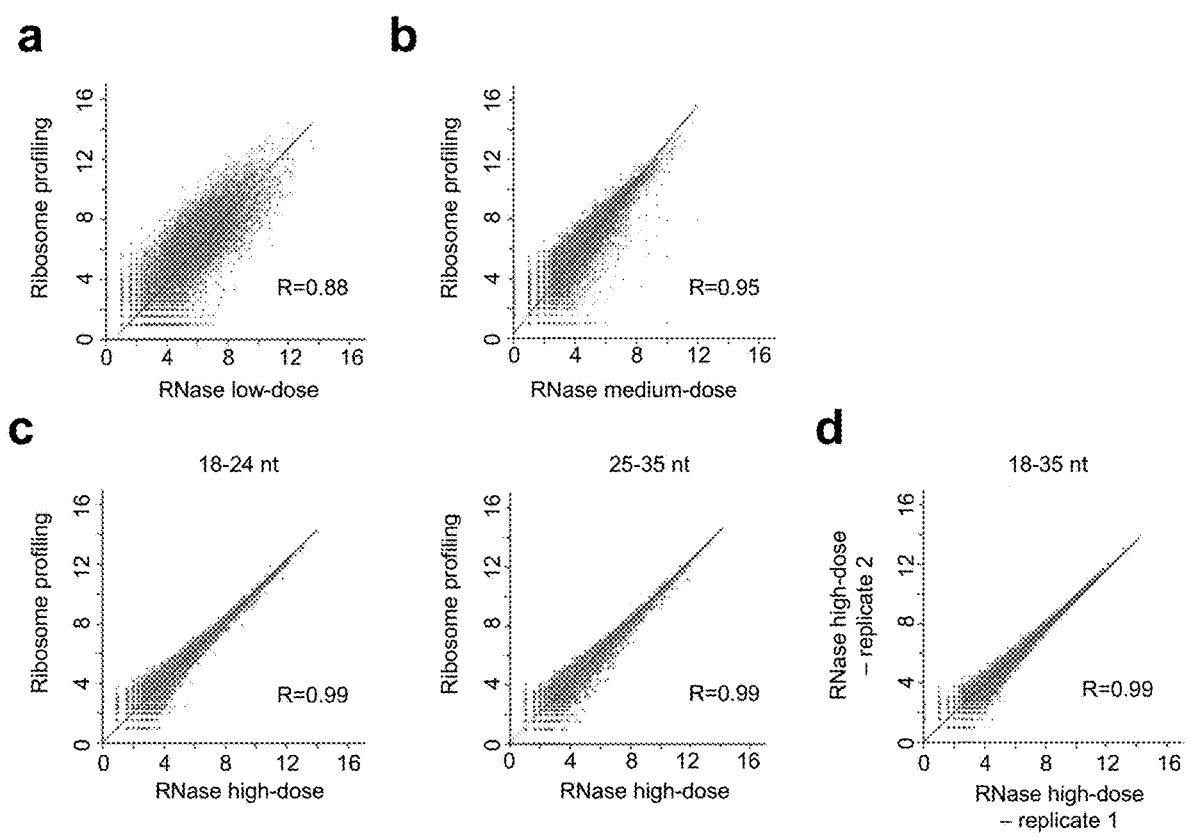
Figures 10a-d

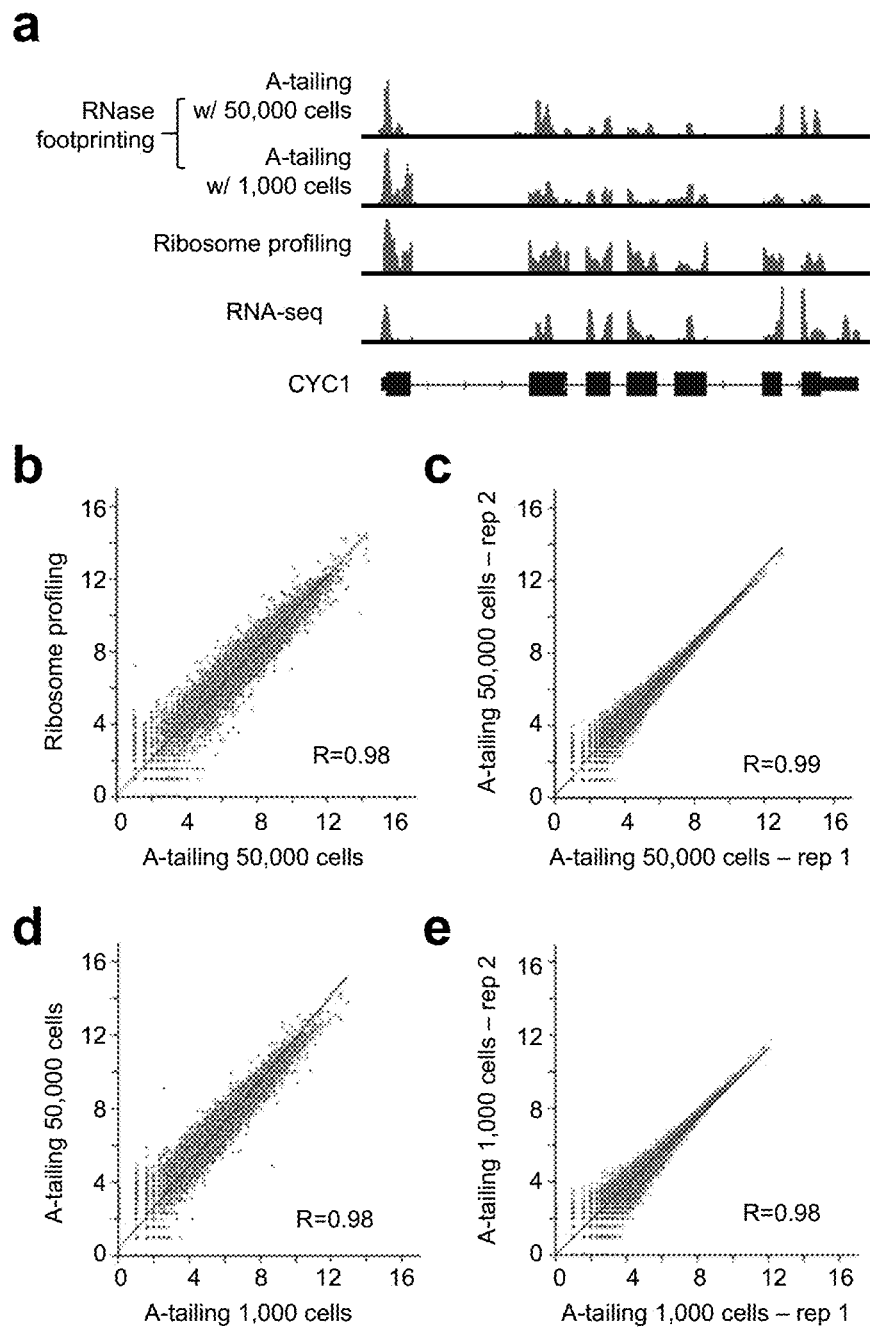
Figures 11a-e

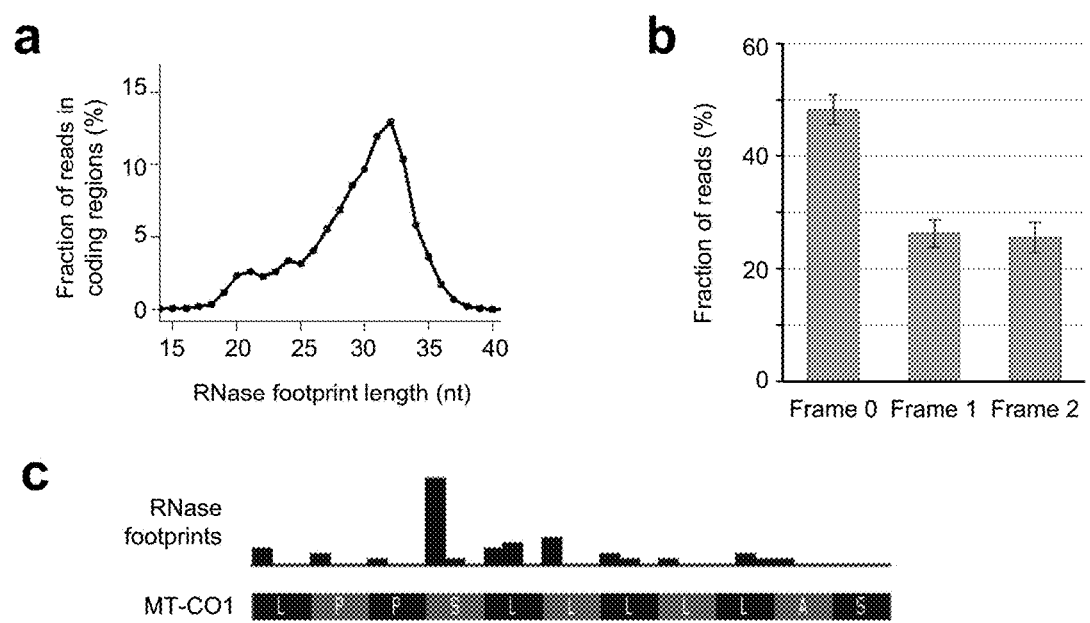
Figures 12a-c

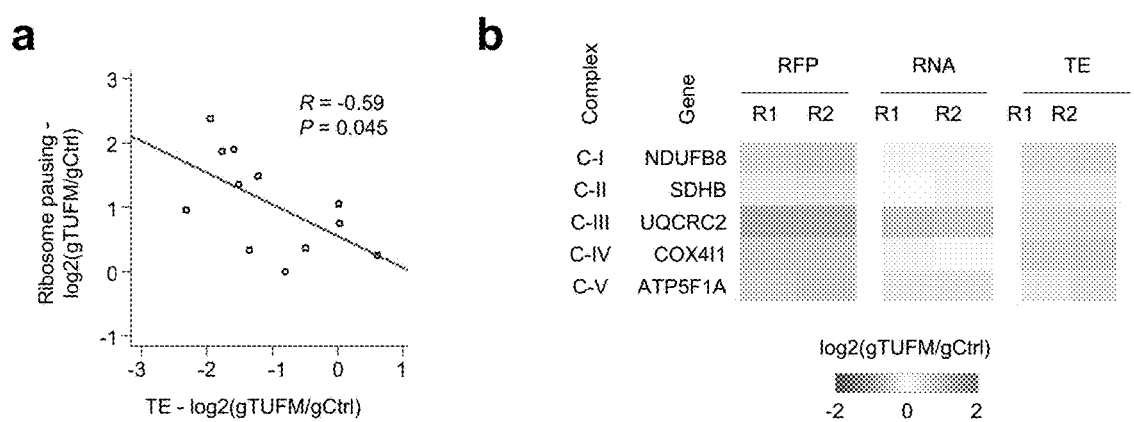
Figures 13a-b

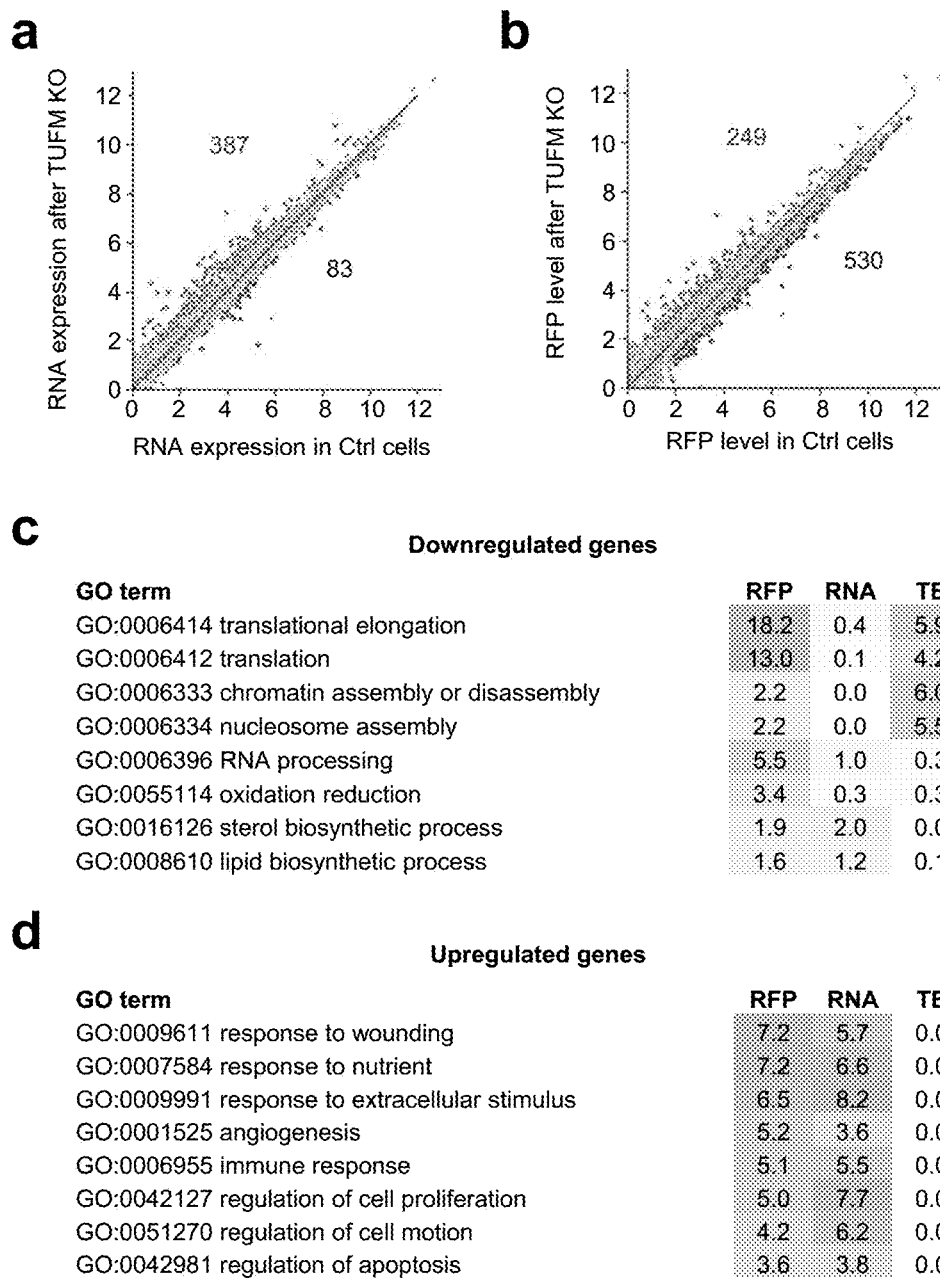
Figures 14a-d

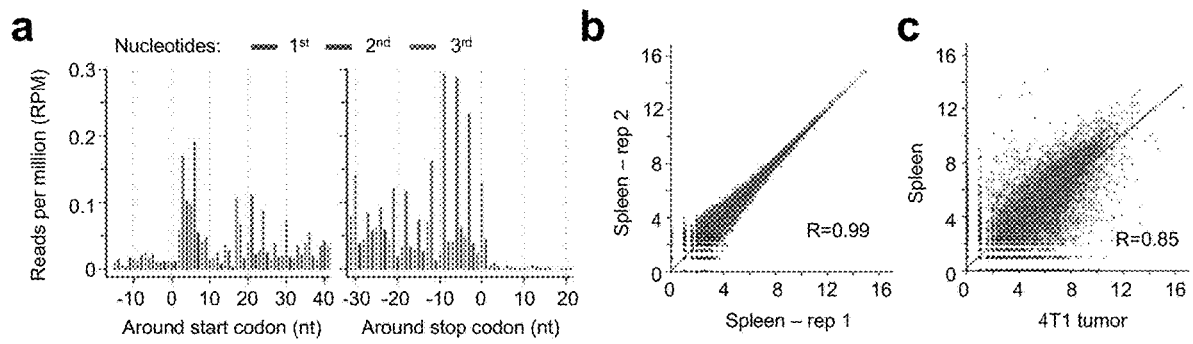
Figures 15a-c

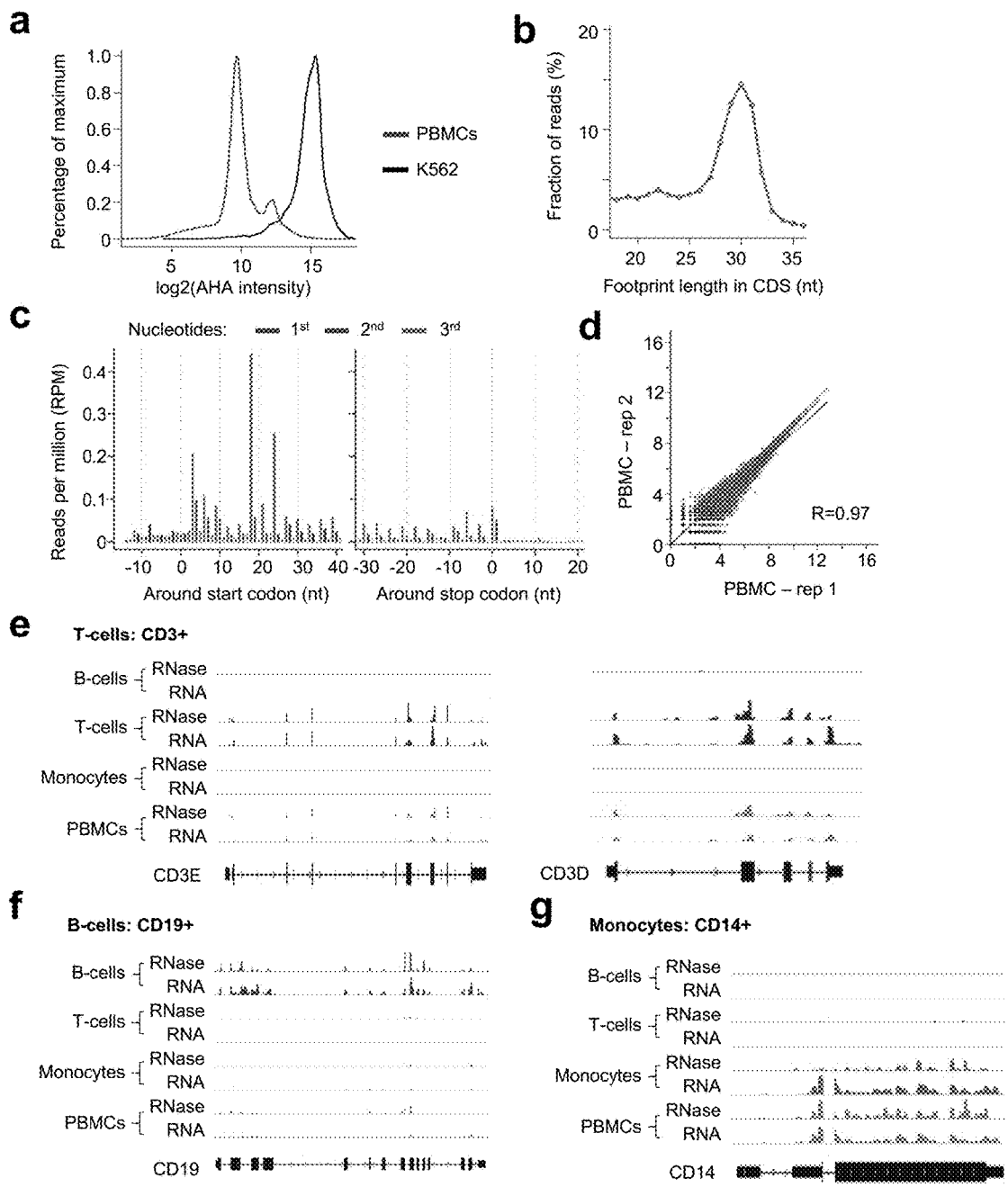
Figures 16a-g

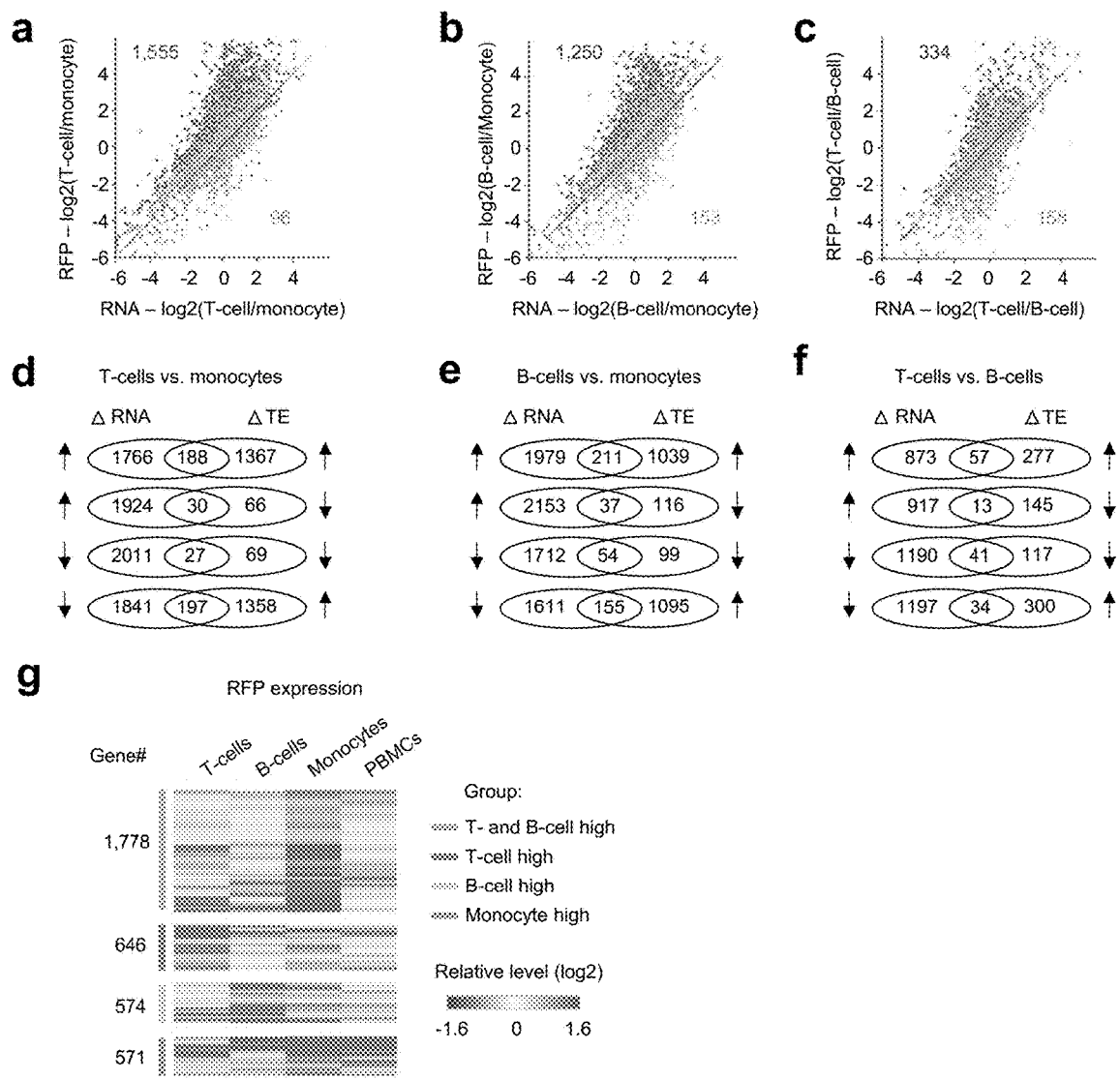
Figures 17a-g a
T-cell high

| GO_BP | RFP | RNA | TE |
|---|---|---|---|
| GO:0042110 T cell activation | 8.0 | 8.2 | 0.3 |
| GO:0046649 lymphocyte activation | 6.4 | 7.3 | 0.4 |
| GO:0050863 regulation of T cell activation | 3.7 | 8.8 | 0.6 |
| GO:0016055 Wnt receptor signaling pathway | 3.7 | 1.9 | 0.1 |
| GO:0006917 induction of apoptosis | 3.5 | 5.0 | 0.1 |
| GO:0030217 T cell differentiation | 3.4 | 4.3 | 0.4 | b
B-cell high

| GO_BP | RFP | RNA | TE |
|---|---|---|---|
| GO:0046649 lymphocyte activation | 5.9 | 2.2 | 0.9 |
| GO:0051056 regulation of small GTPase mediated signal transduction | 5.9 | 0.9 | 0.0 |
| GO:0030888 regulation of B cell proliferation | 5.8 | 3.0 | 0.0 |
| GO:0042113 B cell activation | 5.4 | 3.4 | 0.3 |
| GO:0050864 regulation of B cell activation | 4.6 | 2.8 | 0.0 |
| GO:0009891 positive regulation of biosynthetic process | 4.5 | 0.7 | 0.4 |
| GO:0046578 regulation of Ras protein signal transduction | 4.5 | 0.4 | 0.0 | c
Monocyte high

| GO_BP | RFP | RNA | TE |
|---|---|---|---|
| GO:0009611 response to wounding | 18.3 | 19.5 | 0.8 |
| GO:0006954 inflammatory response | 14.1 | 12.4 | 1.6 |
| GO:0006952 defense response | 13.3 | 13.5 | 1.0 |
| GO:0016044 membrane organization | 7.8 | 14.8 | 0.1 |
| GO:0006955 immune response | 7.6 | 16.5 | 0.8 |
| GO:0006909 phagocytosis | 7.4 | 7.1 | 0.0 |
| GO:0006935 chemotaxis | 7.1 | 6.7 | 0.2 |
| GO:0006897 endocytosis | 7.1 | 14.7 | 0.2 |
| GO:0009617 response to bacterium | 5.7 | 7.3 | 0.6 |
| GO:0006928 cell motion | 5.0 | 5.1 | 0.0 | d
T- and B-cell high

| GO_BP | RFP | RNA | TE |
|---|---|---|---|
| GO:0006396 RNA processing | 21.2 | 3.3 | 12.5 |
| GO:0051276 chromosome organization | 20.8 | 0.3 | 9.5 |
| GO:0016568 chromatin modification | 16.7 | 0.6 | 8.9 |
| GO:0045449 regulation of transcription | 14.4 | 21.3 | 8.7 |
| GO:0007049 cell cycle | 9.6 | 1.0 | 11.3 |
| GO:0006259 DNA metabolic process | 9.0 | 1.8 | 3.7 |
| GO:0006403 RNA localization | 6.8 | 0.0 | 2.6 |
| GO:0006281 DNA repair | 6.6 | 0.8 | 2.5 |
| GO:0006412 translation | 5.5 | 32.2 | 2.2 |
| GO:0006414 translational elongation | 2.4 | 70.1 | 0.0 |

Figures 18a-d

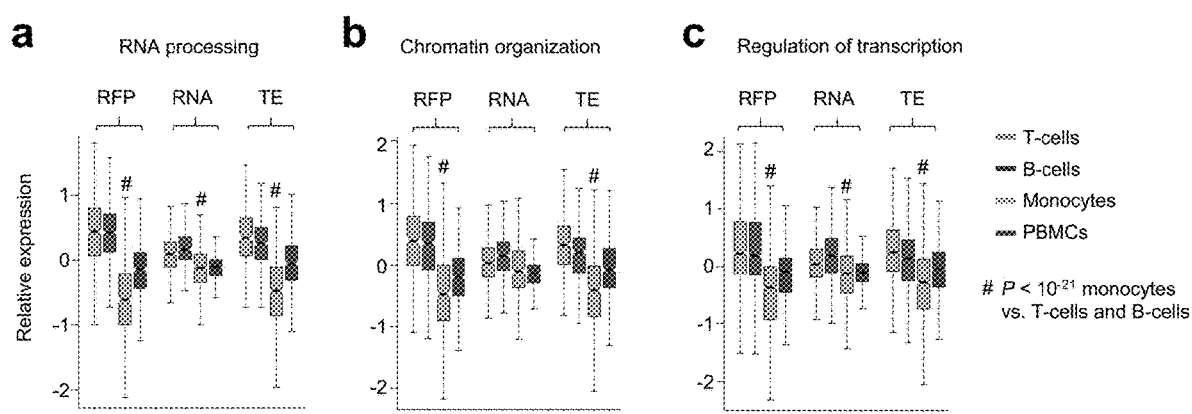
Figures 19a-c

Figures 21A-H
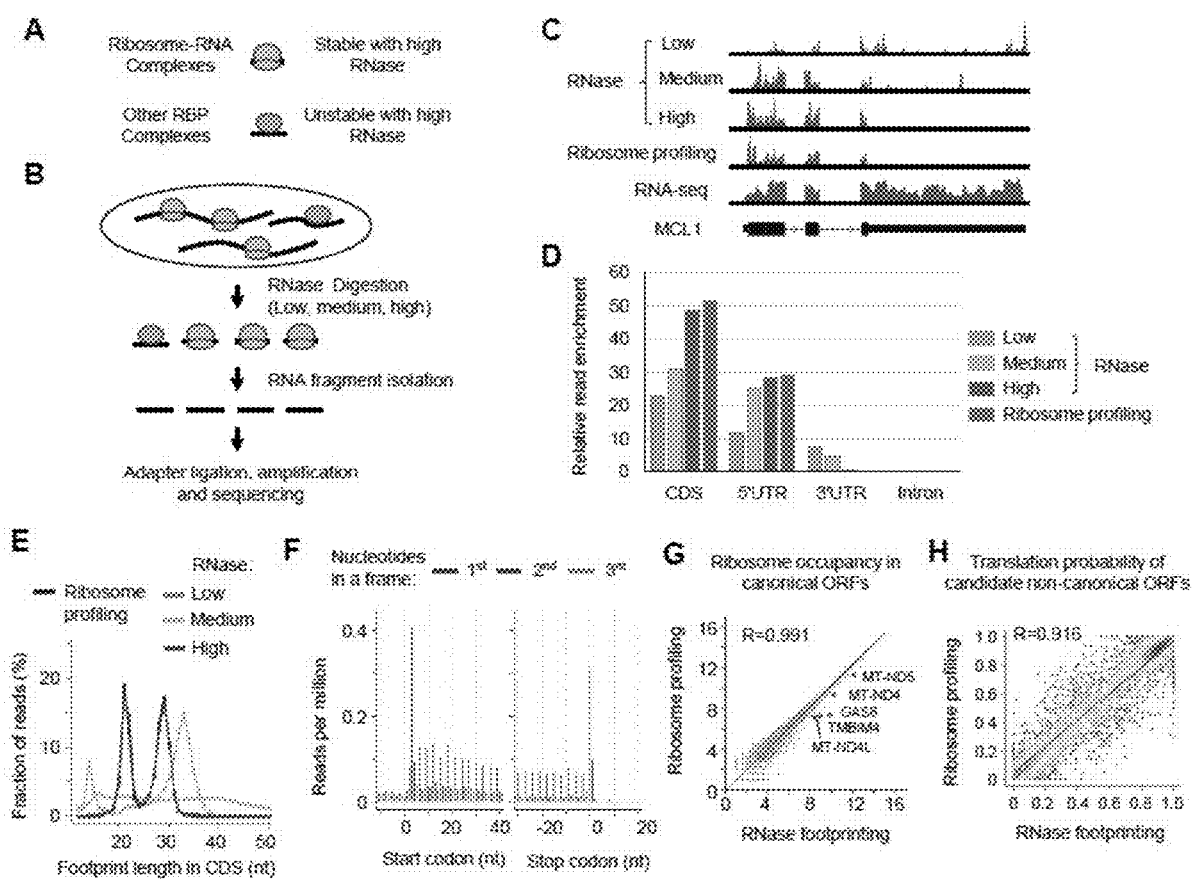

Figures 22A-H
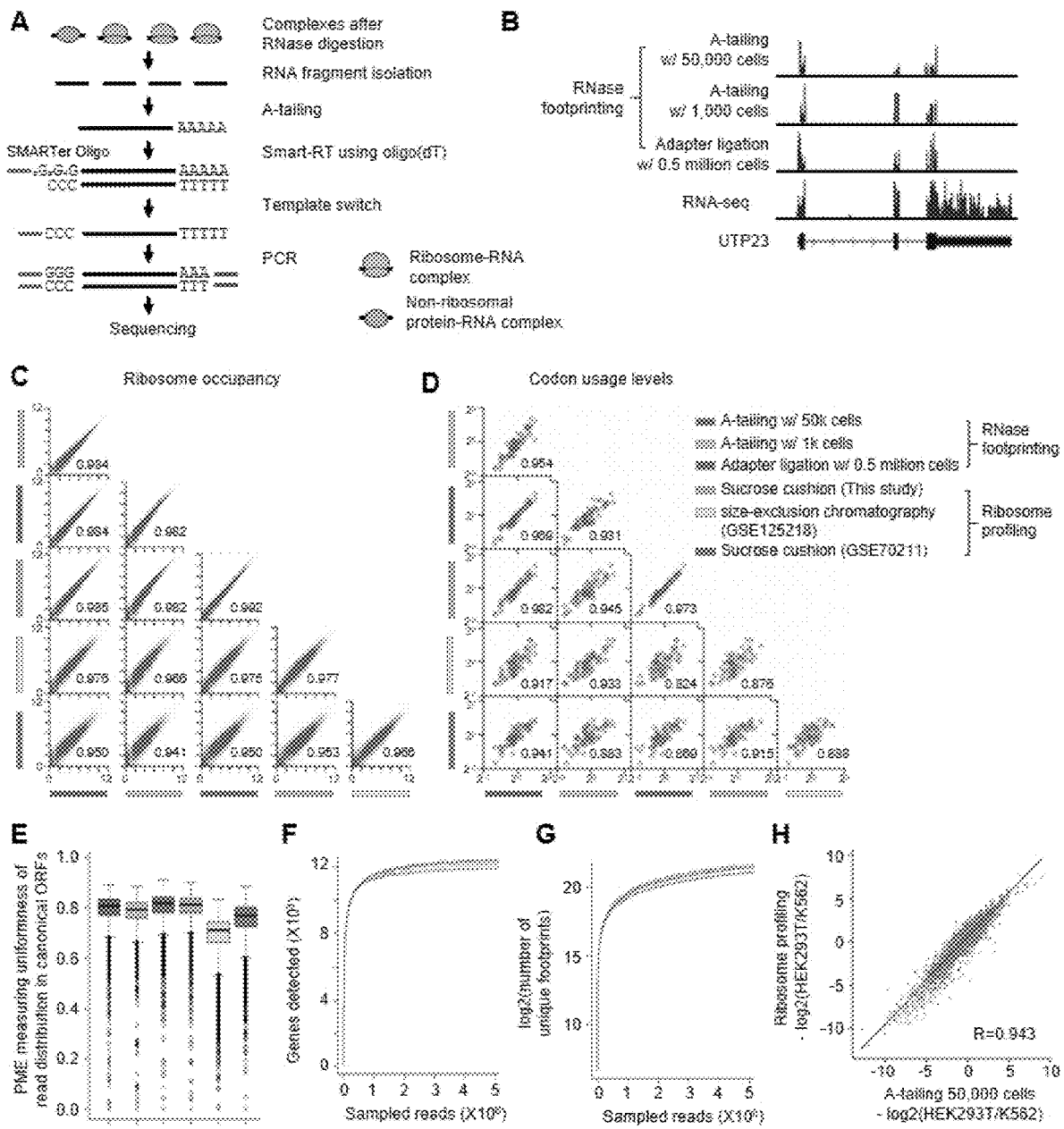

Figures 23A-G
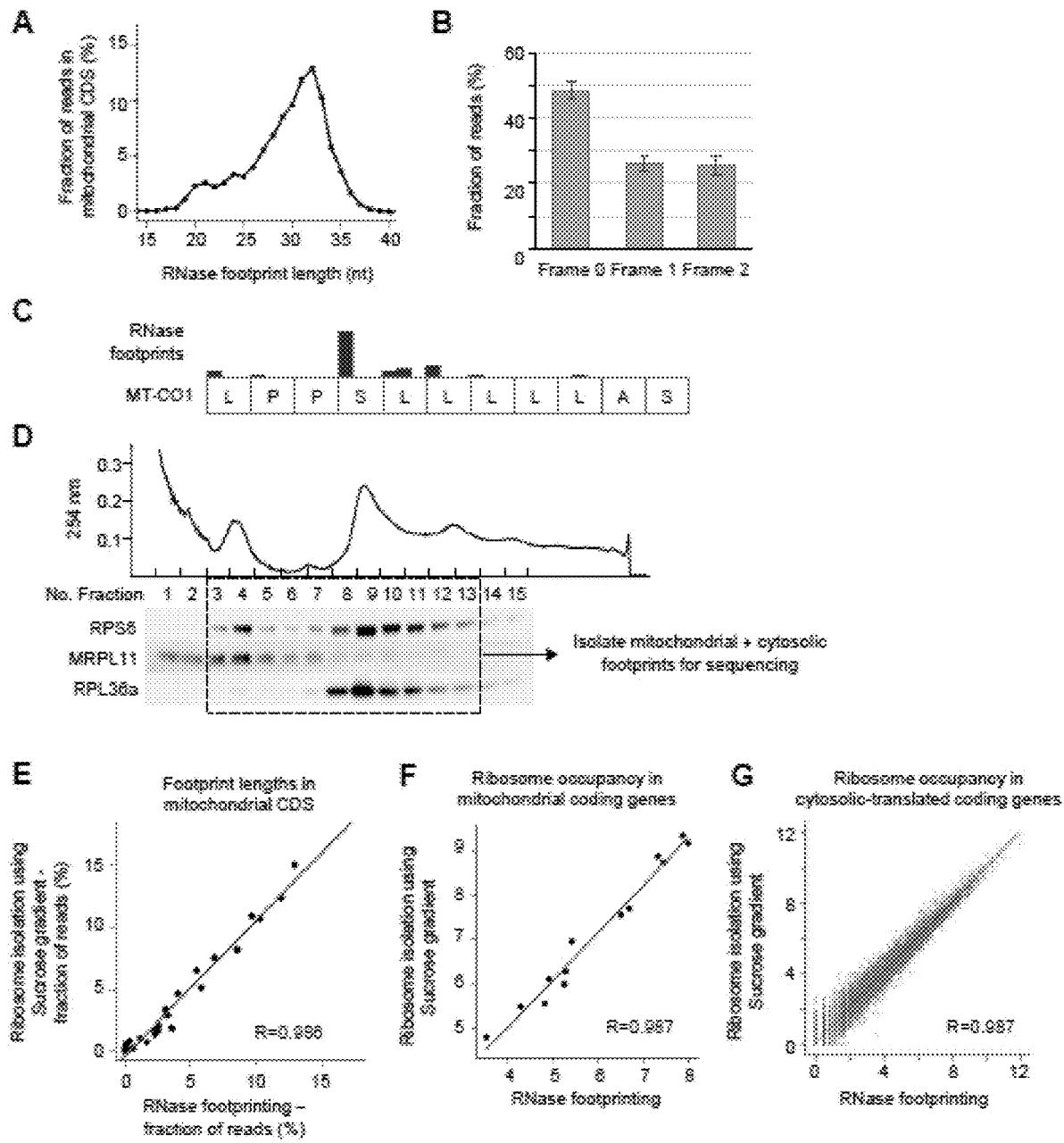

Figures 24A-I
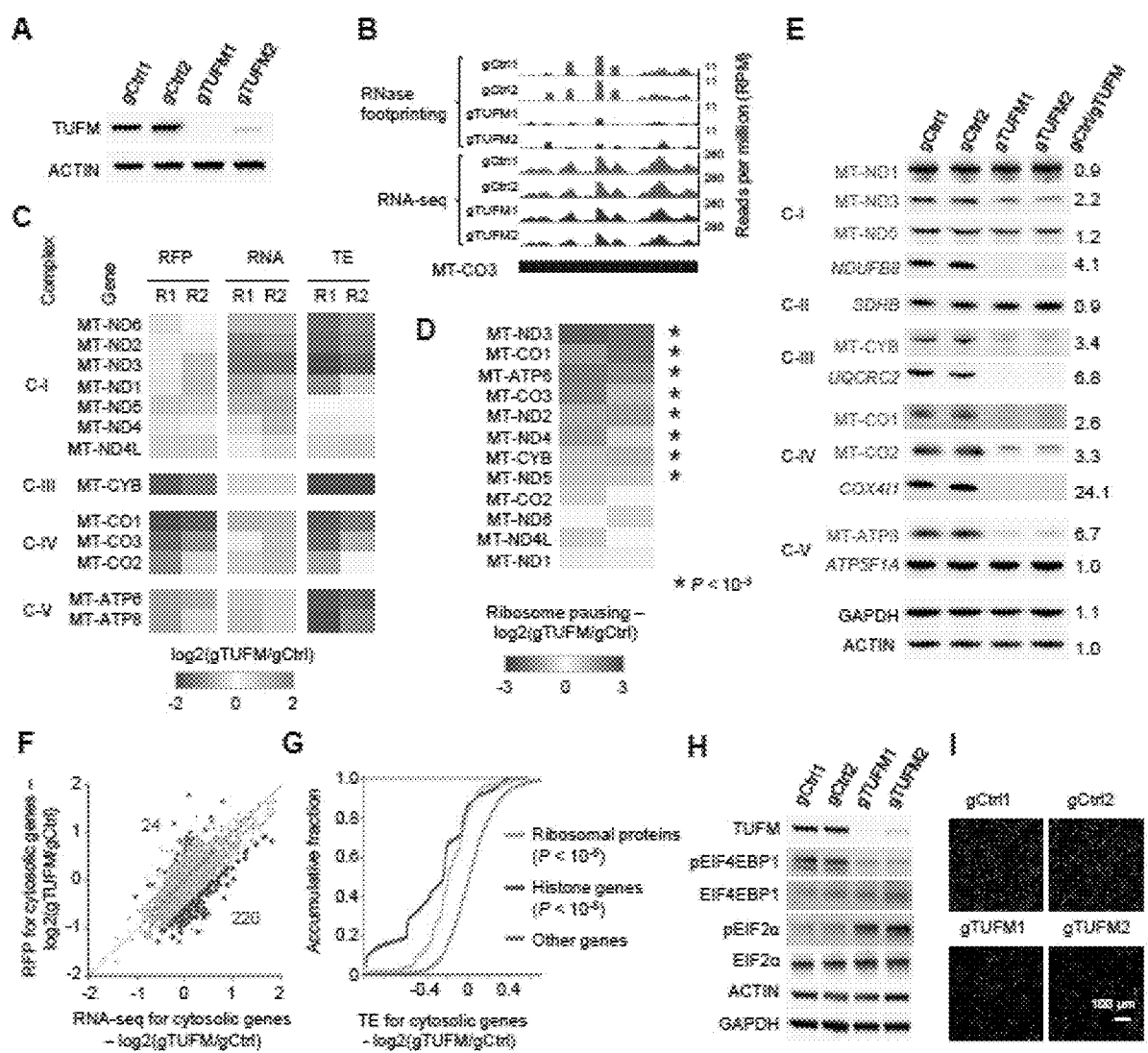

Figures 25A-F
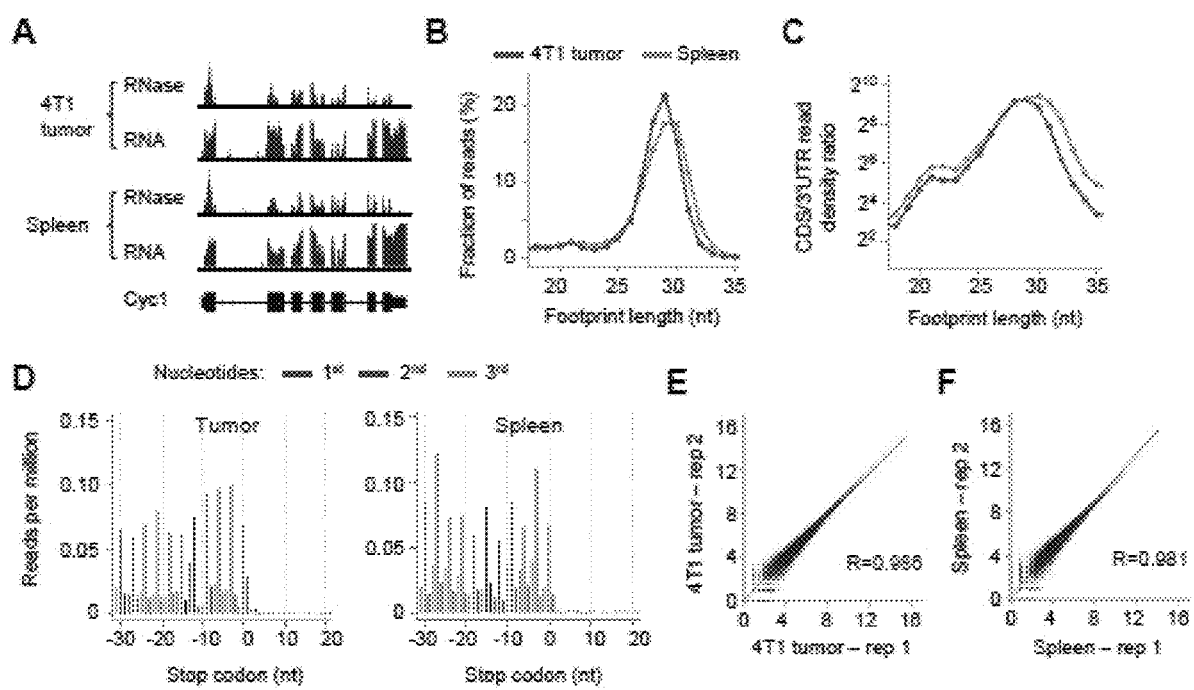

Figures 26A-H
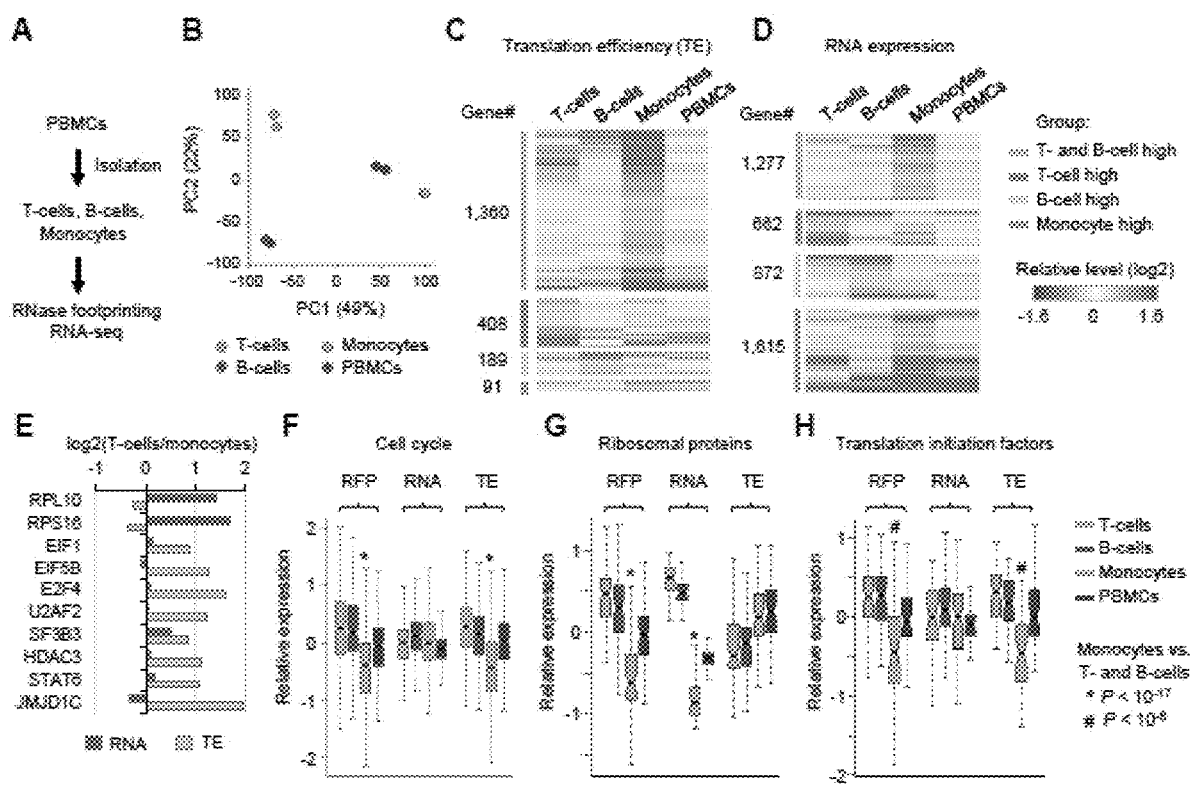

Figures 27A-D
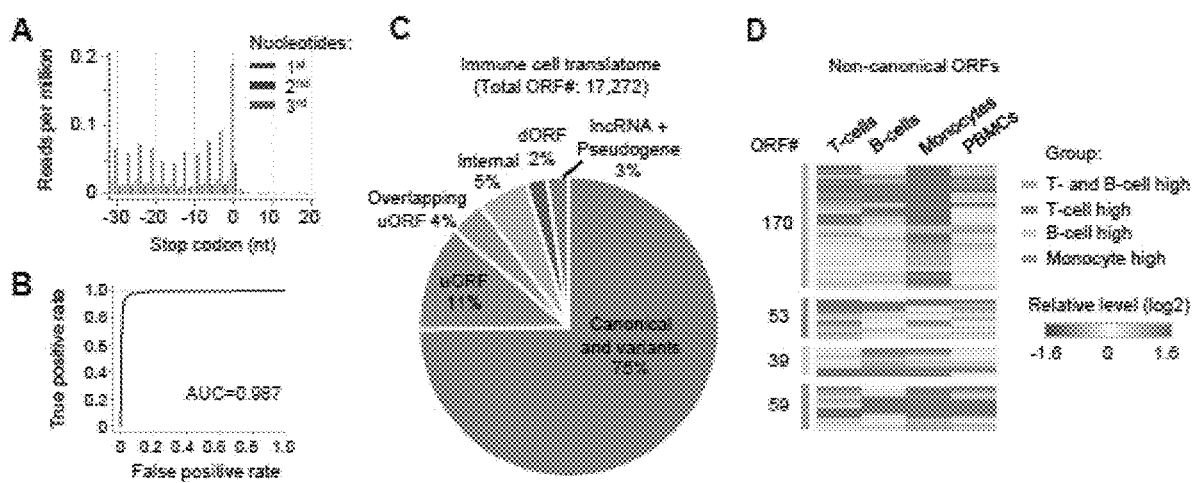

Figures 28A-G
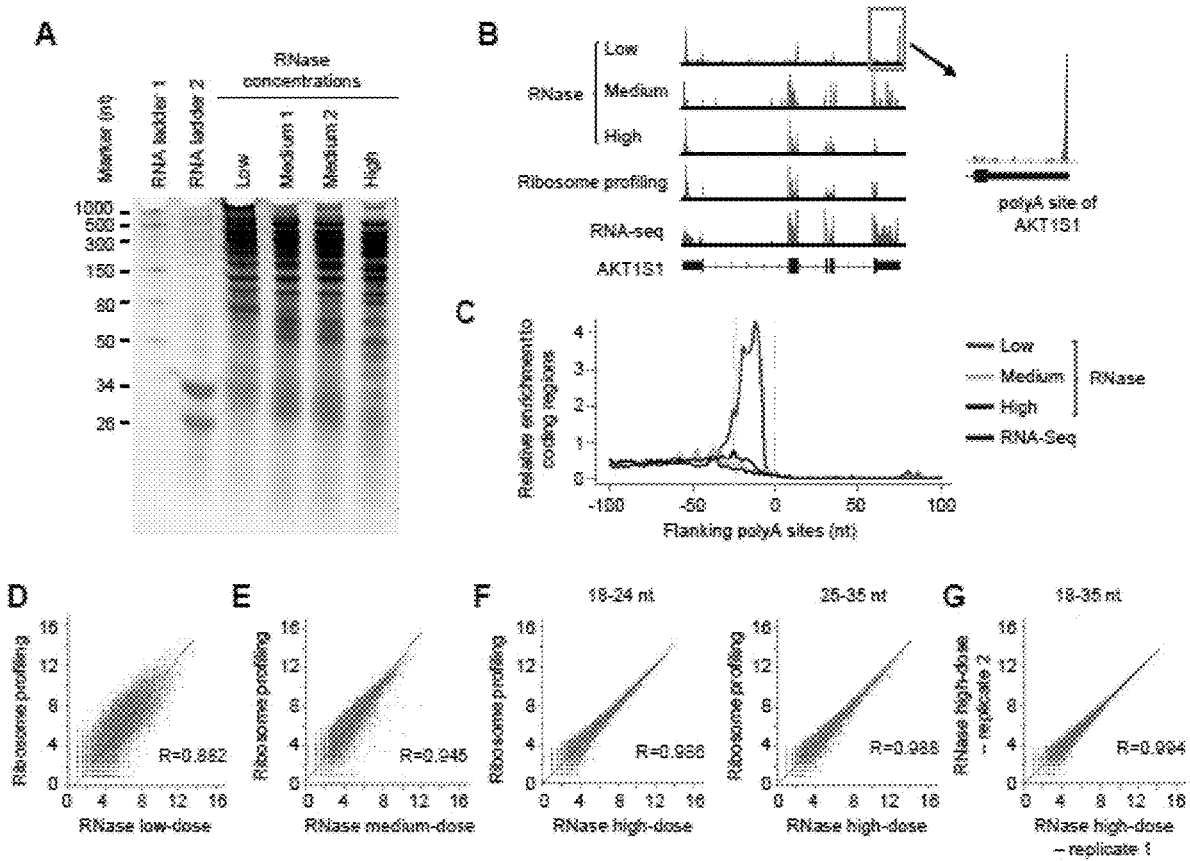

Figures 29A-G
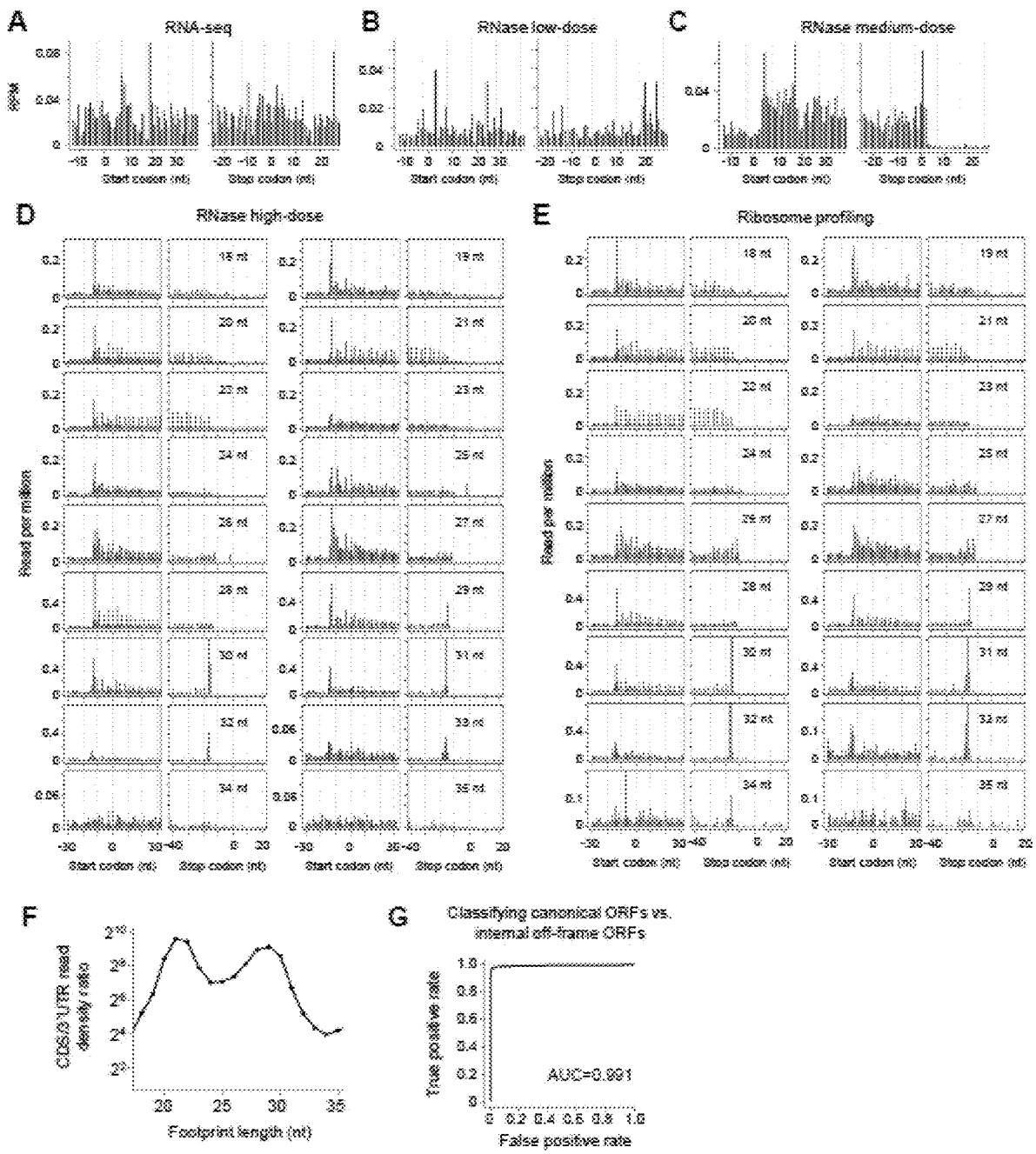

Figures 30A-H
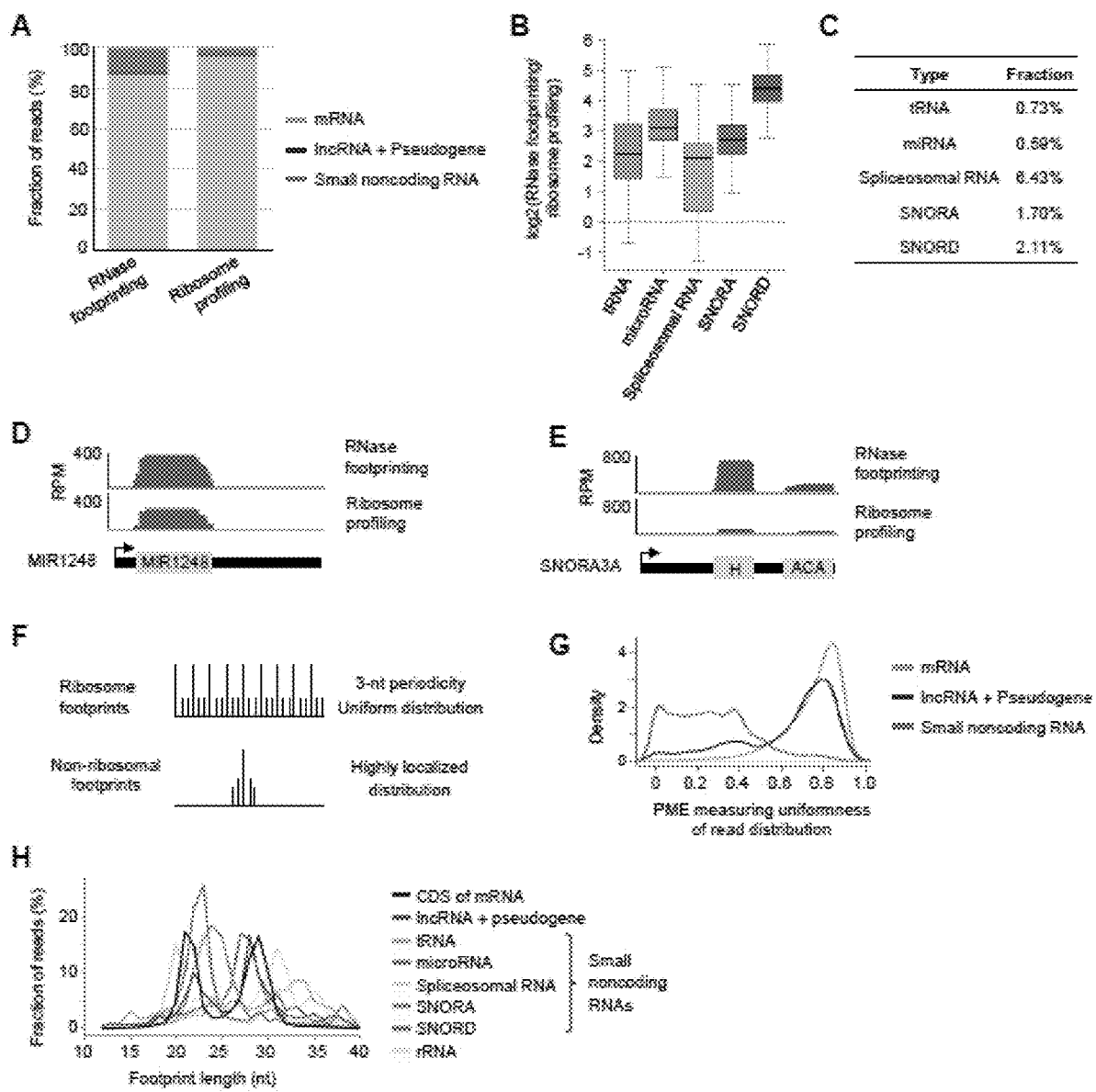

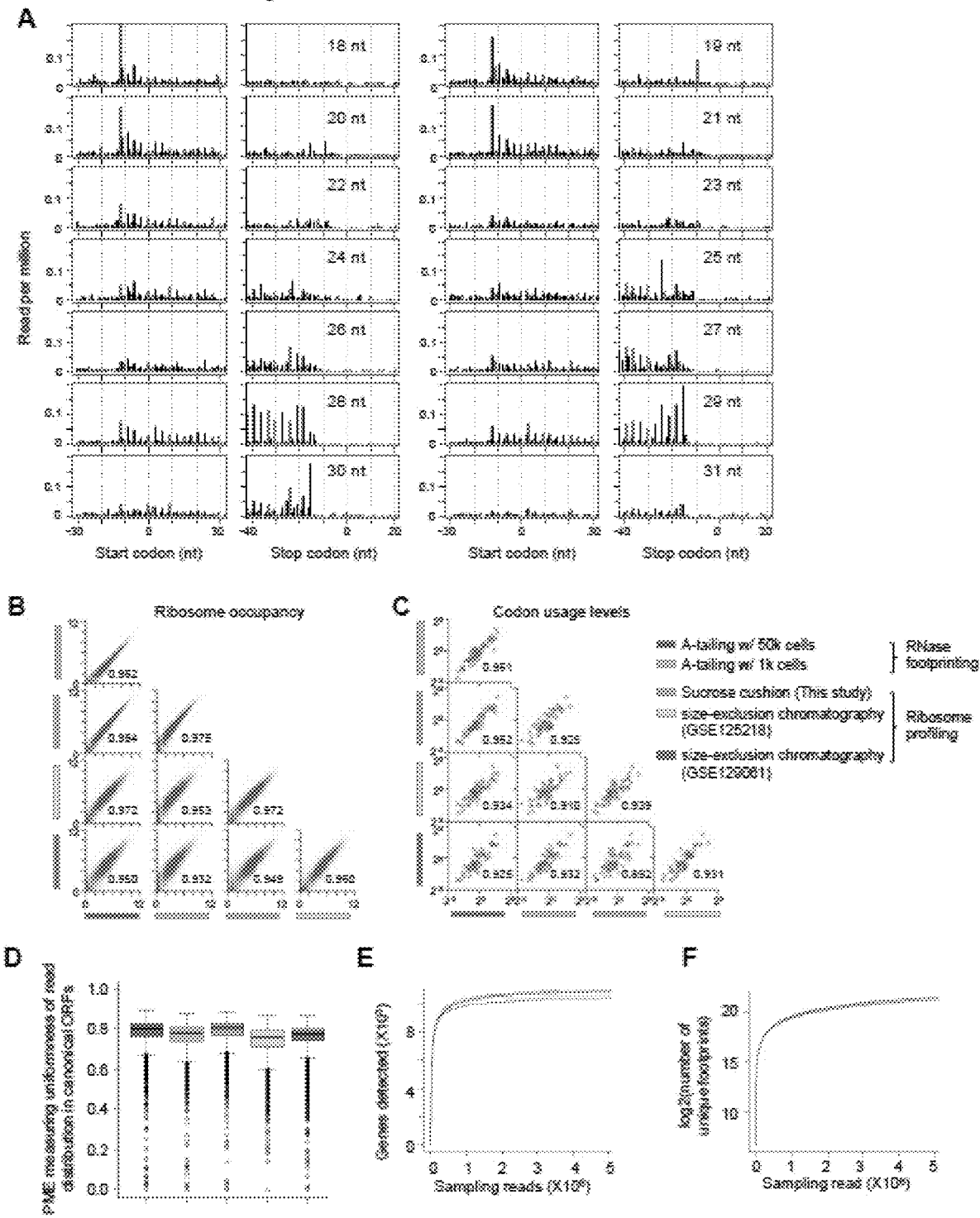
Figures 31A-F

Figures 32A-I
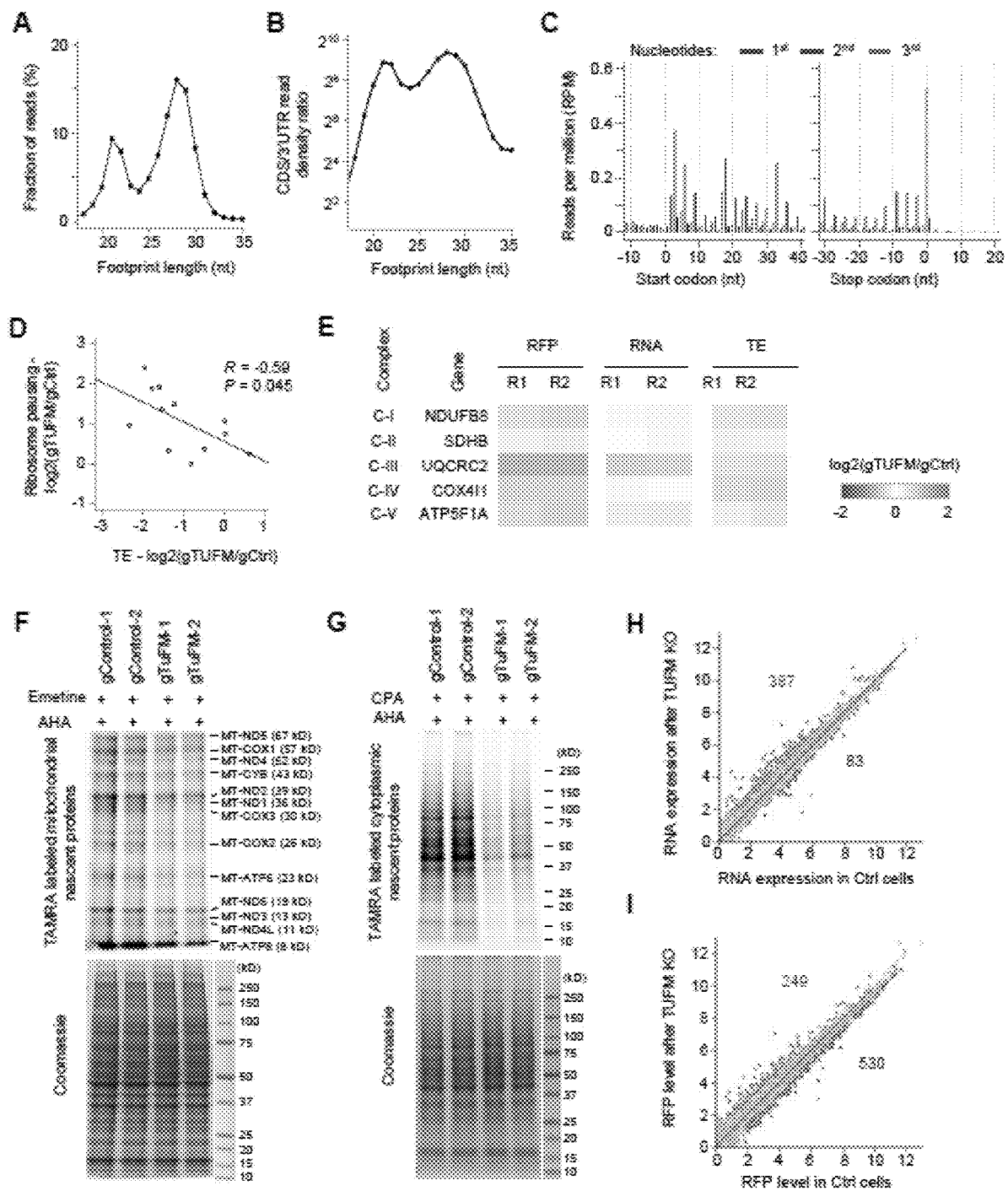

Figures 33A-H
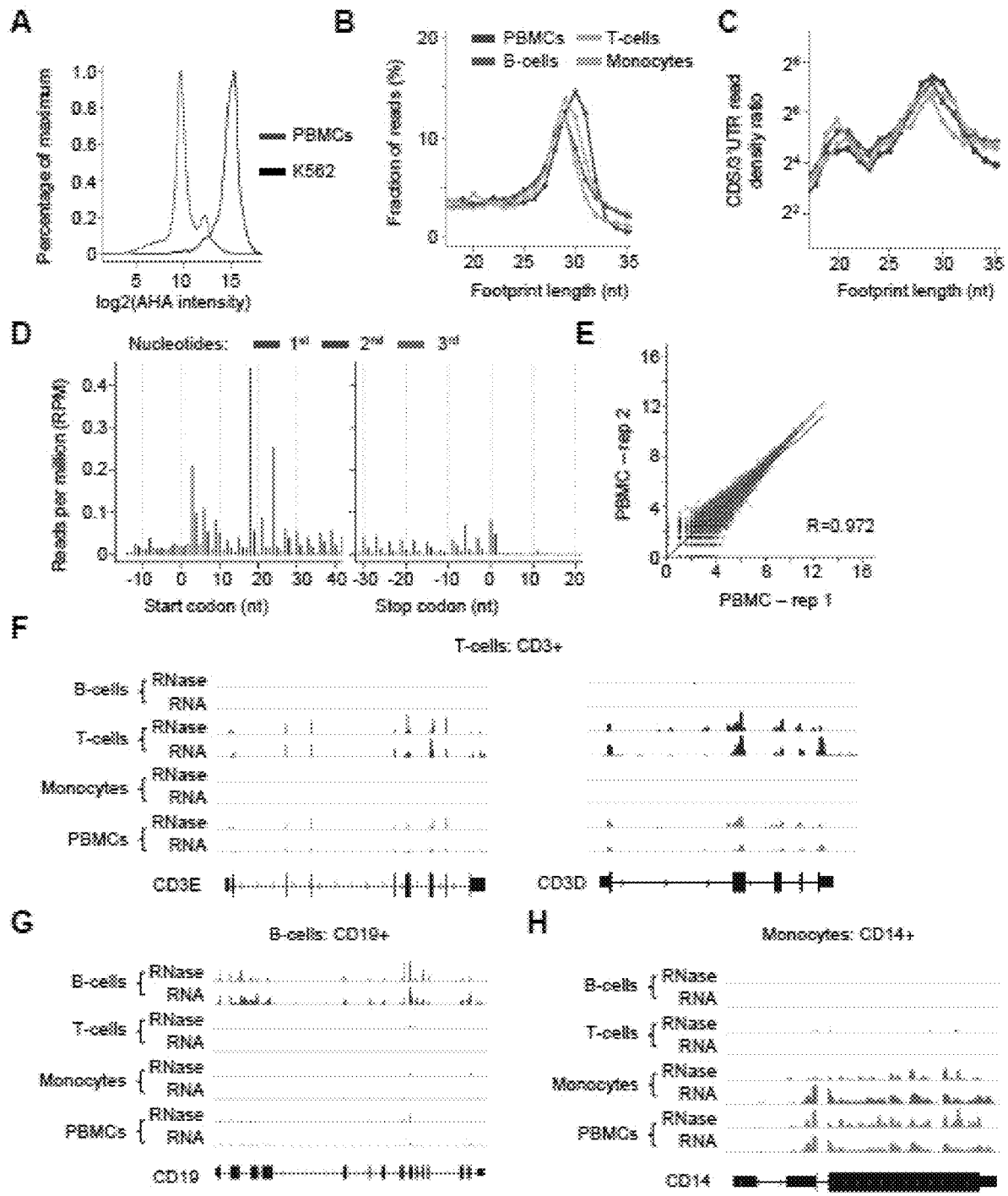

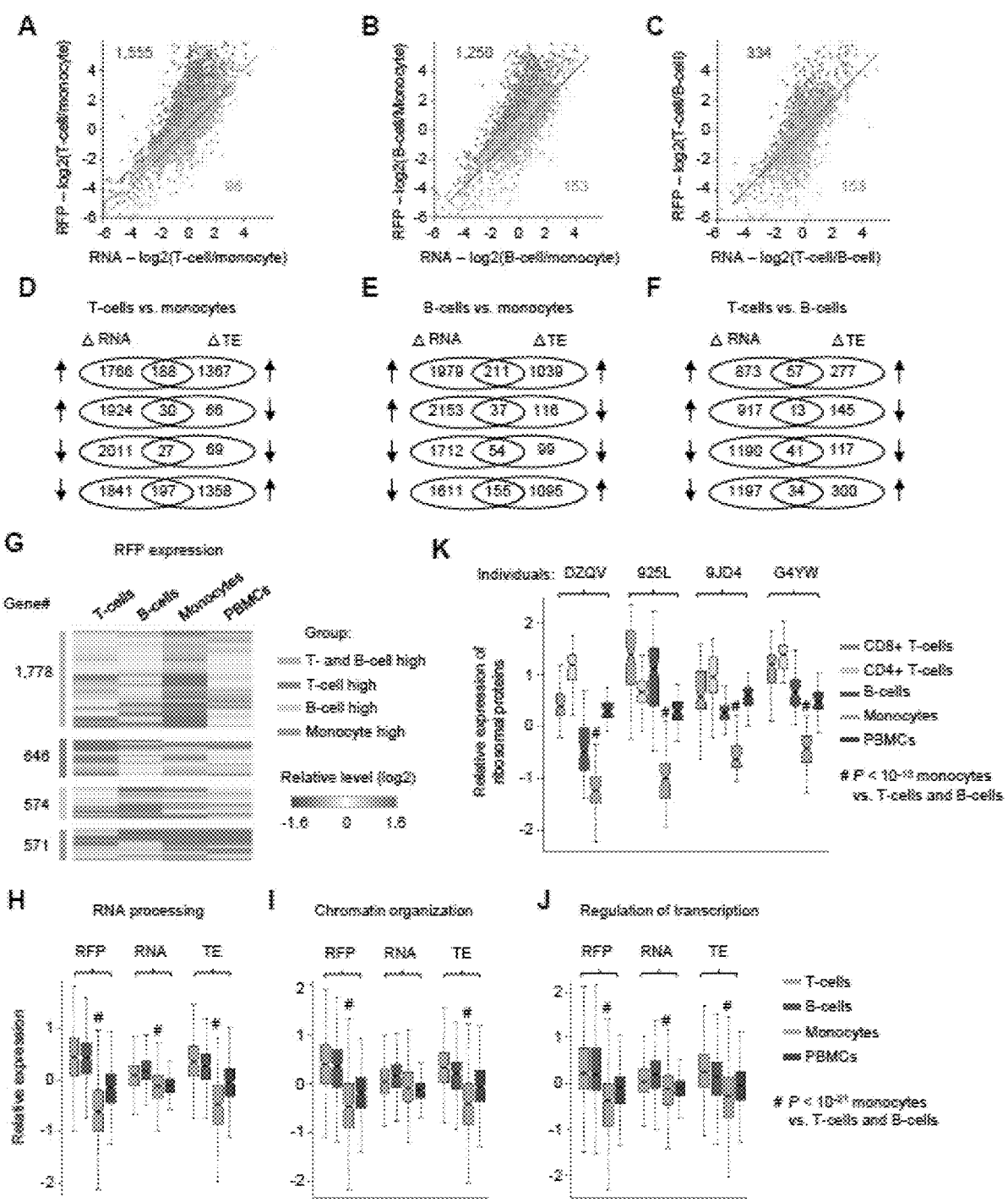
Figures 34A-K

SEQUENCE LISTING

<160> NUMBER OF SEQ ID NOS: 16

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
ctaggagctt gccatgcccg                                                    20

<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
cgttggtacg gtcctccccg                                                    20

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
taaggggcta acttggtccc                                                    20

<210> SEQ ID NO 4
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
agatcggaag                                                               10

```
<210> SEQ ID NO 5
<211> LENGTH: 10
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
aaaaaaaaaa                                                               10

<210> SEQ ID NO 6
<211> LENGTH: 51
<212> TYPE: DNA
<213> ORGANISM: Artificial Sequence
<220> FEATURE:
<223> OTHER INFORMATION: Description of Artificial Sequence: Synthetic
      primer
<220> FEATURE:
<221> NAME/KEY: modified_base
<222> LOCATION: (20)..(34)
<223> OTHER INFORMATION: a, c, t, g, unknown or other
<220> FEATURE:
<221> NAME/KEY: modified_base
<222> LOCATION: (51)..(51)
<223> OTHER INFORMATION: a, c, t, g, unknown or other

<400> SEQUENCE: 6
acgtgtgctc ttccgatctn nnnnnnnnnn nnnntttttt ttttttttv n                  51

<210> SEQ ID NO 7
<211> LENGTH: 37
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<223> OTHER INFORMATION: Description of Combined DNA/RNA Molecule:
      Synthetic oligonucleotide
<220> FEATURE:
<221> NAME/KEY: modified_base
<222> LOCATION: (31)..(34)
<223> OTHER INFORMATION: a, c, t, g, unknown or other

<400> SEQUENCE: 7
ctctttccct acacgacgct cttccgatct nnnnggg                                 37

<210> SEQ ID NO 8
<211> LENGTH: 27
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 8
gatctacact ctttccctac acgacgc                                            27

<210> SEQ ID NO 9
<211> LENGTH: 34
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 9
gtgactggag ttcagacgtg tgctcttccg atct                                    34
```

<210> SEQ ID NO 10
<211> LENGTH: 42
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 10
aatgatacgg cgaccaccga gatctacact ctttccctac ac                           42

<210> SEQ ID NO 11
<211> LENGTH: 51
<212> TYPE: DNA
<213> ORGANISM: Artificial Sequence
<220> FEATURE:
<223> OTHER INFORMATION: Description of Artificial Sequence: Synthetic
      primer
<220> FEATURE:
<221> NAME/KEY: modified_base
<222> LOCATION: (25)..(29)
<223> OTHER INFORMATION: a, c, t, g, unknown or other

<400> SEQUENCE: 11
caagcagaag acggcatacg agatnnnnng tgactggagt tcagacgtgt g                 51

<210> SEQ ID NO 12
<211> LENGTH: 194
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 12
aatgatacgg cgaccaccga gatctacact ctttccctac acgacgctct tccgatctat        60
cggggagcag ggtagagttg gtgctatctg cactagccat ttcaaccaaa gtgttttcat       120
tcaaatactg agatcggaag agcacacgtc tgaactccag tcacatcgct atctcgtatg       180
ccgtcttctg cttg                                                         194

<210> SEQ ID NO 13
<211> LENGTH: 174
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 13
aatgatacgg cgaccaccga gatctacact ctttccctac acgacgctct tccgatctat        60
cggggatctg cactagccat ttcaaccaaa gtgttttcat tcaaatactg agatcggaag       120
agcacacgtc tgaactccag tcacatcgct atctcgtatg ccgtcttctg cttg             174

<210> SEQ ID NO 14
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 14
cgaggagatt gacaatgccc                                                    20

```
<210> SEQ ID NO 15
<211> LENGTH: 11
<212> TYPE: PRT
<213> ORGANISM: Homo sapiens

<400> SEQUENCE: 15

Leu Pro Pro Ser Leu Leu Leu Leu Leu Ala Ser
1               5                   10

<210> SEQ ID NO 16
<211> LENGTH: 25
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16
tttttttttt tttttttttt ttttt                                              25
```

METHODS FOR MAPPING PERSONALIZED TRANSLATOME

The present application claims priority to U.S. provisional application No. 63/121,680 filed Dec. 4, 2020, which is incorporated herein by references for all purposes.

STATEMENT OF GOVERNMENT SUPPORT

This invention was made with government support under grant numbers R00 CA 207865 and R35GM138192 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Mar. 11, 2022, is named 121384-0170_SL.txt and is 4,722 bytes in size.

BACKGROUND

RNA translation controls the protein production in a cell and is dynamically regulated during diverse biological processes, such as the stress response, cell differentiation, oncogenesis, and neuronal diseases[1-4]. Quantifying ribosome-protected RNA fragments represents a state-of-art approach to examine the regulation of RNA translation in vivo, and distinguishes protein synthesis vs. other layers of protein and RNA metabolic processes. Ribosome profiling technology uses RNase to digest RNA fragments not protected by protein complexes, isolates the 80S ribosome complexes, and purifies the ribosome footprints for deep sequencing[5, 6]. This method reveals active translation at single-nucleotide resolution. It has been widely used to study various aspects of protein synthesis, such as the regulation of translation efficiency[7, 8], alternative translation initiation[9, 10], ribosome elongation and pausing[11, 12] codon usage[13], and identifying novel translated ORFs and micropeptides (<100 amino acids) encoded in a genome[14-17]. However, current ribosome profiling protocols typically involve complicated experimental procedures to isolate translating ribosome complexes, such as 80S ribosome complexes, such as ultracentrifugation through a sucrose cushion/gradient[6, 18], size-exclusion chromatography[19, 20], or pulling down ribosomes with empty A-sites using a puromycin-containing molecule[21]. These complex isolation steps are time-consuming and require many starting materials (typically using millions of input cells). These technical barriers have prevented their application to physiological tissue samples with a small number of cells and/or low protein synthesis activity. As a result, most of the current understanding of translational control is based on experiments with cultured cells and is not in the physiological context.

To address this technical challenge, the present application suggests rapidly quantifying ribosome footprints using a simplified experimental procedure, which is accessible to various types of low-input cells. The assay is based on the fact that translating ribosomes, such as cytosolic ribosomes, e.g. 80S cytosolic ribosomes, and/or mitoribosomes, e.g. 55S mitoribosomes, have stronger protection affinity to RNA fragments than other RNA binding proteins (RBPs) in coding regions. By treating cell lysates with highly concentrated RNase, an embodiment of the invention retains RNA fragments bound by translating ribosomes while removing those associated with other proteins in coding regions. This embodiment detects the synchronized regulation of cytosolic and mitochondrial translation. An embodiment can map the translation landscape of small amounts of snap-frozen tissues and is compatible with a standard blood draw from a healthy donor to examine the regulation of personalized translatome using primary immune cells with low protein synthesis activity.

SUMMARY

An embodiment is an RNase footprinting method that provides a simplified method to obtain ribosome-RNA complexes using high-dose RNAse digestion, which does not involve conventional experimental procedures such as sucrose gradient, sucrose cushion, or polysome immunoprecipitation.

An embodiment is a method of RNAse footprinting comprising contacting a biological sample comprising cells with an RNAse in an amount sufficient to protect translational ribosome-bound fragments, sequencing the translational ribosome-bound fragments, and mapping the ribosome profile for each of the translational ribosome-bound fragments, wherein the number of cells in the biological sample is less than about 100,000, and wherein said method does not comprise centrifugation.

An embodiment is a method of low input RNase footprinting comprising contacting a biological sample comprising 50,000 or less cells with an RNase in an amount sufficient to protect translational ribosome-bound fragments, sequencing the translational ribosome-bound fragments, and mapping the ribosome profile for each of the translational ribosome-bound fragments, wherein said method does not comprise centrifugation.

In an embodiment, the RNAse has a concentration between 0.5 and 1.5 U/μl, more preferably 1.0 U/μl.

In an embodiment, the RNAse has a ratio of between 25 and 250 U RNAse/μg RNA, more preferably 50 U RNAse/μg RNA. Unless otherwise specified, the present application uses the definition of activity unit of RNase 1 from Lucigen (cat. no. N6901K) and Thermo Fisher™ (cat. no. EN0601/EN0602). In those documents, activity unit of RNase is defined by One unit that degrades 100 ng of E. coli ribosomal RNA per second into acid-soluble nucleotides at 37° C. An alternative definition of activity unit of RNase is from Ambion® (cat. no. AM2294/AM2295) where the activity unit is defined by as one unit being the amount of enzyme required to produce 1 μg of acid-soluble material from mouse liver RNA in 30 min at 37° C. To transfer the activity unit as defined from Lucigen (cat. no. N6901K) and Thermo Fisher™ (cat. no. EN0601/EN0602) into the alternative activity unit from Ambion® (cat. no. AM2294/AM2295) the former needs to be multiplied by ~10. Lucigen (cat. no. N6901K), Thermo Fisher™ (cat. no. EN0601/EN0602) Ambion® (cat. no. AM2294/AM2295) are incorporated herein by reference in their entirety.

In some embodiments, the RNase is selected from the group consisting of RNAse I, A, S7, and T1.

In some embodiments, the RNAse is RNAse I.

In some embodiments, the number of cells in the biological sample is about 1,000 to about 75,000. In some embodiments, the number of cells in the biological sample is about 1,000 to about 50,000. In some embodiments, the number of cells in the biological samples is less than about 50,000. In some embodiments, the number of cells in the biological sample is less than about 1,000. In some embodiments, the number of cells in the biological sample is less than about 500 or less than about 200 or less than about 100. In some embodiments, the number of cells in the biological sample is less than about 50 or less than about 20. In some embodiments, the biological sample includes a very limited number of cells, such as 15 cells or less; 10 cells or less; 5 cells or less, 4 cells or less; 3 cells or less, 2 cells or even a single cell.

In some embodiments, The biological sample comprises immune cells.

In some embodiments, the RNA fragments code proteins in multiple cellular regions.

In some embodiments, the RNA fragments code proteins in the mitochondria.

In some embodiments, the RNA fragments code proteins in the cytosol.

In each of the above embodiments, the translational ribosome-bound fragments may include one or both of cytosolic ribosome-bound fragments, such as 80S cytosolic ribosome-bound fragments, and mitoribosome-bound fragments, such as 55S mitoribosome-bound fragments.

FIGURES

FIGS. 1a-g. Different doses of RNase treatment effectively distinguish RNA footprints bound by 80S ribosomes vs. other RBPs in coding regions. (a) Schematic illustration of protein-RNA complexes. (b) Experimental steps of isolating RNase footprints for sequencing with three different doses of RNase (i.e., low, medium, and high). (c) Example read distribution across the gene MCL1 with three different doses of RNase. Both RNA-seq and ribosome profiling data are shown for comparison. (d) Fractions of reads across mRNAs (i.e., coding region (CDS), 5'UTR, 3'UTR, and intron). (e) The distribution of the lengths of RNA fragments in coding regions of mRNAs. (f) RNase footprinting read distribution around the start and stop codons of mRNAs. For 29-nt long footprints, their 5'-end genomic location were adjusted to the ribosomal A-sites and plotted the read per million (RPM) values. (g) Correlation of read counts in coding regions measured by RNase footprinting and ribosome profiling. The X-axis and Y-axis represent log 2 (read count+1). A few genes were highlighted showing >1.2-fold greater expression levels by RNase footprinting compared to ribosome profiling.

FIGS. 2a-f. Low-input RNase footprinting quantifies ribosome occupancies using 1,000 and 50,000 input cells. (a) The experimental procedure of low-input RNase footprinting. (b) Read distribution representing different RNase footprinting methods across the example gene RRM2. RNA-seq data is shown as the control. (c) Correlation between the A-tailing method using 50,000 input cells vs. the adapter ligation method using 0.5 million input cells. The X-axis and Y-axis represent log 2 (read count+1) in coding regions. (d) Correlation between the expression ratios of HEK293T vs. K562 cells calculated using RNase footprinting (A-tailing method with 50,000 cells) vs. ribosome profiling (with 1.5 million cells). (e) Correlation between biological replicates of RNase footprinting using the A-tailing method with 50,000 input cells. (f) Correlation between RNase footprinting using the A-tailing method with 50,000 cells vs. 1,000 cells.

FIGS. 3a-e. Regulation of mitochondrial RNA translation after TUFM knockout. (a) The western blots showing TUFM knockout. The expression of actin was used as the control. (b) RNase footprinting and RNA-seq read distribution across the MT-CO3 gene in TUFM knockout and control cells. (c) The regulation of ribosome occupancy (ribosome footprints, RFP), RNA expression (RNA), and translation efficiency (TE) of 13 mitochondria-encoded genes after TUFM knockout. R1/R2, replicates 1 and 2. Complexes of the mitochondrial electron transport chain are indicated at left (I, III, IV, and V). (d) The regulation of ribosome pausing of mitochondria-encoded genes after TUFM knockout. The ribosome pausing level was calculated as the ratio of RNase footprinting read density in the first 20% of a transcript vs. the remaining. The error bars represent the standard deviation of two biological replicates. Asterisks indicate significantly increased ribosome pausing after TUFM knockout with a Fisher exact test ($P<10^{-3}$). (e) Western blots showing the expression of mitochondria-encoded (red) and nuclear-encoded (blue italic) mitochondrial proteins after TUFM knockout. The expression levels of GAPDH and actin were used as the control. The ratios of protein expression between control and TUFM knockout are shown. Complexes I-V of the mitochondrial electron transport chain are indicated at left.

FIGS. 4a-f Regulation of cytosolic RNA translation after TUFM knockout. (a) Change in mRNA and ribosome footprint (RFP) levels after TUFM knockout. The genes showing significant differential translation efficiency are highlighted. Blue: down-regulated; Red: up-regulated. (b) The cumulative distribution function plot showing the changes in translation efficiency (TE) of indicated gene sets. The P-values comparing "ribosome proteins" and "histone genes" vs. other genes are shown. (c) RNase footprinting and RNA-seq read distribution across the ATF4 gene. The locations of uORFs across the transcripts are shown. (d) The western blots showing the expression of translation factors after TUFM knockout. (e) Nascent proteins containing the methionine analog (AHA) were visualized by fluorescence microscopy. The down-regulation of AHA fluorescence in TUFM knockout cells indicates the inhibition of new protein synthesis. (f) The density plots showing the AHA fluorescence levels.

FIG. 5a-d. RNase footprinting maps RNA translation landscape using snap-frozen tumor and spleen tissues. (a) RNase footprinting and RNA-seq read distribution across the example gene IRF1. (b) The distribution of footprint lengths in coding regions of mRNAs. (c) Adjusted read distribution around the start and stop codons of mRNAs using RNase footprinting data of the 4T1 tumor. The 5'-end genomic locations of footprints were adjusted to the ribosomal A-sites. (d) Correlation of ribosome occupancy levels between two replicates of 4T1 tumor cells. The X-axis and Y-axis represent log 2 (read count+1) in coding regions.

Figure 6:
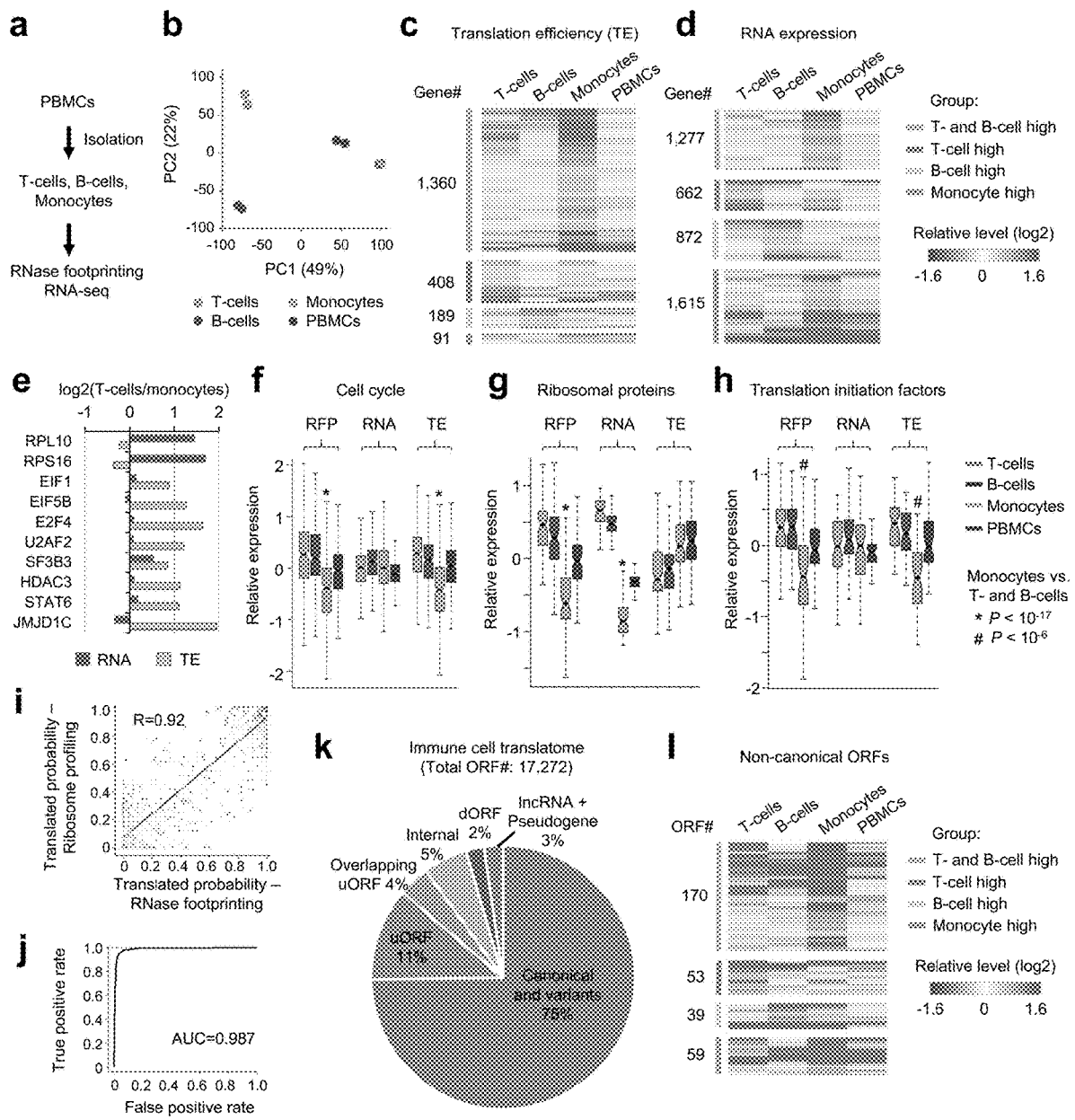

FIG. 6a-1. Regulation of RNA translation across human primary immune cell types. (a) Experimental steps to isolate T-cells, B-cells, and monocytes from PBMCs, and perform RNase footprinting and RNA-seq. (b) The principal components analysis (PCA) of ribosome occupancies of T-cells, B-cells, monocytes, and PBMCs. Genes showing >2-fold regulation across cells were used in the analyses. The percentages of variance explained by PC1 and PC2 are shown in parentheses. (c-d) The heatmap showing genes with significant regulation of translation efficiency (c) and RNA expression (d) comparing T-cells, B-cells, and monocytes. (e) Example genes showing differential RNA expression and translation efficiency, comparing T-cells vs. monocytes. (f-h) Boxplots showing the relative expression levels of ribosome occupancy (RFP), RNA expression, and translation efficiency (TE) of indicated genesets comparing T-cells, B-cells, monocytes, and PBMCs: "cell cycle" (f), "ribosomal proteins" (g), and "translation initiation factors"

(h). The "*" or "#" label indicates the Wilcoxon rank sum test P-value showing the geneset has significantly lower expression in monocytes, compared to both T-cells and B-cells. (i) The correlation between RibORF-predicted translated probabilities of candidate ORFs using RNase footprinting vs. ribosome profiling data in HEK293T cells. 1,000 candidate ORFs were randomly picked for the scatter plot colored by density (red color indicates more data points). (j) The ROC curve measuring the RibORF performance in classifying in-frame translated ORFs vs. internal off-frame ORFs using RNase footprinting data in immune cells. The area under the ROC curve (AUC) value is shown. (k) The RibORF-identified genome-wide translated ORFs in immune cells, which were grouped based on their genomic locations. uORF: ORF in 5'UTR; dORF: ORF in 3'UTR; Internal: ORF within canonical ORFs. (l) The heatmap showing lncRNA ORFs and uORFs with significant regulation of ribosome occupancy comparing T-cells, B-cells, and monocytes.

FIGS. 7a-d. Read distribution of RNA fragments from different RNase treatments. (a) The gel showing the size distribution of RNA fragments after different doses of RNase treatment. (b) The example gene AKT1S1. The enlarged region showed the read distribution around the polyadenylation (polyA) site with a low dose RNase treatment. The RNA-seq and ribosome profiling data are shown for comparison. (c) The example gene NUP62. (d) The read distribution surrounding the genome-wide polyA sites.

FIGS. 8a-d. The read distribution around start codons and stop codons of mRNAs. (a) RNA-seq data. (b) Low-dose RNase. (c) Medium-dose RNase. (d) Ribosome profiling. From (c) and (d), the inventors adjusted 5'-end genomic locations of RNA fragments to the ribosomal A-sites and plotted the Read per Million (RPM) values. The clear 3-nt periodicity across ORFs can be observed using ribosome profiling data, but not using other datasets.

Figure 9:
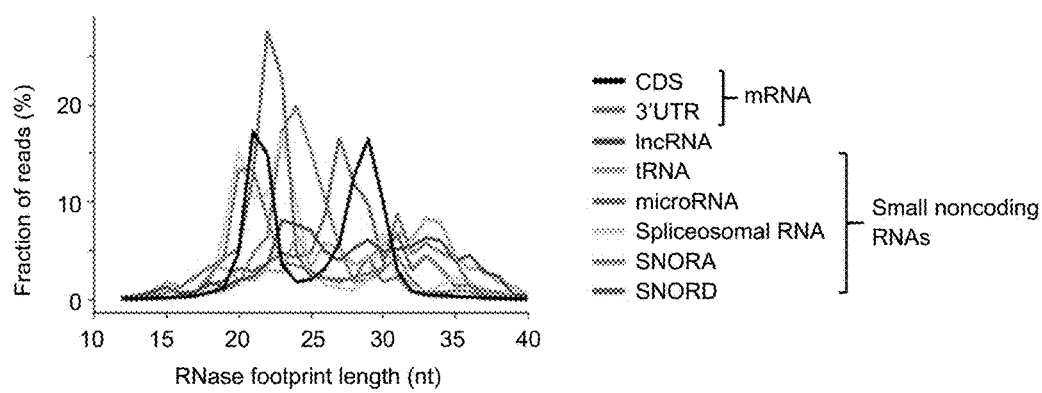

FIG. 9. The length distribution of RNase footprints (high dose treatment) across indicated genomic regions. The footprints in small noncoding RNAs represent non-ribosomal protein-RNA complexes. The footprints in lncRNAs have two categories: ribosomal-RNA complexes and non-ribosomal protein-RNA complexes. It is important to distinguish these two types of footprints during data analyses.

FIGS. 10a-d. Correlation between RNase treatments and ribosome profiling. The X-axis and Y-axis represent log 2 (read count+1) in coding regions. (a) Low-dose RNase treatment vs. ribosome profiling. (b) Medium-dose RNase treatment vs. ribosome profiling. (c) High-dose RNase footprinting vs. ribosome profiling. The reads were grouped based on their indicated length ranges: 18-24 nt and 25-35 nt. (d) Correlation between biological replicates of high-dose RNase footprinting.

FIG. 11a-e. Low-input RNase footprinting for K562 cells. (a) Read distribution of different RNase footprinting methods across the example gene CYC1. RNA-seq and ribosome profiling data are shown as comparisons. (b) Correlation between the A-tailing method using 50,000 input cells vs. ribosome profiling using 1.5 million input cells. The X-axis and Y-axis represent log 2 (read count+1) in coding regions. (c) Correlation between biological replicates of RNase footprinting using the A-tailing method with 50,000 input cells. (d) Correlation between RNase footprinting using the A-tailing method with 50,000 cells vs. 1,000 cells. (e) Correlation between biological replicates of RNase footprinting using the A-tailing method with 1,000 input cells.

FIGS. 12a-c. RNase footprinting examines mitochondrial translation. (a) The distribution of footprint lengths across mitochondrial protein coding regions. (b) The fractions of reads in three frames of codons. The 32-nt long footprints in mitochondrial coding regions were used for the calculation. The standard deviation represents the variation across 13 mitochondria-encoded protein coding genes. (c) An example transcript region of MT-CO1 showing the 3-nt periodicity of read distribution. FIG. 12c discloses SEQ ID NO: 15.

FIGS. 13a-b. Mitochondrial translation regulation after TUFM knockout. (a) The correlation between the differential regulation of translation efficiency (TE) vs. ribosome pausing. The Pearson correlation coefficient and the linear regression P-value are shown. (b) The regulation of ribosome footprint (RFP) levels, RNA expression, and translation efficiency (TE) of mitochondrial respiratory chain proteins encoded by the nuclear genome.

FIGS. 14a-d. Regulation of cytosolic gene expression after TUFM knockout. (a) RNA expression regulation. Red: up-regulated genes; blue: down-regulated genes. The total number of differentially regulated genes is indicated. (b) The regulation of ribosome occupancy (RFP). (c-d) the inventors performed gene ontology analyses for genes showing significant up-regulation (c) or down-regulation (d) of ribosome occupancy (RFP), RNA expression, and translation efficiency (TE) after TUFM knockout. The −log 10 (P-values) of indicated pathways are shown.

FIGS. 15a-c. RNase footprinting quantifies RNA translation using frozen spleen tissues. (a) Adjusted read distribution around the start and stop codons of mRNAs using RNase footprinting data of the spleen sample. The inventors adjusted 5'-end genomic locations of footprints to the ribosomal A-sites. (b) Correlation of ribosome occupancy levels between two replicates of spleen cells. The X-axis and Y-axis represent log 2 (read count+1) in coding regions. (c) Correlation of ribosome occupancy levels between 4T1 tumor and spleen.

FIGS. 16a-g. RNase footprinting quantifies RNA translation in primary blood cells. (a) Protein synthesis rates in primary PBMCs vs. K562 cancer cells are compared in density plots showing AHA fluorescence levels. (b) The distribution of footprint lengths in coding regions of mRNAs using footprinting data from PBMCs. (c) Adjusted read distribution around the start and stop codons of mRNAs using the PBMC footprinting data. (d) Correlation of ribosome occupancy levels between two PBMC replicates. The X-axis and Y-axis represent log 2 (read count+1) in coding regions. (e-g) The marker gene expression confirms the purification of T-cells, B-cells, and monocytes. The read distribution of RNase footprinting and RNA-seq across the marker genes: CD3 (CD3E and CD3D) (e), CD19 (f), and CD14 (g).

FIGS. 17a-g. Differential RNA expression and translational regulation across immune cells. (a) Change in mRNA and ribosome footprint (RFP) levels in T-cells vs. monocytes. The genes showing significant differential translation efficiency are highlighted. Yellow: down-regulated in T-cells; purple: up-regulated in T-cells. (b) As in (a), comparing B-cells vs. monocytes. (c) As in (a), comparing T-cells vs. B-cells. (d-f) Venn diagrams showing the overlap of genes showing significant regulation of RNA expression and translation efficiency (TE), comparing T-cells vs. monocytes (d), B-cells vs. monocytes (e), and T-cells vs. B-cells (f). (g) Heatmap showing genes with significant regulation of ribosome occupancy (ribosome footprints, RFP) across different types of immune cells.

FIGS. 18a-d. Gene ontology analyses of gene groups showing higher expression in T-cell only (a), B-cell only (b), monocyte only (c), and both T- and B-cells (d). The inventors performed the analyses for genesets showing significant regulation of ribosome occupancy (RFP) (as in FIG. 17g), RNA expression (as in FIG. 6c), and translation efficiency (TE) (as in FIG. 6d). The regulation of ribosome occupancy is the combinatory effect of RNA expression and translation efficiency. The −log 10 (P-values) of the pathways were shown.

FIGS. 19a-c. The relative expression levels of ribosome occupancy (RFP), RNA expression, and translation efficiency (TE) of indicated genesets comparing T-cells, B-cells, monocytes, and PBMCs: "RNA processing" (a), "chromatin organization" (b), and "regulation of gene transcription" (c). The Wilcoxon rank sum test was used to examine whether the geneset has significantly lower expression in monocytes, compared to both T-cells and B-cells.

Figure 20:
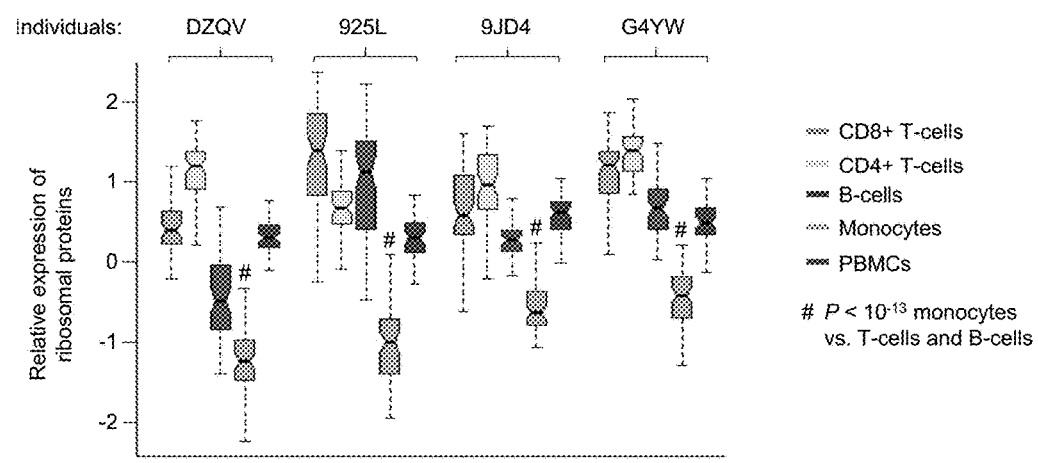

FIG. 20. Boxplots showing relative RNA expression levels of ribosomal proteins comparing classical monocytes vs. naive CD8+ T-cells, CD4+ T-cells, B-cells, and PBMCs from four individuals. The TPM expression values were obtained from the NCBI GEO database (accession number: GSE107011). For each gene, the inventors normalized its expression levels (log 2(TPM+1)) by the mean value across samples. The Wilcoxon rank sum test was used to show monocytes have lower RNA expression of ribosomal proteins than other cell types.

FIGS. 21A-H. Different doses of RNase treatment effectively distinguish RNA footprints bound by 80S ribosomes vs. other RBPs in coding regions.
  (A) Schematic illustration of RNA-protein complexes.
  (B) Experimental steps of isolating RNase footprints for sequencing with three different doses of RNase: low (0.05 U/μg), medium (0.5 U/μg), and high (50 U/μg).
  (C) Example read distribution across the gene MCL1 with three different doses of RNase. Both RNA-seq and ribosome profiling data are shown for comparison.
  (D) Relative enrichment of reads in different regions of mRNAs (i.e., coding region (CDS), 5'UTR, 3'UTR, and intron). The fraction of reads were calculated in each region and then the value was normalized by the relative total length of the region.
  (E) The distribution of the lengths of RNA fragments in coding regions of mRNAs.
  (F) RNase footprinting (high-dose) read distribution around the start and stop codons of mRNAs. For footprints showing strong 3-nt periodicity, the inventors adjusted their 5'-end genomic location to the ribosomal A-sites, and plotted the read per million (RPM) values (See Methods in Example 2 for detail).
  (G) Correlation of read counts in coding regions measured by RNase footprinting (high-dose) and ribosome profiling. The X-axis and Y-axis represent log 2 (read count+1). A few genes showing >1.2-fold greater expression levels by RNase footprinting compared to ribosome profiling were highlighted.
  (H) The correlation between RibORF-predicted translation probabilities of candidate ORFs using RNase footprinting (high-dose) vs. ribosome profiling data in HEK293T cells. 2,000 candidate ORFs were randomly picked for the scatter plot colored by density (red color indicates more data points). The Pearson correlation coefficient value is indicated in the plot.

FIGS. 22A-H. Low-input RNase footprinting quantifies ribosome occupancies using 1,000 and 50,000 HEK293T cells.
  (A) The experimental procedure of low-input RNase footprinting.
  (B) Read distribution representing different RNase footprinting methods across the example gene UTP23. RNA-seq data is shown as the control.
  (C) Correlation of ribosome occupancies inferred by the RNase footprinting method and conventional ribosome profiling datasets. The X-axis and Y-axis represent log 2 (read per million (RPM)+1) in coding regions. The Pearson correlation coefficient values are indicated in the plot.
  (D) Correlation of codon usage levels at the ribosomal P-sites inferred by the RNase footprinting method and conventional ribosome profiling datasets. The Pearson correlation coefficient values are indicated in the plot.
  (E) The distribution of the percentage of maximum entropy (PME) values, measuring the uniformness of read coverage across codons of canonical ORFs. Genes with >10 reads were included in the analysis. A PME value closer to 1 indicates higher uniformness of read distribution.
  (F-G) The sequencing reads were downsampled and then the number of genes (F) and unique footprints
  (G) detected by different datasets with a fixed number of reads were calculated.
  (H) The differential ribosome occupancy between HEK293T and K562 comparing the present RNase footprinting data to ribosome profiling data. The Pearson correlation coefficient value is indicated in the plot.

FIGS. 23A-G. RNase footprinting examines mitochondrial translation.
  (A) The distribution of footprint lengths across mitochondrial protein-coding regions.
  (B) The fractions of reads in the three codon frames. The 32-nt long footprints (the peak size) in mitochondrial coding regions were used for the calculation. The standard deviation represents the variation across 13 mitochondria-encoded protein coding genes.
  (C) An example transcript region of MT-CO1 showing the 3-nt periodicity of read distribution.
  FIG. 23C discloses SEQ ID NO: 15.
  (D) The sucrose gradient was used to isolate 55S mitoribosome and 80S ribosome complexes and then associated footprints for sequencing were extracted. Western blots were performed for ribosomal proteins to show the fractions containing 55S mitoribosomes and 80S ribosomes.
  (E) The correlation of footprint length distribution in mitochondrial coding regions calculated using the RNase footprinting method and sucrose gradient-based ribosome profiling.
  (F-G) The correlation of ribosome occupancies in mitochondrial-(F) and nuclear-encoded (G) coding genes calculated using the two methods. The RNase footprinting data using 50,000 HEK293T cells were used for the analyses.

FIGS. 24A-I. Regulation of mitochondrial and cytosolic RNA translation after TUFM knockout. (A) The western blots showing TUFM knockout. The expression of actin was used as the control.
  (B) RNase footprinting and RNA-seq read distribution across the MT-CO3 gene in TUFM knockout and control cells.
  (C) The regulation of ribosome occupancy (ribosome footprints, RFP), RNA expression (RNA), and translation efficiency (TE) of 13 mitochondria-encoded genes after TUFM knockout. R1/R2, replicates 1 and 2. Complexes of the mitochondrial electron transport chain are indicated at left (I, III, IV, and V).

(D) The regulation of ribosome pausing of mitochondria-encoded genes after TUFM knockout. The ribosome pausing level was calculated as the ratio of RNase footprinting read density in the first 20% of a transcript vs. the remaining. Asterisks indicate significantly increased ribosome pausing after TUFM knockout with a Fisher exact test (P<10-3).

(E) Western blots showing the expression of mitochondria-encoded (red) and nuclear-encoded (blue italic) mitochondrial proteins after TUFM knockout. The expression levels of GAPDH and actin were used as the control. The ratios of protein expression between control and TUFM knockout are shown. Complexes I-V of the mitochondrial electron transport chain are indicated at left.

(F) Change in mRNA and ribosome footprint (RFP) levels after TUFM knockout. The genes showing differential translation efficiency are highlighted. Blue: down-regulated; Red: up-regulated.

(G) The cumulative distribution function plot showing the changes in translation efficiency (TE) of indicated gene sets. The P-values comparing "ribosome proteins" and "histone genes" vs. other genes are shown.

(H) Western blots showing the expression of translation factors after TUFM knockout.

(I) Nascent proteins containing the methionine analog (AHA) were visualized by fluorescence microscopy. The down-regulation of AHA fluorescence in TUFM knockout cells indicates the inhibition of new protein synthesis.

FIGS. 25A-F. RNase footprinting maps RNA translation landscape using snap-frozen tumor and spleen tissues.

(A) RNase footprinting and RNA-seq read distribution across the example gene Cyc1.

(B) The distribution of footprint lengths in coding regions of mRNAs.

(C) The log 2 ratio of read density in coding regions vs. 3'UTRs for each fragment size (18-35 nt).

(D) Adjusted read distribution around the start and stop codons of mRNAs using RNase footprinting data of the 4T1 tumor and spleen tissues. 5'-end genomic locations of the 29-nt footprints to the ribosomal A-sites were adjusted.

(E-F) Correlation of ribosome occupancy levels between two replicates of 4T1 tumor (E) and spleen tissues (F). The X-axis and Y-axis represent log 2 (read count+1) in coding regions.

FIGS. 26A-H. Regulation of RNA translation across human primary immune cell types.

(A) Experimental steps to isolate T-cells, B-cells, and monocytes from PBMCs, and then perform RNase footprinting and RNA-seq.

(B) The principal components analysis (PCA) of ribosome occupancies of T-cells, B-cells, monocytes, and PBMCs. Genes showing >2-fold regulation across cells were used in the analyses. The percentages of variance explained by PC1 and PC2 are shown in parentheses.

(C-D) The heatmap showing genes with regulation of translation efficiency (C) and RNA expression (D) comparing T-cells, B-cells, and monocytes.

(E) Example genes showing differential RNA expression and translation efficiency, comparing T-cells vs. monocytes.

(F-H) Boxplots showing the relative levels of ribosome occupancy (RFP), RNA expression, and translation efficiency (TE) for indicated genesets comparing T-cells, B-cells, monocytes, and PBMCs: "cell cycle" (F), "ribosomal proteins" (G), and "translation initiation factors" (H). The "*" or "#" label indicates the Wilcoxon rank sum test P-value showing the geneset has significantly lower expression in monocytes, compared to both T-cells and B-cells.

FIGS. 27A-D. Regulation of non-canonical ORFs among primary immune cells.

(A) Adjusted RNase footprinting read distribution around the stop codons of mRNAs. For footprints showing strong 3-nt periodicity, adjusted their 5'-end genomic location to the ribosomal A-sites, and plotted the read per million (RPM) values (See Methods of Example 2 for detail).

(B) The ROC curve measuring the RibORF performance in classifying in-frame translated ORFs vs. internal off-frame ORFs using RNase footprinting data in immune cells. The area under the ROC curve (AUC) value is shown.

(C) The RibORF-identified genome-wide translated ORFs in immune cells, which were grouped based on their genomic locations. uORF: ORF in 5'UTR; dORF: ORF in 3'UTR; Internal: ORF within canonical ORFs.

(D) The heatmap showing lncRNA ORFs and uORFs with dynamic regulation of ribosome occupancy comparing T-cells, B-cells, and monocytes.

FIGS. 28A-G. Compare read distribution of RNA fragments from different doses of RNase treatments (A) The gel showing the size distribution of RNA fragments after different doses of RNase treatment.

(B) The example gene AKT1S1. The enlarged region shows the read distribution around the polyadenylation (polyA) site with a low dose RNase treatment. RNA-seq and ribosome profiling data are shown for comparison.

(C) The read distribution surrounding the genome-wide polyA sites.

(D-F) Correlation between RNase treatments and ribosome profiling in HEK293Tcells: (D) Low-dose RNase treatment vs. ribosome profiling; (E) Medium-dose RNase treatment vs. ribosome profiling; (F) High-dose RNase footprinting vs. ribosome profiling. The reads were grouped based on their indicated length ranges: 18-24 nt and 25-35 nt. The X-axis and Y-axis represent log 2 (readcount+1) in coding regions.

(G) Correlation between two biological replicates of high-dose RNase footprinting.

FIGS. 29A-G. Compare RNase footprinting and ribosome profiling read distribution across mRNAs.

(A-C) Read Distribution around start codons and stop codons of mRNAs: (A) RNA-seq data; (B) Low-dose RNase; (C) Medium-dose RNase (32-ntfragments).

(D) Distribution of high-dose RNase footprinting reads grouped based on fragment sizes (18-35 nt). Y-axis represents the Read per Million (RPM) value. The read location was represented by 5'-end of the alignment position.

(E) Similar to (D), the read distribution of conventional ribosome profiling data were shown.

(F) The log 2 ratio of read density in coding regions vs. 3' UTRs for each fragment size between 18-35 nt for high-dose RNase footprinting data.

(G) The ROCcurve measuring the performance using HEK293T RNase footprinting (high-dose) data to classifying-frame translated canonical ORFs vs. internal off-frame ORFs. The area under the ROC curve (AUC) value is shown.

FIGS. 30A-H. Comparing the read distribution of RNase footprinting (high dose) and ribosome profiling in noncoding regions.
- (A) The fractions of reads aligned to different types of RNAs.
- (B) The ratios of RNase footprinting and ribosome profiling reads (measured by RPM values) for different types of small noncoding RNAs.
- (C) The fractions of reads mapped to different small noncoding RNAs using the RNase footprinting data.
- (D-E) Example genes showing the read distribution in small noncoding RNAs: MIR1248 (D) and SNORA3A (E). The functional domains of the RNAs are highlighted in yellow. The Y-axis represents read per million (RPM) values.
- (F) Read distribution patterns representing translated ORFs and non-ribosomal RNA-protein complexes.
- (G) Distribution of PME values measuring the uniformness of read distribution across candidate ORFs in the indicated types of transcripts. Included ORFs with >10 reads in the analyses. A PME value closer to 1 indicates a higher uniformness of read distribution. Small noncoding RNAs show low PME values indicating localized read distribution, representing the binding of non-ribosomal RNA-protein complexes.
- (H) The length distribution of footprints across different RNA regions. Also plotted the fragment size distribution for rRNAs, as 78% of total sequencing reads were aligned to rRNAs.

FIGS. 31A-F. Low-input RNase footprinting for 50,000 and 1,000 K562 cells.
- (A) RNase footprinting reads (using 1,000 K562 cells) grouped by fragment sizes. The read location was represented by 5' end of the alignment position.
- (B) Correlation of ribosome occupancies inferred by the present RNase footprinting method and conventional ribosome profiling datasets. The X-axis and Y-axis represent log 2 (read per million (RPM)+1) in coding regions. The Pearson correlation coefficient values are indicated in the plots.
- (C) Correlation of codon usage levels at the ribosomal P-sites inferred by the present RNase footprinting method and conventional ribosome profiling datasets. The Pearson correlation coefficient values are indicated in the plots.
- (D) The distribution of the percentage of maximum entropy (PME) values measuring the uniformness of read coverage across codons of canonical ORFs.
- (E-F) Downsampled of the sequencing reads and then calculated the number of genes (E) and unique footprints (F) detected by different datasets with a fixed number of reads.

FIGS. 32A-I. Translational regulation after TUFM knockout in HeLa cells.
- (A) The distribution of footprint lengths in protein-coding regions.
- (B) The log 2 ratio of read density in coding regions vs. 3'UTRs.
- (C) Read distribution around the start and stop codons of mRNAs (29-nt footprints). Adjusted the 5'-end genomic locations of the reads to the ribosomal A-sites.
- (D) The correlation between the differential regulation of translation efficiency (TE) vs. ribosome pausing. The Pearson correlation coefficient and the linear regression P-value are shown.
- (E) The regulation of ribosome footprint (RFP) levels, RNA expression, and translation efficiency (TE) of mitochondrial respiratory chain proteins encoded by the nuclear genome.
- (F-G) The pulse labeling AHA assay to show the down-regulation of mitochondrial (F) and cytosolic (G) nascent protein synthesis levels, respectively, comparing TUFM knockout cells vs. control. The Coomassie blue stainings for total proteins were shown as loading controls.
- (H) RNA expression regulation of cytosolic genes. Red: up-regulated genes; blue: down-regulated genes. The total number of differentially regulated genes is indicated.
- (I) The regulation of ribosome occupancy (RFP) of cytosolic genes.

FIGS. 33A-H. RNase footprinting quantifies RNA translation in primary blood cells.
- (A) Protein synthesis rates in primary PBMCs vs. K562 cancer cells are compared in density plots based on AHA fluorescence levels.
- (B) The distribution of footprint lengths in coding regions of mRNAs using footprinting data from different blood cells.
- (C) The log 2 ratio of read density in coding regions vs. 3'UTRs for each fragment size (18-35 nt) for the footprinting data.
- (D) Adjusted read distribution (29-nt fragments) around the start and stop codons of mRNAs using the PBMC footprinting data.
- (E) Correlation of ribosome occupancy levels between two PBMC replicates. The X-axis and Y-axis represent log 2 (read count+1) in coding regions.
- (F-H) The marker gene expression confirms the purification of T-cells, B-cells, and monocytes. The read distribution of RNase footprinting and RNA-seq across the marker genes: CD3 (CD3E and CD3D) (F), CD19 (G), and CD14 (H).

FIGS. 34A-K. Differential RNA expression and translational regulation across immune cells.
- (A) Change in mRNA and ribosome footprint (RFP) levels in T-cells vs. monocytes. The genes showing significant differential translation efficiency are highlighted. Yellow: down-regulated in T-cells; purple: up-regulated in T-cells.
- (B) As in (A), comparing B-cells vs. monocytes.
- (C) As in (A), comparing T-cells vs. B-cells.
- (D-F) Venn diagrams showing the overlap of genes showing significant regulation of RNA expression and translation efficiency (TE) comparing T-cells vs. monocytes (D), B-cells vs. monocytes (E), and T-cells vs. B-cells (F).
- (G) Heatmap showing genes with significant regulation of ribosome occupancy (ribosome footprints, RFP) across different types of immune cells.
- (H-J) The relative expression levels of ribosome occupancy (RFP), RNA expression, and translation efficiency (TE) of indicated genesets comparing T-cells, B-cells, monocytes, and PBMCs: "RNA processing" (H), "chromatin organization" (I), and "regulation of gene transcription" (J). The Wilcoxon rank sum test was used to examine whether the geneset has significantly lower expression in monocytes, compared to both T-cells and B-cells.
- (K) Relative RNA expression levels of ribosomal proteins comparing classical monocytes vs. naive CD8+ T-cells, CD4+ T-cells, B-cells, and PBMCs from four individuals. The TPM expression values were obtained from the NCBI GEO database (accession number: GSE107011). The Wilcoxon rank sum test was used to show monocytes have lower RNA expression of ribosomal proteins than other cell types.

DETAILED DESCRIPTION

Unless otherwise specified "a" or "an" means one or more.

All numeric values should be treated as having the term "about" placed before a specific numeric value.

As used herein, the term "about" placed before a specific numeric value may mean±20% of the numeric value; ±18% of the numeric value, ±15% of the numeric value; ±12% of the numeric value; ±8% of the numeric value; ±5% of the numeric value; ±3% of the numeric value; ±2% of the numeric value; ±1% of the numeric value or ±0.5% of the numeric value.

Different types of protein-RNA complexes have variable sensitivities to RNase. One embodiment is to select translational ribosome complexes using concentrated RNase treatment in order to reduce the bottleneck of ribosome profiling. Translational ribosome complexes may include cytosolic ribosome complexes, such as 80S cytosolic ribosome complexes, mitoribosome complexes, such as 55S mitoribosome complexes, and their combinations. Similarly, RNase dose is an important parameter for capturing other protein-RNA complexes. For example, the low dose RNase used in an embodiment works well to identify cleavage and polyadenylation complexes. In combination with A-tailing and SMARTer oligo-based template switching to add sequencing adapters, this embodiment reveals base-resolution active translation using ~100-fold fewer starting materials than existing methods. The working hours of the library preparation is comparable to regular RNA-seq and requires less than about 30% of that needed for conventional ribosome profiling.

An embodiment allows the simultaneous quantification of cytosolic and mitochondrial ribosome footprints. Current assays studying mitochondrial translation use complicated procedures using sucrose gradient to purify mitochondrial ribosome complexes[29, 36, 37]. RNase footprinting provides a simplified method to tackle mitochondrial translation. Using an embodiment, TUFM selectively regulates the translation efficiency and ribosome elongation of the 13 mitochondrial-encoded protein-coding genes, and cytosolic translation is synchronically repressed after TUFM knockout. Similar approaches can be used to define the functional roles of other regulators and dissect the crosstalk between mitochondrial translation and cytosolic regulation during biological processes.

One embodiment is widely applicable to examining transcriptomic translation in physiological contexts for both basic scientific research and clinical personalized prognosis. One test performed has shown that an embodiment reveals base-resolution active translation in snap-frozen mouse tissues (i.e., tumor and spleen) and primary immune cells (i.e., T-cells, B-cells, and monocytes) from an individual's standard blood draw. Interestingly, many genes showed significantly lower translation activity in monocytes than lymphocytes. This is likely due to lower RNA expression of ribosomal proteins in monocytes. Analysis of the RNA expression profiles of monocytes and lymphocytes using published RNA-seq datasets showed that the differential regulation appears to be a general phenomenon across human individuals (FIG. 20). Further studies examining RNA translation in more immune cell subtypes and progenitor cells will provide mechanistic insights into translational control during hematopoiesis. RNA translation is tightly regulated during development, aging, and the progression of human disease (e.g. cancer and neuronal disorders)[38, 39]. Cells in various tissue compartments are under differential stress conditions, potentially impacting RNA translation. In combination with other rare-cell isolation techniques, such as fluorescence-activated cell sorting (FACS) or laser-capture microdissection, the present method can be used to examine RNA translation of individual cell types from heterogeneous tissue samples. The results can provide an understanding of the translational control underlying physiological and pathophysiological conditions. Recent studies showed that micropeptides encoded by non-canonical ORFs can serve as novel cancer biomarkers/targets[40], and can be used to design novel neoantigens for immunotherapy[41-43]. A potential additional application of an embodiment is to define the comprehensive translatome using patient samples, which can lead to novel clinical disease diagnosis and personalized treatment strategies.

The present invention is further illustrated by though in no way limited to the following examples.

EXAMPLE 1

Material and Methods

Cell culture and gene knockout. HEK293T and HeLa cells (ATCC) were cultured in DMEM medium (Gibco, cat. no. 11965092) supplemented with 10% FBS (Gibco, cat. no. 26140079). K562 cells (ATCC) were cultured using IMDM medium (Gibco, cat. no. 12440061) supplemented with 10% FBS. To knock out TUFM in Hela cells, two TUFM-targeting single guide RNAs (sgRNAs) (5'-CTAG-GAGCTTGCCATGCCCG-3' (SEQ ID and 5'-NO: 1), CGAGGAGATTGACAATGCCC-3' (SEQ ID NO: 14)) and two non-targeting control sgRNAs (5'-CGTTGGTACGGTCCTCCCCG-3' (SEQ ID NO: 2), and 5'-TAAGGGGCTAACTTGGTCCC-3' (SEQ ID NO:3)) were cloned into the pLentiCRISPR V2 plasmid (Addgene, cat. no. 52961). Lentivirus was produced by transfecting HEK293T cells with pMD2.G, pPAX2, and pLentiCRISPR V2 target plasmid. After 24 h of lentiviral transduction, HeLa cells stably expressing sgRNAs were selected by treating cells with 0.5 µg/ml of puromycin for 7 days. The medium was refreshed with puromycin every two days and passaged cells when necessary. TUFM knockout efficiency was confirmed by western blotting.

Mouse 4T1 breast tumor model. All mouse experiments were in compliance with relevant ethical regulations and were approved by the Institutional Animal Care and Use Committee (IACUC) (protocol IS00010046). The 4T1 mouse breast cancer cells were purchased from the Karmanos Cancer Institute. Briefly, 4-6-week-old, female Balb/c mice were used for 4T1 xenograft experiments. 100,000 cells were resuspended in 50 µl DMEM mixed with 50 µl Matrigel (Corning 354234), and implanted into the fourth mammary gland subcutaneously. After 3 weeks, mice were $CO_2$ euthanized, and tumor and spleen tissues were collected and were snap frozen in liquid nitrogen. Snap-frozen mouse tissues were powdered using a pre-cooled mortar and pestle under the continuous addition of liquid nitrogen. For each tissue type, 1 mg powdered tissue was collected for RNase footprinting, and 5 mg powdered tissue for total RNA extraction and RNA-seq.

Human immune cell isolation. Fresh human whole peripheral blood was purchased from Stemcell Technologies, and was a standard blood draw (total 20 ml) from one healthy donor (61-year-old female). PBMCs were isolated using Ficoll-Paque PREMIUM (GE Healthcare) following the manufacturer's protocol. $CD3^+$ T-cells, $CD3^-CD19^+$ B-cells, and $CD14^+CD16^-$ monocytes were isolated from PBMCs using immunomagnetic isolation kits (Stemcell Technologies, cat. no. 17951, 17954, and 19359, respectively) following the manufacturer's instructions. For each cell population, 100,000 immune cells (the amount of ribosome footprints in the cells corresponds to that in ~3,500 K562 cancer cells) were counted to generate the RNase footprinting library. 300,000 cells were used to generate a RNA sequencing library. All the sequencing libraries were generated using the cells from the same one-time blood draw.

Low-input RNase footprinting. The protocol has two major steps.

1. RNase treatment and footprint purification. Optimized RNase digestion is a key step for the RNase footprinting library preparation. Cells were treated with 100 μg/ml cycloheximide for 1-3 min before harvesting. Cells were then rinsed twice with PBS and lysed using cold lysis buffer (20 mM Tris, pH 7.4, 150 mM NaCl, 5 mM $MgCl_2$, 1 mM DTT, 100 μg/ml cycloheximide, 1% v/v Triton X-100). A total of 90 μl of lysis buffer was used to lyse 50,000 HEK293T, K562, or HeLa cells. Cells were pipetted in lysis buffer and incubated on ice for 10 min, and then triturated through a 26 gauge needle. RNA concentration in the lysate was determined using Qubit (Invitrogen). ~1 μg total RNA was obtained from 50,000 cells. The cell lysate was digested with 50 U of RNase 1 (10 U/μl, cat. no. N6901K, by the Lucigen definition) at room temperature for 1 h. 400 μl of TRIzol (Ambion®) was added and then 100 μl of chloroform (Sigma) to extract RNase footprints/The footprints were precipitated overnight with isopropanol.

2. Sequencing library construction using A-tailing and SMARTer oligo-based template switching. The following are the experimental conditions for 50,000 HEK293T, K562, or HeLa cells. Precipitated RNase footprints were suspended in 5 μl of TNK reaction mixture (0.5 μl of 10×T4 Polynucleotide Kinase (PNK) buffer, 1 μl of PNK (New England Biolabs, NEB®), 0.5 μl of SUPERase·In RNase Inhibitor (Invitrogen™), and 3 μl of RNase-free water). The footprints were end-repaired at 37° C. for 90 min followed by incubating at 65° C. for 5 min to inactivate PNK. The end-repaired RNase footprints were 3' polyadenylated with 10 U of *E. coli* poly (A) polymerase (New England Biolabs, NEB®), by incubating at 37° C. for 2 h (supplemented with 2 μl of first-strand buffer (Invitrogen™ 250 mM Tris-HCl (pH 8.3), 375 mM KCl, 15 mM $MgCl_2$), 1 μl of *E. coli* poly (A) polymerase (New England Biolabs, NEB®), 0.2 μl of 10 mM ATP, 0.5 μl of SUPERase·In RNase Inhibitor, and 1.3 μl of RNase-free water). The resulting polyadenylated RNA was reverse transcribed by a modified SMART-RT reaction. The RNA was first mixed with 2.5 μl of 10 μM RT primer and annealed by heating to 72° C. for 5 min and cooled on ice immediately. The reaction mixture was then supplemented with SMART-RT mixture (dNTP, Superscript II reverse transcriptase (Invitrogen™). SUPERase·In RNase Inhibitor, Superscript II first-strand buffer, DTT, betaine, $MgCl_2$, and template-switching oligos) and incubated at 42° C. for 1 h, followed by 10 cycles of heating to 50° C. for 2 min and then cooling to 42° C. for 2 min. The enzyme was inactivated by heating at 70° C. for 10 min. The RNA fragments hybridized to DNA were then removed by incubating reaction mixture at 37° C. for 15 min with 5 U of RNase H (New England Biolabs, NEB®). The resultant cDNA was amplified by a round of PCR and then 30 μl of cDNA were combined with 50 μl of 2× HiFi PCR mix (New England Biolabs, NEB®), 0.5 μM $1^{st}$-primers and water to obtain a final reaction volume of 100 μl. This first round of PCR was carried out with an initial 3 min denaturation at 98° C., followed by 1 cycle of 20 s denaturation at 98° C., 30 s annealing at 65° C., and 90 s extension at 72° C., and then 6 cycles of 20 s denaturation at 98° C., 20 s annealing at 67° C., and 60 s extension at 72° C. PCR round 1 was finished with a 3 min extension at 72° C. The PCR products were purified using a DNA clean & concentrator column (Zymo Research) and eluted in 20 μl of water. This library was amplified by a second round of PCR. Purified PCR1 products were combined with 25 μl of 2× HiFi PCR mix (New England Biolabs, NEB®) and 0.5 M primers. An initial 3 min denaturation was performed at 98° C., followed by 4 cycles of 20 s denaturation at 98° C., 20 s annealing at 65° C., and 60 s extension at 72° C., and finished with 3 min extension at 72° C. The final DNA library was separated and visualized in a 4% agarose gel. DNA fragments with 15-35 bp-insert bands were excised and recovered using the DNA gel recover kit (Zymo Research). Two DNA sequences were designed of 15 nt and 35 nt insert as markers to guide the library size selection. The primers used for the library preparation are shown in Table 5.

For the library construction of ultra-low-input conditions (i.e. immune cells and 1,000 cultured cells), the polyadenylation tailing incubation time was increased to 4 h to achieve >80% polyadenylation of footprints. The PCR cycles (7 cycles for the first round and 5 cycles for second) were increased to generate the sequencing library.

Ribosome profiling. Ribosome profiling libraries for 1.5 million HEK293 and K562 cells were prepared based on a recently updated protocol[18].

Sequencing libraries to compare RNA fragments after digestion with different doses of RNase. 0.5 million HEK293T cells were used for the experiments. The cell lysate containing 10 μg total RNA was treated with different RNase doses (cat. no. N6901K, Lucigen): 0.5 U (low dose), 5 U (medium dose), and 500 U (high dose), respectively, at room temperature for 1 h. For the medium and high dose conditions, RNA fragments with 10-40 nt were selected to generate the sequencing library, using the same adapter ligation procedures described for ribosome profiling[18]. For the low dose RNase condition, all RNA fragments were extracted and subjected to A-tailing and the SMARTer oligo-based template switching described above to generate the sequencing library.

RNA sequencing library preparation. Total RNA was isolated using the Direct-zol RNA kit (Zymo Research), and mRNAs were purified using Oligo $(dT)_{25}$ magnetic beads (New England Biolabs, NEB®) according to the manufacturer's instructions. Purified mRNAs were fragmented with NEBNext $Mg^{2+}$ RNA fragmentation module (New England Biolabs, NEB®) at 94° C. for 6 min. Fragmented RNAs were then precipitated overnight at −20° C. by adding 0.1 volume of 3 M sodium acetate, 10 mg of glycoblue, and 1.2 volumes of isopropanol. Purified RNA fragments were used for the library construction using the A-tailing and SMARTer oligo-based template switching method described above for RNase footprinting.

Western blotting. Proteins were separated in a NuPAGE 12% Bis-Tris precast gel (Invitrogen) and were transferred to a nitrocellulose membrane using a Trans-blot Turbo Transfer System (Bio-Rad). The membrane was blocked with 5% nonfat milk in TBST, incubated with primary antibodies overnight at 4° C., washed three times with TBST at room temperature, incubated with HRP-secondary antibodies, and imaged using the Bio-Rad Chemidoc imaging system. Protein blot intensity in FIG. 3e was quantified by Image J. The antibodies used for the western blots are shown in Table 6.

Measurement of nascent protein synthesis. Nascent protein synthesis was assessed using Click-iT AHA (L-azido-homoalanine) (Invitrogen, cat. no. C10102), which is an amino acid analog that can be incorporated into nascent proteins and detected by alkyne-modified fluorophores (Invitrogen, cat. no. A10267). Cells were rinsed twice with warm PBS, incubated with the methionine-free medium for 1 h, and then incubated with AHA-containing medium for 3 h at 37° C. in 5% $CO_2$. Cells were fixed with 4% PFA in PBS, permeated with 0.1% Triton X-100 in PBS, and incubated with Alexa Fluor 488 alkyne in Click-iT cell reaction buffer (Invitrogen, cat. no. C10269). Labeled proteins were analyzed by flow cytometry (BD LSRFortessa) and microscopy imaging (Nikon MR confocal microscope).

RNase footprinting data analyses. Paired-end sequencing (2×151 nt) was performed on the footprinting libraries. Because the RNase footprint lengths are short (<35 nt for ribosome footprints), the first ends of reads were used to perform mapping and gene expression calculation. The 3' sequencing adapters of reads (AGATCGGAAG (SEQ ID NO: 4) for the datasets generated by linker ligation methods, and AAAAAAAAAA (SEQ ID NO: 5) for the A-tailing methods) were trimmed. For the libraries using SMARTer oligo-based template switching, the first 7 nt were trimmed, including the random 4 nt and 3 locked Gs in the 5' sequencing adapters. The trimmed reads were first mapped to the rRNA sequences (5S, 5.8S, 18S, and 28S) using bowtie2 (version 2.2.6)[44]. The unmappable reads were then mapped to a reference genome (hg38 for human or mm10 for mouse) and transcriptome using tophat (version 2.1.0)[45]. The transcriptome annotation was based on GENCODE (release 28 for human and release 20 for mouse)[46], and the annotation was modified by incorporating the mitochondrial transcripts annotated by the UCSC Genome Browser.

Only the uniquely mappable reads with lengths of 18-35 nt were used for the calculations of protein synthesis levels because actively translation ribosomes show footprints of these defined lengths. To obtain read counts in RefSeq-defined protein-coding regions, the regions were excluded overlapping with uORFs and used HTSeq (version 0.9.1)[47] to generate gene-level read counts. The ribosome occupancy levels were then measured as transcript per million (TPM) values. RibORF software[14] were used to adjust the reads' genomic locations based on offset distance between the 5' end of fragments and ribosomal A-site and to examine 3-nt periodicity of the read distribution across codons. A few dozen genes showed high read enrichment in several genomic locations, but did not show uniform read distribution across the coding regions. Examining these reads showed that the highly localized distribution was due to sequencing errors and the associated read misalignment. These genes were excluded from all downstream analyses. To achieve this goal, previously published percentage of maximum entropy (PME) values[14] were used to model the uniformness of the read distribution across coding regions. Only genes with PME values >0.3 were retained for further expression analyses.

Ribosome profiling and RNA-seq analyses. To make the analysis results comparable, the same RNase footprinting analysis procedures described above were used for the ribosome profiling and RNA-seq read mapping and gene expression calculation. The one exception was that all uniquely mappable reads with different fragment lengths (not just those from 18-35 nt) from RNA-seq were used to calculate RNA expression levels.

Analyses of translation efficiency. The translation efficiency of a gene is calculated as the ratio of RNase footprinting read density vs. RNA-seq read density in the coding region. Suppose for gene i, the TPM value of ribosome footprints (RFP) is $RFP_i$ and the TPM value of RNA expression is RNA. The translation efficiency (TE) of gene i is calculated as follows: $TE_i=(RFP_i+1)/(RNA_i+1)$. The pseudocount 1 was added to mitigate the technical variance of lowly expressed genes. Genes included in the differential translation efficiency analyses should show high RNA expression levels, with TPM values >3 across all compared samples, and observable RNase footprinting with TPM>3 in at least one experimental condition.

Translational regulation and RNA expression after TUFM knockout. The regulation of ribosome occupancy is the combined effect of RNA expression and translation efficiency. Genes showing significant regulation of ribosome occupancy were defined based on the following criteria: 1) TPM>3 in at least one condition; 2) >1.2-fold expression change in both replicates with an average expression change >1.5-fold. The same cutoff was used to select genes showing significant RNA expression regulation. Genes showing significant regulation of translation efficiency were selected using the following cutoff: >1.2-fold change in both replicates and an average expression change >1.5-fold. To examine the regulation of ribosome elongation after TUFM knockout, different cutoffs were used to split the coding regions of the mitochondrial gene into two segments: 10/90, 20/80, 30/70, 40/60, 50/50, 60/40, 70/30, 80/20, and 90/10. Then the Fisher exact test was used to examine whether the read ratio in two segments showed significant changes in TUFM knockout vs. control samples. Finally, 20/80 was picked as the cutoff, because it showed the most robust results across genes to capture ribosome pausing at the 5'-end of transcripts. The gene MT-ATP8 were excluded from these analyses because it did not have enough reads in unique gene regions for the calculation.

Translational regulation and RNA expression across immune cell types. To examine the regulation of translation efficiency, genes were first identified showing significant regulation from the pairwise comparisons of T-cells, B-cells, and monocytes, using a cutoff of >1.5-fold change in both replicates (FIG. 17a-c). Then for the genes showing significant regulation in any of the pairwise comparisons, their relative expression were compared across the immune cell types by normalizing their translation efficiency (log 2 values) to the mean of T-cells, B-cells, and monocytes. The genes were separated into 4 groups: "T- and B-cell high" (the normalized value >log 2(1.1) in both T-cells and B-cells, and <0 in monocytes); "T-cell high" (the normalized value >log 2(1.1) in T-cells, and <0 in both B-cells and monocytes); "B-cell high" (the normalized value >log 2(1.1) in B-cells, and <0 in both T-cells and monocytes); and "monocyte high" (the normalized value >log 2(1.1) in monocytes, and <0 in both T-cells and B-cells). The genes showing higher translation efficiency in the "T- and B-cell high" group capture lymphocyte-specific regulation, while the genes in other groups identify cell type-specific regulation. This grouping method effectively captured cell type-specific gene regulation, and included 92% of all regulated genes from the pairwise comparison. Using the same method, the regulation of ribosome occupancy and RNA expression across the immune cell types was examined, except that only genes showing TPM>3 in any one cell type were included in the analyses, and a 2-fold change was used as the cutoff to select genes showing significant RNA expression regulation from the pairwise comparison. The relative expression of a few genesets across immune cells were selected. The gene lists were manually curated for "ribosomal proteins" and "translation initiation factors". The following gene ontology defined genesets were also included in the analyses: "GO:0007049 cell cycle", "GO: 0006396 RNA processing", "GO:0051276 chromosome organization", "GO:0045449 regulation of transcription". The gene lists are shown in Table 7.

The analyses of non-canonical ORFs. The RibORF software was used[14, 35] for the analyses. RNase footprinting or ribosome profiling reads were grouped based on fragment lengths, and only selected the high-quality reads showing clear 3-nt periodicity across canonical ORFs for further analyses to identify novel translated non-canonical ORFs. The high-quality reads should show >50% assigned to the $1^{st}$ nucleotides of codons. The algorithm uses the following read distribution features to distinguish the in-frame actively translated ORFs vs. off-frame ORFs: (1) 3-nt periodicity across ORFs measured by the fraction of reads in $1^{st}$ nucleotides of codons; (2) the uniformness of read distribution across ORFs measured by the PME value. It uses in-frame translated canonical ORFs as positive examples and internal off-frame candidate ORFs as negative examples to train the logistic regression model to identify genome-wide translated ORFs. It randomly picked 1,000 positive examples and 2,000 negative examples for training and used another 1,000 positive examples and 2,000 negative examples for testing. The candidate ORFs (any possible ORF with a start codon NUG/ACG and a stop codon) were obtained using transcripts defined by GENCODE (v28)[46]. The predicted translated probabilities of candidate ORFs were compared using RNase footprinting vs. ribosome profiling data in HEK293T cells, and found the results are highly consistent. To identify genome-wide translated ORFs in immune cells, high-quality reads in different immune cell types were merged for the analyses. The ROC curve was used to measure the algorithm performance for classifying positive and negative examples in the testing set. The translated ORFs were selected using the following cutoffs: translated probability >0.7, and >10 supporting reads.

To examine the differential ribosome occupancy in non-canonical ORFs, footprinting reads with 18-35 nt for the analyses was used and the ORFs were required to contain >5 reads in both replicates in at least one immune cell type (i.e. T-cells, B-cells, and monocytes). For overlapping uORFs, the regions overlapping with canonical ORFs were excluded from the analyses. Similar analysis steps presented above were used for canonical coding regions to identify non-canonical ORFs showing >1.5-fold differential ribosome occupancy among the immune cells.

Gene ontology analyses. Gene ontology analyses were conducted using the DAVID database[48].

Data accession and code availability. Sequencing data have been deposited in the National Cancer for Biotechnology Information Gene Expression Omnibus with accession numbers GSE151989, GSE151986, GSE151987, GSE151988, and GSE153411. The secure token to allow review of the record while it remains in private status is: epkfksoqdzqbfkr. All codes for computational analyses are available upon request.

Results

RNase Digestion Distinguishes RNA Fragments Bound by 80S Ribosomes Vs. Other RBPs As suggested by previous studies, RBPs show different binding affinities to RNAs. To capture RNA fragments bound by 40S scanning ribosomes or splicing factors, formaldehyde or UV were used to crosslink and stabilize protein-RNA complexes before the RNase digestion[22, 23]. In contrast, 80S ribosomes show stronger protection of RNAs, and the crosslinking step is not needed when capturing their footprints[6]. Based on this distinction, by treating cell lysates with a high dose of RNase, it was possible to selectively retain 80S ribosome footprints, while digesting the fragments bound by other RBPs in coding regions (FIG. 1a).

Figure 7:
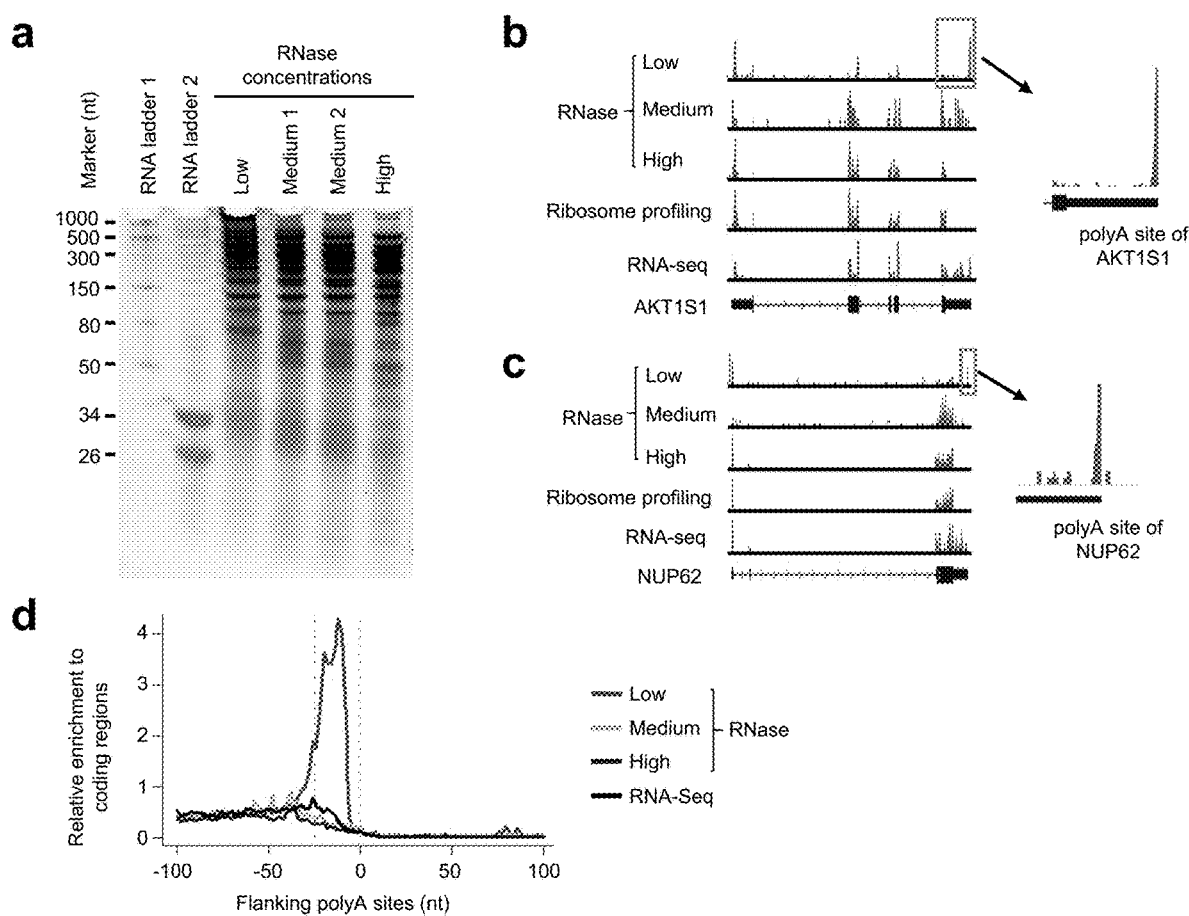

To this end, the cells were treated with three different doses of RNase varying ~1,000-fold. Then the RNA fragments were isolated associated with protein-RNA complexes for sequencing (FIG. 1b,c, and FIG. 7a). As the concentration of RNase increased, the fragments showed decreased lengths, higher enrichment in coding regions of mRNAs, and depletion of those mapped to introns and 3'UTRs (FIG. 1d,e). For example, the binding fragments of the cleavage and polyadenylation complexes can be captured with a low dose of RNase treatment, and they were completely digested by a concentrated RNase (FIG. 7b-d). The results are consistent with the hypothesis that 80S ribosome footprints can be selectively retained after concentrated RNase digestion.

Figure 8:
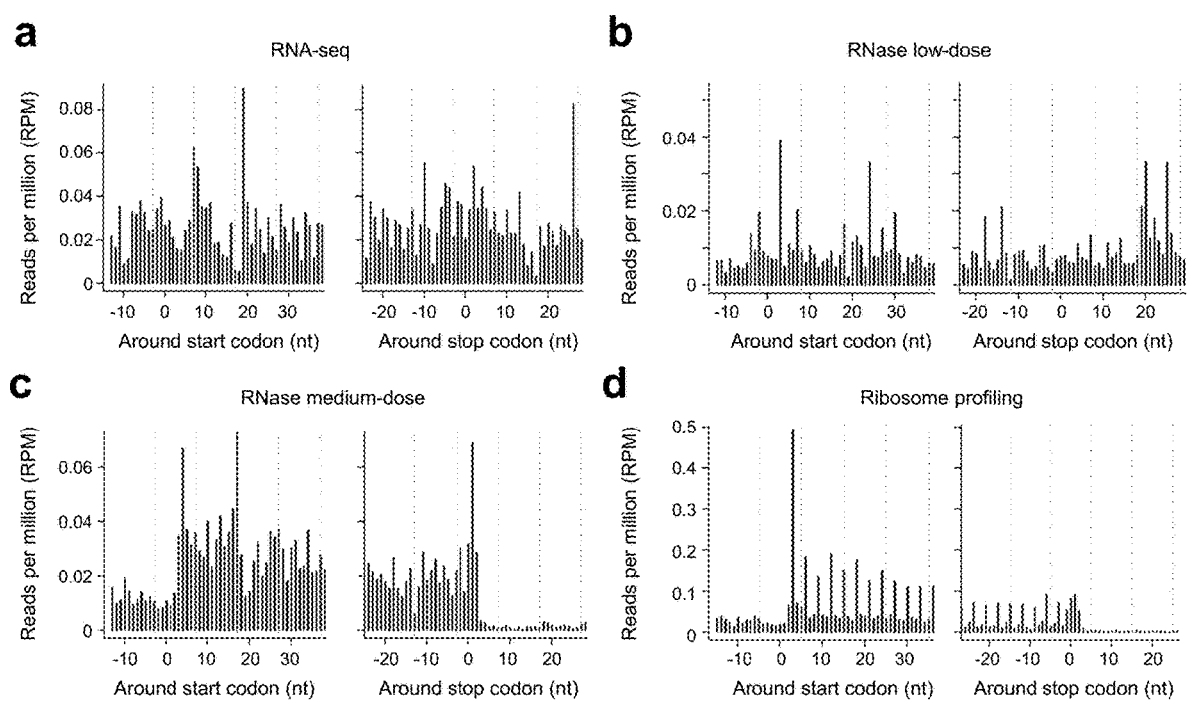

With the high dose of RNase treatment, the features of sequencing reads mapped to protein-coding regions reflect those of ribosome footprints, supported by the following evidence. First, the lengths of footprints show two enriched peaks at 21 nucleotides (nt) and 29 nt, respectively (FIG. 1e), corresponding to the two functional states of ribosome complexes[11]. Second, the footprinting reads show 3-nt periodicity across coding regions, representing that 80S ribosomes move 3 nt per step to decode RNAs (FIG. 1f and FIG. 8). These are the commonly used quality-control metrics for ribosome profiling to show that the reads in coding regions represent actively translating ribosome complexes.

RNase Footprinting Simplifies Experimental Procedures to Profile RNA Translation Conventional ribosome profiling uses ultracentrifugation with a sucrose cushion to select ribosome-RNA complexes after RNase digestion[18]. This step requires millions of input cells. RNase footprinting adjusts the dose of RNase to remove non-ribosomal protein-RNA complexes in coding regions and does not require ultracentrifugation (FIG. 1b). The results are consistent with previous finding[24] that the centrifugation step during ribosome profiling is not specific to 80S ribosomes, but also isolates many native stable non-ribosomal protein-RNA complexes (FIG. 9). During the data analyses, sequencing reads with a length of 18-35 nt were selected to quantify protein synthesis levels because footprints of actively translating ribosomes show these defined lengths[11]. The significant correlation with ribosome profiling data (R=0.99) indicates that the RNase footprinting approach quantitatively measures ribosome occupancy (FIG. 1g, and FIG. 10a-c). Notably, a few genes show higher expression (~1.2 fold) from RNase footprinting than ribosome profiling, such as the mitochondrial transcripts MT-ND5, MT-ND4, and MT-ND4L (FIG. 1g). The data are in line with that mitochondrial ribosomes have a smaller molecular weight than 80S cytosolic ribosomes. Because RNase footprinting does not perform the centrifugation steps, it captures more ribosome-RNA complexes. The results are reproducible between biological replicates (R=0.99, FIG. 10d).

Figure 2:
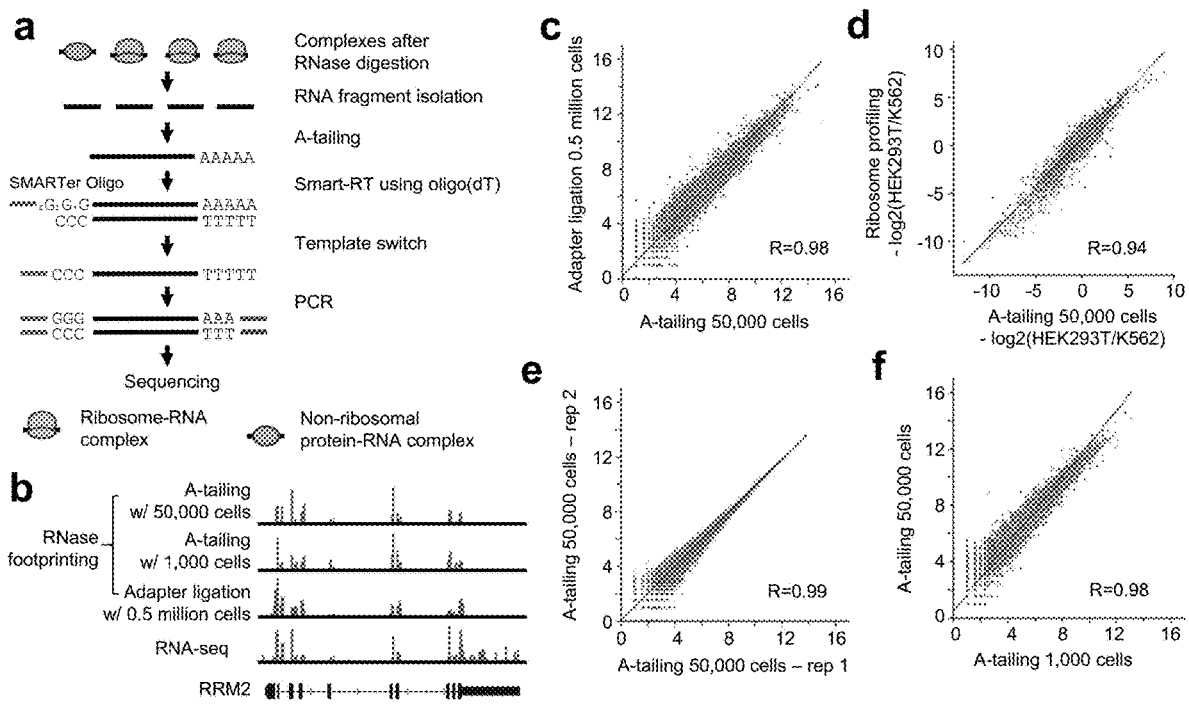

Low-Input RNase Footprinting Rapidly Quantifies RNA Translation Using 1,000-50,000 Cultured Cells To make data most comparable, the adapter ligation steps used during RNase footprinting above were the same as in ribosome profiling[18]. However, the loss-prone ligation reactions require a lot of starting material (>0.2 million HEK293T cells). To further reduce the input material, A-tailing of the footprints was performed, and reverse transcription primed with Oligo(dT) in conjunction with a template switch using SMARTer oligos (FIG. 2a). A-tailing and the SMARTer oligo-based template switch work well for low-input sequencing methods including single-cell RNA-seq[25]. 4 random nucleotides were added to the 3' end of SMARTer oligos before the locked nucleotide acids GGG, which can increase the sequencing quality. Finally, the fragments were amplified using PCR and generated a sequencing library. The total library preparation time is ~1.5 workdays.

Low-input RNase footprinting was performed using 50,000 and 1,000 HEK293T and K562 cells, respectively (FIG. 2b and FIG. 11a). Ribosome occupancies inferred by the A-tailing method using 50,000 cells were significantly correlated with those from the linker ligation method using 0.5 million cells (R=0.98, FIG. 2c and FIG. 11b). And RNase footprinting reliably inferred differential ribosome binding between HEK293T and K562 cells (R=0.94 vs. ribosome profiling, FIG. 2d). The biological replicates were highly consistent (R=0.99, FIG. 2e and FIG. 11c). Accurate measurement of ribosome occupancies was even achieved using 1,000 cells as the starting material (FIG. 2f and FIG. 11d,e).

RNase Footprinting Maps Mitochondrial Translation

Mitochondria have their own translation machinery to generate the 13 proteins encoded by the mitochondrial genome, which are all subunits of respiratory chain complexes[26]. As proteins composing the mitochondrial translation machinery are encoded by the nuclear genome, cytosolic and mitochondrial translational programs are synchronically regulated during biological processes[27-29]. RNase footprinting reads in mitochondrial protein-coding regions represent fragments associated with translating ribosomes. The reads show a peak of 32 nt long with 3-nt periodicity across coding regions (FIG. 12). A minor peak at 21 nt suggests that mitochondrial ribosome complexes may also have two states, similar to the cytosolic machinery (FIG. 12a).

Figure 3:
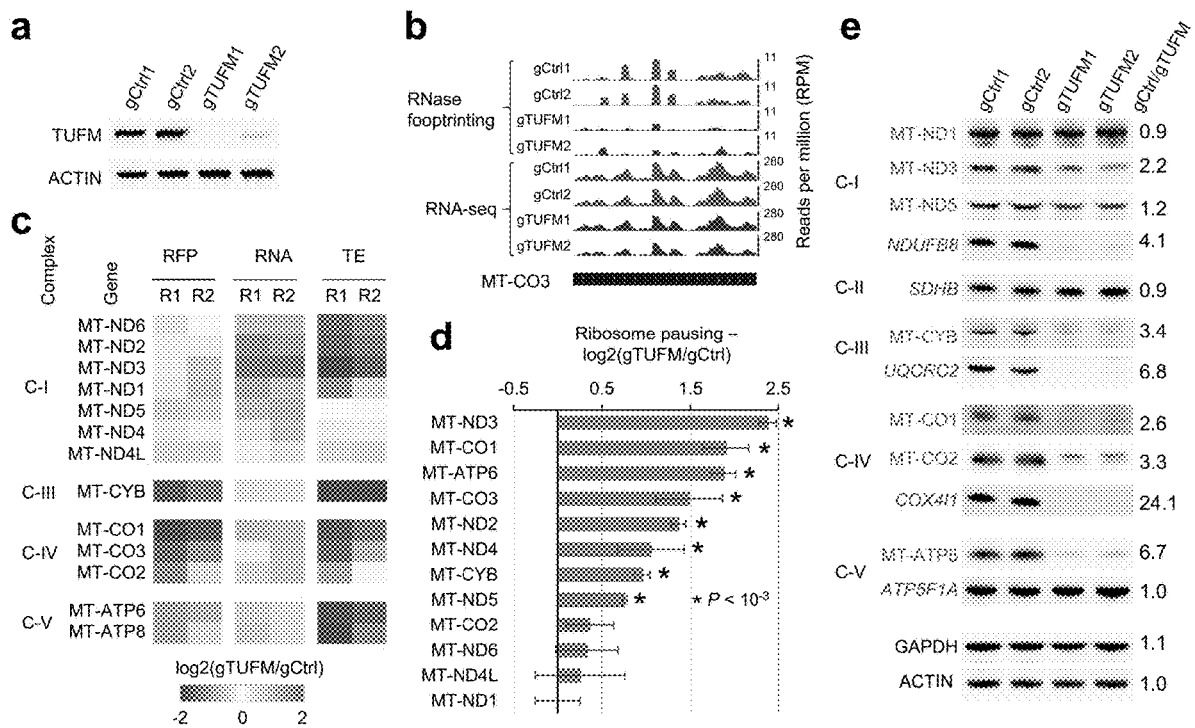

RNase Footprinting Identifies the Selective Functions of TUFM in Mitochondrial Translation The mitochondrial translation machinery is a macromolecular complex composed of ~80 proteins[30]. Currently, the heterogeneity of the complex and specialized functions of individual translation factors remain poorly understood. Using RNase footprinting, the functional roles of the mitochondrial translation elongation factor TUFM was studied in cells. RNase footprinting and RNA-seq in HeLa cells was performed after TUFM knockout (FIG. 3a,b). The translation efficiency was calculated of an mRNA as the ratio of read density in the coding region from RNase footprinting vs. that from RNA-seq. The translation efficiencies of 13 mitochondrial protein-coding genes were repressed at variable levels (from 5-fold down-regulation to none) after TUFM knockout (FIG. 3c). Besides occupancy of the transcripts, ribosome elongation and pausing is another important regulatory layer of protein synthesis. Consistent with the fact that TUFM is a mitochondrial translation elongation factor, 8 mitochondrial genes showed increased ribosomal pausing (from 1.8-fold to 6-fold) at the 5'-end (the first 20%) of transcripts after the gene knockout (FIG. 3d). Ribosome pausing is significantly correlated with the down-regulation of translation efficiency (R=−0.59, P<0.05, FIG. 13a).

Genes encoding subunits of complexes III, IV, and V of the mitochondrial respiratory chain generally showed decreased translation efficiency and ribosome occupancy, as well as increased ribosome pausing after TUFM knockout (FIG. 3cd). And their protein expression were drastically down-regulated (FIG. 3e). Interestingly, heterogeneous regulations were observed for the subunits of complex I. Translation efficiencies of genes such as MT-ND2 and MT-ND6 were decreased after TUFM knockout. But ribosome occupancies of the genes were not down-regulated, because their RNA expression levels were increased possibly due to the compensatory regulation from gene transcription (FIG. 3cd). MT-ND1 did not show significant regulation of ribosome occupancy or pausing, and its protein expression was unchanged (FIG. 3c-e). Altogether, these data indicate a selective function of TUFM in regulating mitochondrial translation and demonstrate the ability of RNase footprinting to dissect the heterogeneity and redundancy of the translation machinery.

Additionally, expression of nuclear-encoded respiratory chain subunits was examined, which have been commonly used as markers for complex activities[31, 32]. For NDUFB8 (complex I), UQCRC2 (complex III), and COX4I1 (complex IV), their protein levels were drastically down-regulated (>4-fold; FIG. 3e), but the ribosome occupancies across these transcripts just showed modest down-regulation (1.1- to 1.8-fold; FIG. 13b). These data suggest that TUFM knockout translationally suppressed the expression of respiratory chain proteins encoded by the mitochondrial genome, causing complex instability and the degradation of nuclear-encoded protein subunits.

Figure 4:
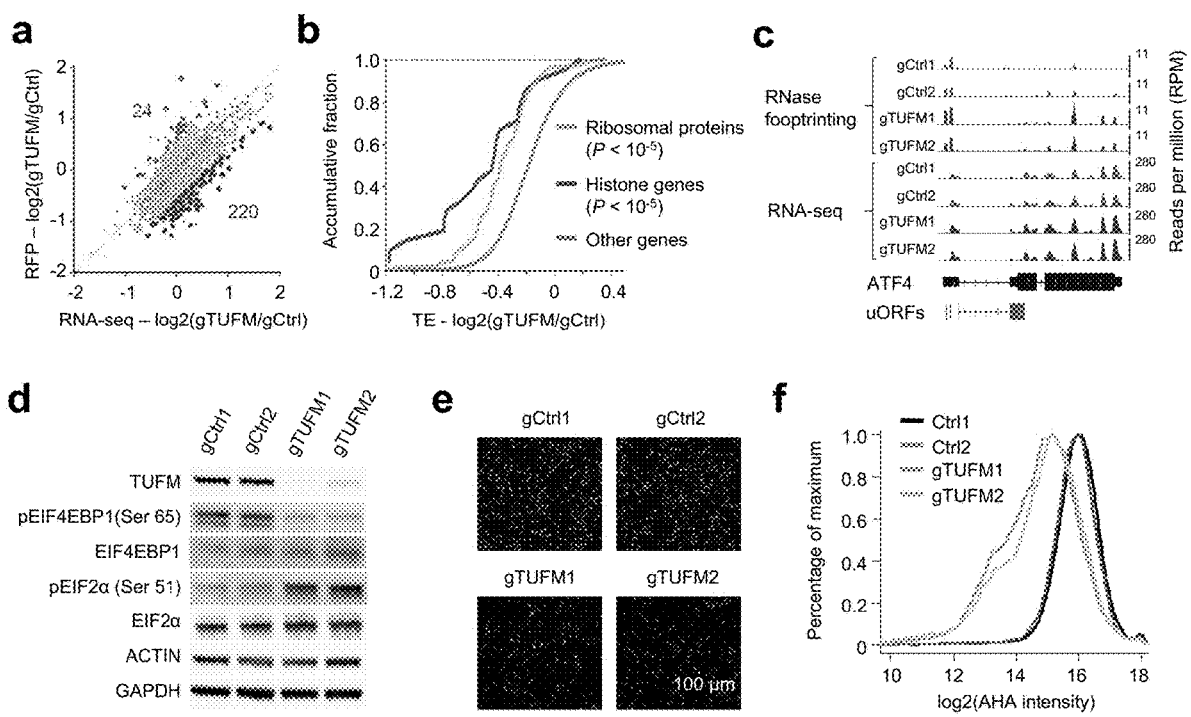

RNase Footprinting Shows the Suppression of Cytosolic Translation Upon Mitochondrial Translation Dysfunction A total of 220 cytosolic mRNAs showed significant inhibition (>1.5-fold) of translation efficiency (FIG. 4a, FIG. 14a,b, and Table 1). These genes are enriched with ribosomal proteins and histone genes (FIG. 4b and FIG. 14c). Only 24 genes showed increased translation efficiency, and 9 of them had highly expressed upstream ORFs (uORFs) in 5'UTRs, such as ATF4 and PPP1R16A (FIG. 4c and Table 1). The transcriptionally upregulated genes were enriched in pathways such as "response to extracellular stimulus", "immune response", and "regulation of apoptosis" (FIG. 14d). Western blots showed that the translation initiation factor eIF2a is more phosphorylated and eIF4EBP1 shows decreased phosphorylation after TUFM knockout (FIG. 4d). Using a fluorescent methionine analog, the global nascent protein synthesis rate was decreased by 2.3-fold (FIG. 4e,f). Altogether, the data indicate that cytosolic translation activity is inhibited in response to cellular stress induced by mitochondrial dysfunction after TUFM knockout, and the regulated genes and pathways are similar to those mediated by other stress responses[33, 34]. These results showed that the RNase footprinting data can be used to dissect the synchronized regulation between mitochondrial and cytosolic translation programs.

Figure 5:
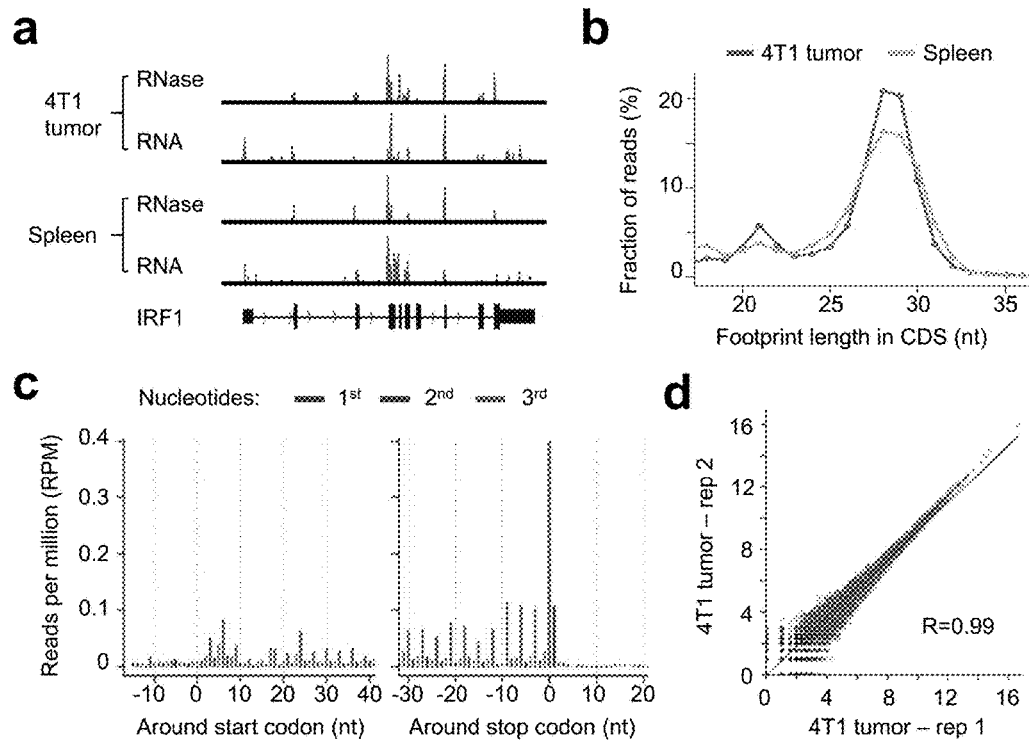

RNase Footprinting Reveals Base-Resolution Translation Using Low Amounts of Snap-Frozen Tissues and Primary Blood Cells Poorly proliferative primary tissues show lower translational activity than rapidly dividing cultured cells, and this makes it a challenge to quantify the small number of actively translating ribosome complexes in cells. Because the present RNase footprinting approach is accessible to low numbers of input cells, it can be used to map the translational landscape of primary cells. This approach was applied to assay RNA translation in snap-frozen tumor and spleen samples (with only 1 mg input material) from the mouse 4T1 breast cancer model (FIG. 5a). The lengths of the ribosome footprints showed enrichment around 28 nt and a minor peak at 21 nt (FIG. 5b). The reads were enriched in coding regions and showed continuous 3-nt periodicity across ORFs, indicating active translation (FIG. 5c and FIG. 15a). The calculated ribosome occupancy levels were highly consistent between replicates (R=0.99; FIG. 5d and FIG. 15b,c). Additionally, primary peripheral blood mononuclear cells (PBMCs) showed a 30-fold lower protein synthesis rate than cultured K562 cancer cells (FIG. 16a). The RNase footprinting method quantitatively maps ribosome footprints using 100,000 PBMCs (the footprint amount corresponds to that in ~3,500 K562 cells) from an individual's standard blood draw (FIG. 16b-d).

RNase Footprinting Reveals the Regulation of RNA Translation Among Primary Immune Cells Besides mixed PBMCs, RNase footprinting and RNA-seq was performed for purified T-cells, B-cells, and monocytes from the same blood draw (FIG. 6a). Footprinting profiles of these immune cells effectively captured the marker gene expression and classified the cell types (FIG. 6b and FIG. 16e-g). 2,048 genes showed >1.5-fold differential translation efficiency comparing T-cells, B-cells, and monocytes (FIG. 6c, FIG. 17a-c). These translationally regulated genes showed little overlap with these regulated by gene transcription identified by RNA-seq (FIG. 6d,e, FIG. 17d-g). The data indicate that RNA translation and gene transcription are two complementary regulatory layers of immune cell activities. Transcriptionally regulated genes are enriched in the genes associated with cell type-specific functions. Genes uniquely activated in T-cells and B-cells are enriched in the pathways "T-cell activation" and "B-cell activation", respectively (FIG. 18a,b). Monocyte-specific genes are enriched in the pathway of "inflammatory response" (FIG. 18c). Most translationally regulated genes (1,360 genes, 66% of total) show consistent higher translation efficiency in both T-cells and B-cells as compared to monocytes (FIG. 6c), representing lymphocyte-specific regulation. These genes are enriched in pathways such as "cell cycle", "RNA processing", "regulation of transcription", and "chromatin organization" (FIG. 6f, FIGS. 18d and 19). Interestingly, ribosomal proteins showed significantly lower RNA expression in monocytes compared to lymphocytes ($P<10^{-17}$, Wilcoxon rank sum test; FIG. 6g). This possibly is the mechanistic reason that monocytes show lower translation activities. Translation initiation factors were mildly regulated at the transcriptional level, but showed significantly lower translation efficiency in monocytes than lymphocytes ($P<10^{-8}$, Wilcoxon rank sum test) (FIG. 6h). The suppression of initiation factors at the translational level may further decrease the translation activity in monocytes. Altogether, these results demonstrate the feasibility and significance of profiling the translatomic landscape of human primary tissue samples, which can lead to novel mechanistic insights into biological systems.

RNase Footprinting Examines Non-Canonical ORFs in Individual's Immune Cells

As RNase footprinting reveals ribosome binding at the single-nucleotide resolution, the data can be used to identify actively translated non-canonical ORFs in annotated noncoding regions, such as lncRNAs and 5'UTRs of mRNAs. Indeed, using the RibORF software[14, 35], the analyses of RNase footprinting data in HEK293T cells showed that predicted translated probabilities of candidate ORFs are well-correlated with those from ribosome profiling (R=0.92, FIG. 6i). Footprinting data from immune cells can accurately distinguish in-frame translated ORFs vs. internal off-frame ones (area under the receiver operating characteristic (ROC) curve=0.987, FIG. 6j). In total, 2,639 translated uORFs in 5'UTRs, 265 lncRNA ORFs, and 134 pseudogene ORFs (FIG. 6k) were identified. 321 of these non-canonical ORFs showed >1.5-fold differential ribosome occupancy comparing the individual's primary immune cells (FIG. 6l and Table 4). The data showed that personalized translatomics data from RNase footprinting can be used to characterize the regulation of non-canonical ORFs.

EXAMPLE 2

Summary

This example relates to a low-input RNase footprinting approach for the rapid quantification of ribosome-protected fragments with as few as 1,000 cultured cells. The assay uses a simplified procedure to selectively capture ribosome footprints based on optimized RNase digestion. It simultaneously maps cytosolic and mitochondrial translation with single-nucleotide resolution. The assay was applied to reveal selective functions of the elongation factor TUFM in mitochondrial translation, and synchronized repression of cytosolic translation after TUFM perturbation. The assay is applicable to small amounts of primary tissue samples with low protein synthesis rates, including snap-frozen tissues and immune cells from an individual's blood draw. This example demonstrates the assay's feasibility to characterize the personalized immuno-translatome. The analyses revealed that thousands of genes show lower translation efficiency in monocytes compared to lymphocytes, and identified thousands of translated non-canonical open reading frames (ORFs). Altogether, the RNase footprinting approach opens an avenue to assay transcriptome-wide translation using low-input samples from a wide range of physiological conditions. RNA translation controls the protein production in a cell and is dynamically regulated during diverse biological processes, such as the stress response, cell differentiation, oncogenesis, and neuronal diseases (Holcik and Sonenberg 2005; Kapur et al. 2017; Costa-Mattioli and Walter 2020; Xu and Ruggero 2020). Quantifying ribosome-protected RNA fragments represents a state-of-art approach to examine the regulation of RNA translation in vivo, and distinguishes protein synthesis from other layers of protein and RNA metabolic processes. Ribosome profiling technology uses RNase to digest RNA fragments not protected by protein complexes, isolates the translating ribosome complexes, and purifies the protected footprints for deep sequencing (Ingolia et al. 2009; Ingolia 2014). This method reveals active translation at single-nucleotide resolution. It has been widely used to study various aspects of protein synthesis, such as the regulation of translation efficiency (Guo et al. 2010; Brar et al. 2012), alternative translation initiation (Ingolia et al. 2011; Lee et al. 2012), ribosome elongation and pausing (Liu et al. 2013; Wu et al. 2019), codon usage (Radhakrishnan et al. 2016), and identifying novel translated ORFs and micropeptides (<100 amino acids) encoded in a genome (Ji et al. 2015; Calviello et al. 2016; Chen et al. 2020). However, current ribosome profiling protocols typically involve complicated experimental procedures to isolate translating ribosome complexes, such as ultracentrifugation through a sucrose cushion/gradient (Ingolia et al. 2009; McGlincy and Ingolia 2017), size-exclusion chromatography (Khajuria et al. 2018; van Heesch et al. 2019), or ribosome immunoprecipitation (Clamer et al. 2018). These complex isolation steps are time-consuming and require many input cells (the protocols typically recommend millions of input cells) (Ingolia et al. 2012; McGlincy and Ingolia 2017). These technical barriers have prevented their application to physiological tissue samples with a small number of cells and/or low protein synthesis activity. As a result, most of the current understanding of translational control is based on experiments with cultured cells and is not in the physiological context. To address this technical challenge, the example describes an RNase footprinting approach to rapidly quantify ribosome footprints using a simplified experimental procedure, which is accessible to various types of low-input cells. The assay is based on that translating ribosomes (such as 80S cytosolic ribosomes and 55S mitoribosomes) have a stronger protection affinity to RNA fragments than other RNA binding proteins (RBPs) in coding regions. This example shows that by treating cell lysates with highly concentrated RNase, RNA fragments bound by translating ribosomes were effectively retained while those associated with other proteins in coding regions were digested. This example shows that the assay detects the synchronized regulation of cytosolic and mitochondrial translation. Finally, this example shows that the approach maps the translation landscape of small amounts of snap-frozen tissues and is compatible with a standard blood draw from a healthy donor to examine the regulation of the personalized translatome in primary immune cells with low protein synthesis activity.

Results

Rnase Digestion Distinguishes RNA Fragments Bound by 80S Ribosomes Vs. Other RBPs As suggested by previous studies, RBPs show different binding affinities to RNAs. To capture RNA fragments bound by 40S scanning ribosomes or splicing factors, it is needed to use formaldehyde or UV to crosslink and stabilize RNA-protein complexes before RNase digestion (Darnell 2010; Archer et al. 2016; Van Nostrand et al. 2017). In contrast, translating ribosomes (such as 80S cytosolic ribosomes and mitoribosomes) show stronger protection of RNAs, and the crosslinking step is not needed to capture these footprints (Ingolia et al. 2009; Rooijers et al. 2013; Couvillion et al. 2016). Based on this distinction, it was hypothesized that by treating cell lysates with a high dose of RNase, one can selectively retain footprints protected by translating ribosomes, while digesting the fragments bound by other RBPs in coding regions (FIG. 21A).

To this end, the cells were treated with three different doses of RNase varying 1,000-fold. Then the RNA fragments were isolated after RNase digestion for sequencing (FIG. 21BC, and FIG. 28A). As the concentration of RNase increased, the fragments showed decreased lengths, higher enrichment in coding regions of mRNAs, and depletion of those mapped to 3'UTRs and introns (FIG. 21CDE). For example, the binding fragments of the cleavage and polyadenylation complexes can be captured with a low dose of RNase treatment, but were completely digested by concentrated RNase (FIG. 28BC).

With the high dose of RNase treatment, the features of sequencing reads mapped to protein-coding regions of mRNAs reflected those of ribosome footprints, supported by the following evidence. First, the lengths of footprints showed two enriched peaks at 29 nucleotides (nt) and 21 nt, respectively (FIG. 21E). A recent study found that the ~29 nt footprints represent the ribosome conformational state with occupied A-sites, while the ~21 nt footprints are from the RNase digestion of ribosomes with empty A-sites (Wu et al. 2019). Second, the footprinting reads with the peak sizes (i.e. 20-22 nt and 28-31 nt) showed 3-nt periodicity across coding regions, representing that 80S ribosomes move 3 nt per step to decode RNAs (FIG. 21F and FIG. 29A-D). The results are consistent with the hypothesis that 80S ribosome footprints can be selectively retained after concentrated RNase digestion.

RNase Footprinting Simplifies Experimental Procedures to Profile Cytosolic Translation Next, it was examined whether RNA fragments from the high-dose RNase footprinting can quantitatively measure ribosome occupancy. To this end, detailed comparisons were performed with the ribosome profiling data generated by the conventional protocol, which uses ultracentrifugation through a sucrose cushion to enrich complexes with a higher molecular weight (McGlincy and Ingolia 2017). For each fragment size between 18 nt and 35 nt, the read distribution was plotted around start codons and stop codons of mRNAs (FIG. 29DE). For each fragment size, consistent read distribution patterns were observed between RNase footprinting and ribosome profiling, and the reads are highly enriched in coding regions (FIG. 29D-F). Based on these results, sequencing reads with lengths of 18-35 nt in coding regions were selected to quantify ribosome occupancy (McGlincy and Ingolia 2017). The inferred ribosome occupancies using the RNase footprinting data showed a significant correlation with ribosome profiling ($R=0.99$; FIG. 21G, and FIG. 28D-F), indicating that the RNase footprinting quantitatively measures ribosome binding levels.

Notably, a few genes show higher expression (~1.2 fold) from RNase footprinting than ribosome profiling, such as the mitochondrial transcripts MT-ND5, MT-ND4, and MT-ND4L (FIG. 21G). The data are in line with that 55S mitoribosomes have a smaller molecular weight than 80S cytosolic ribosomes.

Because RNase footprinting does not perform the centrifugation steps of the conventional protocol, it captures more mitoribosomes. The results are reproducible between biological replicates ($R=0.994$, FIG. 28G).

Recently studies such as Bazzini et al. 2014; Ji et al. 2015; Calviello et al. 2016; Chen et al. 2020, showed ribosome footprints can be used to identify translated non-canonical ORFs based on the continuous 3-nt periodicity read distribution pattern in actively translated regions. Using the ribORF software (Ji 2018), the inventors selected read fragments showing strong 3-nt periodicity (>50% assigned to 1st nucleotides of codons in canonical ORFs), adjusted their 5' end locations to ribosomal A-sites, and used these reads to build a logistic regression classifier to calculate translation probabilities of candidate ORFs. The analyses showed that RNase footprinting reads can accurately distinguish translated canonical ORFs vs. internal off-frame ORFs (area under the receiver operating characteristic (ROC) curve=0.991, FIG. 29G). The inventors trained a model using the RNase footprinting data and another model using ribosome profiling, and applied both models to predict the translation probabilities of candidate non-canonical ORFs including uORFs (upstream ORFs in 5'UTRs of mRNAs) and lncRNA ORFs. The inferred translation probabilities were well correlated between the two models (R=0.92, FIG. 21H). The data further indicated that the RNase footprinting can reliably identify in-frame translated ORFs.

RNase Footprinting Identifies Non-Ribosomal Footprints in Localized Noncoding Regions The above analyses showed consistent footprint distribution in translated regions between RNase footprinting and ribosome profiling. The inventors next compared footprints in other genomic regions and observed major differences in small noncoding RNAs (FIG. 30A). 11.5% of the RNase footprinting reads were mapped to small noncoding RNAs, which is 3.7-fold that of ribosome profiling (FIG. 30A-C). These reads were found within functional domains of small noncoding RNAs (FIG. 30DE), representing the binding of non-ribosomal RNA-protein complexes. The footprints showed highly localized distribution without 3-nt periodicity (FIG. 30FG) and had different lengths compared to ribosome footprints (FIG. 30H). For example, the reads in microRNAs were located in mature microRNA regions (FIG. 30D), and may represent the binding of RNA-induced silencing complex (RISC). The reads in H/ACA type snoR-NAs were mapped to the H-box and ACA-box (FIG. 30E). These non-ribosomal footprints also exist in conventional ribosome profiling data with a lower amount. The results are consistent with previous reports showing that the ultracentrifugation step during ribosome profiling is not specific to 80S ribosomes, but also isolates native stable non-ribosomal RNA-protein complexes in abundant structured small noncoding RNAs (Ingolia et al. 2014; Ji et al. 2016). Here, because the RNase footprinting did not perform centrifugation, more of these smaller molecular weight complexes was retained.

Nevertheless, as discussed previously for the ribosome profiling data analyses (Ingolia et al. 2014; Ji et al. 2015; Ji et al. 2016; Ingolia et al. 2019), the existence of highly localized non-ribosomal footprints in noncoding regions does not affect the calculation of ribosome binding in translated ORFs. Based on the different distribution patterns of these two types of RNase footprints (FIG. 30F), one can distinguish them during the computational analyses.

Low-Input RNase Footprinting Rapidly Quantifies RNA Translation Using 1,000-50,000 Cultured Cells To make the data most comparable, the adapter ligation steps used during RNase footprinting above were the same as in ribosome profiling (McGlincy and Ingolia 2017). However, the loss-prone ligation reactions require a lot of starting material. To further reduce the input material, two modifications were made to the sequencing library generation steps. First, A-tailing of the footprints, and reverse transcription primed with Oligo(dT) in conjunction with template switching using SMARTer oligos were performed (FIG. 22A). A-tailing and the SMARTer oligo-based template switch work well for low-input sequencing library preparation (Picelli et al. 2013; Hornstein et al. 2016). 4 random nucleotides were added to the 3' end of SMARTer oligos before the locked nucleic acids GGG, which can increase the sequencing quality. Second, to enrich ribosome footprints, the conventional protocol performed fragment selection using gel purification after the footprint isolation from the sucrose cushion (McGlincy and Ingolia 2017). In contrast, the inventors performed the size selection of the DNA library after PCR amplification and used computational analyses to select wanted fragment sizes (i.e. 18-35 nt) to calculate ribosome occupancy. The procedure further reduced required starting materials by skipping intermediate footprint selection steps. The low-input RNase footprinting method can be carried out in ~1.5 days, the total working time from cell harvesting to final library purification.

Efficient RNase digestion is a important step of the RNase footprinting assay. RNase treatment conditions, such as RNase concentration and digestion time, were optimized for both low- and ultra-low-cell counts (50,000 and 1,000 cultured cells, respectively). It was determined the RNase amount based on its ratio to total cellular RNA (~50 U/µg). It was also found that RNase concentration may be critical to achieving efficient digestion. The final RNase concentration was adjusted to 0.5-1 U/µl in the final reaction volume. This parameter may be especially important for ultra-low-input conditions (such as 1,000 cultured cells). Other library construction steps were also optimized, including A-tailing, Smart-RT, and PCR conditions to unbiasedly include RNase footprints in the sequencing library (see Methods for detail). RNase footprinting libraries were generated for HEK293T and K562 cells with either 50,000 or 1,000 cells (FIG. 22B and FIG. 31A). Next, systematic comparisons was performed between the low-input RNase footprinting data vs. conventional ribosome profiling generated by this study as well as previously published work (Iwasaki et al. 2016; Calviello et al. 2020; Martinez et al. 2020).

The following analysis results indicated that the low-input RNase footprinting can accurately examine different aspects of protein synthesis. First, ribosome occupancies inferred using 50,000 cells and 1,000 cells were significantly correlated with those from the conventional ribosome profiling with millions of input cells (R>0.97 compared to the data and R>0.93 compared to published datasets; FIG. 22C and FIG. S31B). Second, the CONCUR software (Frye and Bornelov 2020) was used to calculate the codon occupancy using the datasets. The codon usage levels learned from our low-input RNase footprinting were well correlated with those from the ribosome profiling (R>0.92 compared to the data and R>0.82 compared to published datasets, FIG. 22D and FIG. 31C). Third, the reads showed comparable uniformity of distribution across codons (FIG. 22E and FIG. 31D), and the downsampling analyses (Hornstein et al. 2016) showed that the same number sequencing reads can detect similar numbers of genes and unique footprints when comparing RNase footprinting with ribosome profiling (FIG. 22FG and FIG. 31EF). Finally, RNase footprinting reliably inferred differential ribosome binding between HEK293T and K562 cells (R=0.94 vs. ribosome profiling, FIG. 22H). Taken together, the data showed that the low-input RNase footprinting is in concordance with established ribosome profiling methods and quantitatively measures cytosolic ribosome binding.

RNase Footprinting Maps Mitochondrial Translation

Mitochondria have their own translation machinery to generate the 13 proteins encoded by the mitochondrial genome, which are all subunits of respiratory chain complexes (Pearce et al. 2017). As proteins composing the mitochondrial translation machinery are encoded by the nuclear genome, the cytosolic and mitochondrial translational programs are synchronously regulated during biological processes (Couvillion et al. 2016; Dennerlein et al. 2017; Suhm et al. 2018). The RNase footprinting reads in mitochondrial protein-coding regions show the features expected of fragments associated with translating ribosomes. The read lengths show a dynamic range between 18-35 nt with a peak at 32 nt. Those at the peak size of 32 nt show 3-nt periodicity across coding regions (FIG. 23A-C). A minor peak at 21 nt suggests that mitoribosome complexes may also have two conformation states, similar to the cytosolic machinery (FIG. 23A).

To further examine whether the RNase footprinting can quantitatively measure mitoribosome occupancy, a previously described method (Rooijers et al. 2013) which uses a sucrose gradient to isolate 55S mitoribosomes and 80S ribosomes after RNase treatment of 20 million HEK293T cells (FIG. 23D), was performed. The resulting footprints in mitochondrial coding regions showed consistent length distribution with those from the RNase footprinting (R=0.986; FIG. 23E). The inferred ribosome occupancies of mitochondrial coding genes (calculated using 18-35 nt footprints) showed a significant correlation between the two methods (R=0.987; FIG. 23F). A similar correlation was observed for cytosolic coding genes (R=0.987; FIG. 23G). These results confirmed that the RNase footprinting provides a simplified method to quantify mitochondrial and cytosolic translation programs simultaneously.

RNase Footprinting Identifies the Selective Functions of TUFM in Mitochondrial Translation The mitochondrial translation machinery is a macromolecular complex composed of ~80 proteins (D'Souza and Minczuk 2018). Currently, the heterogeneity of the complex and specialized functions of individual translation factors remain poorly understood. Using RNase footprinting, the functional roles of the mitochondrial translation elongation factor TUFM in cells was studied.

RNase footprinting and RNA-seq in HeLa cells after TUFM knockout (FIG. 24AB and FIG. 32A-C) were performed.

The translation efficiency of an mRNA as the ratio of read density in the coding region from RNase footprinting vs. that from RNA-seq was calculated. The translation efficiencies of the 13 mitochondrial protein-coding genes were repressed at variable levels (from 5-fold down-regulation to none) after TUFM knockout (FIG. 24C). Besides occupancy of the transcripts, ribosome elongation and pausing is another important regulatory layer of protein synthesis. Consistent with the fact that TUFM is a mitochondrial translation elongation factor, it was found that 8 mitochondrial genes showed increased ribosomal pausing (from 1.8-fold to 6-fold) at the 5'-end (the first 20%) of transcripts after the gene knockout (FIG. 24D). Ribosome pausing is significantly correlated with the down-regulation of translation efficiency (R=−0.59, P<0.05, FIG. 32D). The pulse labeling assay with the methionine analog AHA (L-azidohomoalanine) (Dieterich et al. 2007) showed that the nascent protein synthesis of mitochondrial coding genes were generally suppressed at variable levels after TUFM knockout (FIG. 32F).

Genes encoding subunits of complexes III, IV, and V of the mitochondrial respiratory chain generally showed decreased translation efficiency and ribosome occupancy, as well as increased ribosome pausing after TUFM knockout (FIG. 24CD). And their protein expression were drastically down-regulated (FIG. 24E). Interestingly, heterogeneous regulation was observed for the subunits of complex I. Translation efficiencies of genes such as MT-ND2 and MT-ND6 were decreased after TUFM knockout (FIG. 24C). But ribosome occupancies of the genes were not down-regulated because their RNA expression levels were increased, possibly due to the compensatory regulation from gene transcription (FIG. 24C). MT-ND1 did not show significant regulation of ribosome occupancy or pausing, and its protein expression was unchanged (FIG. 24C-E). Altogether, these data indicate a selective function of TUFM in regulating mitochondrial translation and demonstrate the ability of RNase footprinting to dissect the heterogeneity and redundancy of the translation machinery.

Additionally, the expression of nuclear-encoded respiratory chain subunits, which have been commonly used as markers for complex activity (Baechler et al. 2019; Rudler et al. 2019) was examined. For NDUFB8 (complex I), UQCRC2 (complex III), and COX4I1 (complex IV), their protein levels were drastically down-regulated (>4-fold; FIG. 24E), but the ribosome occupancies across these transcripts showed modest down-regulation (1.1- to 1.8-fold; FIG. 32E). These data suggest that TUFM knockout translationally suppressed the expression of respiratory chain proteins encoded by the mitochondrial genome, causing complex instability and the degradation of nuclear-encoded protein subunits.

RNase Footprinting Shows the Suppression of Cytosolic Translation Upon Mitochondrial Translation Dysfunction A total of 220 cytosolic mRNAs showed inhibition of translation efficiency >1.5-fold after TUFM knockout (FIG. 24F, FIG. 32HI, and Table 1). These genes are enriched with ribosomal proteins and histone genes (FIG. 24G and Table 2). Only 24 genes showed increased translation efficiency, and 9 of them had highly expressed upstream ORFs (uORFs) in 5'UTRs, such as ATF4 and PPP1R16A (Table 1). Gene ontology analyses showed that the transcriptionally upregulated genes were enriched in pathways such as "response to extracellular stimulus", "immune response", and "regulation of apoptosis" (P<10-3; Table 2). Western blots showed that the translation initiation factor eIF2a is more phosphorylated and eIF4EBP1 shows decreased phosphorylation after TUFM knockout (FIG. 24H). Pulse-AHA labeling was used to show that the global nascent protein synthesis rate was decreased by 2.3-fold (FIG. 24I, and FIG. 32G). Altogether, the data indicate that cytosolic translation activity is inhibited in response to cellular stress induced by mitochondrial dysfunction after TUFM knockout, and the regulated genes and pathways are similar to those mediated by other stress responses (Andreev et al. 2015; Gameiro and Struhl 2018). These results showed that the RNase footprinting data can be used to dissect the synchronized regulation between mitochondrial and cytosolic translation programs.

RNase Footprinting Reveals Base-Resolution Translation Using Low Amounts of Snap-Frozen Tissues Poorly proliferative primary tissues show lower translational activity than rapidly dividing cultured cells, and this makes it a challenge to quantify the small number of actively translating ribosome complexes in cells. The RNase footprinting approach was applied to assay RNA translation in snap-frozen tumor and spleen samples (with only 1 mg input material) from the mouse 4T1 breast cancer model (FIG. 25A). RNase digestion and library preparation conditions were calibrated based on the cellular total RNA amount (see Methods for detail). The lengths of the ribosome footprints showed enrichment around 29 nt and a minor peak at 21 nt (FIG. 25B). The reads (18-35 nt) were highly enriched in coding regions (FIG. 25C) and these with peak size (~29 nt) showed continuous 3-nt periodicity across ORFs, indicating active translation (FIG. 25D). The calculated ribosome occupancy levels were highly consistent between replicates (R>0.98; FIG. 25EF). The data indicate that the RNase footprinting can quantify ribosome footprints using snap-frozen tissue samples.

RNase Footprinting Reveals the Regulation of RNA Translation Among Primary Immune Cells RNA translation is highly regulated during blood development and disorders (Signer et al. 2014; Khajuria et al. 2018). Primary peripheral blood mononuclear cells (PBMCs) showed a 30-fold lower protein synthesis rate than cultured K562 cancer cells (FIG. 33A). Using a standard blood draw, RNase footprinting and RNA-seq were performed for mixed PBMCs and purified T-cells, B-cells, and monocytes (FIG. 26A and FIG. 33B-E). Footprinting profiles of these immune cells effectively captured the marker gene expression and classified the cell types (FIG. 26B and FIG. 33F-H). 2,048 genes showed >1.5-fold differential translation efficiency comparing T-cells, B-cells, and monocytes (FIG. 26C, FIG. 34A-C). These translationally regulated genes showed little overlap with those regulated by gene transcription as identified by RNA-seq (FIG. 26DE, FIG. 34D-G). The data indicate that RNA translation and gene transcription are two complementary regulatory layers of immune cell activities. Transcriptionally regulated genes are enriched in the genes associated with cell type-specific functions. Genes uniquely activated in T-cells and B-cells are enriched in the pathways "T-cell activation" and "B-cell activation", respectively (Table 3). Monocyte-specific genes are enriched in the pathway of "inflammatory response" (Table 3). Most translationally regulated genes (1,360 genes, 66% of total) show consistently higher translation efficiency in both T-cells and B-cells as compared to monocytes (FIG. 26C), representing lymphocyte-specific regulation via translation. These genes are enriched in pathways such as "cell cycle", "RNA processing", "regulation of transcription", and "chromatin organization" (FIG. 26F, FIG. 34H-J, and Table 3).

Interestingly, ribosomal proteins showed significantly lower RNA expression in monocytes compared to lymphocytes ($P<10-17$, Wilcoxon rank sum test; FIG. 26G). This is a possible mechanistic explanation for the decreased translational activity observed in monocytes. Translation initiation factors were mildly regulated at the transcriptional level, but showed significantly lower translation efficiency in monocytes than lymphocytes ($P<10-8$, Wilcoxon rank sum test) (FIG. 26H). The suppression of initiation factors at the translational level may further decrease the translation activity in monocytes. Altogether, these results demonstrate the feasibility and significance of profiling the translatomic landscape of human primary tissue samples, which can lead to novel mechanistic insights into biological systems.

RNase Footprinting Examines Non-Canonical ORFs in Individual's Immune Cells

Next, the RNase footprinting data was used to study the immune-translatome and examine the regulation of non-canonical ORFs. Using the RibORF software (Ji et al. 2015; Ji 2018), read fragments that show strong 3-nt periodicity (FIG. 27A) were selected to train a logistic regression model to predict the translation probability of a candidate ORF. Footprinting data from immune cells can accurately distinguish in-frame translated ORFs vs. internal off-frame ones (area under the ROC curve=0.987, FIG. 27B). In total, 2,639 translated uORFs in 5'UTRs, 265 lncRNA ORFs, and 134 pseudogene ORFs (FIG. 27C) were identified. 321 of these non-canonical ORFs showed >1.5-fold differential ribosome occupancy among the individual's primary immune cell types (FIG. 27D and Table 4). The data showed that personalized translatomics data from RNase footprinting can be used to characterize the regulation of non-canonical ORFs.

Discussion

The original ribosome profiling protocol used the cushion gradient to isolate 80S ribosome complexes and associated footprints to study RNA translation (Ingolia et al. 2009). Later on, to simplify the experimental procedure, ultracentrifugation through a sucrose cushion or size-exclusion chromatography was used to enrich complexes with higher molecular weights (McGlincy and Ingolia 2017). Here, by leveraging that translating ribosomes (80S ribosomes and 55S mitoribosomes) show stronger protection efficiency than other RBPs, the digestion conditions were optimized using concentrated RNase and effectively retained ribosome-protected fragments, while digesting other RNA fragments in coding regions. The simplified procedure to select translating ribosome-protected footprints allowed rapid ribosome profiling. Similarly, RNase dose is an important parameter for capturing other RNA-protein complexes. For example, the low-dose RNase used in this study works well to identify cleavage and polyadenylation complexes. In combination with A-tailing and SMARTer oligo-based template switching to add sequencing adapters, the RNase footprinting reveals base-resolution active translation using as few as 1,000 cultured cells, which is 1,000-fold fewer starting materials than conventional protocols. It was shown that the RNase footprinting data can quantitatively measure different aspects of protein synthesis. The calculated ribosome occupancy, codon usage level, and ORF translation probability are well correlated with conventional ribosome profiling datasets generated by sucrose cushion, sucrose gradient, and size-exclusion chromatography methods. The protocol was calibrated for a variety of primary tissue samples with low protein synthesis rates. It was shown that the protocol worked robustly for snap-frozen tissues and primary immune cells. The method does not require any specialized equipment. The working hour of the RNase footprinting protocol is ~1.5 workdays (comparable to regular RNA-seq) and is less than 30% of that needed for conventional ribosome profiling.

Quality control of the RNase footprinting data was performed using a set of analyses. The footprint lengths show peaks in ~29 nt and ~21 nt (minor in some cells) representing optimized RNase digestion (Martinez et al. 2020). The reads around the peak sizes show 3-nt periodicity across canonical ORFs. Additionally, the reads between 18-35 nt in length show high enrichment in coding regions compared to 3'UTRs. The original ribosome profiling protocol only captured the ~29 nt footprints and did not examine the ~21 nt ones. Only recently, several studies highlighted the fraction of ribosome footprints with ~21 nt (Lareau et al. 2014; Wu et al. 2019). Consistent with the previous study (Wu et al. 2019), the ratio of 29 nt vs. 21 nt reads appears to be variable across different cells and tissues. During the data analyses, 18-35 nt reads were used to calculate ribosome occupancy. But when codon usage levels were calculated and actively translated non-canonical ORFs were identified, only the reads showing strong 3-nt periodicity (typically those around peak sizes) were used because these analyses require accurate correction of read location to the ribosomal A-site or P-site.

The RNase footprinting assay skips the ultracentrifuge step. Different from the previously published footprinting method (Silverman et al. 2014), this assay does not perform the RNA-protein crosslinking steps and treated the cell lysates with highly concentrated RNase. As a result, only the most stable RNA-protein complexes were retained after RNase digestion. The non-ribosomal footprints show highly localized distribution without 3-nt periodicity and have different lengths compared to ribosomal ones. Based on these read distribution patterns, one can computationally distinguish the two types of footprints (Ingolia et al. 2014; Ji et al. 2016; Ingolia et al. 2019). As discussed previously (Ji et al. 2016), the characterization of non-ribosomal footprints could provide biological insights into corresponding noncoding regions. Additionally, similar to conventional ribosome profiling, ~78% of the sequencing reads are fragments from ribosomal RNAs (rRNAs).

Due to the unbiased assay of transcriptomic RNase footprints, the footprinting data allow the simultaneous quantification of cytosolic and mitochondrial translation. Current assays used to study mitochondrial translation involve complicated procedures using sucrose gradient to purify 55S mitoribosome complexes (Rooijers et al. 2013; Couvillion et al. 2016; Morscher et al. 2018). The RNase footprinting provides a simplified method to tackle mitochondrial translation and obtains comparable results (i.e. ribosome occupancy and footprint lengths) versus the conventional method. Using the assay, it was revealed that TUFM selectively regulates the translation efficiency and ribosome elongation of the 13 mitochondrial-encoded protein-coding genes, and showed that cytosolic translation is synchronously repressed after TUFM knockout. Similar approaches can be used to define the functional roles of other regulators and dissect the crosstalk between mitochondrial translation and cytosolic regulation during biological processes.

The RNase footprinting technique opens up an avenue to examine transcriptomic translation using low input primary cells from physiological contexts for both basic scientific research and clinical personalized prognosis. It was shown that the assay reveals base-resolution active translation in snap-frozen mouse tissues (i.e., tumor and spleen) and primary immune cells (i.e., T-cells, B-cells, and monocytes) from an individual's standard blood draw. Interestingly, many genes showed lower translation activity in monocytes than lymphocytes. This is likely due to the lower RNA expression of ribosomal proteins in monocytes. The RNA expression profiles of monocytes and lymphocytes were analyzed using published RNA-seq datasets and it was found that this differential regulation appears to be a general phenomenon across human individuals (FIG. 34K).

Materials and Methods

Cell culture and gene knockout. HEK293T and HeLa cells (ATCC) were cultured in DMEM medium (Gibco, cat. no. 11965092) supplemented with 10% FBS (Gibco, cat. no. 26140079). K562 cells (ATCC) were cultured using IMDM medium (Gibco, cat. no. 12440061) supplemented with 10% FBS. To knock out TUFM in HeLa cells, two TUFM-targeting single guide RNAs (sgRNAs) (5'-CTAGGAGCTTGCCATGCCCG-3' (SEQ ID NO: 1), and 5'-CGAGGAGATTGACAATGCCC-3' (SEQ ID NO: 14) and two non-targeting control sgRNAs (5'-CGTTGGTACGGTCCTCCCCG-3' (SEQ ID NO: 2), and 5'-TAAGGGGCTAACTTGGTCCC-3' (SEQ ID NO: 3)) were cloned into the pLentiCRISPR V2 plasmid (Addgene, cat. no. 52961). Lentivirus was produced by transfecting HEK293T cells with pMD2.G, pPAX2, and pLentiCRISPR V2 target plasmid. After 24 h of lentiviral transduction, HeLa cells stably expressing sgRNAs were selected by treating cells with 0.5 µg/ml of puromycin for 7 days. The medium was refreshed with puromycin every two days and passaged cells when necessary. TUFM knockout efficiency was confirmed by western blotting.

Mouse 4T1 breast tumor model. All mouse experiments were in compliance with relevant ethical regulations and were approved by the Institutional Animal Care and Use Committee (IACUC) (protocol IS00010046). The 4T1 mouse breast cancer cells were purchased from the Karmanos Cancer Institute. Briefly, 4-6-week-old, female Balb/c mice were used for 4T1 xenograft experiments. 100,000 cells were resuspended in 50 µl DMEM mixed with 50 µl Matrigel (Corning 354234), and implanted into the fourth mammary gland subcutaneously. After 3 weeks, mice were $CO_2$ euthanized, and tumor and spleen tissues were collected and were snap frozen in liquid nitrogen. Snap-frozen mouse tissues were powdered using a pre-cooled mortar and pestle under the continuous addition of liquid nitrogen. For each tissue type, powdered tissue was collected for RNase footprinting and RNA-seq.

Human immune cell isolation. Fresh human whole peripheral blood was purchased from Stemcell Technologies, and was a standard blood draw from one healthy donor (61-year-old female). PBMCs were isolated using Ficoll-Paque PREMIUM (GE Healthcare) following the manufacturer's protocol from the 10 ml blood sample. The cells were split into four groups: one was used as the mixed PBMC control, and the other three groups were used to isolated immune cell types. CD3+ T-cells, CD3-CD19+ B-cells, and CD14+CD16-monocytes were isolated from PBMCs using immunomagnetic isolation kits (Stemcell Technologies, cat. no. 17951, 17954, and 19359, respectively) following the manufacturer's instructions. Then RNA sequencing and replicates of RNase footprinting were generated using the isolated cells. All sequencing libraries were generated using cells from the same one-time blood draw.

Low-input RNase footprinting. The protocol has two steps:

Step 1. Cell harvesting, RNase treatment, and footprint purification. For cultured adherent cells, cells were seeded in one well of a multi-well plate the day before harvest and were grown to 70%-80% confluency. Cells were supplemented with 100 µg/ml cycloheximide and then quickly washed twice with cold PBS containing 100 µg/ml cycloheximide. Lysis buffer was immediately added to each well (20 mM Tris (pH 7.4), 150 mM NaCl, 5 mM $MgCl_2$, 1 mM DTT, 100 µg/ml cycloheximide, 1% v/v Triton X-100). The cells were left to lyse on ice for 10 min. Cell lysates were collected in a 1.5 ml microcentrifuge tube, followed by 10 times trituration through a 26 gauge needle. For suspension-cultured cells and primary immune cells, cells were pelleted in a 1.5 ml microcentrifuge tube and were washed twice with cold PBS. Cells were immediately lysed in the lysis buffer on ice for 10 min, followed by 10 times trituration through a 26 gauge needle. For primary tissue samples, powdered tissue was collected in a 1.5 ml microcentrifuge tube and was lysed in the lysis buffer. Tissue lysate was incubated on ice for 10 min, followed by 10 times trituration through a 26 gauge needle. After centrifugation at 1,000 g for 5 min, the supernatant was collected in a new 1.5 ml microcentrifuge tube.

The RNase treatment condition was calibrated based on the total RNA amount in the cell lysate. RNA concentration in the lysate was measured by Qubit (Invitrogen™). The experimental conditions were optimized using different RNases.

When the activity unit of RNase 1 was defined by One unit degrading 100 ng of E. coli ribosomal RNA per second into acid-soluble nucleotides at 37° C. (Lucigen cat. no.

N6901K, and Thermo Fisher™ cat. no. EN0601/EN0602), RNase digestion conditions were determined by the following two steps. First, the inventors calculated the required RNase amount with the equation: the amount of RNase (U)=50×total RNA amount (μg). Secondly, the inventors found that the RNase concentration in the reaction volume is also critical to achieving efficient digestion, and the inventors adjusted the final RNase concentration to 0.5-1 U/μl. The adjustment is especially important for ultra-low cell counts (e.g. 1,000 cultured cells).

When the activity unit of RNase 1 was defined by One unit is the amount of enzyme required to produce 1 μg of acid-soluble material from mouse liver RNA in 30 min at 37° C. (Ambion® cat. no. AM2294/AM2295), RNase digestion conditions were then determined by the following two steps. First, the inventors calculated the required RNase amount with the equation: the amount of RNase (U)=500× total RNA amount (μg). Secondly, the inventors found that the RNase concentration in the reaction volume is also critical to achieving efficient digestion, and the inventors adjusted the final RNase concentration to 5-10 U/μl. The adjustment is especially important for ultra-low cell counts (e.g. 1,000 cultured cells).

50,000 cultured cells (generally obtained ~1 μg of total RNA from cultured HEK293T, K562, and HeLa cells) and 1 mg primary tissues (~1 μg of total RNA) were lysed in 90 μl buffer, and digested with 50 U RNase 1 (Lucigen cat. no. N6901K). 1,000 cultured cells (10-20 ng of total RNA) and immune cells (50-100 ng of total RNA were obtained from the inventors' PBMC, T cells, B cells, and monocytes) were lysed in 60 μl buffer, and digested with 60 U RNase 1 (Lucigen cat. no. N6901K). The cell lysate was digested at room temperature (25° C.) for 1.5 h. The inventors added 400 μl of TRIzol (Ambion®) and 100 μl of chloroform (Sigma) to extract RNase footprints, and the footprints were precipitated overnight with isopropanol.

Step 2. Sequencing library construction using A-tailing and SMARTer oligo-based template switching. The following are the experimental conditions used for 50,000 cultured cells (HEK293T, K562, or HeLa cells) or 1 mg primary tissues. Precipitated RNase footprints were suspended in 5 μl of TNK reaction mixture (0.5 μl of 10×T4 Polynucleotide Kinase (PNK) buffer, 1 μl of PNK (New England Biolabs or NEB®), 0.5 μl of SUPERase·In RNase Inhibitor (Invitrogen™), and 3 μl of RNase-free water). The footprints were end-repaired at 37° C. for 90 min followed by incubation at 65° C. for 5 min to inactivate PNK. The end-repaired RNase footprints were 3' polyadenylated with 10 U of E. coli poly (A) polymerase (New England Biolabs or NEB®) by incubating at 37° C. for 2 h (supplemented with 2 μl of first-strand buffer (Invitrogen™, 250 mM Tris-HCl (pH 8.3), 375 mM KCl, 15 mM $MgCl_2$), 2 μl of E. coli poly (A) polymerase (New England Biolabs or NEB®), 0.25 μl of 10 mM ATP, 0.5 μl of SUPERase·In RNase Inhibitor, and 0.25 μl of RNase-free water). The resulting polyadenylated RNA was reverse transcribed by a modified SMART-RT reaction. The RNA was first mixed with 2.5 μl of 10 μM RT primer and annealed by heating to 72° C. for 5 min and cooled on ice immediately. The reaction mixture was then supplemented with SMART-RT mixture (2.5 μl of 10 mM dNTP, 2 μl of Superscript II reverse transcriptase (Invitrogen™), 0.5 μl of SUPERase·In RNase Inhibitor, 4 μl of Superscript II first-strand buffer, 1.5 μl of 100 mM DTT, 6 μl of 5 M betaine, 0.12 μl of 1 M $MgCl_2$, and 0.4 μl of 100 μM template-switching oligos, and 0.5 μl of RNase-free water) and incubated at 42° C. for 1 h, followed by 10 cycles of heating at 50° C. for 2 min and then cooling to 42° C. for 2 min. The enzyme was inactivated by heating at 70° C. for 10 min. The RNA fragments hybridized to DNA were then removed by incubating the reaction mixture at 37° C. for 15 min with 5 U of RNase H (New England Biolabs or NEB®).

The resultant 30 μl of cDNA was combined with 50 μl of 2× Ultra II Q5 Master Mix (New England Biolabs or NEB®), 0.5 μM 1st-primers and water to obtain a final reaction volume of 100 μl. This first round of PCR was carried out with an initial 3 min denaturation at 98° C., followed by 1 cycle of 20 s denaturation at 98° C., 30 s annealing at 65° C., and 90 s extension at 72° C., and then 6 cycles of 20 s denaturation at 98° C., 20 s annealing at 67° C., and 60 s extension at 72° C. PCR round 1 was finished with a 3 min extension at 72° C. The PCR products were purified using a DNA clean & concentrator column (Zymo Research) and eluted in 20 μl of water. This library was amplified by a second round of PCR. Purified PCR1 products were combined with 25 μl of 2× Ultra II Q5 Master Mix (New England Biolabs or NEB®) and 0.5 μM primers. An initial 3 min denaturation was performed at 98° C., followed by 4 cycles of 20 s denaturation at 98° C., 20 s annealing at 67° C., and 30 s extension at 72° C., and finished with 3 min extension at 72° C. The final DNA library was separated and visualized in a 4% agarose gel. DNA fragments with 15-35 bp-insert bands were excised and recovered using the DNA gel recover kit (Zymo Research). Two DNA sequences with 15 nt and 35 nt length inserts were designed as markers to guide the library size selection. The primers used for the library preparation are shown in Table 5.

For the library construction of ultra-low-input conditions (i.e. 1,000 cultured cells and immune cells), the polyadenylation tailing incubation time was increased to 4 h to achieve >80% polyadenylation of footprints. The PCR cycles (6 cycles for the first round and 5 cycles for the second) were also increased to generate the sequencing library.

Ribosome profiling using sucrose cushion. Ribosome profiling libraries for 1.5 million HEK293 and K562 cells were prepared based on a recently updated protocol (McGlincy and Ingolia 2017). Because the original RNase recommended by the protocol is out of the market, the RNase digestion condition was adjusted according to the RNase 1 unit definition by Lucigen. Lysates containing 10 μg of total RNA were digested with 150 units of RNase 1 (Lucigen) at 25° C. for 1 h.

Mitochondrial and cytosolic ribosome profiling using sucrose gradient. A previously published method (Rooijers et al. 2013) was used to examine mitochondrial and cytosolic ribosome protected footprints. Approximately 20 million HEK293T cells were treated with 100 μg/ml cycloheximide and were then lysed. Lysates were centrifuged at 1,300 g and the supernatant was treated with 5 U/μl of RNase 1 (Ambion®) for 1 h at room temperature (25° C.). Lysates were fractionated on a linear sucrose gradient (5-45%) using the SW-41Ti rotor at 210,000 g for 2.5 h. Live absorption at 254 nm was used to track the fractions. Fractions enriched in 55S mitoribosomes and 80S cytosolic ribosomes were identified by western blotting to exame the expression of ribosome proteins, including RPS6, RPL36a, and MRPL11. These fractions were then pooled to perform footprint extraction. Ribosome footprints between 15-40 nucleotides were gel-purified and a sequencing library was prepared using the A-tailing and SMARTer oligo-based template switching method described above for RNase footprinting.

Sequencing libraries to compare RNA fragments after digestion with different doses of RNase. 0.5 million HEK293T cells were used for the experiments. The cell lysate containing 10 μg total RNA was treated at room temperature (25° C.) for 1 h with different RNase doses (cat. no. N6901K, Lucigen): low (0.05 U/μg), medium (0.5 U/μg), and high (50 U/μg), respectively. For the medium and high dose conditions, RNA fragments with 10-40 nt were selected to generate the sequencing library, using the same adapter ligation procedures described for ribosome profiling (McGlincy and Ingolia 2017). For the low dose RNase condition, all RNA fragments were extracted. A-tailing and the SMARTer oligo-based template switching described above were used to generate the sequencing library.

RNA sequencing library preparation. Total RNA was isolated using the Direct-zol RNA kit (Zymo Research), and mRNAs were then purified using Oligo (dT) 25 magnetic beads (New England Biolabs or NEB®) according to the manufacturer's instructions. Purified mRNAs were fragmented with NEBNext Mg2+ RNA fragmentation module (New England Biolabs or NEB®) at 94° C. for 4 min. Fragmented RNAs were then precipitated overnight at −20° C. by adding 0.1 volume of 3 M sodium acetate, 10 mg of glycoblue, and 1.2 volumes of isopropanol. Purified RNA fragments were used for the library construction using the A-tailing and SMARTer oligo-based template switching method described above for RNase footprinting.

Western blotting. Proteins were separated in a NuPAGE 12% Bis-Tris precast gel (Invitrogen™) and were transferred to a nitrocellulose membrane using a Trans-blot Turbo Transfer System (Bio-Rad). The membrane was blocked with 5% nonfat milk in TBST, incubated with primary antibodies overnight at 4° C., washed three times with TBST at room temperature, incubated with HRP-secondary antibodies, and imaged using the Bio-Rad Chemidoc imaging system. Protein blot intensity in FIG. 24E was quantified by Image J. The antibodies used for the western blots are shown in Table 6.

Measurement of nascent protein synthesis. AHA (L-azidohomoalanine) (Invitrogen, cat. no. C10102) was used for the metabolic labeling of nascent proteins and detected them using alkyne-modified fluorophores through the "click" reaction. To detect global nascent protein synthesis rate (FIG. 24I) (Dieterich et al. 2007), cells with 70-80% confluency in a 6-well plate were rinsed with warm PBS, cultured in the methionine-free medium for 1 h, and then labeled with AHA in culture medium for 3 h. AHA labeled total proteins were clicked with the Alexa Fluor 488 alkyne (Invitrogen™, cat. no. C10267), and analyzed by flow cytometry (BD LSRFortessa) and microscopy imaging (Nikon AIR confocal microscope). To detect cytosolic or mitochondrial nascent protein synthesis rate independently (FIG. 32FG) (Xiao et al. 2015; Shih and Hsueh 2016), mitochondrial translation inhibitor (100 μg/ml chloramphenicol, Sigma, cat. no. C1919) or cytosolic translation inhibitor (100 μg/ml emetine, Sigma, cat. no. 324693) was supplemented to the culture medium during AHA labeling. AHA-labeled cytosolic or mitochondrial translation products were clicked with TAMRA (Invitrogen, cdoseat. no. C33370), and analyzed by gel electrophoresis. In brief, protein lysates (200 μg) were incubated with Click-iT TAMRA for 2 h at room temperature and then precipitated by methanol/chloroform. Precipitated proteins were resolubilized in sample loading buffer and equal amounts of protein were subjected to NuPAGE Novex 4-12% Bis-Tris protein gel separation. TAMRA labeled gels were imaged by Bio-Rad Chemidoc using 532 nm excitation. The gel was stained with Coomassie to confirm equal sample loading.

RNase footprinting data analyses. Paired-end sequencing (2×151 nt) of the footprinting libraries was performed. Because the RNase footprint lengths are short (<35 nt for ribosome footprints), the first ends of reads to perform mapping and gene expression calculation. First the 3' sequencing adapters were trimmed from the reads (AGATCGGAAG (SEQ ID NO: 4) for the datasets generated by linker ligation methods, and AAAAAAAAAA (SEQ ID NO:5) for the A-tailing methods). For the libraries using SMARTer oligo-based template switching, the first 7 nt, including the random 4 nt and 3 locked Gs in the 5' sequencing adapters, were trimmed. The trimmed reads were first mapped to the rRNA sequences (5S, 5.8S, 18S, and 28S) using bowtie2 (version 2.2.6) (Langmead and Salzberg 2012). ~78% of reads were mapped to rRNAs. The unmappable reads were then mapped to a reference genome (hg38 for human or mm10 for mouse) and transcriptome using tophat (version 2.1.0) (Kim et al. 2013). The transcriptome annotation was based on GENCODE (release 28 for human and release 20 for mouse) (Frankish et al. 2019), and the annotation was modified by incorporating the mitochondrial transcripts as annotated by the UCSC Genome Browser.

Only the uniquely mappable reads with lengths of 18-35 nt were used for the calculations of ribosome occupancy because actively translating ribosomes show footprints of these defined lengths. To obtain read counts in RefSeq-defined protein-coding regions, this work excluded the regions overlapping with uORFs (Ji et al. 2015) and used HTSeq (version 0.9.1) (Anders et al. 2015) to generate gene-level read counts. The ribosome occupancy levels were then measured as transcript per million (TPM) values.

To examine the read distribution across codons, the RibORF software (Ji et al. 2015; Ji 2018) was used to plot the read distribution around the start and stop codons of mRNAs, adjust the reads' genomic locations based on the offset distance between the 5' end of fragments and ribosomal A-site, and examine 3-nt periodicity. As described below, only the reads showing strong 3-nt periodicity were used to calculate codon usage levels and identify non-canonical translated ORFs.

Additionally, the previously published method based on the percentage of maximum entropy (PME) values (Ji et al. 2015) was used to model the uniformness of the read distribution across an ORF region. A high PME value (close to 1) indicates uniform read coverage across codons, while a low value (close to 0) represents a highly localized distribution. It was observed that a few genes show consistently low PME values across samples. The reads for these genes were manually examined and it was found that they are due to sequencing errors and read misalignment. These 45 genes with PME values <0.3 were excluded from further expression analyses.

Ribosome profiling and RNA-seq analyses. To make the analysis results comparable, the same RNase footprinting analysis procedures described above were used for the ribosome profiling and RNA-seq read mapping and gene expression calculation. The one exception was that all uniquely mappable reads with different fragment lengths (not just those from 18-35 nt) from RNA-seq were used to calculate RNA expression levels.

Comparing RNase footprinting with ribosome profiling datasets. To evaluate the performance of the RNase footprinting method, the obtained results were compared with the ribosome profiling datasets generated by the conventional methods. Besides the data generated in this study which used the sucrose cushion to isolate ribosomes, published HEK293T and K562 ribosome profiling datasets were downloaded and two high-quality datasets were chosen for each cell type for the comparative analyses. ~29 nt footprints of these datasets show clear 3-nt periodicity across canonical ORFs. The accession numbers for the HEK293T datasets are GSE125218 (SRX5256546; using size-exclusion chromatography) and GSE70211 (SRX1070870; using sucrose cushion), and the K562 datasets are GSE125218 (SRX5256556; using size-exclusion chromatography) and GSE129061 (SRX5604287; using size-exclusion chromatography) (Iwasaki et al. 2016; Calviello et al. 2020; Martinez et al. 2020). Notably, these published studies only surveyed the subpopulation of ribosome footprints around 29 nt and did not include the 21 nt population in the sequencing library construction.

Analyses of codon usage levels. The published software CONCUR (Frye and Bornelov 2020) was used to select the read fragments showing strong 3-nt periodicity across canonical ORFs, correct read locations to ribosomal P-sites, and count the number of reads occupying each codon. Then the relative codon usage level was calculated for each codon by normalizing the occupying read count to the mean count number across codons.

Analyses of translation efficiency. The translation efficiency of a gene is calculated as the ratio of RNase footprinting read density vs. RNA-seq read density in the coding region. Suppose for gene i, the TPM value of ribosome footprints (RFP) is RFPi and the TPM value of RNA expression is RNAi. The translation efficiency (TE) of gene i is calculated as follows: $TE_i = (RFP_i+1)/(RNA_i+1)$. The pseudocount 1 was added to mitigate the technical variance of lowly expressed genes. Genes included in the differential translation efficiency analyses should show high RNA expression levels with TPM values >3 across all compared samples, and RNase footprinting with TPM>3 in at least one experimental condition.

Translational regulation and RNA expression after TUFM knockout. The regulation of ribosome occupancy is the combined effect of RNA expression and translation efficiency. Genes showing dynamic regulation of ribosome occupancy were defined based on the following criteria: 1) TPM>3 in at least one condition; 2) >1.2-fold expression change in both replicates with an average expression change >1.5-fold. The same cutoffs were used to select genes showing RNA expression regulation. Genes showing regulation of translation efficiency were selected using the following cutoff: >1.2-fold change in both replicates and an average expression change >1.5-fold. To further support the regulation of ribosomal proteins and histone genes, the relative expression of all genes in the pathway were examined comparing TUFM knockout vs. control, and the Wilcoxon rank sum test was used to get the P-values. The curated gene lists are shown in Table 7.

To examine the regulation of ribosome elongation after TUFM knockout, different cutoffs were used to split the coding regions of the mitochondrial gene into two segments: 10/90, 20/80, 30/70, 40/60, 50/50, 60/40, 70/30, 80/20, and 90/10. Then the Fisher exact test was used to examine whether the read ratio in two segments showed significant changes in TUFM knockout vs. control samples. Finally, 20/80 was picked up as the cutoff, because it showed the most robust results across genes to capture ribosome pausing at the 5'-end of transcripts. The gene MT-ATP8 was excluded from these analyses because it did not have enough reads in unique gene regions for the calculation.

Translational regulation and RNA expression across immune cell types. To examine the regulation of translation efficiency, first genes showing dynamic regulation were identified from the pairwise comparisons of T-cells, B-cells, and monocytes, using a cutoff of >1.5-fold change in both replicates (FIG. 34A-C). Then for the genes showing dynamic regulation in any of the pairwise comparisons, their relative expression across the immune cell types was further compared by normalizing their translation efficiency (log 2 values) to the mean of T-cells, B-cells, and monocytes. The genes were separated into 4 groups: "T- and B-cell high" (the normalized value >log 2(1.1) in both T-cells and B-cells, and <0 in monocytes); "T-cell high" (the normalized value >log 2(1.1) in T-cells, and <0 in both B-cells and monocytes); "B-cell high" (the normalized value >log 2(1.1) in B-cells, and <0 in both T-cells and monocytes); and "monocyte high" (the normalized value >log 2(1.1) in monocytes, and <0 in both T-cells and B-cells). The genes showing higher translation efficiency in the "T- and B-cell high" group capture lymphocyte-specific regulation, while the genes in other groups identify cell type-specific regulation. It was found that this grouping method effectively captured cell type-specific gene regulation, and included 92% of all regulated genes from the pairwise comparison.

Using the similar method, the regulation of ribosome occupancy and RNA expression were examined across the immune cell types, except that only genes showing TPM>3 in any one cell type were included in the analyses, and a 2-fold change was used as the cutoff to select genes showing RNA expression regulation from the pairwise comparison. To further examine the regulation of a pathway, the relative expression of all genes in the pathway were compared as one geneset across immune cells using the Wilcoxon rank sum test. The gene lists were manually curated for "ribosomal proteins" and "translation initiation factors". The following gene ontology-defined genesets were also included in the analyses: "GO:0007049 cell cycle", "GO:0006396 RNA processing", "GO:0051276 chromosome organization", "GO:0045449 regulation of transcription". The gene lists are shown in Table 7.

The analyses of non-canonical ORFs. The RibORF software (Ji et al. 2015; Ji 2018) was used for the analyses. RNase footprinting or ribosome profiling reads was grouped based on fragment lengths, and enriched reads showing clear 3-nt periodicity across canonical ORFs were chosen for further analysis to identify translated non-canonical ORFs. These reads should show >50% assigned to the 1st nucleotides of codons. Their 5' end locations to the ribosomal A-sites were adjusted based on defined offset distances. For the analyses of HEK293T cells in FIG. 27, the following read fragment lengths and corresponding offset distances were used: 20 nt (+15), 21 nt (+15), 22 nt (+16), 28 nt (+15), 30 nt (+16), 31 nt (+16). These parameters are the same for RNase footprinting and ribosome profiling. To identify genome-wide translated ORFs in blood cells, reads (28-31 nt) in different blood cell types were merged for the analyses with the following offset correction parameters: 28 nt (+15), 29 nt (+15), 30 nt (+16), 31 nt (+16). The algorithm uses the following read distribution features to distinguish the in-frame actively translated ORFs vs. off-frame ORFs: (1) 3-nt periodicity across ORFs measured by the fraction of reads in 1st nucleotides of codons; (2) the uniformness of read distribution across ORFs measured by the PME value. It uses in-frame translated canonical ORFs as positive examples and internal off-frame candidate ORFs as negative examples to train the logistic regression model to identify genome-wide translated ORFs. It randomly picked 1,000 positive examples and 2,000 negative examples for training and used another 1,000 positive examples and 2,000 negative examples for testing. The candidate ORFs (any possible ORF with a start codon NUG/ACG and a stop codon) were obtained using transcripts defined by GENCODE (v28) (Frankish et al. 2019). The ROC curve was used to measure the algorithm performance for classifying positive and negative examples in the testing set. The translated ORFs were selected using the following cutoffs: translation probability >0.7 and >10 supporting reads.

To examine the differential ribosome occupancy in non-canonical ORFs, footprinting reads with 18-35 nt were used for the analysis and required that the ORFs should contain >10 reads in at least one immune cell type (i.e. T-cells, B-cells, and monocytes). For overlapping uORFs, the regions overlapping with canonical ORFs were excluded from the analyses. The similar analyses steps presented above for canonical coding regions were performed to identify non-canonical ORFs showing >1.5-fold differential ribosome occupancy among the immune cells.

Gene ontology analyses. Gene ontology analyses were conducted using the DAVID database (Huang da et al. 2009).

Data accession and code availability. Sequencing data have been deposited in the National Cancer for Biotechnology Information Gene Expression Omnibus with accession numbers GSE151989, GSE151986, GSE151987, GSE151988, and GSE153411. The secure token to allow review of the record while it remains in private status is: afqpueaabzibfgp. All codes for computational analyses are available upon request.

REFERENCES

Anders S, et al. 2015. *Bioinformatics* 31: 166-169.
Andreev D E, et al. 2015. *Elife* 4: e03971.
Archer S K, et al. 2016. *Nature* 535: 570-574.
Baechler S A, et al. 2019. *Nat Commun* 10: 83.
Bazzini A A, et al. 2014. *EMBO J* 33: 981-993.
Brar G A, et al. 2012. *Science* 335: 552-557.
Calviello L, et al. 2020. *Nat Struct Mol Biol* 27: 717-725.
Calviello L, Mukherjee N, Wyler E, Zauber H, Hirsekorn A, Selbach M, Landthaler M, Obermayer B, Ohler U. 2016. *Nat Methods* 13: 165-170.
Chen J, Brunner A D, Cogan J Z, Nunez J K, Fields A P, Adamson B, Itzhak D N, Li J Y, Mann M, Leonetti M D et al. 2020. *Science* 367: 1140-1146.
Chong C, Muller M, Pak H, Harnett D, Huber F, Grun D, Leleu M, Auger A, Arnaud B, Stevenson B J et al. 2020. *Nat Commun* 11: 1293.
Clamer M, Tebaldi T, Lauria F, Bernabo P, Gomez-Biagi R F, Marchioretto M, Kandala D T, Minati L, Perenthaler E, Gubert D et al. 2018. *Cell Rep* 25: 1097-1108 e1095.
Costa-Mattioli M, Walter P. 2020. *Science* 368.
Couvillion M T, Soto I C, Shipkovenska G, Churchman L S. 2016. *Nature* 533: 499-503.
D'Souza A R, Minczuk M. 2018. *Essays Biochem* 62: 309-320.
Darnell R B. 2010. *Wiley Interdiscip Rev RNA* 1: 266-286.
Dennerlein S, Wang C, Rehling P. 2017. *Trends Cell Biol* 27: 712-721.
Dieterich D C, Lee J J, Link A J, Graumann J, Tirrell D A, Schuman E M. 2007. *Nat Protoc* 2: 532-540.
Frankish A, Diekhans M, Ferreira A M, Johnson R, Jungreis I, Loveland J, Mudge J M, Sisu C, Wright J, Armstrong J et al. 2019. *Nucleic Acids Res* 47: D766-D773.
Frye M, Bornelov S. 2020. *Bioinformatics* doi:10.1093/bioinformatics/btaa733.
Gameiro P A, Struhl K. 2018. *Cell Rep* 24: 1415-1424.
Guo H, Ingolia N T, Weissman J S, Bartel D P. 2010. *Nature* 466: 835-840.
Hardigan A A, Roberts B S, Moore D E, Ramaker R C, Jones A L, Myers R M. 2019. *Nucleic Acids Res* 47: e84.
Holcik M, Sonenberg N. 2005. *Nat Rev Mol Cell Biol* 6: 318-327.
Hornstein N, Torres D, Das Sharma S, Tang G, Canoll P, Sims P A. 2016. *Genome Biol* 17: 149.
Huang da W, Sherman B T, Zheng X, Yang J, Imamichi T, Stephens R, Lempicki R A. 2009. *Curr Protoc Bioinformatics* Chapter 13: Unit 13 11.
Ingolia N T. 2014. *Nat Rev Genet* 15: 205-213.
Ingolia N T, Brar G A, Rouskin S, McGeachy A M, Weissman J S. 2012. *Nat Protoc* 7: 1534-1550.
Ingolia N T, Brar G A, Stern-Ginossar N, Harris M S, Talhouarne G J, Jackson S E, Wills M R, Weissman J S. 2014. *Cell Rep* 8: 1365-1379.
Ingolia N T, Ghaemmaghami S, Newman J R, Weissman J S. 2009. *Science* 324: 218-223.
Ingolia N T, Hussmann J A, Weissman J S. 2019. *Cold Spring Harb Perspect Biol* 11.
Ingolia N T, Lareau L F, Weissman J S. 2011. *Cell* 147: 789-802.
Iwasaki S, Floor S N, Ingolia N T. 2016. *Nature* 534: 558-561.
Ji Z. 2018. *Curr Protoc Mol Biol* 124: e67.
Ji Z, Song R, Huang H, Regev A, Struhl K. 2016. *Nat Biotechnol* 34: 410-413.
Ji Z, Song R, Regev A, Struhl K. 2015. *eLife* 4: e08890.
Kapur M, Monaghan C E, Ackerman S L. 2017. *Neuron* 96: 616-637.
Khajuria R K, Munschauer M, Ulirsch J C, Fiorini C, Ludwig L S, McFarland S K, Abdulhay N J, Specht H, Keshishian H, Mani D R et al. 2018. *Cell* 173: 90-103 e119.
Kim D, Pertea G, Trapnell C, Pimentel H, Kelley R, Salzberg S L. 2013. *Genome Biol* 14: R36.
Kondrashov N, Pusic A, Stumpf C R, Shimizu K, Hsieh A C, Ishijima J, Shiroishi T, Barna M. 2011. *Cell* 145: 383-397.
Langmead B, Salzberg S L. 2012. *Nat Methods* 9: 357-359.
Lareau L F, Hite D H, Hogan G J, Brown P O. 2014. *Elife* 3: e01257.
Laumont C M, Vincent K, Hesnard L, Audemard E, Bonneil E, Laverdure J P, Gendron P, Courcelles M, Hardy M P, Cote C et al. 2018. *Sci Transl Med* 10.
Lee S, Liu B, Lee S, Huang S X, Shen B, Qian S B. 2012. *Proc Natl Acad Sci USA* 109: E2424-2432.
Liu B, Han Y, Qian S B. 2013. *Mol Cell* 49: 453-463.
Martinez T F, Chu Q, Donaldson C, Tan D, Shokhirev M N, Saghatelian A. 2020. *Nat Chem Biol* 16: 458-468.
McGlincy N J, Ingolia N T. 2017. *Methods* 126: 112-129.
Morscher R J, Ducker G S, Li S H, Mayer J A, Gitai Z, Sperl W, Rabinowitz J D. 2018. *Nature* 554: 128-132.
Ouspenskaia T, Law T, Clauser K R, Klaeger S, Sarkizova S, Aguet F, Li B, Christian E, Knisbacher B A, Le P M et al. 2020. *bioRxiv* doi:10.1101/2020.02.12.945840: 2020.2002.2012.945840.
Pearce S F, Rebelo-Guiomar P, D'Souza A R, Powell C A, Van Haute L, Minczuk M. 2017. *Trends Biochem Sci* 42: 625-639.
Picelli S, Bjorklund A K, Faridani O R, Sagasser S, Winberg G, Sandberg R. 2013. *Nat Methods* 10: 1096-1098.
Prensner J R, Enache O M, Luria V, Krug K, Clauser K R, Dempster J M, Karger A, Wang L, Stumbraite K, Wang V M et al. 2021. *Nat Biotechnol* doi:10.1038/s41587-020-00806-2.

Radhakrishnan A, Chen Y H, Martin S, Alhusaini N, Green R, Coller J. 2016. *Cell* 167: 122-132 e129.
Rooijers K, Loayza-Puch F, Nijtmans L G, Agami R. 2013. *Nat Commun* 4: 2886.
Rudler D L, Hughes L A, Perks K L, Richman T R, Kuznetsova I, Ermer J A, Abudulai L N, Shearwood A J, Viola H M, Hool L C et al. 2019. *Sci Adv* 5: eaay2118.
Ruiz Cuevas M V, Hardy M P, Holly J, Bonneil E, Durette C, Courcelles M, Lanoix J, Cote C, Staudt L M, Lemieux S et al. 2021. *Cell Rep* 34: 108815.
Shih Y T, Hsueh Y P. 2016. *Nat Commun* 7: 11020.
Signer R A, Magee J A, Salic A, Morrison S J. 2014. *Nature* 509: 49-54.
Silverman I M, Li F, Alexander A, Goff L, Trapnell C, Rinn J L, Gregory B D. 2014. *Genome Biol* 15: R3.
Suhm T, Kaimal J M, Dawitz H, Peselj C, Masser A E, Hanzen S, Ambrozic M, Smialowska A, Bjorck M L, Brzezinski P et al. 2018. *Cell Metab* 27: 1309-1322 e1306.
Tahmasebi S, Khoutorsky A, Mathews M B, Sonenberg N. 2018. *Nat Rev Mol Cell Biol* 19: 791-807.
van Heesch S, Witte F, Schneider-Lunitz V, Schulz J F, Adami E, Faber A B, Kirchner M, Maatz H, Blachut S, Sandmann C L et al. 2019. *Cell* 178: 242-260 e229.
Van Nostrand E L, Nguyen T B, Gelboin-Burkhart C, Wang R, Blue S M, Pratt G A, Louie A L, Yeo G W. 2017. *Methods Mol Biol* 1648: 177-200.
Wu C C, Zinshteyn B, Wehner K A, Green R. 2019. *Mol Cell* 73: 959-970 e955.
Xiao L, Xian H, Lee K Y, Xiao B, Wang H, Yu F, Shen H M, Liou Y C. 2015. *J Biol Chem* 290: 24961-24974.
Xu Y, Ruggero D. 2020. *Annual Review of Cancer Biology* 4: 437-457.

TABLES

Table 1. Cytosolic genes showing dynamic regulation of translation efficiency after TUFM knockout. For the genes with increased translation efficiency, those with uORFs and >10 supporting reads were annotated.

Table 2. Gene ontology analyses results for genes showing up-regulation or down-regulation of ribosome occupancy (RFP), RNA expression, and translation efficiency (TE) after TUFM knockout. The −log 10 (P-values) were shown.

Table 3. Gene ontology analyses results for genes showing regulation of ribosome occupancy (RFP), RNA expression, and translation efficiency (TE) comparing immune cell types. The −log 10 (P-values) were shown.

Table 4. Non-canonical ORFs showing dynamic regulation of ribosome occupancy among human immune cell types.

Table 5. The primers used for low-input RNase footprinting library preparation.

Table 6. The antibodies used for the western blots to examine protein expression.

TABLE 7

Genesets used to examine the regulation of indicated pathways among immune cell types. Table 1. Sheet 1. Genes showing significant up-regulation of translation efficiency after TUFM knockout.

| gene_name | RFP.fold | RNA.fold | TE.fold | uORF |
|---|---|---|---|---|
| AATK | −0.335 | −1.027 | 0.693 | No |
| AMN1 | 3.314 | 0.126 | 3.189 | No |
| ANKRD1 | 1.653 | 0.786 | 0.867 | No |

TABLE 7-continued

Genesets used to examine the regulation of indicated pathways among immune cell types. Table 1. Sheet 1. Genes showing significant up-regulation of translation efficiency after TUFM knockout.

| gene_name | RFP.fold | RNA.fold | TE.fold | uORF |
|---|---|---|---|---|
| ANKRD54 | 0.753 | 0.071 | 0.682 | Yes |
| ATF4 | 1.336 | 0.547 | 0.789 | Yes |
| CCDC57 | 0.832 | −0.106 | 0.937 | No |
| CRACR2B | 0.901 | 0.047 | 0.854 | No |
| FSTL3 | −0.088 | −0.684 | 0.597 | No |
| GJB3 | 0.834 | 0.018 | 0.816 | Yes |
| MARVELD1 | 0.723 | 0.029 | 0.693 | No |
| MYORG | 0.881 | 0.177 | 0.704 | Yes |
| NACC2 | 0.175 | −0.413 | 0.588 | Yes |
| PGBD2 | 0.555 | −0.138 | 0.693 | Yes |
| PLD6 | −0.090 | −0.749 | 0.659 | No |
| PLEKHG5 | 1.235 | 0.566 | 0.669 | No |
| PPP1R16A | 1.000 | 0.113 | 0.887 | Yes |
| RCE1 | 0.864 | 0.078 | 0.786 | No |
| SAMD8 | 0.617 | 0.008 | 0.609 | No |
| SCML1 | 0.435 | −0.188 | 0.623 | Yes |
| SCNM1 | 1.067 | 0.432 | 0.635 | No |
| SELENOW | 1.785 | 0.087 | 1.698 | No |
| TMED7 | 1.204 | −0.220 | 1.424 | No |
| UNKL | 0.221 | −0.552 | 0.773 | No |
| ZBED3 | 0.773 | 0.128 | 0.645 | Yes |

TABLE 1

Sheet 2. Genes showing significant down-regulation of translation efficiency after TUFM knockout

| genename | RFP.fold | RNA.fold | TE.fold |
|---|---|---|---|
| AAGAB | −0.633 | 0.037 | −0.670 |
| ABHD17C | −0.159 | 0.504 | −0.663 |
| ABI1 | −0.435 | 0.258 | −0.693 |
| ACSL4 | 0.257 | 0.998 | −0.740 |
| ACVR1 | −0.211 | 0.454 | −0.666 |
| AIDA | −0.521 | 0.086 | −0.607 |
| AIFM1 | −0.541 | 0.132 | −0.673 |
| AKIP1 | −0.454 | 0.390 | −0.844 |
| AKR1C3 | −1.031 | −0.445 | −0.587 |
| ANAPC15 | −0.647 | −0.014 | −0.634 |
| ANKRD37 | −0.630 | 0.291 | −0.920 |
| ANKRD46 | −1.160 | −0.238 | −0.922 |
| ANXA4 | −0.888 | −0.288 | −0.599 |
| AP1S3 | −0.775 | 0.386 | −1.160 |
| AREG | 0.926 | 1.676 | −0.750 |
| AREL1 | −0.478 | 0.150 | −0.628 |
| ARHGAP12 | −0.561 | 0.373 | −0.934 |
| ARL14EP | −0.538 | 0.162 | −0.700 |
| ARMC7 | −0.780 | −0.012 | −0.768 |
| ARPP19 | −0.731 | 0.007 | −0.739 |
| ARRDC3 | −0.163 | 0.450 | −0.614 |
| ATF3 | 0.775 | 1.480 | −0.705 |
| ATG4A | −0.154 | 0.452 | −0.607 |
| BBS2 | −0.181 | 0.463 | −0.645 |
| BEX3 | −0.461 | 0.132 | −0.594 |
| BIN3 | −0.440 | 0.174 | −0.614 |
| BLOC1S6 | −0.878 | 0.073 | −0.951 |
| BORCS6 | −0.734 | −0.082 | −0.652 |
| C11orf86 | −0.100 | 0.891 | −0.991 |
| C11orf98 | −0.524 | 0.120 | −0.643 |
| C21orf91 | −0.756 | 0.410 | −1.166 |
| C2orf74 | −0.415 | 0.216 | −0.631 |
| CACUL1 | −0.743 | 0.189 | −0.932 |
| CAMLG | −0.658 | 0.025 | −0.683 |
| CBX5 | −0.894 | −0.247 | −0.647 |
| CCDC25 | −0.450 | 0.208 | −0.658 |
| CCDC68 | 0.108 | 0.855 | −0.748 |
| CCDC91 | −0.364 | 0.317 | −0.681 |
| COMMD9 | −0.935 | −0.318 | −0.616 |
| CREBL2 | −0.577 | 0.418 | −0.995 |
| CRELD1 | −0.368 | 0.302 | −0.670 |
| CREM | −0.461 | 0.321 | −0.782 |

TABLE 1-continued

Sheet 2. Genes showing significant down-regulation of translation efficiency after TUFM knockout

| genename | RFP.fold | RNA.fold | TE.fold |
| --- | --- | --- | --- |
| CSGALNACT2 | −0.116 | 0.538 | −0.654 |
| CSRNP1 | −0.064 | 0.685 | −0.750 |
| CTH | 0.274 | 0.889 | −0.615 |
| CYP11A1 | −0.728 | 0.167 | −0.895 |
| CYTH1 | −0.138 | 0.511 | −0.648 |
| DALRD3 | −0.335 | 0.313 | −0.647 |
| DCUN1D1 | −0.611 | 0.049 | −0.660 |
| DDIT3 | 0.832 | 1.798 | −0.966 |
| DNAAF4 | −0.177 | 0.474 | −0.651 |
| DNAJC1 | −0.059 | 0.560 | −0.618 |
| DNAJC19 | −0.850 | −0.148 | −0.702 |
| DOLPP1 | −0.373 | 0.297 | −0.670 |
| DPH6 | −0.821 | −0.102 | −0.720 |
| DUSP2 | −0.530 | 0.166 | −0.696 |
| DYNLL2 | −0.661 | 0.103 | −0.765 |
| EPC2 | −0.536 | 0.228 | −0.764 |
| ESF1 | −0.599 | 0.058 | −0.657 |
| FABP5 | −0.272 | 0.320 | −0.592 |
| FAM102B | −0.823 | 0.014 | −0.837 |
| FAM114A1 | −0.783 | −0.113 | −0.670 |
| FAM8A1 | −0.295 | 0.379 | −0.675 |
| FAM98A | −0.556 | 0.033 | −0.589 |
| FBXL12 | −0.926 | 0.007 | −0.933 |
| FBXO22 | −0.474 | 0.111 | −0.585 |
| FEZ2 | −0.412 | 0.202 | −0.614 |
| FGF7 | −0.842 | −0.001 | −0.841 |
| FGFR1OP2 | −0.347 | 0.276 | −0.623 |
| FKBP5 | −0.528 | 0.058 | −0.586 |
| FUOM | −0.733 | −0.125 | −0.608 |
| GATAD1 | −0.666 | 0.130 | −0.796 |
| GCC1 | −0.312 | 0.295 | −0.606 |
| GDAP1 | −0.174 | 0.456 | −0.630 |
| GLCE | 0.090 | 0.744 | −0.654 |
| GMPR2 | −0.207 | 0.405 | −0.612 |
| GNG12 | −0.779 | 0.034 | −0.812 |
| GPATCH11 | −0.197 | 0.446 | −0.643 |
| GTF3C6 | −0.806 | −0.117 | −0.688 |
| H1F0 | 0.408 | 1.112 | −0.704 |
| HDGFL3 | −0.904 | −0.085 | −0.818 |
| HIBCH | −0.283 | 0.353 | −0.636 |
| HIRIP3 | −0.174 | 0.436 | −0.610 |
| HIST1H1C | −0.309 | 0.458 | −0.768 |
| HIST1H2AE | −0.242 | 0.544 | −0.786 |
| HIST1H2BC | −0.690 | 0.484 | −1.174 |
| HIST1H2BD | −0.438 | 0.347 | −0.785 |
| HIST1H2BH | −0.690 | −0.029 | −0.662 |
| HIST1H3D | −0.658 | 0.399 | −1.058 |
| HIST1H4H | −0.358 | 0.814 | −1.172 |
| HLX | 0.240 | 0.841 | −0.601 |
| HMGN4 | −0.722 | −0.102 | −0.619 |
| HMGN5 | −0.926 | −0.111 | −0.815 |
| HS1BP3 | −0.540 | 0.267 | −0.808 |
| HSPD1 | −0.929 | −0.333 | −0.596 |
| IFIT1 | 0.466 | 1.264 | −0.798 |
| IFIT2 | −0.085 | 0.730 | −0.815 |
| IFIT3 | 0.579 | 1.259 | −0.680 |
| ING2 | −0.488 | 0.224 | −0.713 |
| ISCA1 | −0.640 | 0.063 | −0.703 |
| ITGB3BP | −0.726 | −0.040 | −0.686 |
| JKAMP | −0.585 | 0.002 | −0.587 |
| KCTD5 | −0.836 | −0.195 | −0.641 |
| KITLG | −0.191 | 0.418 | −0.609 |
| KLF3 | −0.073 | 0.565 | −0.639 |
| LLPH | −0.941 | −0.250 | −0.691 |
| LRRC42 | −0.700 | −0.065 | −0.636 |
| LYPLAL1 | −0.580 | 0.148 | −0.729 |
| MAP3K2 | −0.389 | 0.269 | −0.657 |
| MAPRE1 | −0.563 | 0.046 | −0.609 |
| MBIP | −0.503 | 0.122 | −0.625 |
| MCUB | −0.515 | 0.114 | −0.629 |
| ME2 | −0.834 | −0.241 | −0.593 |
| MEIS1 | −0.492 | 0.129 | −0.621 |
| METTL2A | −0.554 | 0.148 | −0.701 |
| MFF | −1.061 | −0.472 | −0.588 |
| MFSD8 | −0.531 | 0.213 | −0.744 |
| MICU2 | −0.525 | 0.197 | −0.722 |
| MRPL47 | −0.473 | 0.112 | −0.585 |
| MRPS35 | −0.532 | 0.058 | −0.591 |
| NDUFAF5 | −0.580 | 0.061 | −0.640 |
| NHLRC3 | −0.562 | 0.072 | −0.634 |
| NKIRAS1 | −0.550 | 0.250 | −0.800 |
| NSRP1 | −0.641 | −0.010 | −0.631 |
| NT5E | 0.747 | 1.475 | −0.728 |
| NTS | 0.916 | 1.636 | −0.719 |
| NUDT12 | −0.845 | −0.056 | −0.789 |
| PACRGL | −0.093 | 0.655 | −0.748 |
| PAK1IP1 | −0.715 | −0.100 | −0.615 |
| PCGF5 | −0.755 | 0.001 | −0.755 |
| PCK2 | 0.640 | 1.283 | −0.643 |
| PCTP | −0.203 | 0.654 | −0.858 |
| PHC2 | −0.092 | 0.530 | −0.622 |
| PIGX | −0.774 | 0.123 | −0.897 |
| PJA1 | −0.378 | 0.313 | −0.691 |
| PLEKHA1 | −0.737 | 0.056 | −0.793 |
| POME | −0.574 | 0.037 | −0.612 |
| POT1 | −0.288 | 0.299 | −0.587 |
| PPIL3 | −0.477 | 0.225 | −0.702 |
| PPOX | −0.106 | 0.509 | −0.615 |
| PRKACB | −0.844 | −0.191 | −0.653 |
| PRNP | 0.147 | 0.764 | −0.617 |
| PRRG4 | −1.065 | 0.263 | −1.327 |
| PTER | −0.754 | 0.244 | −0.998 |
| PTMS | −0.620 | 0.048 | −0.668 |
| PTPN12 | −0.051 | 0.576 | −0.627 |
| PTPN2 | −0.451 | 0.192 | −0.643 |
| RAB3D | −0.268 | 0.330 | −0.599 |
| RAB4A | −0.983 | −0.121 | −0.861 |
| RAVER2 | −0.591 | 0.263 | −0.854 |
| RCAN1 | −0.725 | −0.068 | −0.657 |
| RIPK2 | −0.485 | 0.200 | −0.685 |
| RPL14 | −0.921 | −0.097 | −0.824 |
| RPL26 | −0.601 | 0.118 | −0.718 |
| RPL30 | −0.646 | 0.052 | −0.698 |
| RPL35 | −0.675 | −0.025 | −0.650 |
| RPL39L | −1.279 | −0.119 | −1.160 |
| RPL6 | −0.807 | −0.093 | −0.714 |
| RPLP2 | −0.658 | 0.027 | −0.684 |
| RPS13 | −0.639 | −0.008 | −0.631 |
| RPS19 | −0.600 | 0.112 | −0.712 |
| RPS23 | −0.610 | −0.003 | −0.607 |
| RPS3A | −0.686 | −0.087 | −0.599 |
| S100A2 | 0.163 | 0.841 | −0.679 |
| SC5D | −0.864 | −0.152 | −0.712 |
| SCRN3 | −0.588 | 0.062 | −0.650 |
| SEC22C | −0.765 | −0.143 | −0.622 |
| SERPINB3 | 0.084 | 0.702 | −0.618 |
| SET | −0.782 | −0.179 | −0.603 |
| SIAE | −0.762 | −0.114 | −0.648 |
| SIAH2 | −0.857 | −0.070 | −0.787 |
| SLC2A3 | −0.405 | 0.194 | −0.600 |
| SMIM15 | −0.752 | −0.028 | −0.724 |
| SNRPE | −0.543 | 0.052 | −0.595 |
| SOCS6 | −0.180 | 0.432 | −0.612 |
| SOX12 | −1.278 | −0.569 | −0.709 |
| SPRED2 | 0.228 | 0.870 | −0.642 |
| SRP9 | −0.805 | −0.179 | −0.626 |
| TARSL2 | −0.686 | −0.005 | −0.680 |
| TBL1XR1 | −0.498 | 0.135 | −0.633 |
| TBP | −0.794 | 0.038 | −0.832 |
| TBPL1 | −0.681 | 0.370 | −1.051 |
| THG1L | −0.763 | 0.083 | −0.846 |
| TIGD2 | −0.645 | −0.057 | −0.589 |
| TIMM9 | −0.932 | −0.285 | −0.647 |
| TLK2 | −0.540 | 0.231 | −0.771 |
| TMEM158 | 0.909 | 1.640 | −0.732 |
| TMEM19 | −0.760 | −0.154 | −0.606 |
| TMEM237 | −0.809 | −0.030 | −0.780 |
| TMEM238 | −0.048 | 0.550 | −0.597 |
| TMEM38A | −0.684 | 0.112 | −0.796 |
| TMEM42 | −0.259 | 0.366 | −0.625 |

TABLE 1-continued

Sheet 2. Genes showing significant down-regulation of translation efficiency after TUFM knockout

| genename | RFP.fold | RNA.fold | TE.fold |
|---|---|---|---|
| TMEM45B | −0.102 | 0.518 | −0.619 |
| TMEM87B | −0.166 | 0.478 | −0.645 |
| TNNT1 | 0.221 | 0.855 | −0.634 |
| TRAPPC6B | −0.002 | 0.686 | −0.688 |
| TSPAN13 | −0.028 | 0.606 | −0.634 |
| TSPAN9 | −0.383 | 0.271 | −0.654 |
| UBE2M | −0.621 | −0.010 | −0.611 |
| UCHL3 | −0.402 | 0.185 | −0.587 |
| UGDH | −1.039 | −0.423 | −0.617 |
| UPF3B | −0.340 | 0.284 | −0.624 |
| UQCRB | −0.592 | 0.054 | −0.647 |
| USP1 | −0.456 | 0.154 | −0.611 |
| USP46 | −1.078 | −0.086 | −0.992 |
| VAMP4 | 0.041 | 1.020 | −0.979 |
| VIP | −0.081 | 0.883 | −0.964 |
| WASHC3 | −0.634 | 0.076 | −0.710 |
| WASL | −0.315 | 0.299 | −0.614 |
| WRB | −1.191 | −0.254 | −0.938 |
| YAF2 | −0.963 | −0.078 | −0.885 |
| ZBTB2 | −0.645 | 0.257 | −0.902 |
| ZBTB3 | −0.599 | −0.005 | −0.593 |
| ZBTB8OS | −0.715 | −0.049 | −0.666 |
| ZEB1 | −0.424 | 0.299 | −0.724 |
| ZMYND11 | −0.788 | −0.197 | −0.591 |
| ZNF148 | −0.743 | −0.110 | −0.633 |
| ZNF428 | −0.015 | 0.577 | −0.592 |
| ZNF641 | −0.466 | 0.285 | −0.751 |
| ZNRF2 | −0.923 | −0.285 | −0.638 |

TABLE 2

Gene ontology analyses for genes showing significant up-regulation or down-regulation of ribosome occupancy (RFP), RNA expression, and translation efficiency (TE) after TUFM knockout. The −log10(P-values) of indicated pathways are shown.

| GO term | RFP | RNA | TE |
|---|---|---|---|
| Top enriched pathways for downregulated genes | | | |
| GO:0006414 translational elongation | 18.2 | 0.4 | 5.9 |
| GO:0006412 translation | 13.0 | 0.1 | 4.2 |
| GO:0006333 chromatin assembly or disassembly | 2.2 | 0.0 | 6.0 |
| GO:0006334 nucleosome assembly | 2.2 | 0.0 | 5.5 |
| GO:0006396 RNA processing | 5.5 | 1.0 | 0.3 |
| GO:0055114 oxidation reduction | 3.4 | 0.3 | 0.3 |
| GO:0016126 sterol biosynthetic process | 1.9 | 2.0 | 0.0 |
| GO:0008610 lipid biosynthetic process | 1.6 | 1.2 | 0.1 |
| Top enriched pathways for upregulated genes | | | |
| GO:0009611 response to wounding | 7.2 | 5.7 | 0.0 |
| GO:0007584 response to nutrient | 7.2 | 6.6 | 0.0 |
| GO:0009991 response to extracellular stimulus | 6.5 | 8.2 | 0.0 |
| GO:0001525 angiogenesis | 5.2 | 3.6 | 0.0 |
| GO:0006955 immune response | 5.1 | 5.5 | 0.0 |
| GO:0042127 regulation of cell proliferation | 5.0 | 7.7 | 0.0 |
| GO:0051270 regulation of cell motion | 4.2 | 6.2 | 0.0 |
| GO:0042981 regulation of apoptosis | 3.6 | 3.8 | 0.0 |

TABLE 3

Gene ontology analyses of gene groups showing higher expression in T-cell only, B-cell only, monocyte only, and both T- and B-cells. We performed the analyses for genesets showing regulation of ribosome occupancy (RFP), RNA expression, and translation efficiency (TE), respectively. The −log10(p-values) are shown.

| GO_BP | RFP | RNA | TE |
|---|---|---|---|
| T-cell high | | | |
| GO:0042110 T cell activation | 8.0 | 8.2 | 0.3 |
| GO:0046649 lymphocyte activation | 6.4 | 7.3 | 0.4 |
| GO:0050863 regulation of T cell activation | 3.7 | 8.8 | 0.6 |
| GO:0016055 Wnt receptor signaling pathway | 3.7 | 1.9 | 0.1 |
| GO:0006917 induction of apoptosis | 3.5 | 5.0 | 0.1 |
| GO:0030217 T cell differentiation | 3.4 | 4.3 | 0.4 |
| B-cell high | | | |
| GO:0046649 lymphocyte activation | 5.9 | 2.2 | 0.9 |
| GO:0051056 regulation of small GTPase mediated signal transduction | 5.9 | 0.9 | 0.0 |
| GO:0030888 regulation of B cell proliferation | 5.8 | 3.0 | 0.0 |
| GO:0042113 B cell activation | 5.4 | 3.4 | 0.3 |
| GO:0050864 regulation of B cell activation | 4.6 | 2.8 | 0.0 |
| GO:0009891 positive regulation of biosynthetic process | 4.5 | 0.7 | 0.4 |
| GO:0046578 regulation of Ras protein signal transduction | 4.5 | 0.4 | 0.0 |
| Monocyte high | | | |
| GO:0009611 response to wounding | 18.3 | 19.5 | 0.8 |
| GO:0006954 inflammatory response | 14.1 | 12.4 | 1.6 |
| GO:0006952 defense response | 13.3 | 13.5 | 1.0 |
| GO:0016044 membrane organization | 7.8 | 14.8 | 0.1 |
| GO:0006955 immune response | 7.6 | 16.5 | 0.8 |
| GO:0006909 phagocytosis | 7.4 | 7.1 | 0.0 |
| GO:0006935 chemotaxis | 7.1 | 6.7 | 0.2 |
| GO:0006897 endocytosis | 7.1 | 14.7 | 0.2 |
| GO:0009617 response to bacterium | 5.7 | 7.3 | 0.6 |
| GO:0006928 cell motion | 5.0 | 5.1 | 0.0 |
| T- and B-cell high | | | |
| GO:0006396 RNA processing | 21.2 | 3.3 | 12.5 |
| GO:0051276 chromosome organization | 20.8 | 0.3 | 9.5 |
| GO:0016568 chromatin modification | 16.7 | 0.6 | 8.9 |
| GO:0045449 regulation of transcription | 14.4 | 21.3 | 8.7 |
| GO:0007049 cell cycle | 9.6 | 1.0 | 11.3 |
| GO:0006259 DNA metabolic process | 9.0 | 1.8 | 3.7 |
| GO:0006403 RNA localization | 6.8 | 0.0 | 2.6 |
| GO:0006281 DNA repair | 6.6 | 0.8 | 2.5 |
| GO:0006412 translation | 5.5 | 32.2 | 2.2 |
| GO:0006414 translational elongation | 2.4 | 70.1 | 0.0 |

TABLE 4

| ORF_ID | T-cells | B-cells | Monocytes | PBMCs | group |
|---|---|---|---|---|---|
| ENST00000535010.5:chr1:+|19|6227:340:415|uORF|ATG | 2.473 | 0.525 | −2.998 | 1.726 | T- and B-cell high |
| ENST00000438274.7:chr17:−|2|1569:40:100|uORF|ATG | 2.35 | 0.444 | −2.794 | 2.149 | T- and B-cell high |
| ENST00000487832.6:chr6:+|7|1427:73:157|uORF|ATG | 2.777 | 0.398 | −3.175 | 2.382 | T- and B-cell high |
| ENST00000504102.5:chr17:−|20|1865:167:308|uORF|ATG | 2.143 | 0.163 | −2.306 | 0.067 | T- and B-cell high |
| ENST00000403231.5:chr5:−|9|2181:91:2182|uORF|ATG | 1.923 | 0.259 | −2.182 | 0.197 | T- and B-cell high |
| ENST00000524013.1:chr8:+|10|2150:212:434|overlap.uORF|TTG | 1.972 | 0.291 | −2.262 | 0.088 | T- and B-cell high |
| ENST00000621592.5:chr8:+|18|2366:363:588|overlap.uORF|TTG | 1.971 | 0.291 | −2.262 | 0.088 | T- and B-cell high |

TABLE 4-continued

| | | | | | |
|---|---|---|---|---|---|
| ENST00000341567.8:chr7:+|7|4229:116:161|uORF|ATG | 1.225 | 0.459 | −1.685 | 1.15 | T- and B-cell high |
| ENST00000574110.5:chr19:+|7|2495:97:109|uORF|ATG | 3.363 | 0.554 | −3.917 | 1.102 | T- and B-cell high |
| ENST00000322914.7:chr17:−|7|2786:83:101|uORF|GTG | 1.464 | 0.343 | −1.807 | 0.949 | T- and B-cell high |
| ENST00000395323.7:chr2:+|3|2933:16:58|uORF|GTG | 2.871 | 0.182 | −3.054 | 1.056 | T- and B-cell high |
| ENST00000390687.8:chr15:+|17|1528:123:339|uORF|ATG | 2.448 | 0.808 | −3.256 | 0.636 | T- and B-cell high |
| ENST00000562889.5:chr15:−|11|1547:140:1409|uORF|ATG | 1.673 | 0.582 | −2.255 | 0.504 | T- and B-cell high |
| ENST00000375040.7:chr6:−|5|1476:71:173|uORF|ATG | 2.408 | 0.312 | −2.72 | 0.576 | T- and B-cell high |
| ENST00000445950.2:chr4:+|8|2175:85:205|overlap.uORF|ATG | 1.255 | 0.373 | −1.627 | 0.741 | T- and B-cell high |
| ENST00000444957.3:chr7:+|9|2969:114:282|overlap.uORF|ATG | 0.555 | 2.264 | −2.818 | 1.096 | T- and B-cell high |
| ENST00000323703.10:chr2:−|2|2139:6:39|uORF|ATG | 0.49 | 2.375 | −2.865 | 1.828 | T- and B-cell high |
| ENST00000361189.6:chr5:−|2|4889:76:178|uORF|TTG | 0.521 | 2.532 | −3.053 | 1.475 | T- and B-cell high |
| ENST00000370272.8:chr1:+|22|10148:263:335|uORF|ATG | 2.004 | 1.143 | −3.147 | 1.969 | T- and B-cell high |
| ENST00000378024.8:chr11:−|222|18787:2428:2518|uORF|CTG | 2.248 | 1.11 | −3.358 | 2.398 | T- and B-cell high |
| ENST00000248342.8:chr19:+|14|864:154:187|overlap.uORF|GTG | 2.224 | 1.009 | −3.233 | 2.874 | T- and B-cell high |
| ENST00000645759.1:chr3:−|7|6755:91:106|uORF|GTG | 2.812 | 0.916 | −3.728 | 1.831 | T- and B-cell high |
| ENST00000450536.6:chr6:−|6|4537:51:111|uORF|ATG | 2.093 | 1.085 | −3.178 | 1.013 | T- and B-cell high |
| ENST00000567027.5:chr15:−|48|1353:536:956|uORF|ATG | 1.83 | 1.219 | −3.049 | 0.886 | T- and B-cell high |
| ENST00000371584.8:chr20:−|27|1073:314:887|uORF|ATG | 1.751 | 0.831 | −2.582 | 1.223 | T- and B-cell high |
| ENST00000215567.9:chr19:+|6|1171:74:251|overlap.uORF|CTG | 2.067 | 1.046 | −3.113 | 1.338 | T- and B-cell high |
| ENST00000367142.4:chr1:−|18|6496:249:327|overlap.uORF|GTG | 1.912 | 1.147 | −3.059 | 1.222 | T- and B-cell high |
| ENST00000392870.2:chr10:+|1|2654:32:41|uORF|ATG | 1.11 | 3.066 | −4.175 | 2.08 | T- and B-cell high |
| ENST00000453426.1:chr6:+|19|1267:324:516|noncoding|ATG | 2.056 | 1.496 | −3.552 | 1.219 | T- and B-cell high |
| ENST00000371544.7:chr1:−|2|5858:28:46|uORF|ATG | 1.782 | 2.259 | −4.041 | 1.225 | T- and B-cell high |
| ENST00000400075.3:chr21:+|1|4814:3:210|uORF|GTG | 2.395 | 2.146 | −4.54 | 1.264 | T- and B-cell high |
| ENST00000371825.7:chrX:+|8|4029:112:397|overlap.uORF|GTG | 2.589 | 1.396 | −3.985 | 1.929 | T- and B-cell high |
| ENST00000410067.7:chr2:−|3|736:49:79|overlap.uORF|CTG | 2.533 | 3.425 | −5.958 | 2.742 | T- and B-cell high |
| ENST00000398733.7:chr5:+|15|2702:344:395|uORF|CTG | 2.748 | 3.209 | −5.957 | 3.215 | T- and B-cell high |
| ENST00000370272.8:chr1:+|17|10148:230:239|uORF|ATG | 4.475 | 2.822 | −7.298 | 3.078 | T- and B-cell high |
| ENST00000344095.8:chr7:−|1|2727:2:23|uORF|ATG | 1.913 | 2.221 | −4.134 | 1.686 | T- and B-cell high |
| ENST00000331808.4:chr16:−|2|1561:29:122|uORF|ATG | 2.926 | 2.487 | −5.413 | 2.1 | T- and B-cell high |
| ENST00000282570.3:chr2:+|9|4191:98:158|uORF|ATG | 3.502 | 2.192 | −5.695 | 2.743 | T- and B-cell high |
| ENST00000305352.6:chr1:+|10|2909:151:208|uORF|ATG | 2.337 | 2.279 | −4.616 | 2.008 | T- and B-cell high |
| ENST00000252934.9:chr22:+|3|3329:118:451|overlap.uORF|CTG | 0.798 | 1.387 | −2.185 | 0.679 | T- and B-cell high |
| ENST00000398733.7:chr5:+|13|2702:308:335|uORF|CTG | 1.895 | 2.545 | −4.44 | 0.486 | T- and B-cell high |
| ENST00000635841.1:chrX:−|144|1734:1593:1614|noncoding|GTG | 2.726 | 1.722 | −4.448 | 0.293 | T- and B-cell high |
| ENST00000469141.6:chr1:+|24|3339:213:309|uORF|ATG | 1.129 | 1.931 | −3.06 | 1.026 | T- and B-cell high |
| ENST00000623368.3:chr8:+|18|2368:304:361|uORF|ATG | 1.073 | 2.462 | −3.536 | 1.147 | T- and B-cell high |
| ENST00000432937.6:chr7:+|5|2411:53:212|uORF|CTG | 1.371 | 1.625 | −2.996 | 0.745 | T- and B-cell high |
| ENST00000447863.5:chr7:+|7|3954:109:268|uORF|CTG | 1.371 | 1.625 | −2.996 | 0.745 | T- and B-cell high |
| ENST00000320876.10:chr18:+|11|8821:132:168|uORF|ACG | 1.513 | 2.049 | −3.563 | 1.006 | T- and B-cell high |
| ENST00000551742.5:chr16:−|6|5900:101:173|overlap.uORF|ATG | 1.466 | 1.934 | −3.4 | 0.856 | T- and B-cell high |
| ENST00000372554.8:chr9:−|4|1985:40:142|overlap.uORF|GTG | 1.872 | 1.767 | −3.639 | 0.889 | T- and B-cell high |
| ENST00000396386.6:chr7:+|4|1857:66:138|uORF|TTG | 1.632 | 1.837 | −3.47 | 0.786 | T- and B-cell high |
| ENST00000381061.8:chr22:+|3|3135:119:413|overlap.uORF|CTG | 1.094 | 1.528 | −2.622 | 0.732 | T- and B-cell high |
| ENST00000507747.1:chr6:−|7|600:57:558|uORF|ATG | 1.229 | 3.158 | −4.387 | 0.532 | T- and B-cell high |
| ENST00000609590.1:chr6:+|120|5310:1623:2130|noncoding|ATG | 0.906 | 2.397 | −3.302 | −2.241 | T- and B-cell high |
| ENST00000316308.8:chr5:−|15|2568:170:1616|uORF|ATG | 1.55 | 1.035 | −2.585 | −1.343 | T- and B-cell high |
| ENST00000538654.5:chr11:−|115|2768:1156:1180|noncoding|ATG | 1.284 | 0.677 | −1.962 | −1.323 | T- and B-cell high |
| ENST00000362058.2:chr1:−|12|2029:133:499|noncoding|ATG | 0.852 | 0.453 | −1.305 | −1.795 | T- and B-cell high |
| ENST00000423902.6:chr8:+|5|11568:61:388|uORF|ACG | 0.501 | 1.067 | −1.568 | −2.453 | T- and B-cell high |
| ENST00000489653.6:chr2:+|1|1003:1:373|noncoding|ATG | 0.662 | 0.874 | −1.536 | −1.522 | T- and B-cell high |
| ENST00000319555.7:chr16:+|3|5380:117:288|uORF|ACG | 1.031 | 1.551 | −2.583 | −0.728 | T- and B-cell high |
| ENST00000314393.5:chr8:+|31|4624:421:673|uORF|ACG | 0.949 | 1.547 | −2.496 | −0.203 | T- and B-cell high |
| ENST00000421406.1:chr1:−|16|1465:172:1339|noncoding|ATG | 0.99 | 1.438 | −2.429 | −0.298 | T- and B-cell high |
| ENST00000614944.4:chr11:+|5|3388:55:253|overlap.uORF|GTG | 0.942 | 1.545 | −2.487 | 0.031 | T- and B-cell high |
| ENST00000645306.1:chr16:+|4|3662:29:167|uORF|GTG | 1.088 | 2.053 | −3.141 | 0.035 | T- and B-cell high |
| ENST00000536163.5:chr7:−|33|7296:415:1369|uORF|ATG | 0.487 | 1.597 | −2.084 | 0.026 | T- and B-cell high |
| ENST00000346243.7:chr17:−|23|1296:229:1297|uORF|ATG | 0.715 | 1.677 | −2.392 | −0.321 | T- and B-cell high |
| ENST00000350532.7:chr17:−|23|1413:229:1414|uORF|ATG | 0.544 | 1.63 | −2.174 | −0.447 | T- and B-cell high |
| ENST00000508738.5:chr4:−|9|1470:94:1471|uORF|ATG | 0.568 | 1.718 | −2.285 | −0.312 | T- and B-cell high |
| ENST00000456324.5:chr19:+|45|3780:634:679|uORF|ATG | 1.904 | 1.897 | −3.801 | −0.578 | T- and B-cell high |
| ENST00000496856.5:chr3:+|3|2033:66:378|uORF|GTG | 1.653 | 1.279 | −2.932 | −0.245 | T- and B-cell high |
| ENST00000319357.5:chr7:+|8|3368:142:175|uORF|GTG | 1.708 | 1.97 | −3.678 | −0.266 | T- and B-cell high |
| ENST00000394457.7:chr2:+|129|6574:1517:1748|noncoding|GTG | 2.37 | 2.922 | −5.291 | −0.142 | T- and B-cell high |
| ENST00000348610.3:chr3:−|5|3272:94:253|overlap.uORF|ATG | 2.298 | 0.99 | −3.289 | 0.11 | T- and B-cell high |
| ENST00000380817.7:chr22:−|3|8008:13:115|uORF|ATG | 1.6 | 1.065 | −2.665 | 0.394 | T- and B-cell high |
| ENST00000369367.7:chr12:−|6|7543:125:152|uORF|ATG | 1.178 | 1.187 | −2.365 | 0.377 | T- and B-cell high |
| ENST00000393066.7:chr17:−|16|3622:217:289|uORF|CTG | 1.286 | 0.905 | −2.191 | 0.505 | T- and B-cell high |
| ENST00000244546.4:chr6:−|84|2696:862:2218|uORF|ATG | 1.64 | 0.466 | −2.106 | −0.397 | T- and B-cell high |
| ENST00000562889.5:chr15:−|64|1547:660:1158|uORF|TTG | 1.824 | 0.783 | −2.607 | −0.198 | T- and B-cell high |
| ENST00000572067.1:chr16:+|1|3907:20:518|noncoding|ATG | 1.772 | 0.733 | −2.505 | −0.063 | T- and B-cell high |
| ENST00000450095.6:chr9:+|14|1280:117:372|overlap.uORF|ATG | 3.149 | 1.09 | −4.239 | −0.103 | T- and B-cell high |
| ENST00000428187.5:chr3:−|17|4235:202:583|overlap.uORF|GTG | 1.637 | 0.975 | −2.612 | −0.309 | T- and B-cell high |
| ENST00000412586.6:chr12:−|3|741:13:742|uORF|ATG | 1.527 | 0.91 | −2.437 | −0.198 | T- and B-cell high |
| ENST00000423703.6:chr12:−|3|602:13:541|uORF|ATG | 1.593 | 0.92 | −2.512 | −0.227 | T- and B-cell high |
| ENST00000444704.5:chr12:−|3|678:13:679|uORF|ATG | 1.595 | 0.963 | −2.558 | −0.21 | T- and B-cell high |
| ENST00000355560.4:chr1:−|15|2120:283:1777|uORF|ATG | 0.232 | 0.756 | −0.987 | −1.28 | T- and B-cell high |
| ENST00000361168.9:chr1:−|8|1934:88:1585|uORF|ATG | 0.232 | 0.756 | −0.987 | −1.28 | T- and B-cell high |
| ENST00000645843.1:chr4:+|5|5827:63:420|overlap.uORF|ACG | 0.858 | 0.267 | −1.125 | −0.742 | T- and B-cell high |
| ENST00000395728.7:chr6:−|3|4129:31:3805|uORF|ATG | 0.585 | 0.394 | −0.979 | −0.942 | T- and B-cell high |

TABLE 4-continued

| | | | | | |
|---|---|---|---|---|---|
| ENST00000374399.8:chr1:+|3|1711:22:229|uORF|ATG | 0.519 | 0.282 | −0.8 | −1.082 | T- and B-cell high |
| ENST00000579690.5:chr4:−|14|2983:154:2209|uORF|ATG | 0.491 | 0.33 | −0.821 | −1.105 | T- and B-cell high |
| ENST00000336332.5:chr3:−|5|2579:775:2134|uORF|ATG | 0.883 | 0.223 | −1.106 | −1.248 | T- and B-cell high |
| ENST00000577119.5:chr17:−|17|9|4200:2245:4201|uORF|ATG | 0.742 | 0.157 | −0.899 | −1.267 | T- and B-cell high |
| ENST00000421068.5:chr1:−|8|4|1060:869:899|noncoding|ATG | 0.728 | 0.238 | −0.966 | −1.069 | T- and B-cell high |
| ENST00000538033.2:chr2:+|36|2800:342:354|noncoding|GTG | 0.7 | 0.324 | −1.024 | −1.205 | T- and B-cell high |
| ENST00000538654.5:chr11:−|89|2768:833:902|noncoding|ATG | 0.679 | 0.302 | −0.982 | −1.156 | T- and B-cell high |
| ENST00000319129.10:chr17:−|49|4156:620:3278|uORF|ATG | 0.836 | 0.693 | −1.529 | −0.842 | T- and B-cell high |
| ENST00000536441.6:chr11:−|2|9558:18:111|uORF|GTG | 0.935 | 0.743 | −1.678 | −0.754 | T- and B-cell high |
| ENST00000526639.2:chr12:+|11|1975:188:197|uORF|TTG | 1.169 | 0.741 | −1.911 | −0.564 | T- and B-cell high |
| ENST00000505973.1:chr2:+|25|1741:277:1435|noncoding|ATG | 1.03 | 0.41 | −1.44 | −0.768 | T- and B-cell high |
| ENST00000416707.1:chr3:−|3|1260:36:285|overlap.uORF|CTG | 1.189 | 0.442 | −1.631 | −0.622 | T- and B-cell high |
| ENST00000446860.5:chr3:−|8|1565:87:435|overlap.uORF|ATG | 1.167 | 0.501 | −1.668 | −0.613 | T- and B-cell high |
| ENST00000320876.10:chr18:+|9|8821:125:152|uORF|GTG | 0.597 | 0.935 | −1.532 | −0.515 | T- and B-cell high |
| ENST00000622241.1:chr8:−|5|4639:40:4222|uORF|ATG | 0.567 | 1.229 | −1.796 | −0.473 | T- and B-cell high |
| ENST00000399219.7:chr9:+|2|1987:9:450|overlap.uORF|ATG | 0.447 | 1.115 | −1.561 | −0.529 | T- and B-cell high |
| ENST00000566842.5:chr16:−|113|1860:1206:1338|uORF|CTG | 0.442 | 1.139 | −1.581 | −0.689 | T- and B-cell high |
| ENST00000589634.1:chr18:−|15|1278:184:1279|uORF|CTG | 0.529 | 0.76 | −1.288 | −0.419 | T- and B-cell high |
| ENST00000591365.1:chr17:−|8|2238:97:871|noncoding|ATG | 0.662 | 0.704 | −1.365 | −0.641 | T- and B-cell high |
| ENST00000252996.8:chr20:−|49|4628:1135:3259|uORF|ATG | 0.905 | 0.733 | −1.638 | −0.315 | T- and B-cell high |
| ENST00000556710.5:chr1:−|1|2635:7:130|uORF|ATG | 0.686 | 0.733 | −1.418 | −0.228 | T- and B-cell high |
| ENST00000295872.8:chr3:−|26|5417:261:2829|uORF|ATG | 0.669 | 0.558 | −1.227 | −1.075 | T- and B-cell high |
| ENST00000535387.5:chr9:−|17|3390:205:3391|uORF|ATG | 0.694 | 0.522 | −1.216 | −0.914 | T- and B-cell high |
| ENST00000221922.10:chr19:+|17|2093:201:270|overlap.uORF|TTG | 0.309 | 0.672 | −0.981 | −0.864 | T- and B-cell high |
| ENST00000375206.6:chr9:+|184|6269:1947:5877|noncoding|ATG | 0.451 | 0.729 | −1.18 | −0.949 | T- and B-cell high |
| ENST00000294383.6:chr1:−|2|10549:25:7864|uORF|ATG | 0.546 | 0.69 | −1.236 | −0.753 | T- and B-cell high |
| ENST00000452274.6:chr2:−|4|3966:36:3828|uORF|ATG | 0.442 | 0.631 | −1.072 | −0.801 | T- and B-cell high |
| ENST00000539107.5:chr12:+|1|2440:5:227|uORF|TTG | 0.541 | 0.58 | −1.121 | −0.72 | T- and B-cell high |
| ENST00000540497.5:chr20:−|5|3405:61:3406|uORF|ATG | 0.479 | 0.65 | −1.129 | −0.695 | T- and B-cell high |
| ENST00000543356.6:chr9:−|13|2576:163:2155|uORF|ATG | 0.235 | 0.969 | −1.204 | −0.259 | T- and B-cell high |
| ENST00000287078.6:chr10:−|4|3644:25:1702|uORF|ATG | 0.388 | 0.775 | −1.163 | −0.078 | T- and B-cell high |
| ENST00000355312.7:chr12:−|19|5466:187:2281|uORF|ATG | 0.354 | 0.8 | −1.154 | −0.249 | T- and B-cell high |
| ENST00000551209.5:chr12:−|19|2127:187:2128|uORF|ATG | 0.374 | 0.764 | −1.138 | −0.268 | T- and B-cell high |
| ENST00000353205.5:chr6:+|2|1660:25:193|overlap.uORF|CTG | 0.447 | 0.418 | −0.865 | −0.692 | T- and B-cell high |
| ENST00000380087.6:chrX:−|11|2333:232:373|overlap.uORF|ACG | 0.422 | 0.488 | −0.91 | −0.502 | T- and B-cell high |
| ENST00000411744.6:chr17:−|7|2031:124:2032|uORF|ATG | 0.383 | 0.616 | −0.999 | −0.342 | T- and B-cell high |
| ENST00000634349.1:chr17:−|7|2124:124:2125|uORF|ATG | 0.384 | 0.662 | −1.045 | −0.37 | T- and B-cell high |
| ENST00000536340.5:chr20:−|9|5273:82:3727|uORF|ATG | 0.475 | 0.645 | −1.12 | −0.536 | T- and B-cell high |
| ENST00000461685.5:chr20:−|5|3567:61:3568|uORF|ATG | 0.427 | 0.641 | −1.068 | −0.498 | T- and B-cell high |
| ENST00000617418.4:chr20:−|5|3411:61:3412|uORF|ATG | 0.415 | 0.689 | −1.104 | −0.495 | T- and B-cell high |
| ENST00000169298.7:chr3:+|10|4645:205:430|uORF|CTG | 0.642 | 0.495 | −1.136 | −0.438 | T- and B-cell high |
| ENST00000428575.6:chr22:+|24|2148:199:307|overlap.uORF|ATG | 0.499 | 0.474 | −0.973 | −0.308 | T- and B-cell high |
| ENST00000427980.6:chr16:+|6|7886:43:106|uORF|ATG | 0.237 | 0.554 | −0.791 | 0.138 | T- and B-cell high |
| ENST00000409175.5:chr2:+|6|2402:54:129|uORF|TTG | 0.404 | 0.59 | −0.994 | 0.299 | T- and B-cell high |
| ENST00000355904.8:chr8:−|8|1762:132:303|overlap.uORF|CTG | 0.539 | 0.429 | −0.969 | 0.261 | T- and B-cell high |
| ENST00000224140.5:chr9:−|3|11100:32:47|uORF|ATG | 0.517 | 0.353 | −0.869 | 0.296 | T- and B-cell high |
| ENST00000343677.3:chr6:−|8|642:91:643|uORF|ACG | 0.437 | 0.369 | −0.806 | 0.218 | T- and B-cell high |
| ENST00000462753.5:chr7:−|31|2322:267:1950|uORF|ATG | 0.703 | 0.473 | −1.176 | 0.383 | T- and B-cell high |
| ENST00000360016.9:chr19:−|15|3240:238:325|overlap.uORF|GTG | 0.668 | 0.42 | −1.088 | 0.184 | T- and B-cell high |
| ENST00000377045.8:chrX:+|7|2458:103:133|uORF|ATG | 0.738 | 0.457 | −1.195 | 0.11 | T- and B-cell high |
| ENST00000545394.2:chr8:+|4|2808:59:425|overlap.uORF|ATG | 0.755 | 0.319 | −1.073 | 0.073 | T- and B-cell high |
| ENST00000520515.5:chr5:−|12|1744:75:1491|noncoding|ATG | 0.731 | 0.257 | −0.988 | −0.043 | T- and B-cell high |
| ENST00000289371.10:chr2:+|6|5777:46:250|overlap.uORF|GTG | 0.144 | 0.329 | −0.473 | −0.195 | T- and B-cell high |
| ENST00000358528.8:chr1:−|36|4076:428:2825|uORF|ATG | 0.187 | 0.456 | −0.643 | −0.125 | T- and B-cell high |
| ENST00000534699.5:chr1:−|9|2667:59:2456|uORF|ATG | 0.187 | 0.456 | −0.643 | −0.125 | T- and B-cell high |
| ENST00000261443.9:chr1:−|8|3228:51:2355|uORF|ATG | 0.172 | 0.456 | −0.628 | −0.115 | T- and B-cell high |
| ENST00000339438.10:chr1:−|39|4006:447:2751|uORF|ATG | 0.172 | 0.456 | −0.628 | −0.115 | T- and B-cell high |
| ENST00000617998.4:chr17:+|16|6751:400:6343|noncoding|ATG | 0.442 | 0.211 | −0.653 | −0.321 | T- and B-cell high |
| ENST00000304056.8:chr7:−|4|3745:113:494|uORF|CTG | 0.761 | 0.143 | −0.904 | −0.328 | T- and B-cell high |
| ENST00000244534.6:chr6:−|6|666:58:667|uORF|GTG | 0.656 | 0.211 | −0.867 | −0.445 | T- and B-cell high |
| ENST00000510267.5:chr4:−|2|2006:43:400|uORF|ATG | 0.652 | 0.26 | −0.912 | −0.519 | T- and B-cell high |
| ENST00000334351.7:chr1:+|18|2416:227:398|uORF|ATG | 0.698 | 0.943 | −1.641 | 0.7 | T- and B-cell high |
| ENST00000591482.1:chr17:+|9|1050:85:925|noncoding|CTG | 0.761 | 0.805 | −1.565 | 0.699 | T- and B-cell high |
| ENST00000313368.7:chr5:−|8|2334:99:309|uORF|ATG | 0.767 | 0.79 | −1.557 | 0.292 | T- and B-cell high |
| ENST00000639725.1:chr6:−|2|4782:41:917|uORF|ATG | 0.649 | 1.057 | −1.707 | 0.417 | T- and B-cell high |
| ENST00000440166.5:chr7:+|2|1415:63:147|uORF|ATG | 0.518 | 0.693 | −1.212 | 0.617 | T- and B-cell high |
| ENST00000394921.8:chr7:−|10|1316:146:263|noncoding|CTG | 0.522 | 0.803 | −1.324 | 0.162 | T- and B-cell high |
| ENST00000490734.6:chr7:+|5|2004:99:288|overlap.uORF|ATG | 0.378 | 0.833 | −1.212 | 0.296 | T- and B-cell high |
| ENST00000547863.5:chr17:+|67|1662:889:1408|noncoding|ATG | 0.386 | 0.84 | −1.226 | 0.362 | T- and B-cell high |
| ENST00000307564.8:chr9:−|4|7380:62:92|uORF|ATG | 1.006 | 0.509 | −1.515 | 0.016 | T- and B-cell high |
| ENST00000582693.4:chr1:−|5|9117:36:330|overlap.uORF|TTG | 0.8 | 0.599 | −1.399 | 0.12 | T- and B-cell high |
| ENST00000263092.10:chr17:−|11|5711:129:1818|uORF|ATG | 0.413 | 1.067 | −1.48 | 0.011 | T- and B-cell high |
| ENST00000622611.4:chr13:−|9|5230:115:427|uORF|CTG | 0.603 | 0.994 | −1.597 | −0.097 | T- and B-cell high |
| ENST00000216185.6:chr22:−|29|1736:375:969|uORF|ATG | 1.106 | 0.817 | −1.924 | 0.074 | T- and B-cell high |
| ENST00000369325.7:chr6:−|4|4633:52:1558|uORF|ATG | 0.866 | 1.147 | −2.013 | 0.009 | T- and B-cell high |
| ENST00000493459.5:chr3:+|12|4205:115:172|uORF|GTG | 0.831 | 0.982 | −1.814 | 0.165 | T- and B-cell high |
| ENST00000370128.8:chr1:+|10|2535:142:361|overlap.uORF|CTG | 0.985 | 0.428 | −1.413 | 0.521 | T- and B-cell high |
| ENST00000637181.1:chr6:+|1|4230:20:104|uORF|GTG | 0.826 | 0.552 | −1.378 | 0.609 | T- and B-cell high |
| ENST00000227524.8:chr11:−|10|2157:136:217|overlap.uORF|GTG | 0.94 | 0.191 | −1.131 | 0.678 | T- and B-cell high |
| ENST00000405807.9:chr5:−|3|2830:29:119|uORF|ATG | 1.06 | 0.224 | −1.283 | 0.564 | T- and B-cell high |

TABLE 4-continued

| | | | | |
|---|---|---|---|---|
| ENST00000314940.6:chr5:−\|10\|8726:198:252\|uORF\|GTG | 0.717 | 0.218 | −0.935 | 0.524 T- and B-cell high |
| ENST00000316856.7:chr19:+\|1\|1736:8:23\|uORF\|ATG | 0.575 | 0.263 | −0.838 | 0.817 T- and B-cell high |
| ENST00000565677.5:chr16:+\|18\|1560:303:606\|uORF\|ATG | 0.527 | 0.353 | −0.88 | 1.055 T- and B-cell high |
| ENST00000317376.8:chr10:−\|20\|5328:230:284\|uORF\|CTG | 2.838 | −0.043 | −2.795 | 1.115 T-cell high |
| ENST00000393599.2:chr19:−\|5\|1422:190:565\|overlap.uORF\|ACG | 2.022 | −0.088 | −1.934 | 0.951 T-cell high |
| ENST00000334494.8:chr21:+\|4\|1334:29:149\|uORF\|GTG | 2.649 | −0.301 | −2.348 | 2.124 T-cell high |
| ENST00000545885.5:chr12:−\|24\|559:320:473\|noncoding\|GTG | 4.419 | −0.828 | −3.591 | 2.523 T-cell high |
| ENST00000569969.5:chr16:+\|337\|5296:3534:3687\|noncoding\|CTG | 4.839 | −2.419 | −2.419 | 4.113 T-cell high |
| ENST00000435962.6:chr14:−\|3\|5146:34:274\|uORF\|ATG | 5.982 | −4.007 | −1.975 | 3.083 T-cell high |
| ENST00000569969.5:chr16:−\|3\|5296:3523:3622\|noncoding\|GTG | 5.884 | −2.942 | −2.942 | 4.386 T-cell high |
| ENST00000330794.8:chr5:−\|36\|1771:335:1475\|uORF\|ATG | 3.361 | −1.893 | −1.468 | 1.084 T-cell high |
| ENST00000361544.11:chr1:+\|8\|2446:97:241\|uORF\|ACG | 3.292 | −1.904 | −1.388 | 0.904 T-cell high |
| ENST00000246533.7:chr19:+\|28\|1918:409:613\|overlap.uORF\|ATG | 2.025 | −1.319 | −0.706 | 0.934 T-cell high |
| ENST00000299381.4:chr10:+\|9\|3195:87:258\|overlap.uORF\|CTG | 2.465 | −2.156 | −0.31 | 1.179 T-cell high |
| ENST00000618759.4:chr7:−\|63\|3910:730:1570\|uORF\|ATG | 3.035 | −2.443 | −0.591 | 1.034 T-cell high |
| ENST00000261461,6:chr1:+\|5\|3128:101:116\|uORF\|ATG | 1.497 | −1.397 | −0.1 | 1.398 T-cell high |
| ENST00000620157.4:chr11:−\|2\|6152:38:161\|uORF\|GTG | 2.479 | −2.032 | −0.447 | 1.539 T-cell high |
| ENST00000493969.2:chr7:−\|21\|876:195:834\|uORF\|ATG | 2.666 | −2.349 | −0.318 | 0.544 T-cell high |
| ENST00000637181.1:chr6:+\|3\|4230:60:225\|uORF\|CTG | 1.335 | −0.977 | −0.359 | 0.753 T-cell high |
| ENST00000277541.7:chr9:−\|231\|9306:1797:1932\|uORF\|CTG | 1.575 | −1.345 | −0.23 | −1.339 T-cell high |
| ENST00000375635.6:chr6:+\|5\|610:41:197\|uORF\|ATG | 1.538 | −0.738 | −0.8 | 1.24 T-cell high |
| ENST00000515768.5:chr5:−\|20\|1098:268:1099\|uORF\|ATG | 1.295 | −0.363 | −0.932 | 0.571 T-cell high |
| ENST00000615507.4:chr10:+\|6\|3100:54:240\|overlap.uORF\|ACG | 1.434 | −0.681 | −0.752 | 0.41 T-cell high |
| ENST00000228136.8:chr11:+\|14\|2049:240:453\|overlap.uORF\|CTG | 0.729 | −0.029 | −0.7 | 0.3 T-cell high |
| ENST00000298316.6:chr14:+\|9\|3865:138:210\|uORF\|CTG | 0.857 | −0.698 | −0.158 | 0.316 T-cell high |
| ENST00000352393.8:chr20:−\|1\|2147:9:90\|uORF\|GTG | 0.914 | −0.685 | −0.229 | 0.524 T-cell high |
| ENST00000437340.5:chr20:−\|8\|1755:79:172\|uORF\|GTG | 0.844 | −0.547 | −0.297 | 0.496 T-cell high |
| ENST00000545648.2:chr8:−\|16\|1976:260:374\|uORF\|ATG | 0.772 | −0.756 | −0.016 | 1.039 T-cell high |
| ENST00000307266.7:chr2:−\|5\|759:64:760\|uORF\|ATG | 1.04 | −0.605 | −0.435 | 1.118 T-cell high |
| ENST00000361436.9:chr9:−\|1\|633:31:151\|overlap.uORF\|GTG | 0.743 | −0.545 | −0.198 | 0.71 T-cell high |
| ENST00000394803.9:chr4:−\|20\|2227:298:355\|overlap.uORF\|TTG | 0.798 | −0.441 | −0.356 | 0.903 T-cell high |
| ENST00000614096.4:chr15:−\|21\|8741:443:623\|uORF\|GTG | 0.807 | −0.368 | −0.44 | 0.842 T-cell high |
| ENST00000552975.5:chr12:−\|18\|378:125:257\|noncoding\|ATG | 2.307 | −0.234 | −2.072 | 0.06 T-cell high |
| ENST00000303391.10:chrX:−\|5\|10505:91:196\|uORF\|ATG | 1.718 | −0.19 | −1.528 | 0.315 T-cell high |
| ENST00000336787.5:chr15:−\|4\|3446:84:219\|uORF\|ACG | 1.639 | −0.178 | −1.46 | 0.427 T-cell high |
| ENST00000308008.10:chr5:−\|7\|4176:145:4177\|uORF\|ATG | 1.632 | −0.28 | −1.351 | −0.552 T-cell high |
| ENST00000360515.7:chr5:+\|14\|3591:143:221\|uORF\|ATG | 1.318 | −0.296 | −1.021 | 0.073 T-cell high |
| ENST00000319397.6:chr11:−\|2\|2231:83:239\|uORF\|CTG | 1.426 | −0.123 | −1.304 | −0.074 T-cell high |
| ENST00000369239.9:chr6:−\|5\|5112:60:90\|uORF\|ACG | 1.23 | −0.105 | −1.125 | −0.168 T-cell high |
| ENST00000370873.8:chr20:−\|3\|996:40:76\|uORF\|GTG | 1.18 | −0.153 | −1.027 | −0.336 T-cell high |
| ENST00000538977.5:chr5:+\|14\|2055:166:328\|uORF\|CTG | 0.614 | −0.068 | −0.546 | −1.575 T-cell high |
| ENST00000461448.5:chr1:−\|112\|1629:1233:1287\|noncoding\|ATG | 0.729 | −0.159 | −0.57 | −1.174 T-cell high |
| ENST00000374088.7:chr9:−\|1\|5464:11:68\|uORF\|ATG | 1.184 | −0.93 | −0.254 | −0.168 T-cell high |
| ENST00000393713.7:chr11:+\|4\|2132:29:134\|overlap.uORF\|ATG | 1.148 | −0.846 | −0.302 | 0.146 T-cell high |
| ENST00000342711.5:chr11:−\|32\|5742:319:4657\|uORF\|ATG | 0.823 | −0.694 | −0.129 | −0.664 T-cell high |
| ENST00000284037.9:chr5:+\|8\|8647:74:314\|uORF\|GTG | 0.783 | −0.705 | −0.077 | −0.285 T-cell high |
| ENST00000312960.3:chr3:−\|1\|2517:11:533\|overlap.uORF\|CTG | 0.684 | −0.415 | −0.269 | −0.156 T-cell high |
| ENST00000075120.11:chr12:−\|10\|3915:101:152\|uORF\|ATG | 1.218 | −0.781 | −0.437 | −0.658 T-cell high |
| ENST00000312189.10:chr9:−\|1\|11836:47:314\|overlap.uORF\|ATG | 1.43 | −0.704 | −0.726 | −1.019 T-cell high |
| ENST00000466493.5:chr10:−\|5\|2110:90:1863\|uORF\|ATG | 1.068 | −0.068 | −1 | −0.862 T-cell high |
| ENST00000300584.7:chr15:−\|23\|6067:379:2893\|uORF\|ATG | 1.117 | −0.385 | −0.732 | −0.251 T-cell high |
| ENST00000318522.9:chr2:+\|7\|5549:72:387\|overlap.uORF\|ACG | 0.902 | −0.374 | −0.528 | −0.285 T-cell high |
| ENST00000445950.2:chr4:+\|2\|2175:26:110\|uORF\|GTG | 0.938 | −0.313 | −0.626 | −0.424 T-cell high |
| ENST00000267176.8:chr12:−\|9\|11121:144:4323\|uORF\|ATG | 0.878 | −0.029 | −0.849 | −0.406 T-cell high |
| ENST00000261842.9:chr15:+\|3\|6758:49:292\|uORF\|ATG | 0.829 | −0.135 | −0.694 | −0.707 T-cell high |
| ENST00000344337.10:chr3:−\|3\|6830:21:135\|uORF\|CTG | 0.915 | −0.188 | −0.727 | −0.64 T-cell high |
| ENST00000428120.5:chr1:−\|2\|2313:23:581\|uORF\|TTG | −0.001 | 1.369 | −1.368 | 0.731 B-cell high |
| ENST00000431415.3:chr1:5:−\|5\|492:28:493\|uORF\|CTG | −0.332 | 2.531 | −2.199 | 0.86 B-cell high |
| ENST00000308660.5:chr5:−\|30\|4196:370:493\|uORF\|CTG | −0.746 | 3.139 | −2.393 | −0.503 B-cell high |
| ENST00000494792.1:chr10:−\|106\|3422:1164:1689\|uORF\|ATG | −0.452 | 2.052 | −1.6 | 0.302 B-cell high |
| ENST00000340020.10:chr1:−\|12\|3008:121:157\|uORF\|ATG | −0.15 | 1.556 | −1.406 | 0.245 B-cell high |
| ENST00000392456.4:chr3:+\|15\|1926:329:599\|overlap.uORF\|TTG | −0.321 | 1.721 | −1.4 | 0.007 B-cell high |
| ENST00000556816.5:chr14:+\|5\|2626:46:355\|overlap.uORF\|GTG | −0.075 | 1.46 | −1.385 | −0.246 B-cell high |
| ENST00000319190.9:chr2:+\|5\|5157:94:403\|overlap.uORF\|CTG | −0.371 | 1.331 | −0.96 | −0.155 B-cell high |
| ENST00000614860.1:chr13:+\|8\|4074:67:295\|uORF\|CTG | −0.147 | 1.167 | −1.02 | −0.229 B-cell high |
| ENST00000619039.4:chr17:−\|3\|5734:27:417\|uORF\|TTG | −0.733 | 1.233 | −0.5 | −0.298 B-cell high |
| ENST00000262738.7:chr22:−\|9\|11389:70:9046\|uORF\|ATG | −1.023 | 2.014 | −0.992 | −0.23 B-cell high |
| ENST00000295025.12:chr2:+\|25\|11255:304:352\|overlap.uORF\|GTG | −1.158 | 1.786 | −0.628 | −0.013 B-cell high |
| ENST00000331442.4:chr6:−\|3\|681:43:682\|uORF\|GTG | −0.754 | 0.815 | −0.06 | 0.012 B-cell high |
| ENST00000426263.8:chr1:−\|20\|3670:392:551\|overlap.uORF\|ACG | −1.228 | 1.275 | −0.047 | 0.111 B-cell high |
| ENST00000281455.6:chr4:−\|2\|3832:50:146\|uORF\|GTG | −0.162 | 0.65 | −0.488 | 0.494 B-cell high |
| ENST00000405944.7:chr8:−\|18\|1994:301:697\|uORF\|ATG | −0.209 | 0.876 | −0.667 | 0.699 B-cell high |
| ENST00000369937.4:chr10:−\|9\|1191:86:233\|overlap.uORF\|ATG | −0.113 | 0.484 | −0.371 | −0.026 B-cell high |
| ENST00000394725.2:chr16:−\|10\|2147:179:254\|overlap.uORF\|GTG | −0.079 | 0.943 | −0.864 | 0.056 B-cell high |
| ENST00000396629.6:chr14:+\|1\|2021:8:95\|uORF\|ATG | −0.207 | 0.804 | −0.597 | −0.129 B-cell high |
| ENST00000544052.6:chr14:+\|3\|2058:21:96\|uORF\|ATG | −0.21 | 0.886 | −0.676 | −0.079 B-cell high |
| ENST00000491829.5:chr6:−\|86\|4212:988:2908\|uORF\|CTG | −0.13 | 1.445 | −1.315 | −1.031 B-cell high |
| ENST00000393227.6:chr17:+\|7\|2284:61:139\|overlap.uORF\|TTG | −0.446 | 1.263 | −0.817 | −0.905 B-cell high |
| ENST00000615447.1:chr16:−\|1\|426:15:366\|uORF\|GTG | −0.506 | 1.288 | −0.781 | −1.041 B-cell high |
| ENST00000348403.9:chr9:−\|2\|3337:56:152\|uORF\|ACG | −0.47 | 1.266 | −0.796 | −0.525 B-cell high |

TABLE 4-continued

| ORF_ID | | | | | |
|---|---|---|---|---|---|
| ENST00000337014.10:chr17:+\|11\|2285:251:503\|overlap.uORF\|ACG | −0.502 | 1.089 | −0.586 | −0.596 | B-cell high |
| ENST00000359983.7:chr17:−\|31\|3290:283:3160\|uORF\|ATG | −0.342 | 1.062 | −0.72 | −0.658 | B-cell high |
| ENST00000418194.6:chr2:−\|7\|3937:38:389\|overlap.uORF\|GTG | −0.129 | 0.998 | −0.868 | −0.801 | B-cell high |
| ENST00000433535.6:chr3:−\|4\|1178:25:1012\|uORF\|ATG | −0.109 | 0.681 | −0.571 | −0.66 | B-cell high |
| ENST00000522941.5:chr8:−\|13\|1700:256:400\|uORF\|CTG | −0.987 | 2.909 | −1.922 | 3.218 | B-cell high |
| ENST00000501726.1:chr15:+\|80\|2530:2134:2413\|noncoding\|ATG | −3.366 | 4.802 | −1.436 | 2.171 | B-cell high |
| ENST00000520281.5:chr9:−\|25\|969:325:961\|uORF\|ATG | −2.617 | 5.233 | −2.617 | 2.531 | B-cell high |
| ENST00000414447.5:chr9:−\|25\|1056:325:1048\|uORF\|ATG | −3.018 | 4.717 | −1.699 | 1.951 | B-cell high |
| ENST00000006750.7:chr17:−\|5\|1269:57:165\|overlap.uORF\|TTG | −2.545 | 4.325 | −1.78 | 2.605 | B-cell high |
| ENST00000377847.6:chr9:−\|25\|996:325:988\|uORF\|ATG | −3.015 | 4.693 | −1.678 | 1.915 | B-cell high |
| ENST00000349817.2:chr17:−\|7\|378:40:379\|uORF\|ATG | −2.643 | 4.689 | −2.045 | 0.843 | B-cell high |
| ENST00000390556.6:chr14:−\|14\|1678:129:1293\|uORF\|ATG | −2.5 | 4.015 | −1.515 | 0.698 | B-cell high |
| ENST00000534096.5:chr19:−\|1\|1155:12:990\|noncoding\|ATG | −2.233 | 3.284 | −1.051 | 0.318 | B-cell high |
| ENST00000390559.6:chr14:−\|16\|1485:235:1363\|uORF\|ATG | −2.169 | 3.746 | −1.577 | −0.026 | B-cell high |
| ENST00000637539.1:chr14:−\|16\|1683:235:1426\|uORF\|ATG | −2.141 | 3.767 | −1.626 | −0.019 | B-cell high |
| ENST00000245932.10:chr19:+\|17\|2305:233:260\|uORF\|ATG | −1.181 | −0.097 | 1.279 | 2.516 | Monocyte high |
| ENST00000535425.5:chr22:−\|2\|1002:16:172\|overlap.uORF\|CTG | −3.565 | −0.081 | 3.646 | 4.022 | Monocyte high |
| ENST00000236067.8:chr1:+\|9\|944:94:169\|uORF\|ATG | −4.047 | −0.331 | 4.377 | 5.411 | Monocyte high |
| ENST00000546342.5:chr8:−\|11\|1482:130:1483\|uORF\|ATG | −1.309 | −0.449 | 1.758 | 2.231 | Monocyte high |
| ENST00000537535.5:chr8:−\|11\|1323:130:1324\|uORF\|ATG | −1.365 | −0.335 | 1.7 | 2.182 | Monocyte high |
| ENST00000541648.5:chr8:−\|11\|1410:130:1411\|uORF\|ATG | −1.425 | −0.266 | 1.691 | 2.166 | Monocyte high |
| ENST00000218104.5:chrX:+\|5\|3664:31:298\|uORF\|GTG | −0.988 | −0.8 | 1.789 | 1.117 | Monocyte high |
| ENST00000309295.8:chr11:+\|4\|5185:93:270\|overlap.uORF\|CTG | −0.988 | −0.462 | 1.45 | 1.082 | Monocyte high |
| ENST00000542575.6:chr19:−\|4\|2882:36:501\|uORF\|CTG | −1.167 | −0.561 | 1.728 | 1.27 | Monocyte high |
| ENST00000390548.6:chr14:−\|28\|2619:403:1201\|uORF\|ATG | −1.3 | −0.39 | 1.69 | 0.516 | Monocyte high |
| ENST00000046640.7:chr17:+\|20\|2866:322:502\|uORF\|ATG | −1.05 | −0.675 | 1.725 | 0.68 | Monocyte high |
| ENST00000392351.7:chr19:−\|1\|1557:25:208\|uORF\|ACG | −0.967 | −0.452 | 1.419 | 0.415 | Monocyte high |
| ENST00000549393.2:chr17:+\|2\|783:37:118\|uORF\|ATG | −0.88 | −0.487 | 1.367 | 0.678 | Monocyte high |
| ENST00000571595.5:chr17:−\|30\|767:295:649\|noncoding\|CTG | −0.318 | −1.649 | 1.966 | 0.825 | Monocyte high |
| ENST00000376962.9:chr9:−\|3\|2785:14:524\|uORF\|GTG | −0.31 | −1.109 | 1.42 | 0.947 | Monocyte high |
| ENST00000608245.5:chr17:−\|13\|465:164:431\|noncoding\|CTG | −0.778 | −1.169 | 1.947 | 0.901 | Monocyte high |
| ENST00000454579.5:chr2:+\|2\|3772:13:160\|overlap.uORF\|ACG | −3.566 | −1.307 | 4.873 | 0.776 | Monocyte high |
| ENST00000262768.11:chr17:−\|2\|3652:143:455\|overlap.uORF\|TTG | −1.206 | −3.259 | 4.465 | 4.786 | Monocyte high |
| ENST00000332839.8:chr2:−\|3\|2922:43:2923\|uORF\|ATG | −1.111 | −1.567 | 2.678 | 3.539 | Monocyte high |
| ENST00000408028.6:chr2:−\|3\|2898:43:2899\|uORF\|ATG | −1.145 | −1.604 | 2.749 | 3.697 | Monocyte high |
| ENST00000318622.8:chr7:+\|4\|1878:85:325\|uORF\|ATG | −1.01 | −1.716 | 2.726 | 3.117 | Monocyte high |
| ENST00000378566.5:chr9:−\|8\|2566:65:128\|uORF\|GTG | −0.903 | −4.08 | 4.983 | 4.342 | Monocyte high |
| ENST00000358334.9:chr10:−\|47\|6680:427:6148\|uORF\|ATG | −0.938 | −1.567 | 2.506 | 3.321 | Monocyte high |
| ENST00000360864.8:chr20:+\|2\|5213:48:153\|uORF\|CTG | −0.948 | −2.115 | 3.063 | 2.901 | Monocyte high |
| ENST00000447110.5:chr17:−\|8\|4495:121:310\|overlap.uORF\|ATG | −0.729 | −1.316 | 2.045 | 1.526 | Monocyte high |
| ENST00000581621.1:chr17:+\|295\|4554:3517:4042\|noncoding\|ATG | −0.74 | −2.964 | 3.704 | 4.38 | Monocyte high |
| ENST00000242057.8:chr7:+\|10\|6276:138:267\|uORF\|CTG | −0.475 | −1.56 | 2.035 | 2.065 | Monocyte high |
| ENST00000377474.3:chr13:−\|2\|6225:87:195\|uORF\|GTG | −0.481 | −3.108 | 3.589 | 3.994 | Monocyte high |
| ENST00000251076.9:chr15:−\|7\|10672:115:163\|uORF\|ATG | −1.373 | −4.25 | 5.622 | 5.755 | Monocyte high |
| ENST00000578921.5:chr18:+\|8\|4055:205:337\|overlap.uORF\|ATG | −2.774 | −2.774 | 5.549 | 5.121 | Monocyte high |
| ENST00000551012.6:chr7:−\|2\|1420:4:85\|uORF\|GTG | −2.889 | −2.889 | 5.777 | 5.163 | Monocyte high |
| ENST00000509248.1:chr4:−\|3\|797:31:229\|uORF\|ATG | −2.367 | −2.367 | 4.733 | 3.285 | Monocyte high |
| ENST00000410074.5:chr8:+\|4\|786:82:148\|uORF\|ATG | −3.207 | −3.207 | 6.414 | 5.637 | Monocyte high |
| ENST00000390547.3:chr14:−\|85\|1112:940:1063\|uORF\|ATG | −2.326 | −2.115 | 4.441 | 1.736 | Monocyte high |
| ENST00000215886.5:chr22:−\|3\|591:17:128\|uORF\|ATG | −2.781 | −2.781 | 5.563 | 5.694 | Monocyte high |
| ENST00000280612.9:chr4:−\|4\|9645:44:98\|uORF\|GTG | −3.521 | −3.521 | 7.042 | 6.035 | Monocyte high |
| ENST00000242057.8:chr7:+\|28\|6276:468:648\|overlap.uORF\|GTG | −1.85 | −1.233 | 3.083 | 1.881 | Monocyte high |
| ENST00000373203.8:chr9:−\|5\|3048:71:239\|uORF\|ATG | −3.183 | −0.969 | 4.152 | 3.917 | Monocyte high |
| ENST00000591463.1:chr18:+\|1\|485:31:127\|uORF\|ATG | −3.565 | −1.01 | 4.574 | 4.869 | Monocyte high |
| ENST00000598235.1:chr19:−\|1\|882:3:111\|uORF\|ACG | −1.545 | −0.199 | 1.743 | −1.78 | Monocyte high |
| ENST00000333480.2:chr8:−\|14\|2347:157:1063\|uORF\|ACG | −1.929 | −0.306 | 2.235 | −0.94 | Monocyte high |
| ENST00000617412.1:chr5:−\|10\|2792:147:453\|overlap.uORF\|GTG | −2.091 | −0.591 | 2.681 | −0.704 | Monocyte high |
| ENST00000302754.5:chr19:+\|4\|1820:54:288\|overlap.uORF\|ACG | −0.345 | −0.594 | 0.939 | 0.744 | Monocyte high |
| ENST00000295702.8:chr1:−\|1\|1116:16:625\|uORF\|ATG | −0.527 | −0.268 | 0.795 | 0.719 | Monocyte high |
| ENST00000235150.4:chr1:−\|34\|2334:574:2197\|uORF\|ATG | −0.56 | −0.099 | 0.659 | 0.427 | Monocyte high |
| ENST00000477026.5:chr1:−\|7\|1009:38:65\|uORF\|ATG | −0.716 | −0.051 | 0.767 | 0.593 | Monocyte high |
| ENST00000602813.1:chr1:+\|7\|131:100:115\|noncoding\|TTG | −0.529 | −0.866 | 1.395 | 0.086 | Monocyte high |
| ENST00000329421.7:chr1:−\|7\|1699:153:387\|overlap.uORF\|CTG | −0.951 | −0.017 | 0.968 | 0.151 | Monocyte high |
| ENST00000371621.4:chr20:+\|6\|4008:63:252\|overlap.uORF\|CTG | −0.593 | −0.443 | 1.036 | −0.054 | Monocyte high |
| ENST00000379270.4:chrX:+\|10\|1065:106:196\|overlap.uORF\|ATG | −0.718 | −0.368 | 1.086 | 0.071 | Monocyte high |
| ENST00000379019.5:chr20:−\|14\|5489:156:204\|uORF\|ACG | −0.362 | −0.322 | 0.684 | −1.14 | Monocyte high |
| ENST00000265085.9:chr5:+\|8\|9483:133:256\|uORF\|GTG | −0.726 | −0.376 | 1.102 | −1.355 | Monocyte high |
| ENST00000369966.7:chr10:+\|5\|3101:27:312\|overlap.uORF\|CTG | −0.764 | −0.102 | 0.867 | −1.536 | Monocyte high |
| ENST00000612899.4:chr6:+\|8\|4735:106:133\|uORF\|TTG | −0.095 | −1.463 | 1.558 | −0.521 | Monocyte high |
| ENST00000313843.7:chr16:+\|4\|1481:39:159\|uORF\|ATG | −0.243 | −0.639 | 0.883 | −0.327 | Monocyte high |
| ENST00000539294.5:chr8:+\|9\|5163:149:323\|uORF\|ACG | −0.211 | −0.954 | 1.165 | −0.507 | Monocyte high |
| ENST00000337304.2:chr22:+\|29\|2019:331:763\|uORF\|GTG | −0.386 | −0.893 | 1.278 | −0.927 | Monocyte high |
| ENST00000316660.6:chr18:+\|2\|1948:26:209\|uORF\|GTG | −0.657 | −0.593 | 1.25 | −0.558 | Monocyte high |
| ENST00000547303.5:chr12:−\|4\|872:30:129\|uORF\|GTG | −0.411 | −0.562 | 0.974 | −0.805 | Monocyte high |

| ORF_ID | type | genename |
|---|---|---|
| ENST00000535010.5:chr1:+\|19\|6227:340:415\|uORF\|ATG | uORF | SH3GLB1 |
| ENST00000438274.7:chr17:−\|2\|1569:40:100\|uORF\|ATG | uORF | BECN1 |
| ENST00000487832.6:chr6:+\|7\|1427:73:157\|uORF\|ATG | uORF | RWDD1 |

TABLE 4-continued

| | | |
|---|---|---|
| ENST00000504102.5:chr17:-\|20\|1865:167:308\|uORF\|ATG | uORF | SPOP |
| ENST00000403231.5:chr5:-\|9\|2181:91:2182\|uORF\|ATG | uORF | KIF3A |
| ENST00000524013.1:chr8:+\|10\|2150:212:434\|overlap.uORF\|TTG | overlap.uORF | MYC |
| ENST00000621592.5:chr8:+\|18\|2366:363:588\|overlap.uORF\|TTG | overlap.uORF | MYC |
| ENST00000341567.8:chr7:+\|7\|4229:116:161\|uORF\|ATG | uORF | TMEM248 |
| ENST00000574110.5:chr19:+\|7\|2495:97:109\|uORF\|ATG | uORF | URI1 |
| ENST00000322914.7:chr17:-\|7\|2786:83:101\|uORF\|GTG | uORF | TMC6 |
| ENST00000395323.7:chr2:+\|3\|2933:16:58\|uORF\|GTG | uORF | LBH |
| ENST00000390687.8:chr15:+\|17\|1528:123:339\|uORF\|ATG | uORF | SNRPN |
| ENST00000562889.5:chr15:-\|11\|1547:140:1409\|uORF\|ATG | uORF | HAPLN3 |
| ENST00000375040.7:chr6:-\|5\|1476:71:173\|uORF\|ATG | uORF | GPSM3 |
| ENST00000445950.2:chr4:+\|8\|2175:85:205\|overlap.uORF\|GTG | overlap.uORF | UBE2K |
| ENST00000444957.3:chr7:+\|9\|2969:114:282\|overlap.uORF\|ATG | overlap.uORF | REPIN1 |
| ENST00000323703.10:chr2:-\|2\|2139:6:39\|uORF\|ATG | uORF | ZNF513 |
| ENST00000361189.6:chr5:-\|2\|4889:76:178\|uORF\|TTG | uORF | PJA2 |
| ENST00000370272.8:chr1:+\|22\|10148:263:335\|uORF\|ATG | uORF | DR1 |
| ENST00000378024.8:chr11:-\|222\|18787:2428:2518\|uORF\|CTG | uORF | AHNAK |
| ENST00000248342.8:chr19:+\|14\|864:154:187\|overlap.uORF\|GTG | overlap.uORF | EIF3K |
| ENST00000645759.1:chr3:-\|7\|6755:91:106\|uORF\|GTG | uORF | CBLB |
| ENST00000450536.6:chr6:-\|6\|4537:51:111\|uORF\|ATG | uORF | REPS1 |
| ENST00000567027.5:chr15:-\|48\|1353:536:956\|uORF\|ATG | uORF | HEXA |
| ENST00000371584.8:chr20:-\|27\|1073:314:887\|uORF\|ATG | uORF | DPM1 |
| ENST00000215567.9:chr19:+\|6\|1171:74:251\|overlap.uORF\|CTG | overlap.uORF | TECR |
| ENST00000367142.4:chr1:-\|18\|6496:249:327\|overlap.uORF\|GTG | overlap.uORF | NUCKS1 |
| ENST00000392870.2:chr10:+\|1\|2654:32:41\|uORF\|ATG | uORF | GRK5 |
| ENST00000453426.1:chr6:+\|19\|1267:324:516\|noncoding\|ATG | lncRNA | XXbac-BPG246D15.8 |
| ENST00000371544.7:chr1:-\|2\|5858:28:46\|uORF\|ATG | uORF | ZCCHC11 |
| ENST00000400075.3:chr21:+\|1\|4814:3:210\|uORF\|GTG | uORF | GABPA |
| ENST00000371825.7:chrX:+\|8\|4029:112:397\|overlap.uORF\|ATG | overlap.uORF | WDR44 |
| ENST00000410067.7:chr2:-\|3\|736:49:79\|overlap.uORF\|CTG | overlap.uORF | CID |
| ENST00000398733.7:chr5:+\|15\|2702:344:395\|uORF\|CTG | uORF | UBE2D2 |
| ENST00000370272.8:chr1:+\|17\|10148:230:239\|uORF\|ATG | uORF | DR1 |
| ENST00000344095.8:chr7:-\|1\|2727:2:23\|uORF\|ATG | uORF | TAF6 |
| ENST00000331808.4:chr16:-\|2\|1561:29:122\|uORF\|ATG | uORF | DEXI |
| ENST00000282570.3:chr2:+\|9\|4191:98:158\|uORF\|ATG | uORF | GMCL1 |
| ENST00000305352.6:chr1:+\|10\|2909:151:208\|uORF\|ATG | uORF | S1PR1 |
| ENST00000252934.9:chr22:+\|3\|3329:118:451\|overlap.uORF\|CTG | overlap.uORF | ATXN10 |
| ENST00000398733.7:chr5:+\|13\|2702:308:335\|uORF\|CTG | uORF | UBE2D2 |
| ENST00000635841.1:chrX:-\|144\|1734:1593:1614\|noncoding\|GTG | lncRNA | XIST |
| ENST00000469141.6:chr1:+\|24\|3339:213:309\|uORF\|ATG | uORF | THRAP3 |
| ENST00000623368.3:chr8:+\|18\|2368:304:361\|uORF\|ATG | uORF | FDFT1 |
| ENST00000432937.6:chr7:+\|5\|2411:53:212\|uORF\|CTG | uORF | DMTF1 |
| ENST00000447863.5:chr7:+\|7\|3954:109:268\|uORF\|CTG | uORF | DMTF1 |
| ENST00000320876.10:chr18:+\|11\|8821:132:168\|uORF\|ACG | uORF | SMCHD1 |
| ENST00000551742.5:chr16:-\|6\|5900:101:173\|overlap.uORF\|ATG | overlap.uORF | KIAA0430 |
| ENST00000372554.8:chr9:-\|4\|1985:40:142\|overlap.uORF\|GTG | overlap.uORF | SH3GLB2 |
| ENST00000396386.6:chr7:+\|4\|1857:66:138\|uORF\|TTG | uORF | CBX3 |
| ENST00000381061.8:chr22:+\|3\|3135:119:413\|overlap.uORF\|CTG | overlap.uORF | ATXN10 |
| ENST00000507747.1:chr6:-\|7\|600:57:558\|uORF\|ATG | uORF | RP11-514O12.4 |
| ENST00000609590.1:chr6:+\|120\|5310:1623:2130\|noncoding\|ATG | lncRNA | RP11-517H2.6 |
| ENST00000316308.8:chr5:-\|15\|2568:170:1616\|uORF\|ATG | uORF | CLK4 |
| ENST00000538654.5:chr11:-\|115\|2768:1156:1180\|noncoding\|ATG | lncRNA | SNHG1 |
| ENST00000362058.2:chr1:-\|12\|2029:133:499\|noncoding\|ATG | pseudogene | CROCCP2 |
| ENST00000423902.6:chr8:+\|5\|11568:61:388\|uORF\|ACG | uORF | CHD7 |
| ENST00000489653.6:chr2:+\|1\|1003:1:373\|noncoding\|ATG | pseudogene | AC016747.2 |
| ENST00000319555.7:chr16:+\|3\|5380:117:288\|uORF\|ACG | uORF | ZFPM1 |
| ENST00000314393.5:chr8:+\|31\|4624:421:673\|uORF\|ACG | uORF | ZHX2 |
| ENST00000421406.1:chr1:-\|16\|1465:172:1339\|noncoding\|ATG | pseudogene | RP11-488L18.4 |
| ENST00000614944.4:chr11:+\|5\|3388:55:253\|overlap.uORF\|GTG | overlap.uORF | VPS11 |
| ENST00000645306.1:chr16:+\|4\|3662:29:167\|uORF\|GTG | uORF | CTCF |
| ENST00000536163.5:chr7:-\|33\|7296:415:1369\|uORF\|ATG | uORF | KIAA1147 |
| ENST00000346243.7:chr17:-\|23\|1296:229:1297\|uORF\|ATG | uORF | IKZF3 |
| ENST00000350532.7:chr17:-\|23\|1413:229:1414\|uORF\|ATG | uORF | IKZF3 |
| ENST00000508738.5:chr4:-\|9\|1470:94:1471\|uORF\|ATG | uORF | CAMK2D |
| ENST00000456324.5:chr19:+\|45\|3780:634:679\|uORF\|ATG | uORF | ZNF146 |
| ENST00000496856.5:chr3:+\|3\|2033:66:378\|uORF\|GTG | uORF | ZNF639 |
| ENST00000319357.5:chr7:+\|8\|3368:142:175\|uORF\|ATG | uORF | STK17A |
| ENST00000394457.7:chr2:+\|129\|6574:1517:1748\|noncoding\|GTG | pseudogene | AC016747.2 |
| ENST00000348610.3:chr3:-\|5\|3272:94:253\|overlap.uORF\|ATG | overlap.uORF | SENP7 |
| ENST00000380817.7:chr22:-\|3\|8008:13:115\|uORF\|ATG | uORF | SBF1 |
| ENST00000369367.7:chr12:-\|6\|7543:125:152\|uORF\|ATG | uORF | SCAF11 |
| ENST00000393066.7:chr17:-\|16\|3622:217:289\|uORF\|CTG | uORF | TRIM37 |
| ENST00000244546.4:chr6:-\|84\|2696:862:2218\|uORF\|ATG | uORF | PEX6 |
| ENST00000562889.5:chr15:-\|64\|1547:660:1158\|uORF\|TTG | uORF | HAPLN3 |
| ENST00000572067.1:chr16:+\|1\|3907:20:518\|noncoding\|ATG | lncRNA | CTC-479C5.10 |
| ENST00000450095.6:chr9:+\|14\|1280:117:372\|overlap.uORF\|ATG | overlap.uORF | GALT |
| ENST00000428187.5:chr3:-\|17\|4235:202:583\|overlap.uORF\|GTG | overlap.uORF | TNK2 |
| ENST00000412586.6:chr12:-\|3\|741:13:742\|uORF\|ATG | uORF | ING4 |
| ENST00000423703.6:chr12:-\|3\|602:13:541\|uORF\|ATG | uORF | ING4 |
| ENST00000444704.5:chr12:-\|3\|678:13:679\|uORF\|ATG | uORF | ING4 |

TABLE 4-continued

| | | |
|---|---|---|
| ENST00000355560.4:chr1:−\|15\|2120:283:1777\|uORF\|ATG | uORF | CLK2 |
| ENST00000361168.9:chr1:−\|8\|1934:88:1585\|uORF\|ATG | uORF | CLK2 |
| ENST00000645843.1:chr4:+\|5\|5827:63:420\|overlap.uORF\|ACG | overlap.uORF | ABHD18 |
| ENST00000395728.7:chr6:−\|3\|4129:31:3805\|uORF\|ATG | uORF | EHMT2 |
| ENST00000374399.8:chr1:+\|3\|1711:22:229\|uORF\|ATG | uORF | NIPAL3 |
| ENST00000579690.5:chr4:−\|14\|2983:154:2209\|uORF\|ATG | uORF | YTHDC1 |
| ENST00000336332.5:chr3:−\|51\|2579:775:2134\|uORF\|ATG | uORF | ZXDC |
| ENST00000577119.5:chr17:−\|79\|4200:2245:4201\|uORF\|ATG | uORF | NLRP1 |
| ENST00000421068.5:chr1:−\|84\|1060:869:899\|noncoding\|ATG | lncRNA | GAS5 |
| ENST00000538033.2:chr2:+\|36\|2800:342:354\|noncoding\|GTG | pseudogene | WASH2P |
| ENST00000538654.5:chr11:−\|89\|2768:833:902\|noncoding\|ATG | lncRNA | SNHG1 |
| ENST00000319129.10:chr17:−\|49\|4156:620:3278\|uORF\|ATG | uORF | FBF1 |
| ENST00000536441.6:chr11:−\|2\|9558:18:111\|uORF\|GTG | uORF | SESN3 |
| ENST00000526639.2:chr12:+\|11\|1975:188:197\|uORF\|TTG | uORF | SNRNP35 |
| ENST00000505973.1:chr2:+\|25\|1741:277:1435\|noncoding\|ATG | lncRNA | RP11-158113.2 |
| ENST00000416707.1:chr3:−\|3\|1260:36:285\|overlap.uORF\|CTG | overlap.uORF | IP6K2 |
| ENST00000446860.5:chr3:−\|8\|1565:87:435\|overlap.uORF\|ATG | overlap.uORF | IP6K2 |
| ENST00000320876.10:chr18:+\|9\|8821:125:152\|uORF\|GTG | uORF | SMCHD1 |
| ENST00000622241.1:chr8:−\|5\|4639:40:4222\|uORF\|ATG | uORF | PRAG1 |
| ENST00000399219.7:chr9:+\|2\|1987:9:450\|overlap.uORF\|ATG | overlap.uORF | PMPCA |
| ENST00000566842.5:chr16:−\|113\|1860:1206:1338\|uORF\|CTG | uORF | KCTD13 |
| ENST00000589634.1:chr18:−\|15\|1278:184:1279\|uORF\|CTG | uORF | SMAD7 |
| ENST00000591365.1:chr17:−\|8\|2238:97:871\|noncoding\|ATG | lncRNA | CTD-2020K17.1 |
| ENST00000252996.8:chr20:−\|49\|4628:1135:3259\|uORF\|ATG | uORF | TAF4 |
| ENST00000556710.5:chr1:−\|1\|2635:7:130\|uORF\|ATG | uORF | RP11-574F21.3 |
| ENST00000295872.8:chr3:−\|26\|5417:261:2829\|uORF\|ATG | uORF | SPICE1 |
| ENST00000535387.5:chr9:−\|17\|3390:205:3391\|uORF\|ATG | uORF | NOL8 |
| ENST00000221922.10:chr19:+\|17\|2093:201:270\|overlap.uORF\|TTG | overlap.uORF | CCDC9 |
| ENST00000375206.6:chr9:+\|184\|6269:1947:5877\|noncoding\|ATG | lncRNA | RP11-23J9.4 |
| ENST00000294383.6:chr1:−\|2\|10549:25:7864\|uORF\|ATG | uORF | USP24 |
| ENST00000452274.6:chr2:−\|4\|3966:36:3828\|uORF\|ATG | uORF | CLASP1 |
| ENST00000539107.5:chr12:+\|1\|2440:5:227\|uORF\|TTG | uORF | CCDC91 |
| ENST00000540497.5:chr20:−\|5\|3405:61:3406\|uORF\|ATG | uORF | ZMYND8 |
| ENST00000543356.6:chr9:−\|13\|2576:163:2155\|uORF\|ATG | uORF | GNE |
| ENST00000287078.6:chr10:−\|4\|3644:25:1702\|uORF\|ATG | uORF | TYSND1 |
| ENST00000355312.7:chr12:−\|19\|5466:187:2281\|uORF\|ATG | uORF | GIT2 |
| ENST00000551209.5:chr12:−\|19\|2127:187:2128\|uORF\|ATG | uORF | GIT2 |
| ENST00000353205.5:chr6:+\|2\|1660:25:193\|overlap.uORF\|CTG | overlap.uORF | NFYA |
| ENST00000380087.6:chrX:−\|11\|2333:232:373\|overlap.uORF\|ACG | overlap.uORF | RBBP7 |
| ENST00000411744.6:chr17:−\|7\|2031:124:2032\|uORF\|ATG | uORF | EXOC7 |
| ENST00000634349.1:chr17:−\|7\|2124:124:2125\|uORF\|ATG | uORF | EXOC7 |
| ENST00000536340.5:chr20:−\|9\|5273:82:3727\|uORF\|ATG | uORF | ZMYND8 |
| ENST00000461685.5:chr20:−\|5\|3567:61:3568\|uORF\|ATG | uORF | ZMYND8 |
| ENST00000617418.4:chr20:−\|5\|3411:61:3412\|uORF\|ATG | uORF | ZMYND8 |
| ENST00000169298.7:chr3:+\|10\|4645:205:430\|uORF\|CTG | uORF | ST6GAL1 |
| ENST00000428575.6:chr22:+\|24\|2148:199:307\|overlap.uORF\|ATG | overlap.uORF | XRCC6 |
| ENST00000427980.6:chr16:+\|6\|7886:43:106\|uORF\|ATG | uORF | ATXN1L |
| ENST00000409175.5:chr2:+\|6\|2402:54:129\|uORF\|TTG | uORF | 43897 |
| ENST00000355904.8:chr8:−\|8\|1762:132:303\|overlap.uORF\|CTG | overlap.uORF | GTF2E2 |
| ENST00000224140.5:chr9:−\|3\|11100:32:47\|uORF\|ATG | uORF | SETX |
| ENST00000343677.3:chr6:−\|8\|642:91:643\|uORF\|ACG | uORF | HIST1H1C |
| ENST00000462753.5:chr7:−\|31\|2322:267:1950\|uORF\|ATG | uORF | TMEM209 |
| ENST00000360016.9:chr19:−\|15\|3240:238:325\|overlap.uORF\|GTG | overlap.uORF | BRD4 |
| ENST00000377045.8:chrX:+\|7\|2458:103:133\|uORF\|ATG | uORF | ARAF |
| ENST00000545394.2:chr8:+\|4\|2808:59:425\|overlap.uORF\|ATG | overlap.uORF | ASH2L |
| ENST00000520515.5:chr5:−\|12\|1744:75:1491\|noncoding\|ATG | lncRNA | CTD-2410N18.4 |
| ENST00000289371.10:chr2:+\|6\|5777:46:250\|overlap.uORF\|GTG | overlap.uORF | EIF5B |
| ENST00000358528.8:chr1:−\|36\|4076:428:2825\|uORF\|ATG | uORF | CSDE1 |
| ENST00000534699.5:chr1:−\|9\|2667:59:2456\|uORF\|ATG | uORF | CSDE1 |
| ENST00000261443.9:chr1:−\|8\|3228:51:2355\|uORF\|ATG | uORF | CSDE1 |
| ENST00000339438.10:chr1:−\|39\|4006:447:2751\|uORF\|ATG | uORF | CSDE1 |
| ENST00000617998.4:chr17:+\|16\|6751:400:6343\|noncoding\|ATG | lncRNA | POLR2A |
| ENST00000304056.8:chr7:−\|4\|3745:113:494\|uORF\|CTG | uORF | KBTBD2 |
| ENST00000244534.6:chr6:−\|6\|666:58:667\|uORF\|GTG | uORF | HIST1H1D |
| ENST00000510267.5:chr4:−\|2\|2006:43:400\|uORF\|ATG | uORF | TNIP2 |
| ENST00000334351.7:chr1:+\|18\|2416:227:398\|uORF\|ATG | uORF | PNRC2 |
| ENST00000591482.1:chr17:+\|9\|1050:85:925\|noncoding\|CTG | lncRNA | CTB-96E2.3 |
| ENST00000313368.7:chr5:−\|8\|2334:99:309\|uORF\|ATG | uORF | TAF7 |
| ENST00000639725.1:chr6:−\|2\|4782:41:917\|uORF\|ATG | uORF | RPS10-NUDT3 |
| ENST00000440166.5:chr7:+\|2\|1415:63:147\|uORF\|ATG | uORF | DBNL |
| ENST00000394921.8:chr7:−\|10\|1316:146:263\|noncoding\|CTG | pseudogene | PMS2L3 |
| ENST00000490734.6:chr7:+\|5\|2004:99:288\|overlap.uORF\|ATG | overlap.uORF | DBNL |
| ENST00000547863.5:chr17:+\|67\|1662:889:1408\|noncoding\|ATG | lncRNA | RNASEK-C17orf49 |
| ENST00000307564.8:chr9:−\|4\|7380:62:92\|uORF\|ATG | uORF | AKNA |
| ENST00000582693.4:chr1:−\|5\|9117:36:330\|overlap.uORF\|TTG | overlap.uORF | RNF115 |
| ENST00000263092.10:chr17:−\|11\|5711:129:1818\|uORF\|ATG | uORF | METTL16 |
| ENST00000622611.4:chr13:−\|9\|5230:115:427\|uORF\|CTG | uORF | RBM26 |
| ENST00000216185.6:chr22:−\|29\|1736:375:969\|uORF\|ATG | uORF | TXN2 |
| ENST00000369325.7:chr6:−\|4\|4633:52:1558\|uORF\|ATG | uORF | MAP3K7 |
| ENST00000493459.5:chr3:+\|12\|4205:115:172\|uORF\|GTG | uORF | MBNL1 |

TABLE 4-continued

| | | |
|---|---|---|
| ENST00000370128.8:chr1:+\|10\|2535:142:361\|overlap.uORF\|CTG | overlap.uORF | RTCA |
| ENST00000637181.1:chr6:+\|1\|4230:20:104\|uORF\|GTG | uORF | TAB2 |
| ENST00000227524.8:chr11:−\|10\|2157:136:217\|overlap.uORF\|GTG | overlap.uORF | PRPF19 |
| ENST00000405807.9:chr5:−\|3\|2830:29:119\|uORF\|ATG | uORF | COL4A3BP |
| ENST00000314940.6:chr5:−\|10\|8726:198:252\|uORF\|GTG | uORF | HNRNPA0 |
| ENST00000316856.7:chr19:+\|1\|1736:8:23\|uORF\|ATG | uORF | RAD23A |
| ENST00000565677.5:chr16:+\|18\|1560:303:606\|uORF\|ATG | uORF | STUB1 |
| ENST00000317376.8:chr10:−\|20\|5328:230:284\|uORF\|CTG | uORF | SPOCK2 |
| ENST00000393599.2:chr19:−\|5\|1422:190:565\|overlap.uORF\|ACG | overlap.uORF | CDKN2D |
| ENST00000334494.8:chr21:+\|4\|1334:29:149\|uORF\|GTG | uORF | PRMT2 |
| ENST00000545885.5:chr12:−\|24\|559:320:473\|noncoding\|GTG | lncRNA | AC084018.1 |
| ENST00000569969.5:chr16:+\|337\|5296:3534:3687\|noncoding\|CTG | lncRNA | RP11-264B17.3 |
| ENST00000435962.6:chr14:−\|3\|5146:34:274\|uORF\|ATG | uORF | TC2N |
| ENST00000569969.5:chr16:+\|336\|5296:3523:3622\|noncoding\|GTG | lncRNA | RP11-264B17.3 |
| ENST00000330794.8:chr5:−\|36\|1771:335:1475\|uORF\|ATG | uORF | TMEM173 |
| ENST00000361544.11:chr1:+\|8\|2446:97:241\|uORF\|ACG | uORF | CDC14A |
| ENST00000246533.7:chr19:+\|28\|1918:409:613\|overlap.uORF\|ATG | overlap.uORF | CAPNS1 |
| ENST00000299381.4:chr10:+\|9\|3195:87:258\|overlap.uORF\|CTG | overlap.uORF | ANAPC16 |
| ENST00000618759.4:chr7:−\|63\|3910:730:1570\|uORF\|ATG | uORF | GIMAP6 |
| ENST00000261461.6:chr1:+\|5\|3128:101:116\|uORF\|ATG | uORF | PPP2R5A |
| ENST00000620157.4:chr11:−\|2\|6152:38:161\|uORF\|GTG | uORF | DDX6 |
| ENST00000493969.2:chr7:−\|21\|876:195:834\|uORF\|ATG | uORF | GIMAP6 |
| ENST00000637181.1:chr6:+\|3\|4230:60:225\|uORF\|CTG | uORF | TAB2 |
| ENST00000277541.7:chr9:−\|231\|9306:1797:1932\|uORF\|CTG | uORF | NOTCH1 |
| ENST00000375635.6:chr6:+\|5\|610:41:197\|uORF\|ATG | uORF | C6orf48 |
| ENST00000515768.5:chr5:−\|20\|1098:268:1099\|uORF\|ATG | uORF | CSNK1A1 |
| ENST00000615507.4:chr10:+\|6\|3100:54:240\|overlap.uORF\|ACG | overlap.uORF | ANAPC16 |
| ENST00000228136.8:chr11:+\|14\|2049:240:453\|overlap.uORF\|CTG | overlap.uORF | C11orf58 |
| ENST00000298316.6:chr14:+\|9\|3865:138:210\|uORF\|CTG | uORF | ARF6 |
| ENST00000352393.8:chr20:−\|1\|2147:9:90\|uORF\|GTG | uORF | CPNE1 |
| ENST00000437340.5:chr20:−\|8\|1755:79:172\|uORF\|GTG | uORF | CPNE1 |
| ENST00000545648.2:chr8:−\|16\|1976:260:374\|uORF\|ATG | uORF | SARAF |
| ENST00000307266.7:chr2:−\|5\|759:64:760\|uORF\|ATG | uORF | MYEOV2 |
| ENST00000361436.9:chr9:−\|1\|633:31:151\|overlap.uORF\|GTG | overlap.uORF | RPL12 |
| ENST00000394803.9:chr4:−\|20\|2227:298:355\|overlap.uORF\|TTG | overlap.uORF | UBE2D3 |
| ENST00000614096.4:chr15:−\|21\|8741:443:623\|uORF\|GTG | uORF | UBE3A |
| ENST00000552975.5:chr12:−\|18\|378:125:257\|noncoding\|ATG | lncRNA | RP11-493L12.2 |
| ENST00000303391.10:chrX:−\|5\|10505:91:196\|uORF\|ATG | uORF | MECP2 |
| ENST00000336787.5:chr15:−\|4\|3446:84:219\|uORF\|ACG | uORF | RAB27A |
| ENST00000308008.10:chr5:−\|7\|4176:145:4177\|uORF\|ATG | uORF | RAPGEF6 |
| ENST00000360515.7:chr5:+\|14\|3591:143:221\|uORF\|ATG | uORF | CDC42SE2 |
| ENST00000319397.6:chr11:−\|2\|2231:83:239\|uORF\|CTG | uORF | ETS1 |
| ENST00000369239.9:chr6:−\|5\|5112:60:90\|uORF\|ACG | uORF | PNISR |
| ENST00000370873.8:chr20:−\|3\|996:40:76\|uORF\|GTG | uORF | PSMA7 |
| ENST00000538977.5:chr5:+\|14\|2055:166:328\|uORF\|CTG | uORF | PPWD1 |
| ENST00000461448.5:chr1:−\|112\|1629:1233:1287\|noncoding\|ATG | lncRNA | SNHG12 |
| ENST00000374088.7:chr9:−\|1\|5464:11:68\|uORF\|ATG | uORF | AKNA |
| ENST00000393713.7:chr11:+\|4\|2132:29:134\|overlap.uORF\|ATG | overlap.uORF | RNF121 |
| ENST00000342711.5:chr11:−\|32\|5742:319:4657\|uORF\|ATG | uORF | CDC42BPG |
| ENST00000284037.9:chr5:+\|8\|8647:74:314\|uORF\|GTG | uORF | ERBIN |
| ENST00000312960.3:chr3:−\|1\|2517:11:533\|overlap.uORF\|CTG | overlap.uORF | SIAH2 |
| ENST00000075120.11:chr12:−\|10\|3915:101:152\|uORF\|ATG | uORF | SLC2A3 |
| ENST00000312189.10:chr9:−\|1\|11836:47:314\|overlap.uORF\|ATG | overlap.uORF | PHF19 |
| ENST00000466493.5:chr10:−\|5\|2110:90:1863\|uORF\|ATG | uORF | RUFY2 |
| ENST00000300584.7:chr15:−\|23\|6067:379:2893\|uORF\|ATG | uORF | TBC1D2B |
| ENST00000318522.9:chr2:+\|7\|5549:72:387\|overlap.uORF\|ACG | overlap.uORF | EML4 |
| ENST00000445950.2:chr4:+\|2\|2175:26:110\|uORF\|GTG | uORF | UBE2K |
| ENST00000267176.8:chr12:−\|9\|11121:144:4323\|uORF\|ATG | uORF | SBNO1 |
| ENST00000261842.9:chr15:+\|3\|6758:49:292\|overlap.uORF\|ATG | overlap.uORF | AP4E1 |
| ENST00000344337.10:chr3:−\|3\|6830:21:135\|uORF\|CTG | uORF | KPNA1 |
| ENST00000428120.5:chr1:−\|2\|2313:23:581\|uORF\|TTG | uORF | FAAP20 |
| ENST00000431415.3:chr15:−\|5\|492:28:493\|uORF\|CTG | uORF | BMF |
| ENST00000308660.5:chr5:−\|30\|4196:370:493\|uORF\|CTG | uORF | 43893 |
| ENST00000494792.1:chr10:−\|106\|3422:1164:1689\|uORF\|ATG | uORF | RP11-12J10.3 |
| ENST00000340020.10:chr1:−\|12\|3008:121:157\|uORF\|ATG | uORF | AIDA |
| ENST00000392456.4:chr3:+\|15\|1926:329:599\|overlap.uORF\|TTG | overlap.uORF | CCDC50 |
| ENST00000556816.5:chr14:+\|5\|2626:46:355\|overlap.uORF\|GTG | overlap.uORF | ISCA2 |
| ENST00000319190.9:chr2:+\|5\|5157:94:403\|overlap.uORF\|CTG | overlap.uORF | TTC7A |
| ENST00000614860.1:chr13:+\|8\|4074:67:295\|uORF\|CTG | uORF | USPL1 |
| ENST00000619039.4:chr17:−\|3\|5734:27:417\|uORF\|TTG | uORF | PIP5K2B |
| ENST00000262738.7:chr22:−\|9\|11389:70:9046\|uORF\|ATG | uORF | CELSR1 |
| ENST00000295025.12:chr2:+\|25\|11255:304:352\|overlap.uORF\|GTG | overlap.uORF | REL |
| ENST00000331442.4:chr6:−\|3\|681:43:682\|uORF\|GTG | uORF | HIST1H1B |
| ENST00000426263.8:chr1:−\|20\|3670:392:551\|overlap.uORF\|ACG | overlap.uORF | SLC2A1 |
| ENST00000281455.6:chr4:−\|2\|3832:50:146\|uORF\|GTG | uORF | ACSL1 |
| ENST00000405944.7:chr8:−\|18\|1994:301:697\|uORF\|ATG | uORF | DERL1 |
| ENST00000369937.4:chr10:−\|9\|1191:86:233\|overlap.uORF\|ATG | overlap.uORF | CUEDC2 |
| ENST00000394725.2:chr16:−\|10\|2147:179:254\|overlap.uORF\|GTG | overlap.uORF | SIAH1 |
| ENST00000396629.6:chr14:+\|1\|2021:8:95\|uORF\|ATG | uORF | SCFD1 |
| ENST00000544052.6:chr14:+\|3\|2058:21:96\|uORF\|ATG | uORF | SCFD1 |

TABLE 4-continued

| | | |
|---|---|---|
| ENST00000491829.5:chr6:−\|8\|4212:988:2908\|uORF\|CTG | uORF | GABBR1 |
| ENST00000393227.6:chr17:+\|7\|2284:61:139\|overlap.uORF\|TTG | overlap.uORF | LUC7L3 |
| ENST00000615447.1:chr16:−\|1\|426:15:366\|uORF\|GTG | uORF | COG8 |
| ENST00000348403.9:chr9:−\|2\|3337:56:152\|uORF\|ACG | uORF | STRBP |
| ENST00000337014.10:chr17:+\|11\|2285:251:503\|overlap.uORF\|ACG | overlap.uORF | HEXDC |
| ENST00000359983.7:chr17:−\|31\|3290:283:3160\|uORF\|ATG | uORF | ATP2A3 |
| ENST00000418194.6:chr2:−\|7\|3937:38:389\|overlap.uORF\|GTG | overlap.uORF | SP3 |
| ENST00000433535.6:chr3:−\|4\|1178:25:1012\|uORF\|ATG | uORF | RPUSD3 |
| ENST00000522941.5:chr8:−\|13\|1700:256:400\|uORF\|CTG | uORF | FAM49B |
| ENST00000501726.1:chr15:+\|180\|2530:2134:2413\|noncoding\|ATG | lncRNA | RP11-358M11.2 |
| ENST00000520281.5:chr9:−\|25\|969:325:961\|uORF\|ATG | uORF | PAX5 |
| ENST00000414447.5:chr9:−\|25\|1056:325:1048\|uORF\|ATG | uORF | PAX5 |
| ENST00000006750.7:chr17:−\|5\|1269:57:165\|overlap.uORF\|TTG | overlap.uORF | CD79B |
| ENST00000377847.6:chr9:−\|25\|996:325:988\|uORF\|ATG | uORF | PAX5 |
| ENST00000349817.2:chr17:−\|7\|378:40:379\|uORF\|ATG | uORF | CD79B |
| ENST00000390556.6:chr14:−\|14\|1678:129:1293\|uORF\|ATG | uORF | IGHD |
| ENST00000534096.5:chr19:−\|1\|1155:12:990\|noncoding\|ATG | pseudogene | NAPSB |
| ENST00000390559.6:chr14:−\|16\|1485:235:1363\|uORF\|ATG | uORF | IGHM |
| ENST00000637539.1:chr14:−\|16\|1683:235:1426\|uORF\|ATG | uORF | IGHM |
| ENST00000245932.10:chr19:+\|17\|2305:233:260\|uORF\|ATG | uORF | VASP |
| ENST00000535425.5:chr22:−\|2\|1002:16:172\|overlap.uORF\|CTG | overlap.uORF | CTA-384D8.28 |
| ENST00000236067.8:chr1:+\|9\|944:94:169\|uORF\|ATG | uORF | ATP6V0B |
| ENST00000546342.5:chr8:−\|11\|1482:130:1483\|uORF\|ATG | uORF | GSR |
| ENST00000537535.5:chr8:−\|11\|1323:130:1324\|uORF\|ATG | uORF | GSR |
| ENST00000541648.5:chr8:−\|11\|1410:130:1411\|uORF\|ATG | uORF | GSR |
| ENST00000218104.5:chrX:+\|5\|3664:31:298\|uORF\|GTG | uORF | ABCD1 |
| ENST00000309295.8:chr11:+\|4\|5185:93:270\|overlap.uORF\|CTG | overlap.uORF | EHBP1L1 |
| ENST00000542575.6:chr19:−\|4\|2882:36:501\|uORF\|CTG | uORF | SLC1A5 |
| ENST00000390548.6:chr14:−\|28\|2619:403:1201\|uORF\|ATG | uORF | IGHG1 |
| ENST00000046640.7:chr17:+\|20\|2866:322:502\|uORF\|ATG | uORF | CTNS |
| ENST00000392351.7:chr19:−\|1\|1557:25:208\|uORF\|ACG | uORF | HOMER3 |
| ENST00000549393.2:chr17:+\|2\|783:37:118\|uORF\|ATG | uORF | RNASEK |
| ENST00000571595.5:chr17:−\|30\|767:295:649\|noncoding\|CTG | lncRNA | MIR22HG |
| ENST00000376962.9:chr9:−\|3\|2785:14:524\|uORF\|GTG | uORF | ZFAND5 |
| ENST00000608245.5:chr17:−\|13\|465:164:431\|noncoding\|CTG | lncRNA | MIR22HG |
| ENST00000454579.5:chr2:+\|2\|3772:13:160\|overlap.uORF\|ACG | overlap.uORF | SSFA2 |
| ENST00000262768.11:chr17:−\|2\|3652:143:455\|overlap.uORF\|TTG | overlap.uORF | TIMP2 |
| ENST00000332839.8:chr2:−\|3\|2922:43:2923\|uORF\|ATG | uORF | SLC8A1 |
| ENST00000408028.6:chr2:−\|3\|2898:43:2899\|uORF\|ATG | uORF | SLC8A1 |
| ENST00000318622.8:chr7:+\|4\|1878:85:325\|uORF\|ATG | uORF | RHBDD2 |
| ENST00000378566.5:chr9:−\|8\|2566:65:128\|uORF\|GTG | uORF | FAM214B |
| ENST00000358334.9:chr10:−\|47\|6680:427:6148\|uORF\|ATG | uORF | MYOF |
| ENST00000360864.8:chr20:+\|2\|5213:48:153\|uORF\|CTG | uORF | DNAJC5 |
| ENST00000447110.5:chr17:−\|8\|4495:121:310\|overlap.uORF\|ATG | overlap.uORF | PIK3R5 |
| ENST00000581621.1:chr17:+\|295\|4554:3517:4042\|noncoding\|ATG | lncRNA | RP11-186B7.4 |
| ENST00000242057.8:chr7:+\|10\|6276:138:267\|uORF\|CTG | uORF | AHR |
| ENST00000377474.3:chr13:−\|2\|6225:87:195\|uORF\|GTG | uORF | KCTD12 |
| ENST00000251076.9:chr15:−\|7\|10672:115:163\|uORF\|ATG | uORF | DMXL2 |
| ENST00000578921.5:chr18:+\|8\|4055:205:337\|overlap.uORF\|ATG | overlap.uORF | RAB31 |
| ENST00000551012.6:chr7:−\|2\|1420:4:85\|uORF\|GTG | uORF | CLEC5A |
| ENST00000509248.1:chr4:−\|3\|797:31:229\|uORF\|ATG | uORF | SLC7A11 |
| ENST00000410074.5:chr8:+\|4\|786:82:148\|uORF\|ATG | uORF | DOCK5 |
| ENST00000390547.3:chr14:−\|85\|1112:940:1063\|uORF\|ATG | uORF | IGHA1 |
| ENST00000215886.5:chr22:−\|3\|591:17:128\|uORF\|ATG | uORF | LGALS2 |
| ENST00000280612.9:chr4:−\|4\|9645:44:98\|uORF\|GTG | uORF | SLC7A11 |
| ENST00000242057.8:chr7:+\|28\|6276:468:648\|overlap.uORF\|GTG | overlap.uORF | AHR |
| ENST00000373203.8:chr9:−\|5\|3048:71:239\|uORF\|ATG | uORF | ENG |
| ENST00000591463.1:chr18:+\|1\|485:31:127\|uORF\|ATG | uORF | TUBB6 |
| ENST00000598235.1:chr19:−\|1\|882:3:111\|uORF\|ACG | uORF | DNAJB1 |
| ENST00000333480.2:chr8:−\|14\|2347:157:1063\|uORF\|ACG | uORF | MAFA |
| ENST00000617412.1:chr5:−\|10\|2792:147:453\|overlap.uORF\|GTG | overlap.uORF | PLK2 |
| ENST00000302754.5:chr19:+\|4\|1820:54:288\|overlap.uORF\|ACG | overlap.uORF | JUNB |
| ENST00000295702.8:chr1:−\|1\|1116:16:625\|uORF\|ATG | uORF | SSR2 |
| ENST00000235150.4:chr1:−\|34\|2334:574:2197\|uORF\|ATG | uORF | RNF19B |
| ENST00000477026.5:chr1:−\|7\|1009:38:65\|uORF\|ATG | uORF | DUSP10 |
| ENST00000602813.1:chr1:+\|7\|131:100:115\|noncoding\|TTG | lncRNA | RNU11 |
| ENST00000329421.7:chr1:−\|7\|1699:153:387\|overlap.uORF\|CTG | overlap.uORF | MARCKSL1 |
| ENST00000371621.4:chr20:+\|6\|4008:63:252\|overlap.uORF\|CTG | overlap.uORF | PTPN1 |
| ENST00000379270.4:chrX:+\|10\|1065:106:196\|overlap.uORF\|ATG | overlap.uORF | SAT1 |
| ENST00000379019.5:chr20:−\|14\|5489:156:204\|uORF\|ACG | uORF | GPCPD1 |
| ENST00000265085.9:chr5:+\|8\|9483:133:256\|uORF\|GTG | uORF | CPEB4 |
| ENST00000369966.7:chr10:+\|5\|3101:27:312\|overlap.uORF\|CTG | overlap.uORF | NFKB2 |
| ENST00000612899.4:chr6:+\|8\|4735:106:133\|uORF\|TTG | uORF | TNFAIP3 |
| ENST00000313843.7:chr16:+\|4\|1481:39:159\|uORF\|ATG | uORF | STX4 |
| ENST00000539294.5:chr8:+\|9\|5163:149:323\|uORF\|ACG | uORF | YTHDF3 |
| ENST00000337304.2:chr22:+\|29\|2019:331:763\|uORF\|GTG | uORF | ATF4 |
| ENST00000316660.6:chr18:+\|2\|1948:26:209\|uORF\|GTG | uORF | PMAIP1 |
| ENST00000547303.5:chr12:−\|4\|872:30:129\|uORF\|GTG | uORF | DDIT3 |

TABLE 5

| Name | Sequence |
|---|---|
| SMART-RT primer | 5'-ACGTGTGCTCTTCCGATCTNNNNNNNNNNNNNNNTTTTTTTTTTTTTTVN-3' (SEQ ID NO: 6) |
| Template-switching oligos | 5'-CTCTTTCCCTACACGACGCTCTTCCGATCTNNNNrGrG+G-3' (SEQ ID NO: 7) |
| PCR1-Forward | 5'-GATCTACACTCTTTCCCTACACGACGC-3' (SEQ ID NO: 8) |
| PCR1-Rerverse | 5'-GTGACTGGAGTTCAGACGTGTGCTCTTCCGATCT-3' (SEQ ID NO: 9) |
| PCR2-Forward | 5'-AATGATACGGCGACCACCGAGATCTACACTCTTTCCCTACAC-3', (SEQ ID NO: 10) |
| PCR2-Rerverse | 5'-CAAGCAGAAGACGGCATACGAGATNNNNNNGTGACTGGAGTTCAGACGTGTG-3' (SEQ ID NO: 11) |
| DNA marker1 (35 bp insert) | AATGATACGGCGACCACCGAGATCTACACTCTTTCCCTACACGACGCTCTTCCGATCTATCGGGGAGCAGGGTAGAGTTGGTGCTATCTGCACTAGCCATTTCAACCAAAGTGTTTTCATTCAAATACTGAGATCGGAAGAGCACACGTCTGAACTCCAGTCACATCGCTATCTCGTATGCCGTCTTCTGCTTG (SEQ ID NO: 12) |
| DNA marker2 | AATGATACGGCGACCACCGAGATCTACACTCTTTCCCTACACGACGCTCTTCCGATCTATCGGGGATCTGCACTAGCCAT |

TABLE 5 -continued

| Name | Sequence |
|---|---|
| (15 bp insert) | TTCAACCAAAGTGTTTTCATTCAAATACTGAGATCGGAAGAGCACACGTCTGAACTCCAGTCACATCGCTATCTCGTATGCCGTCTTCTGCTTG (SEQ ID NO: 13) |

TABLE 6

| Antibody | Manufactory | Cat. no. |
|---|---|---|
| anti-RPS6 | Santa Cruz | sc-74459 |
| anti-RPL36a | Santa Cruz | sc-100831 |
| anti-MRPL11 | Cell Signaling | 2066 |
| anti-TUFM | Santa Cruz | sc-393924 |
| anti-MT-ND1 | Abcam | ab222892 |
| anti-MT-ND3 | Cell Signaling | 45859 |
| anti-MT-ND5 | Proteintech | 55410-1-AP |
| anti-NDUFB8 | Abcam | ab110242 |
| anti-SDHB | Abcam | abl4714 |
| anti-CYTB | ThermoFisher | 55090-1-AP |
| anti-UQCRC2 | Abcam | ab14745 |
| anti-MT-CO1 | Abcam | ab14705 |
| anti-MT-CO2 | Proteintech | 55070-1-AP |
| anti-COX4I1 | Santa Cruz | sc-376731 |
| anti-MT-ATP8 | Proteintech | 26723-1-AP |
| anti-ATP5A | Abcam | ab14748 |
| anti-eIF2α | Santa Cruz | sc-133132 |
| anti-phospho-eIF2α (Ser51) | Cell Signaling | 9721S |
| anti-4E-BP1 | Santa Cruz | sc-9977 |
| anti-phospho-4E-BP1 (Ser65) | Santa Cruz | sc-293124 |
| anti-GAPDH | Santa Cruz | sc-47724 |
| anti-b-Actin | Cell Signaling | 3700S |

TABLE 7

| Geneset | Genes |
|---|---|
| Ribosomal proteins | RPL10, RPL10A, RPL10L, RPL11, RPL12, RPL13, RPL13A, RPL14, RPL15, RPL17, RPL18, RPL18A, RPL19, RPL22, RPL22L1, RPL23, RPL23A, RPL24, RPL26, RPL26L1, RPL27, RPL27A, RPL28, RPL29, RPL3, RPL30, RPL31, RPL32, RPL34, RPL35, RPL35A, RPL36, RPL36A, RPL36AL, RPL37, RPL37A, RPL38, RPL39, RPL39L, RPL3L, RPL4, RPL41, RPL5, RPL6, RPL7, RPL7A, RPL7L1, RPL8, RPL9, RPLP0, RPLP1, RPLP2, RPS10, RPS11, RPS12, RPS13, RPS14, RPS15, RPS15A, RPS16, RPS19, RPS19BP1, RPS2, RPS20, RPS21, RPS23, RPS24, RPS25, RPS26, RPS27, RPS27A, RPS27L, RPS28, RPS29, RPS3, RPS3A, RPS4X, RPS4Y1, RPS4Y2, RPS5, RPS6, RPS7, RPS8, RPSA, RPSAP58 |
| Histone genes | HIST1H1C, HIST1H1E, HIST1H2AC, HIST1H2AD, HIST1H2AE, HIST1H2AG, HIST1H2AM, HIST1H2BC, HIST1H2BD, HIST1H2BG, HIST1H2BH, HIST1H2BJ, HIST1H2BK, HIST1H2BO, HIST1H3D, HIST1H3G, HIST1H3H, HIST1H4C, HIST1H4H, HIST3H2A, HIST4H4 |
| Translation initation factors | EIF1, EIF1AD, EIF1AX, EIF1AY, EIF1B, EIF2A, EIF2AK1, EIF2AK2, EIF2AK3, EIF2AK4, EIF2B1, EIF2B2, EIF2B3, EIF2B4, EIF2B5, EIF2D, EIF2S1, EIF2S2, EIF2S3, EIF2S3B, EIF3A, EIF3B, EIF3D, EIF3E, EIF3F, EIF3G, EIF3H, EIF3I, EIF3J, EIF3K, EIF3L, EIF3M, EIF4A1, EIF4A2, EIF4A3, EIF4B, EIF4E, EIF4E1B, EIF4E2, EIF4E3, EIF4EBP1, EIF4EBP2, EIF4EBP3, EIF4ENIF1, EIF4G1, EIF4G2, EIF4G3, EIF4H, EIF5, EIF5A, EIF5A2, EIF5AL1, EIF5B, EIF6 |
| RNA processing | GAR1, LSM6, DICER1, CWC15, MLH1, RBM6, CPEB1, WTAP, FDXACB1, INTS8, DDX17, PRMT7, PRMT5, WDR77, DNAJC8, PCBP2, SRRM1, RPL11, PTBP2, CDK5RAP1, DUS1L, DEDD2, MTO1, SRPK2, EXOSC8, SNRPN, EXOSC7, SARS, PRPF3, CDC5L, PPARGC1A, WDR83, PCF11, NOP2, CPSF6, SLU7, CELF2, RBM39, CPSF2, FIP1L1, POLR2K, PUSL1, PUS10, TYW3, TRPT1, WBP11, DUSP11, HNRNPA3, MOV10, A1CF, HNRNPF, RPL5, RBM28, NOVA1, PRPF40A, DHX8, ADARB1, SNW1, ELAVL4, PPIE, HNRNPH3, RBMY1F, DDX56, NOLC1, HNRNPUL1, ZRANB2, POP1, HNRNPH1, POP5, DDX54, PUF60, ADAR, TRIT1RNASEL, UTP15, TRMT1, SETX, CDKN2A, RBM8A, INTS7, CLP1, CTU2, RBMS2, MAGOHB, ZRSR2, TSEN2, PABPN1, PHRF1, RPP21, SNUPN, AARS, MTPAP, MBNL1, EXOSC1, HNRNPR, SRPK1, TRMT61B, BICD1, HNRNPU, SMN1, TRMT11, RPS16, CELF1, CPSF4, PRPF38B, SSU72, CID, ZC3H3, POLR2H, POLR2E, POLR2I, TRA2A, KIN, NAA38, PUS7, HNRNPL, ADAT1, SRRT, CIR1, FRG1, CD2BP2, TRDMT1, PPP2CA, ADAT3, METTL1, THG1L, PPIL3, DHX16, NSUN2, PPWD1, SPOP, TSEN34, RBM22, TBL3, MOCS3, YTHDC1, RNPS1, INTS12, HNRNPA1, HNRNPA0, TRNT1, PPP1R8, WDR4, LSM10NCBP2, NAF1, RPL14, CRNKL1, APOBEC4, INTS3, INTS9, SBDS, APP, DKC1, INTS6, DBR1, IMP4, TFIP11, PRPF31, PPP2R1A, NOL3, EMG1, PTBP1, SF1, SMN2, TARBP1, EIF4A3, LARP6, RBM38, CPSF3, SNRPG, PUS3, POLR2F, ELAC2, STRAP, POLR2J, BOP1, SF3B5, XAB2, SF3B4, POLR2B, HNRNPM, SF3B1, DDX46, HNRNPK, RPL7, ADAT2, PRKRA, HNRNPC, PRPF40B, DDX41, RBM23, RPL26, RPF1, ATXN1, PHAX, PAPOLA, NOP58, PHF5A, PES1, CWC22, CSTF1RPP38, FUS, NCBP1, POLR2G, RNMT, SYNCRIP, POLR2A, DGCR8, TRMT5, HNRNPD, QKI, LSM2, DDX20, SNRNP35, ARL6IP4, RBM25, CCAR1, DUS3L, RPS24, KHDRBS1, RPL35A, TRMU, RNASE4, HNRNPA2B1, CASC3, U2AF1L4, RBMY1D, RBMX, DIS3, NOP14, PAPOLB, SNRNP48, UPF3B, RPS19, CELF6, CELF5, RSRC1, GTF2F2, RPS15, AICDA, SNRNP40, RNPC3, TFB1M, NHP2, TRUB2, TXNL4APOBEC1, SNRPD3, SNRPD1, SNRPD2, ZNF638, YBX1, RNGTT, NONO, PUS7L, RBM4B, WDR36, INTS5, DHX38, U2AF1, TFB2M, TGS1, FTSJ1, KRR1, GTPBP3, PRPF4, MRM1, RBPMS, RPS17, LARP7, CPSF7, CELF3, ESRP1, KHSRP, ESRP2, FARS2, PABPC4, ADAD1, NUFIP1, ERI1, QTRT1, FCF1, APLP1, CDC40, GEMIN7, TYW1B, DHX9, TXNL4B, CSTF2, GRSF1, MPHOSPH10, SMAD3, SSB, HEATR1, SMAD1, SF3A1, SNURF, RBMY1A1, JMJD6, SFPQ, POP4, ALG11, SMC1A, UTP14CRALY, SCAF1, PRPF4B, UTP18, U2AF2, RBM4, LSM7, INTS2, SART1, RRP1B, TARDBP, PCBP1, LSM5, LSM4, RPP30, RBM10, RBMS1, RRP1, CSTF2T, TRMT61A, RSL1D1, TARBP2, RPS14, |

| Geneset | Genes |
|---|---|
| | SNRNP200, FBLL1, ERN2, SNRPF, SNRPE, CPSF1, HSD17B10, PPP4R2, ELAC1, PUS1, IVNS1ABP, LIN28A, POLR2D, POLR2C, SF3B2, RPP14, EXOSC10, PPAN, CNOT6L, PRPF8, USP39, SCNM1, NSA2, GTF2H3, ADARB2, TSR2, LCMT2, DDX1, SMAD2, PRPF18, DDX5, NOP10, RBMY1B, PPP1R9B, PPIH, PPIG, NOP56, RBM14, RBM17ZMAT5, HSD3B7, ZCRB1, ZNF346, PNN, ZFC3H1, PLRG1, DDX23, AGGF1, TRMT6, NUDT21, DHX15, ISY1, NPM3, PIWIL2, DHX35, SNRNP70, RPL10A, TSEN15, LUC7L3, SNRPA1, EXOSC9, EXOSC6, PPAN-P2RY11, EFTUD2, EXOSC5, EXOSC2, RRP8, SF3A2, SLBP, URM1, AQR, HNRNPH2, GTF2F1, SYF2, SNRNP27, UTP14A, PAPOLG, TRUB1, DUS4L, PA2G4P4, RPP40, XRN2, PRPF38AADAD2, HNRNPA1L2, RPL36A, TRA2B, RBM15B, RBM3, SNRPB2, RBM5, RP9, SART3, WBP4, SMNDC1, PRPF19, WDR55, CTU1, INTS4, LOC728554, WDR12, GEMIN4, GEMIN5, CLNS1A, BCAS2, MRPL1, PDCD11, CSTF3, MAGOH, INTS10, TTF2, ABCB5, PRPF6, SF3A3, ERN1, LSM11, SNRPC, PDCD7, DDX51APOBEC2, CHERP, POLR2L, PNPT1, TRMT2B, PIN4, SF3B3, RRAGC, DCAF13, IMP3, IYW1, SBDSP1, LSM1, GEMIN6, ZCCHC8, CSDC2, ZFP36, TSEN54, KHDRBS3, PRPF39, EXOSC3, RRP9, RPS6, FBL, RPS7, PA2G4, TRMT12, SNRPB, WDR3, POP7, MRPL44, THOC1RPP25, PPIL1, EXOSC4, UTP6, INTS1, LIN28B, RBMY1E, RPS28, SRRM2, RBMY1J, SNRPA, GEMIN8, LSM3, PABPC1, THOC2, THOC3, SNRNP25, FTSJ3 |
| Regulation of transcription | ITGB3BP, MEF2C, MEF2A, CDX1, CDX2, MED24, MED23, BSX, ZGPAT, ZFP91, MYD88, ZNF776, S1PR1, ZFP90, TIGD2, PHTF1, PQBP1, PATZ1, ZNF395, RARB, CREB3L3, TIGD5, SAP30L, PTPRK, L3MBTL4, ZNF644, EMX1, TIGD1, RXRB, PPARGC1A, PROX1, PPARGC1B, ZNF37A, ZNF236, NME2, RFC1, HNF4A, ASCC2, ZNF783, ASCC3, NME1, MED17, PRDM6, ZNF384, ZNF383, PRDM2, PIAS2, CDCA7L, SUPT6H, ZNHIT3, ZIM2, ZNF611, ZNF133, ZNRD1, VPS72, LIF, PLAGL1, ARX, TCF21, MOV10, KRAS, ZNF224, DMD, LHX3, PBRM1, TCF4, DUX4, TCF25, ARHGEF10L, HNRNPAB, NR1H3, IKZF5, IKZF4, KLF7, TCF7, IKZF3, ZNF625, IKZF2, IKZF1, ESRRG, RYBP, ZBTB41, ZBTB40, PMF1, ZBTB44, UBP1, ZNF526, ZNF215, YY1AP1, ZNF212, RNF4, ETS1, ZNF214, ZNF213, UBA3, TCF19, TCF12, RERE, HLF, ZBTB32, ELF1, TBX20, ZEB1, NFKB2, ZNF518A, ZNF16, KCNIP3, GLI1, ZNF148, USP16, ZNF730, DEDD2, SERTAD2, ZBTB20, AR, TBX15, BRF1, ZNF287, LOC646626, ZNF544, ADNP, TLE3, GTF2H4, TTF1, ZNF687, CCNC, NFAM1, FOSB, ZNF689, ZNF333, FLNA, ZNF140, TAF11, MED7, TAF12, ZNF747, ZNF692, ZNF136, GRM6, MAP3K10, BRDT, RIPPLY1, RUVBL2, ZNF551, LIN54, RBM39, KCNH2, ZNF484, ZNF555, ZFP64, MTDH, ZNF558, POLR2K, ZNF367, TRIM16, NEO1, ZNF654, ZNF32, STAT6, SUMO1, NR1D2, ZSCAN20, NPAT, CSDE1, ETV2, HBP1, PER3, ZNF266, ZNF566, ZNF565, POLR3K, ZFP57, TBX5, ZNF260, ELAVL2, POLR3C, TP73, SOD2, RPS6KA5, RPS6KA4, YWHAH, UBTF, BCORL1, MEOX1, HNRNPUL1, PHF21A, ZBTB2, MMS19, ZNF584, CNOT8, IL16, LMO3, TLR2, TLR3, CASK, CNOT1, TCEAL7, FOXO4, CBX7, CBX6, IL31RA, IL11, GABPB1, ZNF304, SMARCD2, ZNF300, MIER1, MIER3, ZNF446, ATOH7, ZNF575, GABPB2, SATB1, BCL10, MYO6, RELA, GABPA, MTA3, GRHL3, HES6, ZNF3, IGSF1, ZNF197, EDF1, ZNF587, SMARCA2, ASCL3, CAMTA1, ONECUT1, EFCAB6, DRD3, SOX5, TFEB, HDGF, UBE2V1, SOX7, NPM1, ZNF596, HELLS, RNF14, TFDP1, SETDB1, ZMYM2, SAP18, ARID3B, SNW1, TEAD2, FOXP1, ATF7IP2, SALL3, FEZF2, ATF5, PPIE, ATF3, ZNF419, DYRK1B, EBF1, SMARCC2, HIVEP3, FABP4, DNMT1, RFX2, ZNF414, ABL1, SCMH1, HDAC9, DDX54, HDAC8, PUF60, ZNF85, POU6F1, FOSL2, E2F6, PAX6, ZNF200, RHOQ, PRDX3, PAX3, PAX2, SKAP1, MEN1, MAX, MCM8, PAX9, GTF2A1, PRMT7, POU5F1, PRMT5, PAX7, HOMEZ, PDE8B, CAT, YAP1, NRG1, RBPJL, PSMD9, TBL1XR1, ELP2, NANOG, GSC, ZFY, ZNF92, OTX2, DMRT2, NCOA7, FOXJ3, CDC5L, CDK7, ZFP28, NLRP3, MCM3, CCNL2, EYA3, ADRB2, HOXC12, NCOA3, NCOA4, NRL, MDM2, JMJD1C, MDM4, ING5, ING4, ING3, GLIS2, PPM1A, CTCFL, NFYC, CTNND1, GON4L, NFIX, CHD9, RGMB, NPAS2, PRDM15, ERCC6, REL, CENPB, ZNF707, NFAT5, POU2F1, HINFP, NFATC4, MYCBP, CHD6, NFATC3, ZNF605, CHD3, ERCC2, ERF, CEBPE, VHL, CEBPG, SOX30, HMBOX1, SIRT5, DACH1, ATXN3, NME1-NME2, IRF6, SP4, SP7, NFIC, NFIB, TBL1YNAA16, MED22, RORA, CITED1, SHH, EPC1, CRY2, NKX6-3, ZNF248, CREB3L4, TWIST1, ZNF44, TAD A2A, RCOR3, TAF4B, YY1, ZNF48, ZHX1, ZNF790, EOMES, RXRG, HMG20A, PTPRU, MECOM, UHRF1, PRDM9, ZNF789, BAZ1A, ZNF239, VEGFA, VGLL1, TGIF1, FLII, TGFBRAP1, ZNF382, SUDS3, ZNF79, TADA3, CRTC1, ZNF131, AFAP1L2, ZNF512, HESX1, AHRR, ATN1, INS, LEO1, ZNF124, ARNTL2, NKX2-4, VEZF1, DNMT3B, PLAG1, MDFI, DVL3, UTF1, SMAD9, KLF10, TGFBR1, TP53BP1, ZNF221, ABCG4, USF2, ABCG1, ZNF629, DLX2, NOTCH1, TULP3, SAP130, NUP62, NOTCH4, JAZF1, TGFBR3, RAD54B, NCOR1, KLF4, CCNT2, ZNF487, HNF1A, HTATIP2, ZFP41, TBX22, EID2B, TSG101, PPARG, MITF, CCNT1, ZNF347, HSBP1, RFXANK, DAXX, ZNF678, CAMKK2, ZNF343, MBTD1, ASH2L, ELOF1, ZNF681, GATAD1, MYB, ZBTB22, ATF7IP, ZNF33A, CTBP2, ZNF285, CCNH, SNAPC3, GMEB1, TLE4, TLE1, MBD2, MXD3, ZNF341, NAB2, RIPK1, ZNF749, NAB1, VOPP1, RUVBL1, ZNF33B, NACC1, MYND11, PTOV1, ETV7, SCML2, SCML1, POLR2I, CIC, SEC14L2, ZNF75D, CIR1, PGBD1, SQSTM1, PPP2CA, ACTL6A, BAZ2A, ZNF560, LMX1B, ZNF24, ZFP1, ZNF160, AFF3, ZNF25, ILF3, ZNF669, ZNF22, STAT3, MNAT1, PHF19, PPP1R8, ZNF362, ZNF460, ZBTB4, ZNF461, NR5A2, APBB1, MORF4L1, ATP6AP1, MORF4L2, MAEL, TGFB3, NR2E3, CNOT7, ZNF184, CDKN2A, PROP1, ZNF302, ATF6B, PSIP1, ZNF574, INSR, ZNF180, MBD3L1, CIITA, RBL2, ZNF440, RBL1, SIX2, VAX2, RNF5, ARNTL, NROB1, PKIA, ZNF2, PTHLH, HIF1A, KRBA2, NFE2L2, ERC1, RNF20, ZNF438, MYNN, HMGB1, EID2, CNBP, TSHZ1, HMGB4, SNX6, ELK1, SP110, ZNF331, WT1, VDR, IRAK3, TRIM66, FOXQ1, MEIS2, OVOL2, BLOC1S2, ZNF429, SMARCB1, ZNF696, HOXA6, SKIL, SSX2, RUNX2, RUNX3, TAF4, EHMT1, TAF6, GRIN1, LMCD1, NR4A3, GSC2, KAT5, FOXP2, HOXB3, CDKN1C, RFX3, ZNF410, E2F2, ZFP14, ZNF81, ZNF80, GPBP1, E2F7, PAX5, HDX, ZKSCAN5, FEV, NFATC2IP, ARHGAP22, PCGF5, SAP30, PCGF3, POU5F2, HEY1, ZNF407, LRRFIP1, ACAD8, PDE8A, KDM5A, ZNF280C, KHDRBS2, SSBP2, ZNF90, CDK8, RUNX1T1, ESR1, UBE2I, ESR2, HMGA1, CDK2, GZF1, MYT1L, PRKCQ, ZNF717, CUX2, CUX1, MAPRE3, CID, PEG3, BCLAF1, IRX2, NR3C2, PRDM16, ARID2, GLRX2, HIC1, TSC22D1, TFAM, TNFRSF1A, TSC22D4, SAFB, ZNF708, ECD, NFATC2, ERCC3, ZNF607, NFATC1, INSM1, TXNIP, INSM2, CEBPB, ATXN7L3, SIRT2, GPS2, ID1, HBZ, PSPC1, IRF1, KDM4C, SETD7, MAPK8IP1, IRF4SNIP1, STAT5B, NAA15, ASCC1, MED21, ZNF254, MED20, SOHLH2, MAMSTR, ZNF777, TAF5L, APP, BRPF1, GTF2H2C, TRAK2, MED29, TRAK1, PLA2G1B, ZNF394, FOXO3B, PITX3, TIGD6, ZNF641, PCBD2, PCBD1, ZNF503, MED13, PRDM8, ZFP82, ZNF235, RAB18, MED15, PRDM4, MTF1, HES4, MYBBP1A, MCTS1, DEAF1, ZNF517, ELL, TAL1, MUSK, TCF20, ZNF74, AGRN, NKX2-5, TCF3, NKX2-3, PLAGL2, KLF5, ZBTB49, ZNF69, NTF3, SMAD7, PHB, MAP2K3, SMAD5, KLF11, KLF16, ZNF525, TNNI2, NR1I3, NR1I2, CSRNP2, DMTF1, ETS2, DLX4, HOPX, KLF1, ENY2, ZNF488, COPS2, SNORA25, PPARD, HNF1B, ZBTB33, TAF1A, ELF2, NIF3L1, FOXA2, ZNF532, ZNF296, EZH1, TAF1D, EZH2, ZBTB39, TP63, GLI3, HSF1, SERTAD3, ZNF879, HSF4, ZFAT, BRD8, ZCCHC12, SNAPC5, NFKBIZ, RBBP4, ZNF354A, POGZ, ZNF541, ZFP30, SNORA32, SF1, ZBTB26, ECSIT, MBD1, ZNF688, GTF2H2, GTF2H1, RBBP8, INHBA, BRWD1, POGK, CDK11A, MED8, PFDN5, ZNF480, ZNF483, ZNF554, ZNF469, ZNF468, CREM, ZNF556, FHL2, EHF, WTIP, ZNF34, ZNF30, ZNF169, XBP1, REXO4, PER2, ZNF473, BCL9L, TCEA1, BAZ2B, ETV6, TLX2, ETV4, TLX1, ZFP91-CNTF, MYF6, ZNF563, DGKQ, ZNF454, ZNF28, TRIM27, ZNF667, PHF10, TBX1, IGF2, TRIM24, STAT1, WWTR1, ZNF665, ZNF157, ILF2, MEOX2, YAF2, ZNF761, ZNF764, PHF5A, APBB2, PBX3, ZNF257, DNM2, PBX4, ZNF573, AKNA, THRB, ZNF451, NAB3, CAML, CNOT2, FOXO6, CBX5, GATA2, CGGBP1, ZNF577, SCRT2, POU2AF1, FOXN2, FOXN4, HOXD9, ASCL1, ZNF195, TCFL5, TIMELESS, TFAP2B, MNX1, TFAP2A, GCLC, ZNF841, NR2C2, ARNT, CXXC1, ZNF695, RPL6, ZNF697, TFEC, TEAD4, NKX3-2, TFDP3, RHOXF2, EWSR1, RHEBL1, CREBZF, GSX1, TAF7, MALT1, ZNF836, BRCA1, ZNF837, HOXB1, NRF1, ZNF311, EBF3, HOXB5, HIVEP2, IKBKB, PDCD6, HDAC7, HDAC6, PTGES2, ARID4A, ARID4B, ZNF202, ZKSCAN1, PAX1, ZNF207, BZW1, ACVR1B, ZNF729, MAZ, ZNF404, PAX8, PSMC3IP, POU4F1, SOX18, E4F1, NFX1, ELP4, PPP2R1A, IRAK1, |

TABLE 7-continued

| Geneset | Genes |
|---|---|
| | ZNF280B, EGR2, SP100, SOX13, SLA2, LDB1, ARID5A, CDK9, HLTF, PURB, PURA, TARBP1, SARNP, EYA4, IFNAR2, HIPK1, BTG2, FAM120B, NCOA6, UBC, ZFPM2, SUPT3H, DPF3, SBNO2, IRX5, FOXM1, CTNND2, TRIB3, NR3C1, TCF7L2, TCF7L1, CALCOCO1, CCDC59, CALCA, MSX2, ZNF703, ZNF512B, TSC22D2, HAND2, PRDM10, ING1, VPS36, CHD4, TERF1, ERG, FOXL1, EDA2R, SIRT6, ISL1, ATXN1, ISL2, IRF3, JAK2, TBL1X, SCAND1GDF2, ZNF630, STAT5A, ZNF639, ZNF782, PDLIM1, REST, HOXD10, FLI1, ZNF772, ZNF396, ABRA, CREB3L1, TIGD4, RARA, SUPT5H, CCAR1, ZNF43, RAN, RCOR1, NODAL, EMX2, ZNF791, MED11, HNF4G, PROX2, TOX2, MED10, ZNF500, ZNF787, SCYL1, ABT1, PARP15, MNT, ZZZ3, CRTC3, TMX1, TADA1, MYT1, JRK, ZNF229, ZNF225, HEXIM2, HEXIM1, HTATSF1, CASZ1, HOXA10, LHX4, NKX2-1, AEBP2, ESRRA, KLF13, SMAD6, ASXL1, CREBBP, ZNF621, KLF14, EN1, ZBTB45, SHOX2, RNF6, FOXI2, CSRNP3, ZNF211, MLX, ZIK1, ZFHX3, TAF1B, LZTS1, ELF4, ZNFX1, ELF5, ZFP42, ZNF345, ZNF679, ZBTB38, HSF2, ZNF737, HSF5, ZNF540, ZNF492, FOXB2, BHLHE41, CTBP1, ZNF283, ZNF547, BATF2, LEUTX, TP53, SCAI, NDUFA13, ZNF143, ZBTB25, ASH1L, KCNH7, ZSCAN16, CDK11B, ZSCAN12, CLOCK, MED1, CARHSP1, LCORL, ZBTB11, ZNF557, ZNF324B, ZNF75A, ZNF655, ZBTB17, ZNF780A, ZNF174, POLR2A, NR1D1, BCL11B, BCL11A, ACTL6B, ZNF471, THAP1, BRMS1L, JARID2, AFF1, PHF12, TRIM22, ATXN3L, ZNF671, MAPK14, NEUROD6, NR5A1, THRA, ZNF583, LMO4, CRABP2, CNOT3, TLR4, HOXD1, ZIC3, GATA1, RCBTB1, CASP8AP2, HOXC5, GATA4, TDGF1, ZNF444, DDX20, SATB2, HDAC10, MLXIPL, HDAC11, NROB2, TRIM33, TIAL1, SPDEF, ZNF431, ZNF589, TFB1M, HMX3, TSHZ3, LITAF, TFE3, ATF2, TEF, HNRNPD, ZNF426, ZNF420, CREBL2, TRIP4, BHLHE23, EPAS1, TEAD3, MYPOP, UIMC1, MSL3, SALL2, HOXB4, HOXB2, MAFIP, ZNF317, NEDD4, SALL1, HOXB6, ATF7, GTF2F2, ZNF84, E2F3, E2F8, ZNF205, ZKSCAN4, CRX, RPS3, BARX2, FOSL1, ALX3, KHDRBS1, ELP3, EGR3, ZNF280D, ARID5B, DMRT1, CCNL1, RING1, TOPORS, HMGA2, EYA1, NCOA2, EYA2, HOXC13, GHRH, HIPK3, NCOA5, UBB, SMARCAD1, BTAF1, IRX6, NDN, HAT1, HCFC2, NFYA, POU1F1, GRAMD4, TRIB1, RAX2, HMGXB4, POU3F4, EPO, ZBTB7B, CBY1, ID2, SP1, HIF3A, DENND4A, TSSK4ZNF57, CITED2, NONO, PGR, CDCA7, SIN3A, NKX6-2, PHTF2, MED27, CREB3L2, ZNF397, ZNF107, RAB26, FIZ1, PHOX2A, ZNF506, STRN3, ZNF507, RXRA, ZHX2, ZNF234, ZNF784, BAZ1B, VGLL2, NANOGP8, TGFB1I1, ZNF41, CRTC2, ZNF519, TAF9B, ZNF230, ZNF616, SLC11A1, DRAP1, LHX9, ZNF70, TCF24, TCF23, BMP4, DNMT3A, ZNF528, ZNF624, BMP2, KLF8, ZNF121, SRA1, SMAD3, ZNF521, TFCP2, SMAD1, ZNF497, ZSCAN2, ZBTB43, DLX1, RNF2, SMURF2, ZNF114, RBPJ, FOXI1, TCF15, NCOR2, ZNF18, BACH2, HELT, ELF3, INS-IGF2, GRIP1, ZNF12, ZEB2, DMAP1, YBX1, FERD3L, CCNE1, BLZF1, NOD2, RRN3, PBXIP1, ZNF738, ZNF683, ZNF146, ANP32A, SPIC, DMRTC1B, FOXN1, NR2F2, NR2F1, TAF1L, ZNF281, BATF3, ZNF282, ZNF142, GTF2H3, ZNF141, TLE2, ZNF549, ZBTB24, ARHGEF11, CIAO1, ZNF138, MED4, ZSCAN10, FOXD4L1, ZNF135, USP21, CAND2, SPZ1, MAP3K13, KCNH5, ZNF276, THAP7, ZNF559, BDP1, NUFIP1, ZNF366, ZNF653, ZNF652, MYCBP2, SORBS3, STAT4, ZSCAN22, GATAD2A, PER1, MEIS3P1, AATF, SUPT4H1, ETV5, ZNF267, ZNF564, POLR3F, ZNF568, ZNF771, ZFP3, ZNF668, PREB, RLF, ATRX, CNTF, JMJD6, SFPQ, YWHAQ, PBX1, ZNF256, RBM15, FOXE3, BMP10, MYOD1, ZNF823, TBP, MAF1, GDNF, CBFB, TCEAL4, KDM1A, DPRXP4, MYOCD, OLIG3, GATA6, HOXC4, TFB2M, ZNF579, TGS1, SCRT1, ZNF594, GTF2IRD2, ARID1A, SIX4, ARID1B, SLTM, ASCL2, KDM2B, RIPK2, EDA, LBX2, ZNF436, ZNF586, MEAF6, ZNF430, BLM, ADORA2A, ABCA2, SRF, NR2C1, TCERG1, HOXA3, HOXA4, ZNF326, OVOL3, ELK4, TFDP2, SSX3, DBX1, TAF2, MAFG, SREBF1, RFX8, TAF1, TESC, TAF3, GSX2, RFX4, RFX7, SUV39H1, NR4A1, FOXP3, ARID3C, SUV39H2, ATF6, ATF4, HILS1, ZNF316, SMARCC1, EBF2, IKBKG, ZNF415, EAF2, CHURC1, E2F5, HSFY2, HR, PAX4, CBFA2T3, PDCD4, MCM7, ZNF727, GTF2A2, RHOA, SOX15, ZNF721, NFIL3, KDM5C, ZFX, BANP, IRF2BP2, IFI16, AMH, NCOA1, BPTF, KHSRP, ZNF710, NRK, ZFPM1, ACVR1, GLIS3, TNF, ABLIM3, NFYB, ERCC8, PRDM12, POU2F2, PTH, KDM3A, CAMK2A, ZNF700, ENO1, MAF, WDTC1, CREB1, PSRC1, SAP30BP, CENPK, PPP1R13L, MED30, SP2, IRF7, DR1, ATXN7, IRF8, KDM4A, ZBTB8AMEF2B, FST, HIRA, ZNF251, HOXD11, CTNNB1, SIN3B, ZNF773, TIGD3, IFNK, BCL7A, ZNF101, PHOX2B, ZNF100, ZNF649, ZNF502, TBR1, MED19, MAPK1, ZNF233, JUN, RPS14, LRCH4, ST18, SIVA1, HOXA13, ZNF610, ZNF77, ZSCAN5A, ZNF619, ZNF615, ZSCAN5B, ZNF513, FOXH1, NR1H2, ZNF227, ZNF226, LHX1, ZNF223, ZNF799, IL17F, ZNF222, LHX5, SUPT7L, ZNF529, ZBTB47, MAP2K1, ZNF620, ZNF66, SMAD2, SMYD1, EN2, DDX5, ZNF626, ZNF585A, ZNF634, ZNF627, USF1, ZNF524, ZNF585B, TULP4, CSRNP1, SUPT16H, MZF1, BCL6B, KLF2, BMP7, ENG, BMP6, ZNF19, ZNF536, ZNF534, TBX21, ZNF530, ZNF155, SPI1, ZNF154, RASSF7, ZNF880, ZNF677, ZNF682, ZNF735, SPIB, ZNF493, ZNF546, CCNK, ZNF548, SNAPC2, ZNF354B, TLE6, ZNF337, ZNF684, SCAP, JMY, SIGIRR, TAF10, CHMP1A, GTF2I, KCNH6, ZNF550, ZSCAN18, TBX18, NSD1, KCNH4, ZFP62, ZNF274, ZBTB10, PML, ZNF35, ZNF852, LANCL2, BCL6, ZNF268, ZNF561, FOXD1, ZNF562, ZSCAN29, SIM1, MYSM1, MLLT3, SIM2, BCKDHA, SSRP1, IL6, ZNF567, TRIM28, AFF4, SNAI2, ZNF662, ZNF358, ZNF664, MEF2D, ZNF672, MRPL28, BNC1, FOXE1, NEUROD1, NHLH2, NEUROD4, ZNF462, ZNF765, RBM14, ZNF570, ZNF571, ZNF572, NHLH1, IL2, CCDC85B, ZNF580, RBM4, ARNT2, ZNF827, FGF10, PDX1, NFXL1, TGFB1, TCEAL3, BATF, GTF2E1, ATOH1, GTF2E2, MIER2, MDFIC, TARDBP, SMARCD1, ZNF442, ZNF443, RPS27A, ZNF576, MTA2, MTA1, VAX1, GRHL1, GRHL2, SIX6, DDIT3, SUZ12, HHEX, ZNF439, EP300, REM2, ZNF433, ZNF432, TFAP2E, UBA52, SMARCA4, ZNF845, EID1, ZNF844, CAMTA2, SETD1B, ONECUT2, NOSTRIN, ELK3, LIN28A, PYDC1, ZNF846, HOXA1, MEIS3, HOXA7, JUND, NKX3-1, ZNF597, RUNX1, DNAJA3, MAFF, TAF8, JRKL, NR4A2, BRCA2, TEAD1, GTF2A1L, ZNF320, SAFB2, FEZF1, GCM2, HDAC3, SALL4, PSMC5, HDAC2, PHF1, EBF4, HOXB7, ZNF418, PRKAR1A, ZNF416, TMPO, DNAJB6, ZNF208, ZNF83, HSFY1, NR6A1, PRRX1, PRRX2, ZKSCAN3, BUD31, ZKSCAN2, FUBP1, BARX1, HMOX1, HEY2, MSGN1, ZNF408, ALX4, FOXJ2, EGR4, OTX1, LEF1, TMEM189, NRIP2, PCGF1, TARBP2, CD86, ZNF714, ZNF716, ERN2, ZNF702P, IRX4, ZNF808, ZNF806, ING2, STON1, ZNF805, TGIF2LY, TNFRSF4, MACC1, DPF1, NPAS1, CHD8, TSC22D3, ZNF600, CDYL, CEBPZ, CHD2, MYOG, POU3F2, KDM3B, GFI1, ZNF701, ZNF606, CHD5, CEBPA, FOXL2, NACC1, TNFSF4, L3MBTL2, CENPF, CREB5, IRF9, IRF5, SP3, HEYL, THRAP3, SP6, SETD2, MESP2, NFIABBX, HOXD12, RORC, MXI1, HMGN5, ZNF253, CITED4, GTF2IRD2B, RAB1A, ZNF778, ZNF775, MED26, WWP1, YEATS2, CCNA2, PITX1, TBPL1, PITX2, ZNF45, RARG, RCOR2, NKX2-8, ZNF501, TAF6L, PIAS3, PARP14, PRDM5, SMARCAL1, TGIF2, VGLL4, TRAPPC2, ZNF614, ZNF516, ZNF132, NFKBIA, ZNF511, MYBL2, ZNF514, ZSCAN5C, STON1-GTF2A1L, LHX6, BCOR, LHX8, NR1H4, ZNF398, NKRF, ZBTB48, KLF6, NRBF2, MAML1, SMAD4, MSTN, CELSR2, NKX6-1, NOTCH3, ZNF217, PPRC1, ZFHX2, ZNF385A, ZNF219, CHAF1B, BACH1, GTF3A, PPARA, ZNF17, ZNF292, ZNF486, EVX1, NFKB1, RLIM, GLI2, HLX, CREG1, SIK1, FGF2, IHH, GTF2H5, MBD3, MXD1, FOXR1, ZNF335, MYCN, MXD4, ZNF334, FOXD4L4, ZNF134, CAND1, KCNH3, SRCAP, SCML4, ZNF273, ZNF552, ZNF467, VENTXP7, ZBTB9, ZNF658, ZBTB16, ZNF177, ZNF175, SUFU, ZNF660, AGT, GBX2, GBX1, ETV1, ZNF286A, TCEA2, MLLT6, IL4, FADS1, HCLS1, MYF5, TBX4, ZNF569, YWHAB, TNP1, ZNF26, ZFP2, ZNF20, PKNOX1, RBAK, ZNF763, ZBTB1, PBX2, JDP2, TMEM189-UBE2V1, CBX3, CBX2, FOXO3, TCEAL1, ZNF829, CNOT4, PNN, HOXC6, ESF1, IGHMBP2, WNT1, HOXC8, ZNF181, RNF141, NLRC3, SMARCD3, SND1, EED, OLIG1, ZNF445, ATOH8, ZNF593, PKIG, SIX3, ZNF8, IL22, HOXD8, MGA, TFAP2D, NFE2L3, ASCL5, XRN2, HMGB2, TSHZ2, SETD1A, KEAP1, SOX6, ATF1, SRY, HOXA2, ZNF324, HOXA5, SSX7, SSX4, RNF10, TAF9, SSX5, TRAF7, THAP11, NFE2, TAF5, FOXA1, HDAC4, CDKN1B, SEBOX, HDAC1, ZNF417, PNRC2, GTF2F1, HABP4, ZNF318, MAFA, AEBP1, DEDD, DMRTA2, PAWR, CBFA2T2, TMF1, PRR15L, PCGF2, ATP8B1, POU4F2, SOX17, KDM5B, RHOH, EGR1, RB1, OSM, ZMIZ2, ZNF711, KRTAP1-1, COMMD7, ZNF99, DPF2, ABLIM2, GLIS1, PRKDC, NPAS3, TSPYL2, POU2F3, CHD1, KAT2A, ZBTB7A, HSFX2, ZNF818P, L3MBTL3, VSX2, VSX1, SIRT1, MED31, GMCL1, SRFBP1, PHB2, MESP1, POFUT1, CRK, PA2G4P4, VPS25, F2RZNF582, HMGN2, GDF7, |

TABLE 7-continued

| Geneset | Genes |
|---|---|
| | STK36, RBM15B, XRCC6, TCEAL6, TCEAL5, TCEAL8, BMP15, NR2E1, ZFP92, EPC2, HOXC9, MED28, GATA3, ZNF578, OLIG2, TIGD7, ZNF391, TWIST2, ZNF595, ZNF441, BARHL1, BARHL2, TADA2B, RELB, MED12, PIM1, MECP2, FOXN1, ZHX3, ELL3, TRERF1, JUNB, GTF2H2B, HES1, KDM2A, SMARCE1, MED16, MED18, ZGLP1, DPRX, MNDA, NFE2L1, PRDM1, TFAP2C, PIAS1, PAF1, TFAP4, SUMO1P3, ZNF76, ONECUT3, SOX2, ANKRD30A, ZNF510, SOX4, ZNF232, HOXB13, NEDD8, TRRAP, SOX9, MEIS1, SOX8, MED12L, ZC3H8, TAL2, PFN1, NKX1-2, SNF8, OVOL1, HOXA9, MAML3, ASF1A, NAT14, HIP1, ZNF527, ASXL2, BMP3, YEATS4, KLF9, KLF12, RFX5, SUB1, MAFB, RFX6, ATAD2, NEUROG2, ZSCAN4, MED13L, NOTCH2, GCM1, HOXB8, TRPS1, DMRTC1, PNRC1, RFX1, AIRE, HIVEP1, ZNF876P, ZNF117, CRYM, RSC1A1, PHF6, KLF3, KCNH1, BMI1, ACVRL1, ZNF518B, FOXK1, FOXA3, PRDX2, PHF20, DEK, ZNF10, TERF2IP, ZNF14, FOXS1, GFI1B, LBH, ZNF726, PRMT6, RTF1, ZFPL1, ZNF491, BRD7, ZNF732, NOBOX, MKX, ZNF496, MYC, ICAM1, SOX10, ZNF93, NOTO, SNAPC1, ZNF479, SOX14, SOX11, DMRT3, ZNF91, SOX12, MCM2, MCM4, DMRTB1, GTF2B, MCM5, MIXL1, TTF2, PRPF6, CTNNBIP1, FOXD4L3, SS18, ZNF718, TAF13, HIPK2, ZNF277, ERN1, ZNF713, USP22, ZNF98, ZNF275, ZBTB6, FRYL, ZNF800, HCFC1, PRDM13, MRPL12, CHD7, ZSCAN21, MAP3K1, RB1CC1, BCL3, POU3F1, CC2D1A, FOXD2, TLX3, FOXD4, ZNF263, HSFX1, IL5, TBX3, CREB3, ZNF770, IGF1, STAT2, ZNF705G, ZNF165, PKNOX2, ZNF670, ADNP2, SP5, KDM4D, ZNF768MED25, ZNF781, HOXD13, RORB, SOHLH1, TBPL2, FOXF1, IFNG, FOXF2, CRY1, S100A1, RREB1, NKX2-6, MED 14, HMG20B, ZNF792, ZNF793, MSX1, C14ORF39, CCR6, PIAS4, IFNB1, BHLHA9, ZNF786, ZNF785, HES2, SHOX, ZIM3, ZNF613, GPBP1L1, TFCP2L1, HOXA11, CALR, ZNF618, OTP, IL17A, CENPBD1, NKX1-1, LYL1, LHX2, ZNF71, NKX2-2, ZNF623, ASXL3, ESRRB, MAML2, SKI, KLF15, ZSCAN1, ZNF628, DLX3, FOXI3, DMRTC2, DLX6, DLX5, ZNF658B, CHAF1A, YBX2, HIF1AN, ZNF680, ACTR5, NR2F6, ZNF490, CSDC2, TBX10, BRF2, ZNF354C, GMEB2, PTF1A, SPEN, MED6, EREG, MED9, FOXC1, KCNH8, ZNF746, FOXD4L5, POLR2L, TCEA3, MLLT1, PEX14, GATAD2B, LIMD1, ZSCAN23, FOXD3, ETV3, POLR3G, ZNF264, TBX2, NLK, LMX1A, ZNF23, SNAI3, ZNF860, BNC2, IFT57, NEUROD2, ZBTB5, ZBTB3, ZNF581, HMX1, ZXDC, CBX4, ZXDB, FOXO1, ANKRD1, TCEAL2, CNOT6, ZXDA, IL10, GATA5, IL1B, AKIRIN2, MBD3L3, ZNF592, LBX1, MBD3L4, ZNF814, ZNF189, SIX5, ZNF7, FOXN3, AHR, ELL2, PA2G4, SIX1, HOXD4, SMARCA5, DNTTIP2, LRPPRC, ASCL4, SOX1, CYTL1, ZNF329, BTF3, BHLHE40, ASF1B, SLC30A9, ZNF423, TPRX1, BHLHE22, ARID3A, NEUROG1, ESX1, NEUROG3, MAFK, SREBF2, HDAC5, EAF1, HOXB9, ZNF319, E2F1, E2F4, SOX21, RSF1, CTCF, SCGB1A1, DMRTA1, FUBP3, PCGF6, POU4F3, ALX1, IRAK2, ZNF280A, SSBP3, KHDRBS3, RAX, FOXJ1, PADI4, NPAS4, IRF2BP1, UBN1, MSC, NRIP1, MCM6, HOXC10, HOXC11, BTG1, WASL, LCOR, KDM6B, ZBTB8B, IRX1, TGIF2LX, EGLN1, DRGX, HIC2, HAND1, ZNF709, PYCARD, POU3F3, MLXIP, TERF2, NACC2, KAT2B, SIRT4, SIRT7, SIRT3, DACH2, KDM4B, MAMLD1, IRF2, ID4, JAK3, ID3ZNF56, SLC2A4RG, HMX2, CDX4, GDF6, ZNF250, CBX8, TAF7L, MAGED1, ZNF182, ZNF774, BHLHA15, ZNF449, YY2, ZNF646, ZNF648, ZNF813, FRY, PRDM7, HES5, HES3, GTF2IRD1, HOXD3, FOXG1, SMARCA1, IRAK1BP1, UNCX, EID3, SOX3, FIGLA, VENTX, DUXA, MYBL1, LIN28B, ZNF699, DBX2, SSX2B, ZNF425, ZNF599, RHOXF1, SSX1, DMBX1, NFE4, ARGFX, ZBTB46, KLF17, BRIP1, FOXP4, SFMBT1, ZNF835, SFMBT2, ZFHX4, ISX, TCEANC, ZBTB34, EVX2, POU6F2, FOXK2, ZNF676, ZNF675, ZNF674, ZBTB37, FOS, SSX4B, ZNF350, TICAM1, ZNF720, SERTAD1, ZNF284, SNAPC4, ZNF543, RHOXF2B, RBBP7, ZFP37, FOXR2, UBE2N, CARD11, ACVR2B, CD80, ETV3L, ZMIZ1, FOXC2, CARM1, ZNF740, FOXD4L6, IRX3, ZBTB12, ZNF780B, PRDM14, ZNF470, TBX6, BGLAP, CEBPD, ZNF705A, FZD1, ZNF705D, POU5F1B, DBP, ZNF862, KLHL31, ZNF766 |
| Chromatin organization | KIF25, CBX1, CBX7, CBX6, MEN1, SMARCD2, PRMT7, GPX4, PRMT5, TLK1, TLK2, USP16, KDM5D, TBL1XR1, SATB1, AIFM2, DFFB, TTF1, EYA3, TAF12, RFC1, PRDM6, BRDT, RUVBL2, JMJD1C, SMARCA2, SUPT6H, ING5, ING4, ING3, TSPY4, CTCFL, TRIM16, SYCP1, VPS72, CHD9, NCAPH, CHD1L, NCAPG2, NPM1, PBRM1, RNF168, FBXO4, CHD6, HELLS, CHD3, SETDB1, BRD1, HIST1H2BD, SETDB2, SMYD3, EHMT2, RPS6KA5, TEX15, BCORL1, SMARCC2, PHF21A, DNMT1, CDY2A, HDAC9, HDAC8, REREMORF4L1, HMGB1, RAD51C, KDM6A, HIST4H4, TSPY1, HNF1A, TADA3, MORF4L2, MAEL, ARID2, H2AFB1, EPC1, SET, SMARCB1, SAFB, LEO1, ACTL6A, HIST3H2BB, KDM5A, BAZ2A, DNMT3B, APC, EHMT1, TADA2A, RBL2, MSH5, RBL1, HMG20A, NUSAP1, KAT5, HMGA1, SMC2, ATXN7L3, SIRT2, PRDM9, SAP130, SETD7, KDM4C, RUVBL1, IRF4, APBB1, RNF20, NCOR1, SUDS3ENY2, PTGES3, ARID4A, EZH1, EZH2, ARID4B, NAP1L1, NAP1L3, NAP1L4, LATS1, CBX5, HIST2H4B, BRPF1, TAF5L, CDCA8, DKC1, PRMT8, H2AFY, HSF4, RTEL1, BRD8, H1F0, UBE2A, RBBP4, BRCC3, HIST1H1C, AIFM1, CECR2, H2AFJ, HLTF, DCLRE1C, EYA4, NCAPH2, AKAP8, SUPT3H, DPF3, HIST1H2AA, NEK2, NR3C1, TCF7L1, HSPA1L, HJURP, CENPA, H1FOO, CHD4, ERCC1, TERF1, MSH6, PDS5B, PHB, CENPE, RNF8, MSL1, CENPV, CABIN1, PRM1, KLF1, MPHOSPH8, HDAC7, TSSK6, TEX11, HDAC6, UBE2E1SMARCAD1, UTY, HIST1H2AD, HAT1, TADA1, TTN, TSPYL4, POT1, RCBTB1, HIST1H2BM, NIPBL, H2AFV, SEH1L, NPM2, H2AFZ, ACTL6B, HIRIP3, ACIN1, SUPT5H, TINF2, HIST1H2BB, AEBP2, CPA4, SATB2, RCOR1, MSH4, CREBBP, RING1, HDAC10, TP53, WRN, HDAC11, HMGA2, UIMC1, NCAPD3, HIST2H3D, CHRAC1, MSL3, EYA1, EYA2, FANCD2, WRAP53, HIST2H2BF, ASH1L, HIST1H2AJ, HIST1H3F, EP400, SMC1BKIFC1, MEAF6, BLM, PTTG2, DMAP1, MLH3, TSPY10, RPA1, KDM1A, DDX11, SOX15, KDM3A, SUPT4H1, ERCC4, KDM5C, HIST1H4G, DNMT3A, SMG6, SUV39H1, CDC23, ARID1A, BANP, ARID1B, LIG4, FOXP3, RAD54L, UBE2B, MIS12, SUV39H2, KDM2B, HILS1, SYCP3, BPTF, BAZ1B, JMJD6, SMARCC1, RNF2, ATXN7, H2AFY2, USP21, RRS1, H3F3C, PRM2, KDM4A, SMC1A, RNF40ING2, SETD1B, RBM4, HIRA, INO80, BNIP3, PTTG1, HIST2H2AB, CHD8, CDYL, STRA8, HIST2H2AC, CDY1B, SMARCD1, CHD2, SUPT7L, KDM3B, CHD5, MYSM1, TERT, L3MBTL2, MTA2, CENPF, BRCA2, SMYD1, NDC80, H2AFB3, SMC4, NCAPD2, SUZ12, TAF10, CHMP1A, HDAC3, EP300, HDAC2, PHF1, ZWINT, HIST1H2AI, SUPT16H, H3F3A, TEP1, HIST1H2AM, RBM14, SETD2, HIST1H2AL, NSD1, SMARCA4CBX3, CBX2, PCGF2, H2BFS, HIST1H2BK, SMARCD3, SETMAR, EED, STAG3, HIST3H2A, H2AFX, TOP2A, KDM5B, HIST1H1E, HIST1H1D, HIST1H1B, HIST1H1A, RB1, MBD3, TAF6L, RAD50, HIST1H1T, SMARCAL1, PRDM5, PELO, SRCAP, MAP3K12, HMGB2, HIST1H2AG, SETD1A, PRKDC, SOX6, TSPYL5, TSPYL2, CHD1, TAF9, BCOR, PINX1, KAT2A, NFE2, TAF5, MSH2, NASP, DLGAP5, TNP1, SIRT1, SMC3, CTR9, TNKS1BP1, HDAC4, HDAC1, PRM3, H3F3B, CHAF1B, HIST1H3GUTP3, BMI1, HMGN2, HP1BP3, SOX2, XRCC6, TRAP, TERF2IP, H2AFB2, EPC2, ACD, GFI1B, CHD7, NCAPG, CDYL2, PRMT6, RTF1, ASF1A, HIST1H4J, ZW10, HIST1H2BA, YEATS4, SMCHD1, SHPRH, KIF18A, H2BFM, MCM2, CENPH, DOT1L, REC8, HUWE1, SMARCE1, KDM2A, PAF1, USP22, CDY1, PARP1, VCX, KDM4DXRCC5, HIST2H2AA3, NBN, RSF1, SOX21, CBX4, CTCF, H1FX, NAP1L2, NAP1L5, HIST2H4A, NAP1L6, HIST1H2BO, HIST1H2BN, BRPF3, HIST1H2BL, HIST1H2BI, HIST3H3, CDCA5, HMG20B, ESPL1, PADI4, UBN1, MAD2L1, HIST2H2BE, SMARCA5, KDM6B, DSCC1, TNFRSF6B, HIST1H2AB, HIST1H2AC, HIST1H4L, H1FNT, HIST1H4K, SOX1, TSPYL1, HIST1H4A, HIST1H4B, HIST1H4E, HIST1H4F, HIST1H4C, HIST1H4D, ASF1B, TERF2, BUB3, HIST1H4H, HIST1H3J, HIST1H2BC, KAT2B, MSH3, HIST1H2BE, HIST1H2BF, PTTG3P, HIST1H2BG, HIST1H2BH, HDAC5, HIST1H3A, KDM4B, HIST1H3B, HIST1H2AH, HIST1H3C, HIST1H3D, HIST1H3E, CHAF1A, HIST1H3H, HIST1H3ITSPY2, HIST2H3A, TSPY3, HIST2H2AA4, HIST1H2AE, CDC73, RBBP7, CBX8, H2BFWT, SYCP2, DAPK3, TSPYL6, HIST2H3C, UBE2N, PRDM7, CDY2B, HIST1H2BJ, SMARCA1, HIST1H4I, CARM1 |
| Cell cycle | CROCC, AIF1, BTRC, PKMYT1, RBM7, CDC16, FOXO4, WTAP, CDKN2C, TLK1, TLK2, CDCA3, ZC3HC1, POLE, UBR2, TACC1, DCTN1, DCTN2, RAD1, UHRF2, KRT18, SGSM3, PPP5C, NEK1, CHEK1, CHEK2, SYCP1, PIN1, PLAGL1, TUBB, SAC3D1, NCAPG2, NPM1, PBRM1, UBE2D1, TDRD1, NUDC, HELLS, TFDP1, PCNT, PMF1, PSMB9, PSMC6, NOLC1, |

TABLE 7-continued

| Geneset | Genes |
|---|---|
| | PLK2, POLD1, UBA3, ABL1, GAS2L3, CLSPN, KIF25, E2F6, MLH1, CDT1, MEN1, MCM8, RNF103, CABLES2, USP16, PSMD7, FANCA, PSMD9, DHCR24, CDC6, CCNF, CDK7, CDC5L, MCM3, UBE2C, NEK11, PFDN1, PSME1, SLC26A8, NSL1, MDM2, MAPRE2, HORMAD2, MDM4, SPAST, ING4, CKS1B, CAMK2G, CETN3, CTCFL, PSMF1, NCAPH, HSPA2, BCL2, CAMK2D, HINFP, NPAT, HBP1, EXO1, TP73, TEX15, CUL4A, GSPT1, IRF6ADCY3, RAD51C, MAEA, DTYMK, MAEL, AURKB, CUL3, CUL5, CDKN2A, ILK, PARD3B, CUL1, ASPM, EGFR, RBL2, RBL1, ANAPC4, SKP1, VASH1, TACC2, UHRF1, PRDM9, TBRG1, CNTROB, MAPK7, RAD17, NEK3, ANAPC13, NEDD9, ANLN, ANAPC10, CCNG1, SESN2, ITGB1, LLGL2, DUSP13, SMARCB1, PSMB3, SKA3, CDKN1C, PSMC4, RAD54B, NCOR1, MYH10, KIF23, CCNT2, E2F2, LZTS2, TSG101, E2F7, CCNT1, RHOU, DAXX, EVI5, PSMD2, PIWIL1, KLK10, DYNC1H1, CDC7, ARHGEF2, CCNH, DSN1, NUSAP1, UBE2I, CDK2, RAD51, SPDYA, BTG4, IL12A, TOP3A, RUVBL1, MAPRE3, BCAT1, ZMYND11, PARD3, HAUS6, CEP120, LIN9, CEP55, MDC1, CYP26B1, NFATC1, APC, TXNIP, MSH5, GMNN, ANXA1, STRADA, ILF3, APPL1, CEP63, SMC2, SIRT2, GPS2, CDC25B, MNAT1, PSMD12, PSMD11, GSK3B, CALM3, CIT, CDK20, APBB1, CALM2XRCC2, CUL2, CDCA8, APP, CCNA1, ANAPC2, SKP2, MND1, GPR132, PSMA1, TIMELESS, SPAG5, PSMA4, SYCE1L, NEK9, STMN1, AKAP8, NEK4, MCTS1, BBS4, FZR1, NEK2, PSMB4, FBXO43, CLASP1, SKA2, TCF3, TREX2, GAS2, SYCE1, GAS7, CDC27, PSMB8, BRCA1, ATM, RNF8, DMTF1, FBXO31, KCTD11, UBE2E1, CDC14A, LATS1, LATS2, ACVR1B, SBDS, FANCI, PSMC3IP, RANBP1, E4F1, CABLES1, RBBP4, EGFL6, SF1, RAD52, GAK, RBBP8, CDK3, INHBA, RIF1, CCND3, CDK11A, UBC, ADAM17, USH1C, RBM38, HAUS7, HAUS8, CHFR, DMC1, HAUS4, DHH, FOXM1, SPO11, TCF7L2, CENPA, HJURP, CAMK2B, PPP3CA, THBS1, ING1, H1FOO, TERF1, MSH6, PDS5B, CENPE, STRADB, RACGAP1, CDC25C, APPL2, DUSP1, RASSF1, GSPT2, CENPV, RACGAP1P, GAS2L1, PRM1, CUL4B, PES1, APBB2, ARAP1, MPHOSPH8, TEX11, DNM2STEAP3, E2F3, LZTS1, PRC1, E2F8, ZFP42, AURKC, TTN, TGFB2, RCBTB1, CEP250, CASP8AP2, SEH1L, PCBP4, INCENP, NUP37, PSMD6, SUPT5H, STAG2, CCAR1, ANAPC1, KHDRBS1, CRYAA, RAN, RINT1, LIG3, TP53, HMGA2, WEE1, NCAPD3, PSMA6, FANCD2, CDK2AP1, PSME3, CDK11B, TMPRSS11A, SIAH1, UBB, DST, HAUS2, LRRCC1, KATNB1, TIPIN, IFNW1, MRPL41, CEP164, ZNF655, ANAPC11, RCC1, PRR5, NIPBL, MACF1, CDC123, TNKS, THAP1, CLASP2, ZWILCH, LMLN, LFNG, CREBL2, GPS1, CKAP2, UPF1, CCPG1, AK1, MSH4, PCNP, GAS1, SUGT1, TET2, CDC26, RGS14, NAE1, BARD1, TXNL4A, SMC1BKIFC1, TUBB2A, JAG2, PTTG2, MLH3, KIF2B, KIF2C, CCNE1, MCM7, DDX11, CDKN2D, MAP3K8, PIWIL3, DNAJC2, TAF1L, VCPIP1, CDK1, CGRRF1, LIG1, KIF15, BANP, CDK6, LIG4, DCTN3, ESCO2, EIF4G2, FMN2, SASS6, WBP2NL, SYCP3, MAPK4, CLIP1, MAD2L2, ACVR1, PPP6C, HAUS3, BLM, HAUS1, BCCIP, DMWD, SESN1, UHMK1, RPA1, CYLD, PRUNE2, CYP27B1, KATNA1, BUB1, TFDP2, PKD1, TUBE1, CAMK2A, TAF2, TXNL4B, PARD6B, TAF1, CEP135, PSRC1, SUN2, SUV39H1, SMAD3, SYCE2, CDC23, RPL24, TPD52L1, CDKN3, RAD54L, MIS12, SUV39H2, CCNB1, FSD1, CDKN1A, PSMD14, NEDD1, RNF2, PSMD10, KIF20B, RRS1, PARD6G, MPHOSPH6, SMC1A, ALG11, UTP14CMAD1L1, KIF22, S100A6, TTK, CUZD1, AURKA, PTTG1, CD2AP, TGFB1, SART1, CTNNB1, AKT1, CGREF1, NDE1, CDC45, STRA8, OIP5, RSPH1, TARDBP, PSMD1, CDCA2, CDK10, PIWIL4, ARHGAP8, MAPK6, RPS27A, TUBB3, STAG1, CCNK, CHTF8, BOLL, DDIT3, NCAPD2, JMY, MFN2, MAPK1, HHEX, CHMP1A, EP300, MAPK6, PSME2, PSMA5, ZWINT, PSMA3, MAPK3, ERN2, G0S2, MAPRE1, PDCD6IP, PPP1R15A, NUP43, GADD45A, UBA52, EID1, PML, SESN3, PSMB5, SPC24, NUMA1, PSMB2, PKD2, PPP3CB, GFI1, TRIP13, MAP2K1, WDR6, BRCA2, CENPF, NDC80, ATR, CDC25A, SMC4, PPP1R9B, HDAC3, PSMC5, PSMC3, MAPK13, CKS2, CCNDBP1CEP72, DBF4B, DBF4, CDKN2B, VPS4B, STAG3, PIWIL2, H2AFX, SIK1, CCNA2, FGF4, ARL2, ANAPC5, PDPN, RB1, PBK, PPP1CC, TACC3, CDK5, RAD50, KLHDC3, DCLRE1A, PRDM5, PELO, KPNA2, HSD3B7, STK11, CETN1, CDC34, MLF1, SPC25, GADD45GIP1, PSMB6, TSPYL2, PINX1, ERCC6L, MKI67, CKAP5, MSH2, NASP, DLGAP5, CENPJ, SMC3, PYHIN1, CDKN1B, RGS2, PSMC2, RASSF2, ZNF318, CHAF1B, PA2G4P4, TP53INP1, CALM1SPIN1, KNTC1, SENP5, FAM83D, CCNE2, MEI1, GFI1B, MTBP, PSMD3, PSMD5, MYC, ZW10, ESCO1, KIF11, PIM1, TBRG4, MCM2, INHA, CDK4, MARK4, PPP1CB, WEE2, PPM1G, PPM1D, PPP1CA, REC8, RCC2, HEPACAM, ERN1, BUB1B, IL12B, USP22, ANAPC7, NEK6, PSMB10, HAUS5, PKHD1, USP9X, HCFC1, CCNG2, PSMB7, NCAPG, KRT7, RB1CC1, OVOL1, FBXO5, MNS1, SPIN2B, PARD6A, YEATS4, BOD1, ZNF830, CINP, NUF2, KIF18A, BIRC5, HGF, SH3BP4, NOTCH2, RASSF4, PLK3, PSMD13, MAPK12, PLK1, PTP4A1, PSMC1E2F1, TUSC2, NBN, E2F4, RPRM, OSGIN2, GTSE1, RAD21, IFNG, VPS4A, PSMD4, TUBB1, CDCA5, PSMD8, TPX2, ESPL1, HMG20B, PIM2, MYH9, FOXN3, AHR, EML4, ARL3, MCM6, PSMA2, PA2G4, CCND1, MAD2L1, EREG, PRR5-ARHGAP8, HORMAD1, BIN3, SIAH2, DSCC1, PPP2R3B, RABGAP1, ITGAE, PSMA7, CALR, URGCP, PSMB1, SBDSP1, TERF2, BUB3, ERH, KAT2B, TRNP1, TP53BP2, CDC20, SIRT7, AVPI1, MPHOSPH9, CCNB2, PHGDH, GAS2L2, CHTF18, ID4, CHAF1A, SMPD3BGLAP, PDS5A, TUBB2B, POLA1, CETN2, CDC73, SYCP2, SPDYC, PRDM7, CCNB3, CHMP1B, MC1R, CCND2, HEPN1, PAFAH1B1, TUBG1, SKA1, MAP9, SPIN2A, MAP3K11 |

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention.

All of the publications, patent applications and patents cited in this specification are incorporated herein by reference in their entirety.

REFERENCES

1. Xu, Y. & Ruggero, D. *Annual Review of Cancer Biology* 4, 437-457 (2020).
2. Kapur, M., et al. *Neuron* 96, 616-637 (2017).
3. Holcik, M. & Sonenberg, N. *Nat Rev Mol Cell Biol* 6, 318-327 (2005).
4. Costa-Mattioli, M. & Walter, P. *Science* 368 (2020).
5. Ingolia, N. T. *Nat Rev Genet* 15, 205-213 (2014).
6. Ingolia, N. T., et al. *Science* 324, 218-223 (2009).
7. Guo, H., et al. *Nature* 466, 835-840 (2010).
8. Brar, G. A. et al. *Science* 335, 552-557 (2012).
9. Lee, S. et al. *Proc Natl Acad Sci USA* 109, E2424-2432 (2012).
10. Ingolia, N. T., et al. *Cell* 147, 789-802 (2011).
11. Wu, C. C., et al *Mol Cell* 73, 959-970 e955 (2019).
12. Liu, B., et al. *Mol Cell* 49, 453-463 (2013).
13. Radhakrishnan, A. et al. *Cell* 167, 122-132 e129 (2016).
14. Ji, Z., Song, et al. *Elife* 4, e08890 (2015).
15. Chen, J. et al. *Science* 367, 1140-1146 (2020).
16. Calviello, L. et al. *Nat Methods* 13, 165-170 (2016).
17. Bazzini, A. A. et al. *EMBO J* 33, 981-993 (2014).
18. McGlincy, N. J. & Ingolia, N. T. *Methods* 126, 112-129 (2017).
19. Khajuria, R. K. et al. *Cell* 173, 90-103 e119 (2018).
20. van Heesch, S. et al. *Cell* 178, 242-260 e229 (2019).
21. Clamer, M. et al. *Cell Rep* 25, 1097-1108 e1095 (2018).
22. Darnell, R. B. *Wiley Interdiscip Rev RNA* 1, 266-286 (2010).
23. Archer, S. K., Shirokikh, N. E., Beilharz, T. H. & Preiss, T. *Nature* 535, 570-574 (2016).

24. Ji, Z., Song, R., Huang, H., Regev, A. & Struhl, K. *Nat Biotechnol* 34, 410-413 (2016).
25. Picelli, S. et al. *Nat Methods* 10, 1096-1098 (2013).
26. Pearce, S. F. et al. *Trends Biochem Sci* 42, 625-639 (2017).
27. Suhm, T. et al. *Cell Metab* 27, 1309-1322 e1306 (2018).
28. Dennerlein, S., et al. *Trends Cell Biol* 27, 712-721 (2017).
29. Couvillion, M. T., et al. *Nature* 533, 499-503 (2016).
30. D'Souza, A. R. & Minczuk, M. *Essays Biochem* 62, 309-320 (2018).
31. Baechler, S. A. et al. *Nat Commun* 10, 83 (2019).
32. Rudler, D. L. et al. *Sci Adv* 5, eaay2118 (2019).
33. Gameiro, P. A. & Struhl, K. *Cell Rep* 24, 1415-1424 (2018).
34. Andreev, D. E. et al. *Elife* 4, e03971 (2015).
35. Ji, Z. RibORF: *Curr Protoc Mol Biol* 124, e67 (2018).
36. Morscher, R. J. et al. *Nature* 554, 128-132 (2018).
37. Rooijers, K., Loayza-Puch, F., Nijtmans, L. G. & Agami, R. *Nat Commun* 4, 2886 (2013).
38. Kondrashov, N. et al. *Cell* 145, 383-397 (2011).
39. Tahmasebi, S., et al. *Nat Rev Mol Cell Biol* 19, 791-807 (2018).
40. Prensner, J. R. et al. *bioRxiv,* 2020.2003.2010.981001 (2020).
41. Ouspenskaia, T. et al. *bioRxiv,* 2020.2002.2012.945840 (2020).
42. Laumont, C. M. et al. *Sci Transl Med* 10 (2018).
43. Chong, C. et al. *Nat Commun* 11, 1293 (2020).
44. Langmead, B. & Salzberg, S. L. *Nat Methods* 9, 357-359 (2012).
45. Kim, D. et al. *Genome Biol* 14, R36 (2013).
46. Frankish, A. et al. *Nucleic Acids Res* 47, D766-D773 (2019).
47. Anders, S., et al. *Bioinformatics* 31, 166-169 (2015).
48. Huang da, W. et al. *Curr Protoc Bioinformatics* Chapter 13, Unit 13 11 (2009).

The invention claimed is:

1. A method of RNAse footprinting comprising: (a) contacting a biological sample comprising cells with an RNAse in an amount sufficient to selectively protect first RNA fragments bound to a translational ribosome in a coding region, while digesting each of second RNA fragments bound by a RNA binding protein other than the translation ribosome in the coding region, (b) sequencing the first RNA fragments, and (c) mapping a ribosome profile for each of the first RNA fragments, wherein the number of cells in the biological sample is less than about 100,000, and wherein said method does not comprise ribosome isolation by centrifugation or immunoprecipitation.

2. The method of claim 1, wherein the number of cells in the biological sample is about 1,000 to about 75,000.

3. The method of claim 2, wherein the number of cells in the biological sample is about 1,000 to about 50,000.

4. The method of claim 1, wherein the number of cells in the biological samples is less than about 50,000.

5. The method of claim 1, wherein the number of cells in the biological sample is less than about 1,000.

6. The method of claim 1, wherein the biological sample contains a single cell.

7. The method of claim 1, wherein the RNase is selected from the group consisting of RNAse I, A, S7, and T1.

8. The method of claim 7, wherein the RNAse is RNAse I.

9. The method of claim 1, wherein the RNAse is contacted with the biological sample based on the ratio of RNAse to RNA, which is between 25 and 250 U RNAse/µg RNA.

10. The method of claim 8, wherein the ratio of RNAse to RNA is 50 U RNAse/µg RNA.

11. The method of claim 1, wherein said mapping simultaneously detects the ribosomal load of expressed genes in multiple cell regions.

12. The method of claim 1, wherein said mapping simultaneously detects a ribosomal load of cytosolic and mitochondrial expressed genes.

13. The method of claim 1, further comprising ligating an adapter to the first RNA fragments.

14. The method of claim 1, wherein the first RNA fragments comprise cytosolic ribosome-bound fragments.

15. The method of claim 14, wherein the cytosolic ribosome-bound fragments are 80S cytosolic ribosome-bound fragments.

16. The method of claim 1, wherein the first RNA fragments comprise mitoribosome-bound fragments.

17. The method of claim 16, wherein the mitoribosome-bound fragments are 55S mitoribosome-bound fragments.

18. The method of claim 1, wherein the first RNA fragments comprise cytosolic ribosome-bound fragments and mitoribosome-bound fragments.

19. The method of claim 1, wherein the first fragments comprise 80S cytosolic ribosome-bound fragments and 55S mitoribosome-bound fragments.

20. A method of preparing open reading frame-coding RNA fragments from a biological sample comprising: (a) contacting the biological sample with an RNAse in an amount sufficient to selectively protect first RNA fragments bound to a translational ribosome in a coding region from digestion by the RNAse, while digesting each of second RNA fragments bound by a RNA binding protein other than the translation ribosome in the coding region, (b) isolating the first RNA fragments without centrifugation, and (c) sequencing the first RNA fragments coding an open reading frame.

21. A method of low input RNase footprinting comprising: (a) contacting a biological sample comprising 50,000 or less cells with an RNase in an amount sufficient to selectively protect first RNA fragments bound to a translational ribosome in a coding region, while digesting each of second RNA fragments bound by a RNA binding protein other than the translation ribosome in the coding region, (b) sequencing the first RNA fragments, and (c) mapping a ribosome profile for each of the first RNA fragments, wherein said method does not comprise centrifugation.

22. The method of claim 1, wherein the concentration of RNAse is 0.5 to 1.5 U/µl.

* * * * *